(12) United States Patent
Wolf et al.

(10) Patent No.: US 11,860,084 B2
(45) Date of Patent: Jan. 2, 2024

(54) QUANTITATIVE AUXILIARY-FREE CHIRALITY SENSING WITH A METAL PROBE

(71) Applicant: GEORGETOWN UNIVERSITY, Washington, DC (US)

(72) Inventors: Christian Wolf, Arlington, VA (US); Zeus A. O. De Los Santos, Washington, DC (US); Ciaran Lynch, Washington, DC (US)

(73) Assignee: GEORGETOWN UNIVERSITY, Washington, DC (US)

( * ) Notice: Subject to any disclaimer, the term of this patent is extended or adjusted under 35 U.S.C. 154(b) by 277 days.

(21) Appl. No.: 17/275,471

(22) PCT Filed: Sep. 11, 2019

(86) PCT No.: PCT/US2019/050628
§ 371 (c)(1),
(2) Date: Mar. 11, 2021

(87) PCT Pub. No.: WO2020/056012
PCT Pub. Date: Mar. 19, 2020

(65) Prior Publication Data
US 2022/0113247 A1    Apr. 14, 2022

Related U.S. Application Data

(60) Provisional application No. 62/833,419, filed on Apr. 12, 2019, provisional application No. 62/729,833, filed on Sep. 11, 2018.

(51) Int. Cl.
*G01N 31/10* (2006.01)
*G01N 21/19* (2006.01)
*G01N 21/77* (2006.01)

(52) U.S. Cl.
CPC .............. *G01N 21/19* (2013.01); *G01N 21/77* (2013.01); *G01N 2021/7786* (2013.01)

(58) Field of Classification Search
CPC ........ G01N 21/19; G01N 21/78; G01N 21/64; G01N 31/10; G01N 33/52; G01N 33/53; C07C 205/07; C07D 311/04
(Continued)

(56) References Cited

U.S. PATENT DOCUMENTS 5,229,301 A    7/1993   Spira-Solomon et al.
5,624,847 A *   4/1997   Lakowicz .............. G01N 33/84
                                         436/163

(Continued)

FOREIGN PATENT DOCUMENTS

CN       104610960 A     5/2015
WO    2014144197 A1    9/2014
(Continued)

OTHER PUBLICATIONS

PCT/US2019/050628, International Preliminary Report on Patentability (dated Mar. 25, 2021).
(Continued)

*Primary Examiner* — Hoa Q Pham
(74) *Attorney, Agent, or Firm* — Troutman Pepper Hamilton Sanders LLP (Rochester)

(57) ABSTRACT

The present invention relates to an analytical method that includes providing a sample potentially containing a chiral analyte that can exist in stereoisomeric forms, and providing a probe selected from the group consisting of metal salts. The sample is contacted with the probe under conditions that permit coordination of the probe to the analyte, if present in the sample; and, based on any coordination that occurs, the absolute configuration of the analyte in the sample, and/or the concentration of the analyte in the sample, and/or the
(Continued)

enantiomeric composition of the analyte in the sample is/are determined.

26 Claims, 66 Drawing Sheets

(58) Field of Classification Search
USPC ............. 436/501, 172, 73, 89; 356/300–326, 356/432–440
See application file for complete search history.

(56) References Cited

U.S. PATENT DOCUMENTS

| | | | |
|---|---|---|---|
| 5,763,679 | A | 6/1998 | Nicholson et al. |
| 6,013,531 | A * | 1/2000 | Wang .................... C08F 285/00 436/526 |
| 6,875,877 | B2 | 4/2005 | Li et al. |
| 7,045,360 | B2 | 5/2006 | Shair et al. |
| 7,332,343 | B2 | 2/2008 | Anslyn et al. |
| 7,648,841 | B2 | 1/2010 | Inque et al. |
| 7,670,847 | B2 | 3/2010 | Anslyn et al. |
| 7,736,902 | B2 | 6/2010 | Inque et al. |
| 8,189,188 | B2 | 5/2012 | Busch et al. |
| 9,085,511 | B2 | 7/2015 | Wolf et al. |
| 9,815,746 | B2 | 11/2017 | Wolf et al. |
| 10,012,627 | B2 | 7/2018 | Wolf et al. |
| 10,788,471 | B2 | 9/2020 | Wolf et al. |
| 10,900,941 | B2 | 1/2021 | Wolf et al. |
| 2011/0045598 | A1 | 2/2011 | Busch et al. |
| 2012/0064632 | A1 | 3/2012 | Robinson et al. |
| 2014/0291166 | A1* | 10/2014 | Futamatsu ........... C12Q 1/6825 204/400 |
| 2015/0010938 | A1 | 1/2015 | Strongin et al. |
| 2016/0011156 | A1 | 1/2016 | Wolf et al. |
| 2016/0039792 | A1 | 2/2016 | Bogyo et al. |
| 2016/0195532 | A1 | 7/2016 | Carroll et al. |
| 2017/0261502 | A1 | 9/2017 | Karlsson |
| 2020/0150128 | A1 | 5/2020 | Wolf et al. |

FOREIGN PATENT DOCUMENTS

| | | |
|---|---|---|
| WO | 2014145251 A1 | 9/2014 |
| WO | 2017078570 A1 | 5/2017 |
| WO | 2018200498 A1 | 1/2018 |
| WO | 2020028396 A1 | 2/2020 |
| WO | 2020056012 A1 | 3/2020 |

OTHER PUBLICATIONS

PCT/US2018/029109, International Search Report and Written Opinion (dated Aug. 1, 2018).
PCT/US2018/029109, International Preliminary Report on Patentability (dated Nov. 7, 2019).
Pubchem. CID No. 10008, https://pubchem.ncbi.nlm.nih.gov/compound/10008 (retrieved Jun. 8, 2018).
Aikawa & Mikami, "Asymmetric Catalysis Based on Tropos Ligands," Chem. Commun. 48:11050-69 (2012).
Altun et al., "Structural and Spectroscopic (UV-VIS, IR, Raman, and NMR) Characteristics of Anisaldehyde That Are Flavoring Additives: A Density Functional Study in Comparison with Experiments," J. Mol. Struct. 1128:590-605 (2017).
Bentley et al., "Chirality Sensing of Amines, Diamines, Amino Acids, Amino Alcohols, and Alpha-Hydroxy Acids with a Single Probe," J. Am. Chem. Soc. 135:18052-55 (2013).
Bull et al., "Exploiting the Reversible Covalent Bonding of Boronic Acids: Recognition, Sensing, and Assembly," Acc. Chem. Res. 46(2):312-26 (2013).
Gajewy et al., "Asymmetric Hydrosilylation of Ketones Catalyzed by Complexes Formed from Trans-Diaminocyclohexane-Based Diamines and Diethylzinc," Monatsh Chem. 143:1045-54 (2012).

Gajewy et al., "Mechanism and Enantioselectivity of [Zinc(diamine)(diol)]-Catalyzed Asymmetric Hydrosilylation of Ketones: DFT, NMR and ECD Studies," Eur. J. Org. Chem. 2013(2):307-18 (2013).
Ghosn & Wolf, "Chiral Amplification with a Stereodynamic Triaryl Probe: Assignment of the Absolute Configuration and Enantiomeric Excess of Amino Alcohols," J. Am. Chem. Soc. 131:16360-61 (2009).
Ghosn & Wolf "Synthesis, Conformational Stability, and Asymmetric Transformation of Atropisomeric 1,8-Bisphenolnapthalenes," J. Org. Chem. 76(10):3888-3897 (2011).
Iwaniuk & Wolf, "Chiroptical Sensing of Citronellal: Systematic Development of a Stereodynamic Probe Using the Concept of Isostericity," Chem. Commun. 48:11226-28 (2012).
Iwaniuk et al., "Enantioselective Sensing of Chiral Amino Alcohols with a Stereodynamic Arylacetylene-Based Probe," Chirality 24:584-89 (2012).
Joyce et al., "Enantio- and Chemoselective Differentiation of Protected Alpha-Amino Acids and Beta-Homoamino Acids with a Single Copper Host," Chemistry 18(26):8064-69 (2012).
Li et al., "Absolute Configuration for 1,n-Glycols: A Nonempirical Approach to Long-Range Stereochemical Determination," J. Am. Chem. Soc. 134:9026-29 (2012).
Lima et al., "Elucidating the Role of Aromatic Interactions in Rotational Barriers Involving Aromatic Systems," J. Org. Chem. 77(22): 10422-10426 (2012).
Lynch, et al., "Chiroptical Sensing of Unprotected Amino Acids, Hydroxy Acids, Amino Alcohols, Amines and Cabroxylic Acids with Metal Salts," Chem. Commun. 55:6297-6933 (2019).
Matyasovszky et al., "Kinetic Study of the Electrochemical Oxidation of Salicylic Acid and Salicylaldehyde Using UV/Vis Spectroscopy and Multivariate Calibration," J. Phys. Chem. A 113:9348-9353 (2009).
Meca et al., "Racemization Barriers of 1,1'-Binaphthyl and 1,1'-Binapthalene-2,2'-Diol: A DFT Study," J. Org. Chem. 68:5677-80 (2003).
Mikami & Aikawa, "Dynamic Asymmetric Catalysis by Diphenylphosphinoferrocene (DPPF)-Nickel Complexes Through Control of Axial Chirality by Chiral Diamines," Org. Lett. 4(1):99-101 (2002).
Mikami et al., "Tropos or Atropos? That Is the Question!," Synlett 10:1561-78 (2002).
Miyashita et al., "Synthesis of 2,2'-Bis(Diphenylphosphino)-1,1'-Binaphthyl (BINAP), an Atropisomeric Chiral Bis (Triaryl)Phosphine, and Its Use in the Rhodium(I)-Catalyzed Asymmetric Hydrogenation of α-(Acylamino)Acrylic Acids," J. Am. Chem. Soc. 102:7932-34 (1980).
Nieto et al., "A Facile CD Protocol for Rapid Determination of Enantiomeric Excess and Concentration of Chiral Primary Amines," Chemistry 16(1):227-32 (2010).
"Principles of US/Visible Spectrophotometry" in UV and Visible Absorption Techniques, Modern Methods of Pharmaceutical Analysis, (1):31-125.
Pubchem CID 20820440, "14-Chloro-13,15-dioxa-14-phosphapentacyclo[14.8.0.03,12.04,9.019,24]tetracosa-1(16),3(12),4,6,8,10,17,19,21,23-decaene," https://pubchem.ncbi.nlm.nih.gov/compound/20820440 (last accessed Nov. 9, 2019).
Suvitha et al., "NBO, HOMO-LUMO, UV, NLO, NMR and Vibrational Analysis of Vertrole using FT-IR, FT-Raman, FT-NMR Spectra and HF-DFT Computational Methods," Spectrochim. Acta A Mol. Biomol. Spectrosc. 138:357-369 (2015).
Wolf & Bentley, "Chirality Sensing Using Stereodynamic Probes with Distinct Electronic Circular Dichroism Output," Chem. Soc. Rev. 42:5408-24 (2013).
Wu, et al., "Vibrational and Electronic Circular Dichroism Monitoring of Copper(II) Coordination with a Chiral Ligand," Chirality, 24:451-458 (2012).
Wu, et al., "Enhancement of Visual Chiral Sensing Via An Anion-Binding Approach: Novel Ionic Liquids as the Chiral Selectors," Analytica Chimica Acta, 962:97-103 (2017).
You et al., "An Exciton-Coupled Circular Dichroism Protocol for the Determination of Identity, Chirality, and Enantiomeric Excess of Chiral Secondary Alcohols," J. Am. Chem Soc. 134:7117-25 (2012).

(56) References Cited

OTHER PUBLICATIONS

Yu et al., "Simultaneous Determination of Both the Enantiomeric Composition and Concentration of a Chiral Substrate with One Fluorescent Sensor," J. Am. Chem.Soc. 134(50):20282-85 (2012).
Zardi et al., "Concentration-Independent Stereodynamic g-Probe for Chiroptical Enantiomeric Excess Determination," J. Am. Chem. Soc. 139(44):15616-15619 (2017).
Zhang & Wolf, "Sensing of the Concentration and Enantiomeric Excess of Chiral Compounds with Tropos Ligand Derived Metal Complexes," Chem. Commun. 49:7010-12 (2013).
PCT/US2014/29982, International Search Report and Written Opinion (dated Aug. 12, 2014).
PCT/US2014/028500, International Preliminary Report on Patentability (dated Sep. 15, 2015).
PCT/US2019/044189, International Search Report and Written Opinion (dated Oct. 1, 2019).
PCT/US2019/050628, International Search Report and Written Opinion (dated Nov. 27, 2019).
Joyce, et al., "A Simple Method for the Determination of Enantiomeric Excess and Identity of Chiral Carboxylic Acids," J. Am. Chem. Soc., 133(34):13746-13752 (2011).
Nieto, et al., "Rapid Enantiomeric Excess and Concentration Determination Using Simple Racemic Metal Complexes," Org. Lett., 10(22):5167-5170 (2008).
Folmer-Andersen, et al., "Colorimetric Enantiodiscrimination of alpha-Amino Acids in Protic Media," J. Am. Chem. Soc., 127(22):7986-7987 (2005).
Zhang et al., "Thiol-Activated Triplet-Triplet Annihilation Upconversion: Study of the Different Quenching Effect of Electron Acceptor on the Single and Triplet Excited States of Bodipy," J. Org. Chem., 80:5674-5686 (2015).
Ramachandran et al., "2,4-Dinitro-1-napthyl 4-toluene sulfonate," Acta Cryst. 64:873 (2008).
De los Santos et al., "Optical Chirality Sensing with an Auxiliary-Free Earth-Abundant Cobalt Probe," Angew. Chem. Int. Ed., 58(4):1198-1202 (2018).

\* cited by examiner

US 11,860,084 B2

QUANTITATIVE AUXILIARY-FREE CHIRALITY SENSING WITH A METAL PROBE

This application is a national stage application under 35 U.S.C. § 371 of International Application No. PCT/US2019/050628, filed Sep. 11, 2019, which claims the priority benefit of U.S. Provisional Patent Application Ser. No. 62/729,833, filed Sep. 11, 2018, and U.S. Provisional Patent Application Ser. No. 62/833,419, filed Apr. 12, 2019, which are hereby incorporated by reference in their entirety.

This invention was made with government support under grant numbers CHE-1464547 and CHE-1764135 awarded by the National Science Foundation. The government has certain rights in the invention.

FIELD OF THE INVENTION

The present invention relates to an analytical method for the determination of the absolute configuration of an analyte in a sample, and/or the concentration of an analyte in a sample, and/or the enantiomeric composition of an analyte in a sample, based on chiroptical testing of a metal analyte complex.

BACKGROUND OF THE INVENTION

The ubiquity, diversity and general importance of chiral compounds in the chemical and pharmaceutical sciences continue to nurture the search for high-throughput methods that achieve fast quantification of analyte concentration and enantiomeric composition and are compatible with multi-well plate technology and parallel data acquisition. Despite the development of time-efficient chromatographic enantioseparations (Kotoni et al., "Introducing Enantioselective Ultrahigh-Pressure Liquid Chromatography (eUHPLC): Theoretical Inspections and Ultrafast Separations On A New Sub-2-Mum Whelk-01 Stationary Phase," *Anal. Chem.* 84:6805 (2012); Barhate et al., "Ultrafast Chiral Separations for High Throughput Enantiopurity Analysis," *Chem. Commun.* 53:509-512 (2017)), NMR (Wenzel, T. J. (Ed.), "Discrimination of Chiral Compounds Using NMR Spectroscopy," Wiley, Hoboken, NJ, (2007); Yang et al., *J. ACS Cent. Sci.* 2:332 (2016)), and optical (Pu, L., *Chem. Rev.* 104:1687-1716 (2004); Leung et al., *Chem. Soc. Rev.* 41:448 (2012); Wolf, C. & Bentley, K. W., *Chem. Soc. Rev.* 42:5408 (2013); Metola et al., *Chem. Sci.* 5:4278 (2014)) spectroscopic methods have received considerable attention in recent years. To this end, the use of metal coordination complexes that often combine several attractive features, including broad application scope, fast analyte binding at low concentrations and distinct resolution of stereoisomers, has become quite popular. Many metal based NMR solvating agents (Kelly et al., *Org. Lett.* 8:1971 (2006); Perez-Fuertes et al., *Nat. Protoc.* 3:210 (2008); Kelly et al., *Nat. Protoc.* 3:215 (2008); Mishra et al., *Org. Biomol. Chem.* 12:495 (2014); Zhao, Y. & Swager, T. M., *J. Am. Chem. Soc.* 137:3221 (2015); Seo, M.-S. & Kim, H., *J. Am. Chem. Soc.* 137:14190 (2015); Storch et al., *Chem. Commun.* 51:15665-15668 (2015); Tickell et al., *J. Org. Chem.* 81:6795 (2016); Li, L.-P. & Ye, B.-H., *Inorg. Chem.* 56:10717 (2017)), including lanthanide shift reagents (McCreary et al., *J. Am. Chem. Soc.* 96:1038 (1974); Yeh et al., *J. Org. Chem.,* 51:5439 (1986)), and optical sensors (Matile et al., *J. Am. Chem. Soc.* 117:7021 (1995); Huang et al., *J. Am. Chem. Soc.* 124:10320 (2002); Nieto et al., *J. Am. Chem. Soc.* 130:9232 (2008); Holmes et al., W. *J. Am. Chem. Soc.* 129:1506 (2007); Wezenberg et al., *Angew. Chem.* 50:713 (2011); He et al., *Chem. Commun.* 47:11641 (2011); You et al., *J. Am. Chem. Soc.* 134:7117-7125 (2012); Li et al., *J. Am. Chem. Soc.* 134:9026 (2012); Dragna et al., *J. Am. Chem. Soc.* 134:4398 (2012); Joyce et al., *J. Am. Chem. Soc.* 133:13746 (2011); Joyce, L. A.; Canary, J. W. & Anslyn, E. V., *Chem. Eur. J.* 18:8064 (2012); Zhang, P. & Wolf, C., *Chem. Commun.* 49:7010 (2013); Bentley, K. W. & Wolf, C., *J. Am. Chem. Soc.* 135:18052 (2013); Bentley et al., *J. Am. Chem. Soc.* 135:18052 (2013); Scaramuzzo et al., *Chem. Eur. J.* 19:16809 (2013); Huang et al., *Chem. Eur. J.* 20:16458 (2014); Irfanoglu, B. & Wolf, C., *Chirality* 26:379 (2014); Bentley et al., *Chirality* 27:700-707 (2015); Shcherbakova et al., *Angew. Chem. Int. Ed.* 54:7130 (2015); Bentley et al., *J. Org. Chem.* 81:1185 (2016); Gholami et al., *Chem. Eur. J.* 22:9235 (2016); De los Santos et al., *Chirality* 29:663-669 (2017); Zardi et al., *J. Am. Chem. Soc.* 139:15616 (2017)) have been introduced to achieve stereochemical analysis of chiral compounds.

The determination of the absolute configuration and ee values of nonracemic samples with metal complex derived probes generally involves the use of a carefully designed ligand or reagent to achieve enantioselective resolution of the chiral substrate via formation of diastereomeric species. In many cases, the required auxiliary is either expensive or not commercially available and therefore needs to be synthesized. Some assays utilize air and moisture sensitive organometallic compounds which necessitates anhydrous solvents and operation under inert atmosphere. Altogether, these drawbacks can considerably diminish throughput and lab productivity while increasing cost and workload. Because ee analysis with currently available methods is often complicate and time-consuming, it generates a major bottleneck in the workflow.

Chirality plays a fundamental role in nature and across the chemical sciences. The analysis of the enantiomeric composition of chiral compounds has become a crucial task in countless endeavors aimed at developing pharmaceuticals, agrochemicals, materials, molecular devices and other products. For more than 50 years, this field has been dominated by chromatography on chiral stationary phases and by NMR analysis with chiral solvating or derivatizing agents (Wolf, C., "Dynamic Stereochemistry of Chiral Compounds," RSC Publishing, Cambridge, pp. 136-179 (2008)). Despite the introduction of powerful HPLC, SFC (Kotoni et al., "Introducing Enantioselective Ultrahigh-Pressure Liquid Chromatography (eUHPLC): Theoretical Inspections and Ultrafast Separations on a New Sub-2-Mum Whelk-O1 Stationary Phase," *Anal. Chem.* 84:6805 (2012); Barhate et al., "Ultrafast Chiral Separations for High Throughput Enantiopurity Analysis," *Chem. Commun.* 53:509 (2017)) and NMR (Yang et al., *ACS Cent. Sci.* 2:332 (2016); Luu et al., *Chem. Sci.* 9:5087 (2018) and references therein) methods, the advance of automated instrumentation and high-throughput expectations in industrial and academic laboratories has shifted increasing attention toward time-efficient optical methods that are compatible with multi-well plate technology and parallel screening setups (Pu, L., *Chem. Rev.* 104:1687 (2004); Leung et al., *Chem. Soc. Rev.* 41:448 (2012); Wolf, C. & Bentley, K. W., *Chem. Soc. Rev.* 42:5408 (2013); Metola et al., *Chem. Sci.* 5:4278 (2014)). The development of metal coordination complexes carrying carefully designed chiral or stereodynamic ligands has led to a wide variety of broadly applicable NMR agents (Kelly et al., *Org. Lett.* 8:1971 (2006); Pérez-Fuertes et al., *Nat. Protoc.* 3:210 (2008); Kelly et al., *Nat. Protoc.* 3:215 (2008); Mishra et al., *Org. Biomol. Chem.* 12:495 (2014); Zhao, Y. & Swager, T.

M., *J. Am. Chem. Soc.* 137:3221 (2015); Seo, M.-S. & Kim, H., *J. Am. Chem. Soc.* 137:14190 (2015); Storch et al., *Chem. Commun.* 51:15665 (2015); Tickell et al., *J. Org. Chem.* 81:6795 (2016); Li, L.-P.; Ye, B.-H. *Inorg. Chem.* 56:10717 (2017)) and optical sensors (Matile et al., *J. Am. Chem. Soc.* 117:7021 (1995); Huang et al., *J. Am. Chem. Soc.* 124:10320 (2002); Nieto et al., *J. Am. Chem. Soc.* 130:9232 (2008); Holmes et al., *J. Am. Chem. Soc.* 129:1506 (2007); Wezenberg et al., *Angew. Chem.* 50:713 (2011); He et al., *Chem. Commun.* 47:11641 (2011); You et al., *J. Am. Chem. Soc.* 134:7117 (2012); Li et al., *J. Am. Chem. Soc.* 134:9026 (2012); Dragna et al., *J. Am. Chem. Soc.* 134:4398 (2012); Joyce et al., *J. Am. Chem. Soc.* 133:13746 (2011); Joyce et al., *Chem. Eur. J.* 18:8064 (2012); Zhang, P. & Wolf, C., *Chem. Commun.* 49:7010 (2013); Bentley, K. W. & Wolf, C., *J. Am. Chem. Soc.* 135:12200 (2013); Bentley et al., *J. Am. Chem. Soc.* 135:18052 (2013); Scaramuzzo et al., *Chem. Eur. J.* 19:16809 (2013); Huang et al., *Chem. Eur. J.* 20:16458 (2014); Irfanoglu, B. & Wolf, C., *Chirality* 26:379 (2014); Bentley et al., *Chirality* 27:700 (2015); Shcherbakova et al., *Angew. Chem. Int. Ed.* 54:7130 (2015); Bentley et al., *J. Org. Chem.* 81:1185 (2016); Gholami et al., *Chem. Eur. J.* 22:9235 (2016); De los Santos et al., *Chirality* 29:663 (2017); Zardi et al., *J. Am. Chem. Soc.* 139:15616 (2017)) that, in principle, allow simultaneous determination of the enantiomeric excess (ee) of chiral compounds.

Optical chirality sensing with metal complexes typically relies on fast analyte coordination or incorporation of the target compound into a supramolecular assembly. These processes affect the photophysical properties of one or more than one chromophoric reporter unit in the sensor scaffold via intramolecular interactions and formation of distinct spatial arrangements. This affords induced or altered circular dichroism, fluorescence or UV signals that can be compared to a calibration curve to calculate the sample ee values (Herrera et al., *J. Am. Chem. Soc.* 140:10385 (2018)). A remaining drawback is that the required sensor scaffold may be expensive, moisture sensitive or not commercially available.

Circular dichroism spectroscopy is one of the most powerful techniques commonly used for elucidation of the three-dimensional structure, molecular recognition events, and stereodynamic processes of chiral compounds (Gawroński & Grajewski, *Org. Lett.* 5:3301-03 (2003); Allenmark, *Chirality* 15:409-22 (2003); Berova et al., *Chem. Soc. Rev.* 36:914-31 (2007)). The potential of chiroptical CD (circular dichroism) and CPL (circular polarized luminescence) assays with carefully designed probes that produce a circular dichroism signal upon recognition of a chiral substrate has received increasing attention in recent years, and bears considerable promise with regard to high-throughput ee screening (Nieto et al., *J. Am. Chem.* 130:9232-33 (2008); Leung et al., *Chem. Soc. Rev.* 41:448-79 (2012); Song et al., *Chem. Commun.* 49:5772-74 (2013) (chirality CPL sensing)).

In many cases, the CD output of a chemosensor allows determination of the absolute configuration and the enantiomeric composition of the chiral analyte (Wolf & Bentley, *Chem. Soc. Rev.* 42:5408-24 (2013)). But the analysis of the concentration and the enantiomeric composition of chiral substrates by a single optical chemosensor is a difficult task, and a practical method that is applicable to many chiral compounds and avoids time consuming derivatization and purification steps is very desirable (Nieto et al., *Org. Lett.* 10:5167-70 (2008); Nieto et al., *Chem. Eur. J.* 16:227-32 (2010); Yu et al., *J. Am. Chem. Soc.* 134:20282-85 (2012)).

A robust chirality sensing method that (a) can be performed in aqueous or alcoholic solvents under air and (b) is devoid of organic ligands or reagents could overcome these common restraints. An assay that only requires a readily available inorganic salt of an earth-abundant metal in non-hazardous solvents would be more practical, inexpensive, operationally safe and likely to find wide acceptance in academic and industrial laboratories concerned with the synthesis and analysis of chiral compounds.

The present invention is directed to overcoming these and other deficiencies in the art.

SUMMARY OF THE INVENTION

The present invention relates to an analytical method that includes providing a sample potentially containing a chiral analyte that can exist in stereoisomeric forms, and providing a probe selected from the group consisting of metal salts. The sample is contacted with the probe under conditions that permit coordination of the probe to the analyte, if present in the sample; and, based on any coordination that occurs, the absolute configuration of the analyte in the sample, and/or the concentration of the analyte in the sample, and/or the enantiomeric composition of the analyte in the sample is/are determined.

Quantitative optical chirality sensing is possible with ligand-free, earth-abundant cobalt salts devoid of an organic reporter moiety (De los Santos et al., Angew. Chem. 58:1198 (2019), which is hereby incorporated by reference in its entirety). To obtain complexes that are rapidly formed and produce stable CD signals Co(II) salts were used that were treated upon complexation with hydrogen peroxide to afford Co(III) complexes, which can be conveniently handled under air. The introduction of inexpensive, readily available metal salts that can be directly applied to ee analysis streamlines the assay development because it obviates the need to optimize an organic ligand and it results in a simplified sensing protocol with reduced operational cost and waste. It is herein demonstrated that this is a generally useful concept and a variety of examples are shown using cobalt, manganese, iron, palladium, copper, rhodium and cerium salts to sense unprotected amino acids, hydroxy acids, amino alcohols, amines and carboxylic acids in a simple mix-and-measure protocol.

BRIEF DESCRIPTION OF THE DRAWINGS

FIG. 53A shows the reaction with 0 mol % oxidant added (1: pale pink; 24: pale pink; 25: pale pink;

34: pale orange). FIG. 53B shows 50 mol % oxidant added (1: purple; 24: pale green; 25: purple; 24: brown). FIG. 53C shows 100 mol % oxidant added (1: purple; 24: pale green; 25: purple; 34: brown).

FIG. 76A (18) and FIG. 76C (34) show the CD spectra. Linear plots were constructed of the CD amplitudes versus % ee of 18 (FIG. 76B) and 34 (FIG. 76D). All CD measurements were taken at 1.8 mM (18) or 0.5 mM (34) in MeOH.

FIG. 77A shows the UV spectra of the Co(III) assembly formed with increasing amounts of 25 (0 to 300 mol % of Co(III)). FIG. 77B shows the linear plot of the UV maximum obtained at 535 nm versus molar equivalents of 25. FIG. 77C shows the CD spectra of the Co(III) sensing of varying enantiomeric compositions of 25. FIG. 77D shows the plots of the CD amplitudes obtained at 400 (orange) and 560 (blue) nm against % ee of 25. All spectra were obtained at 1.8 mM in MeOH.

FIG. 119 shows the CD spectra of the assembly obtained from $CuCl_2 \cdot 2H_2O$, TBAOH, and (S)-24 (blue) or (R)-24 (orange) in DMSO (0.5 mM $CuCl_2 \cdot 2H_2O$, 2.5 equivalents of 24).

FIG. 120 shows the CD spectra of the assembly obtained from $CuCl_2 \cdot 2H_2O$, and (S,R)-25 (blue) or (R,S)-25 (orange) in DMSO (0.5 mM $CuCl_2 \cdot 2H_2O$, 2.5 equivalents of 25).

FIG. 121 shows the CD spectra of the assembly obtained from $CuCl_2 \cdot 2H_2O$, and (S,R)-26 (blue) or (R,S)-26 (orange) in DMSO (0.5 mM $CuCl_2 \cdot 2H_2O$, 2.5 equivalents of 26).

FIG. 122 shows the CD spectra of the assembly obtained from $CuCl_2 \cdot 2H_2O$, and (S,S)-27 (blue) or (R,R)-27 (orange) in DMSO (0.5 mM $CuCl_2 \cdot 2H_2O$, 2.5 equivalents of 27).

FIG. 123 shows the CD spectra of the assembly obtained from $CuCl_2 \cdot 2H_2O$, and (S,R)-28 (blue) or (R,S)-28 (orange) in DMSO (0.5 mM $CuCl_2 \cdot 2H_2O$, 2.5 equivalents of 28).

FIG. 124 shows the CD spectra of the assembly obtained from $CuCl_2 \cdot 2H_2O$, TBAOH, and (S,S)-31 (blue) or (R,R)-31 (orange) in DMSO (0.5 mM $CuCl_2 \cdot 2H_2O$, 2.5 equivalents of 31).

FIG. 125 shows the CD spectra of the assembly obtained from $CuCl_2 \cdot 2H_2O$, and (S)-36 (blue) or (R)-36 (orange) in DMSO (0.5 mM $CuCl_2 \cdot 2H_2O$, 5 equivalents of 36).

FIG. 126 shows the CD spectra of the assembly obtained from $CuCl_2 \cdot 2H_2O$, and (S)-37 (blue) or (R)-37 (orange) in DMSO (1.8 mM $CuCl_2 \cdot 2H_2O$, 5 equivalents of 37).

FIG. 127 shows the CD spectra of the assembly obtained from $Ce(NO_3)_3 \cdot 6H_2O$, TBAOH, and (S)-1 (blue) or (R)-1 (orange) in DMSO (1.8 mM $Ce(NO_3)_3 \cdot 6H_2O$, 3 equivalents of 1).

FIG. 128 shows the CD spectra of the assembly obtained from $RhCl_3 \cdot 3H_2O$, TBAOH, and (S)-1 (blue) or (R)-1 (orange) in MeOH (1.8 mM $RhCl_3 \cdot 3H_2O$, 3 equivalents of 1).

FIG. 129 shows the CD spectra of the assembly obtained from $RhCl_3 \cdot 3H_2O$, TBAOH, and (S)-23 (blue) or (R)-23 (orange) in DMSO (1.8 mM $RhCl_3 \cdot 3H_2O$, 3 equivalents of 23).

FIG. 130 shows the CD spectra of the assembly obtained from $RhCl_3 \cdot 3H_2O$, and (S,R)-25 (blue) or (R,S)-25 (orange) in DMSO (1.8 mM $RhCl_3 \cdot 3H_2O$, 3 equivalents of 25).

Figure 131:
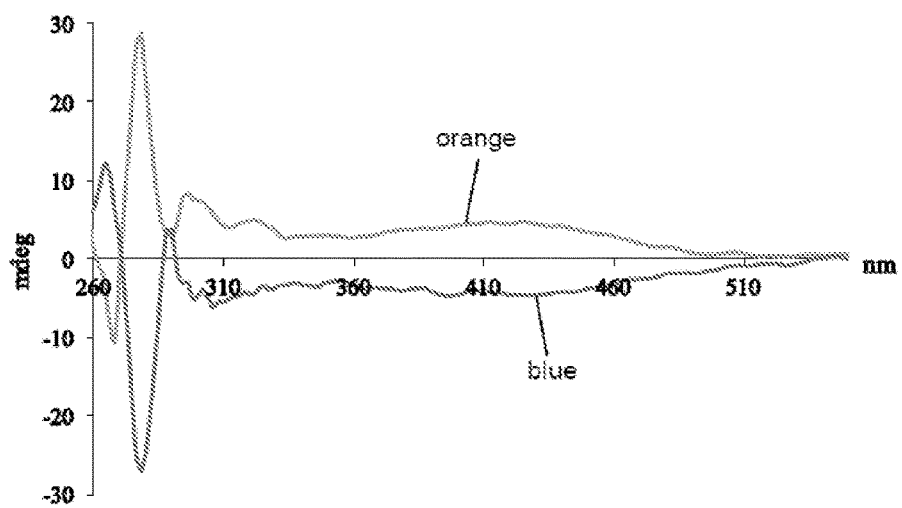

FIG. 131 shows the CD spectra of the assembly obtained from $RhCl_3 \cdot 3H_2O$, and (S)-36 (blue) or (R)-36 (orange) in MeOH at (0.9 mM $RhCl_3 \cdot 3H_2O$, 6 equivalents of 36).

Figure 132:
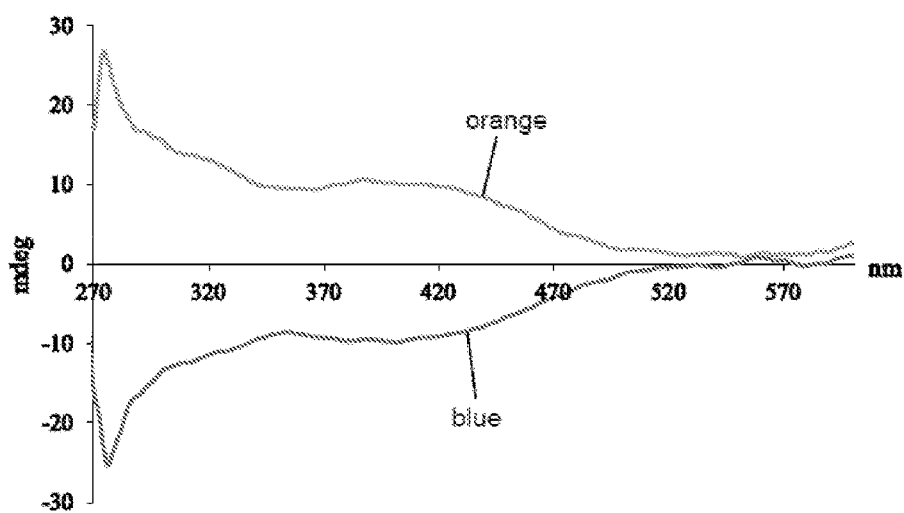

FIG. 132 shows the CD spectra of the assembly obtained from $RhCl_3 \cdot 3H_2O$, and (S)-37 (blue) or (R)-37 (orange) in MeOH (0.9 mM $RhCl_3 \cdot 3H_2O$, 6 equivalents of 37).

Figure 133:
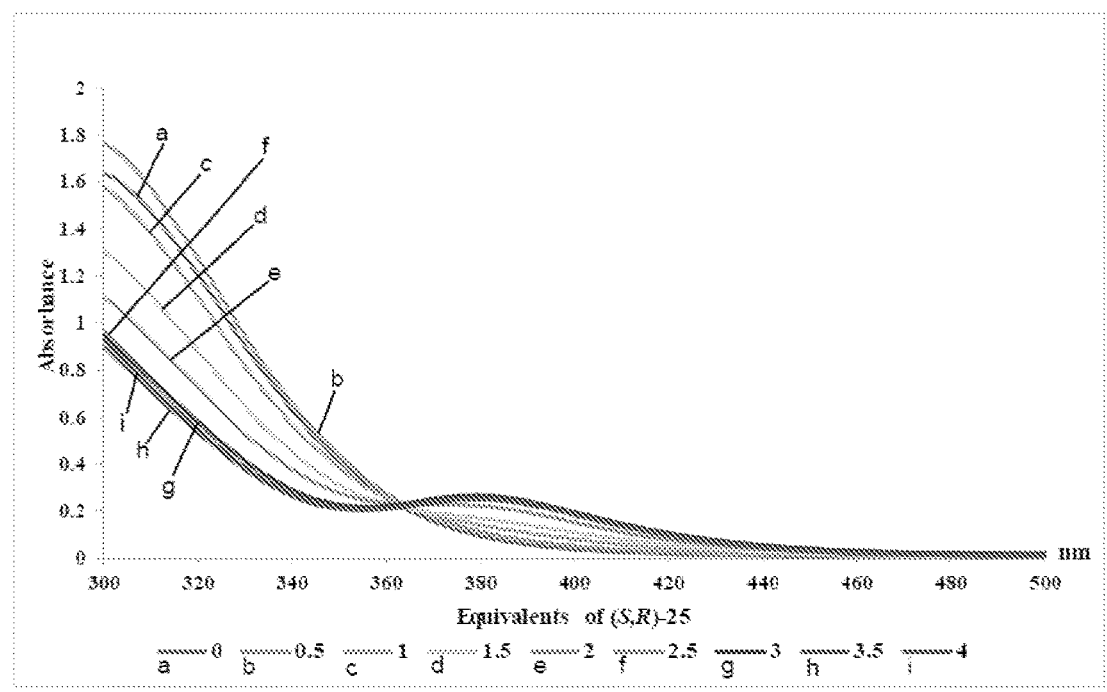

FIG. 133 shows the UV spectra of the assembly formed between $Cu(Cl)_2 \cdot 2H_2O$ and (S,R)-25 in DMSO (0.5 mM $Cu(Cl)_2 \cdot 2H_2O$).

Figure 134:
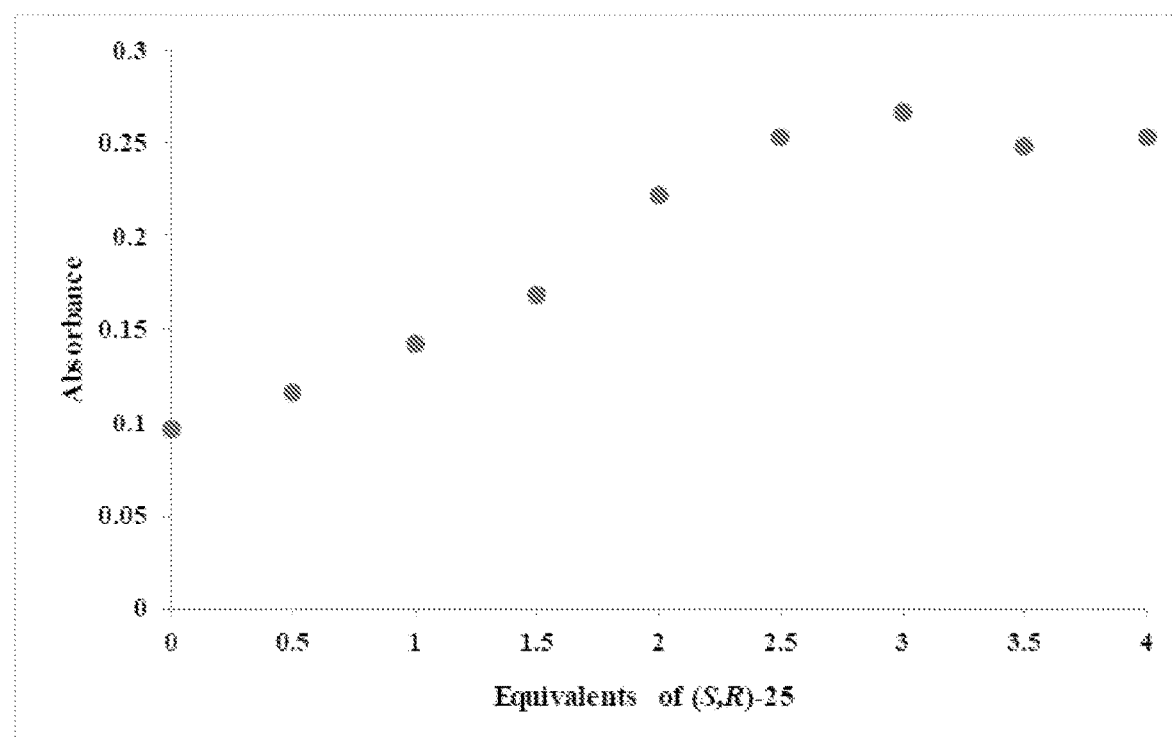

FIG. 134 shows the UV amplitude at 380 nm plotted against the equivalents of (S,R)-25 of the assembly formed between probe $Cu(Cl)_2 \cdot 2H_2O$ and analyte (S,R)-25.

Figure 135:
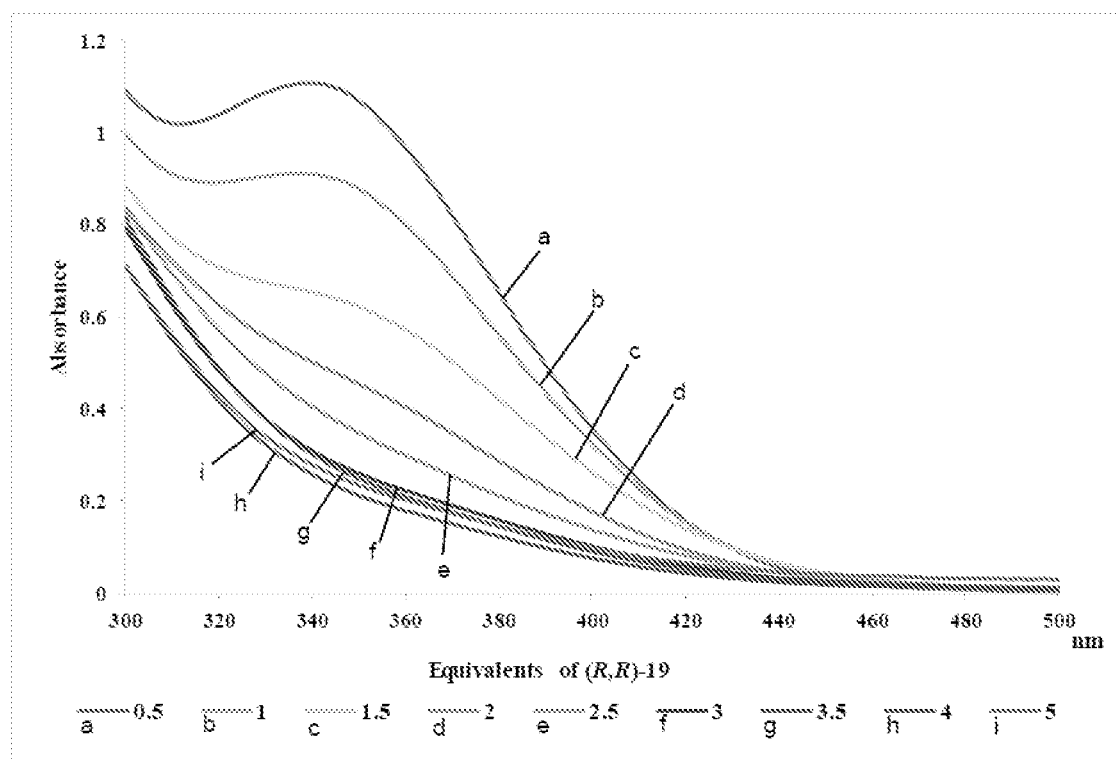

FIG. 135 shows the UV spectra of the assembly formed between $Fe(Cl)_3 \cdot 6H_2O$ and (R,R)-19 (0-5 equivalents) in DMSO (0.5 mM $Fe(Cl)_3 \cdot 6H_2O$).

Figure 136:
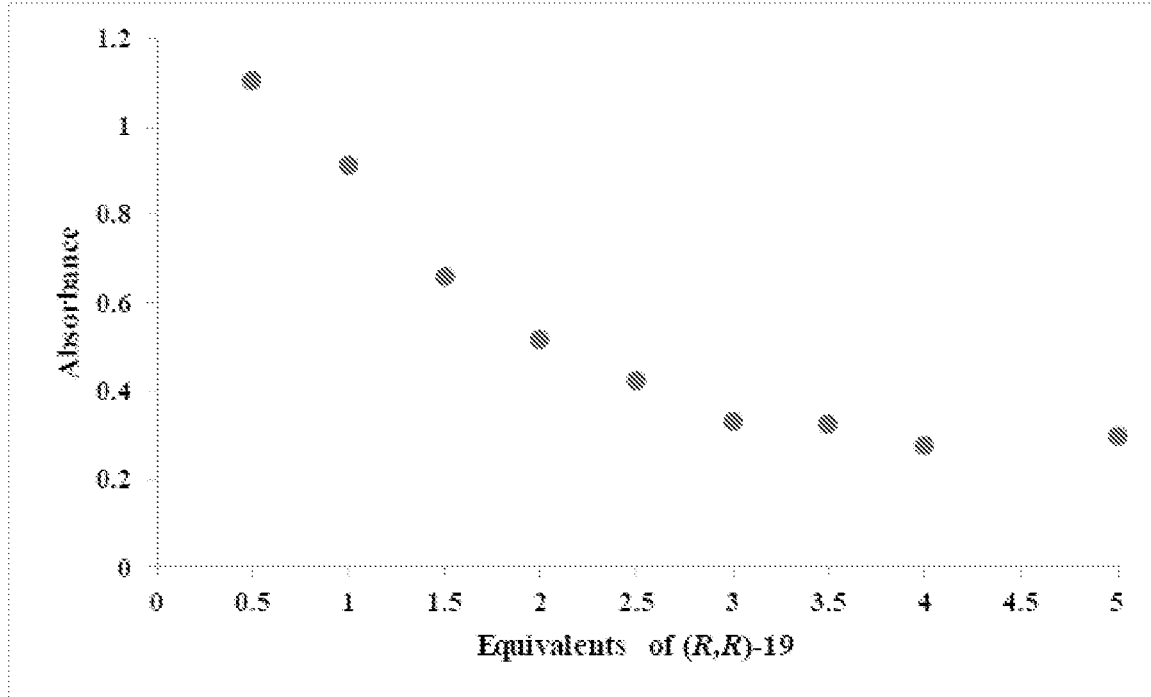

FIG. 136 shows the UV amplitude at 337 nm plotted against the equivalents of (R,R)-19 of the assembly formed between probe $Fe(Cl)_3 \cdot 6H_2O$ and analyte (R,R)-19.

Figure 137:
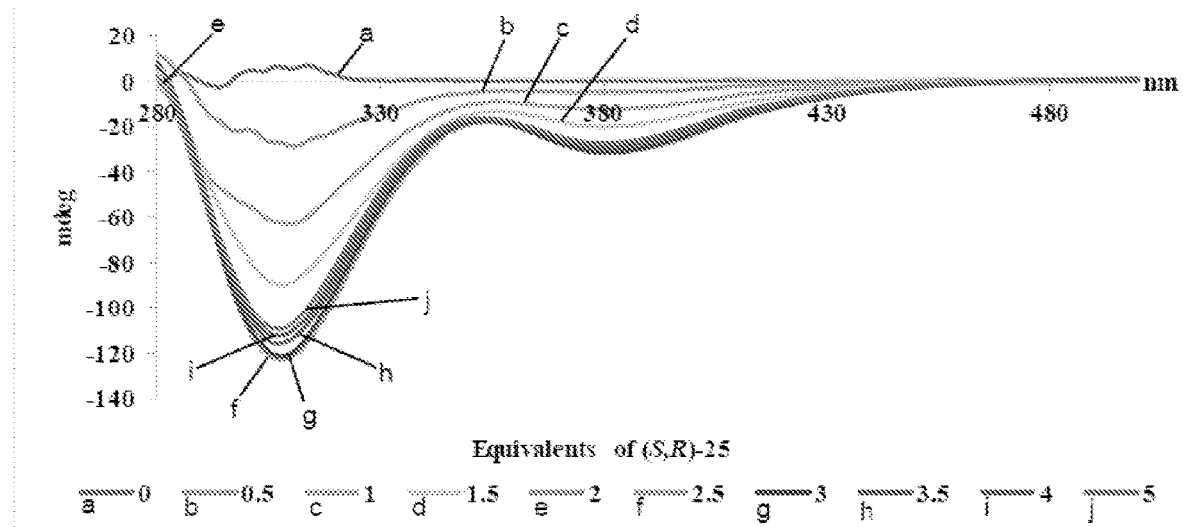

FIG. 137 shows the CD spectra of the assembly obtained from $CuCl_2 \cdot 2H_2O$, and (S,R)-25 (0-5 equivalents) in DMSO at 0.9 mM.

Figure 138:
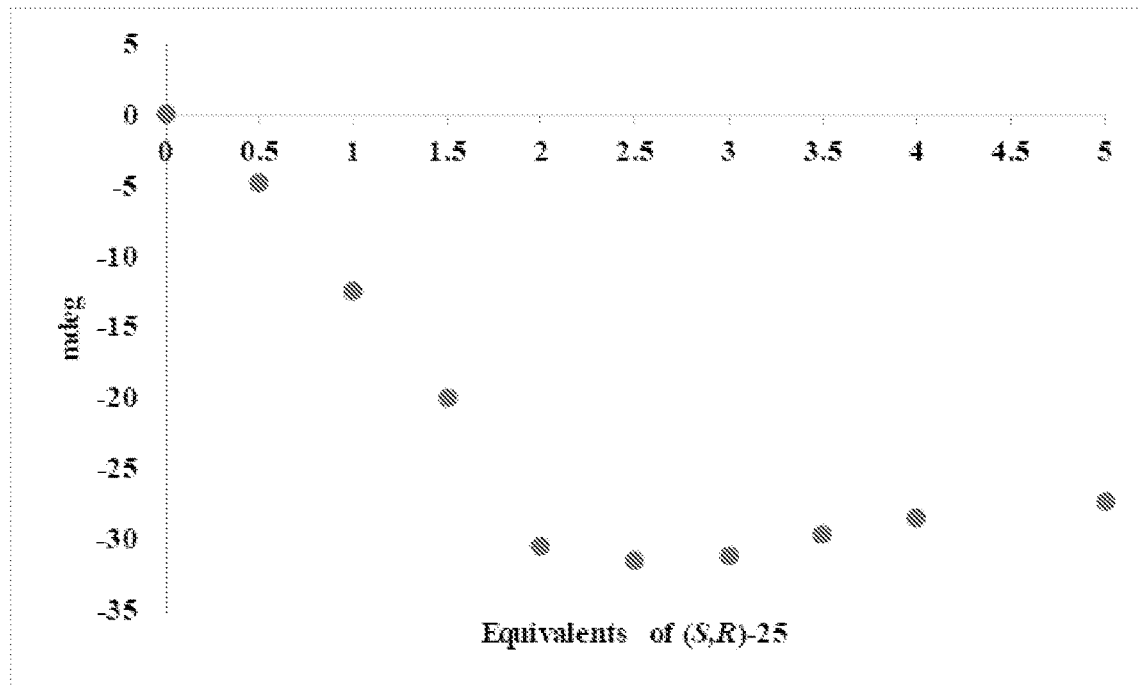

FIG. 138 shows the CD amplitude at 380 nm plotted against the equivalents of (S,R)-25 of the assembly formed between probe $CuCl_2 \cdot 2H_2O$ and analyte (S,R)-25.

Figure 139:
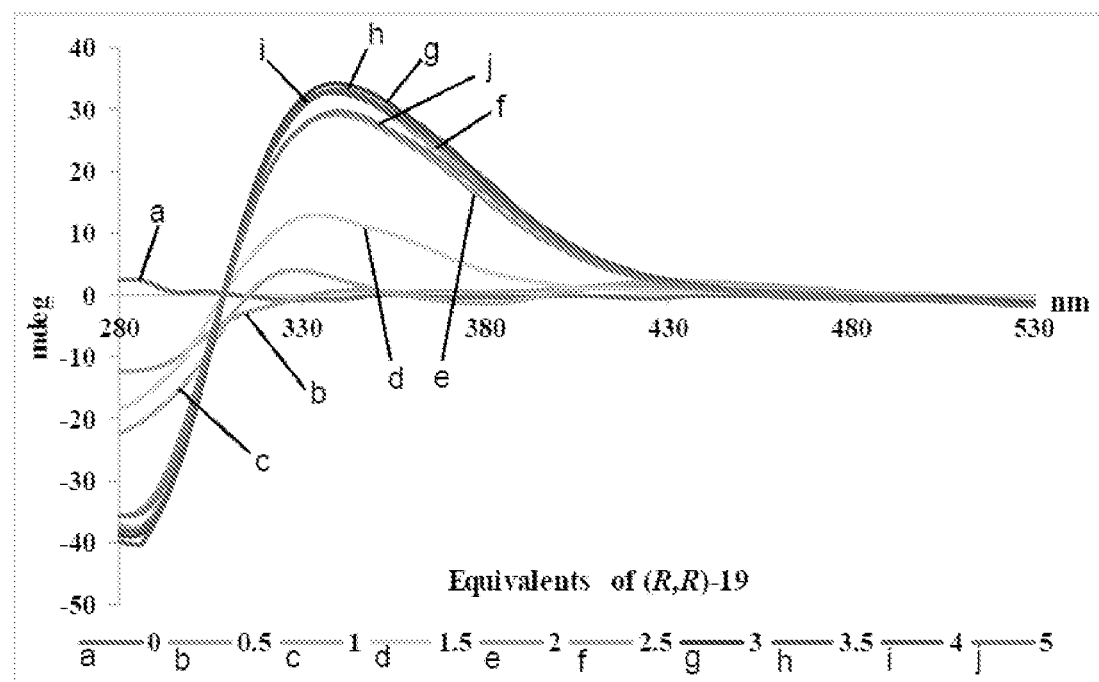

FIG. 139 shows the CD spectra of the assembly obtained from $FeCl_3 \cdot 6H_2O$, and (R,R)-19 (0-5 equivalents) in DMSO at 0.5 mM.

Figure 140:
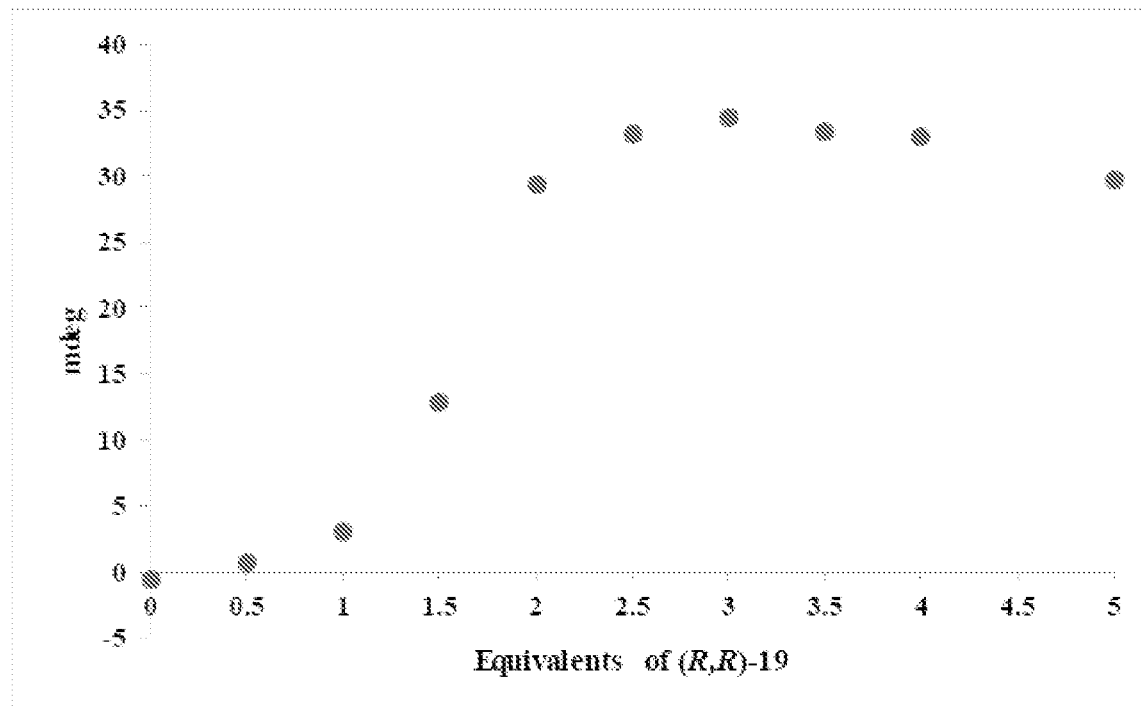

FIG. 140 shows the CD amplitude at 338 nm plotted against the equivalents of (R,R)-19 of the assembly formed between probe $FeCl_3 \cdot 6H_2O$ and analyte (R,R)-19.

Figure 141:
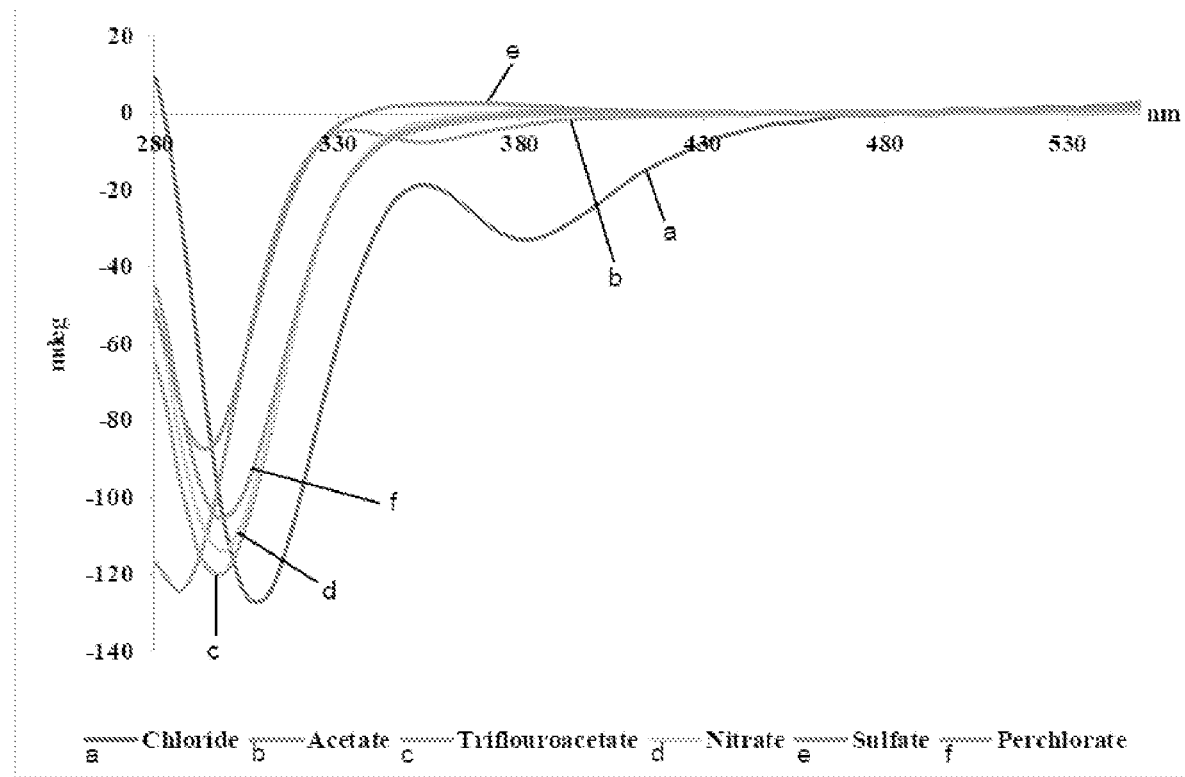

FIG. 141 shows the CD spectra of the anion effect study of different Cu(II) salts with (S,R)-25 in DMSO at 0.9 mM.

Figure 142:
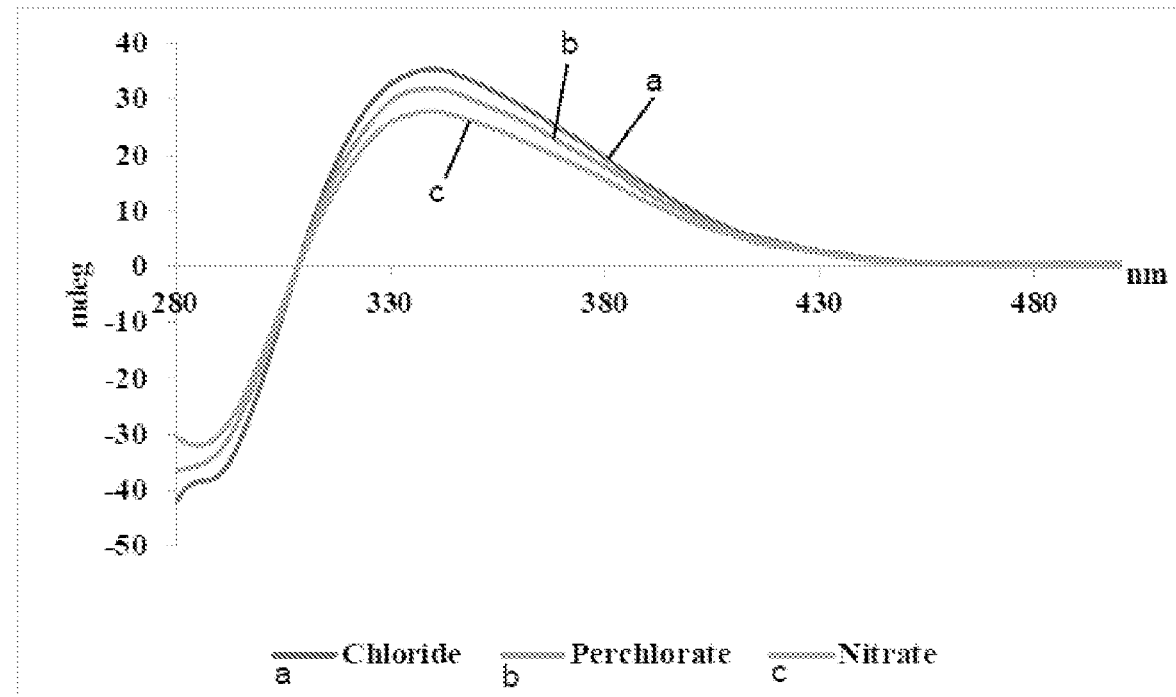

FIG. 142 shows the CD spectra of the anion effect study of different Fe(III) salts with (R,R)-19 in DMSO at 0.5 mM.

Figure 143:
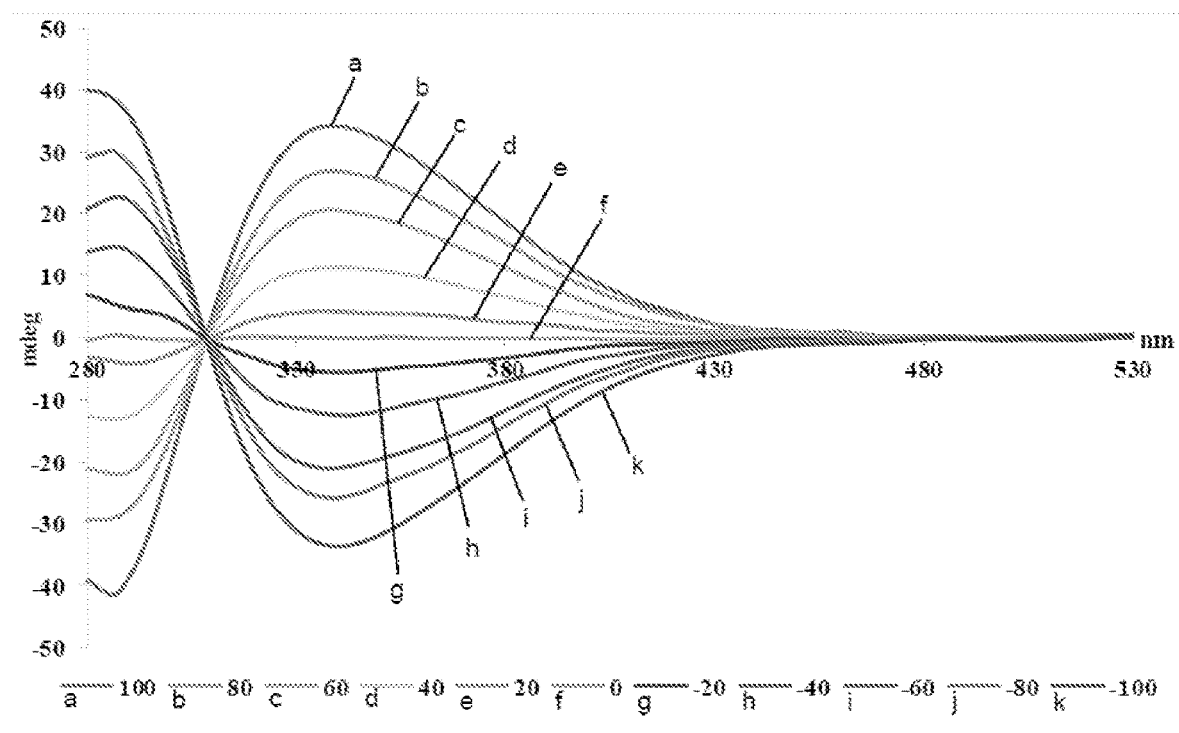

FIG. 143 shows the CD spectra of the $FeCl_3 \cdot 6H_2O$ sensing of varying enantiomeric compositions of 19.

Figure 144:
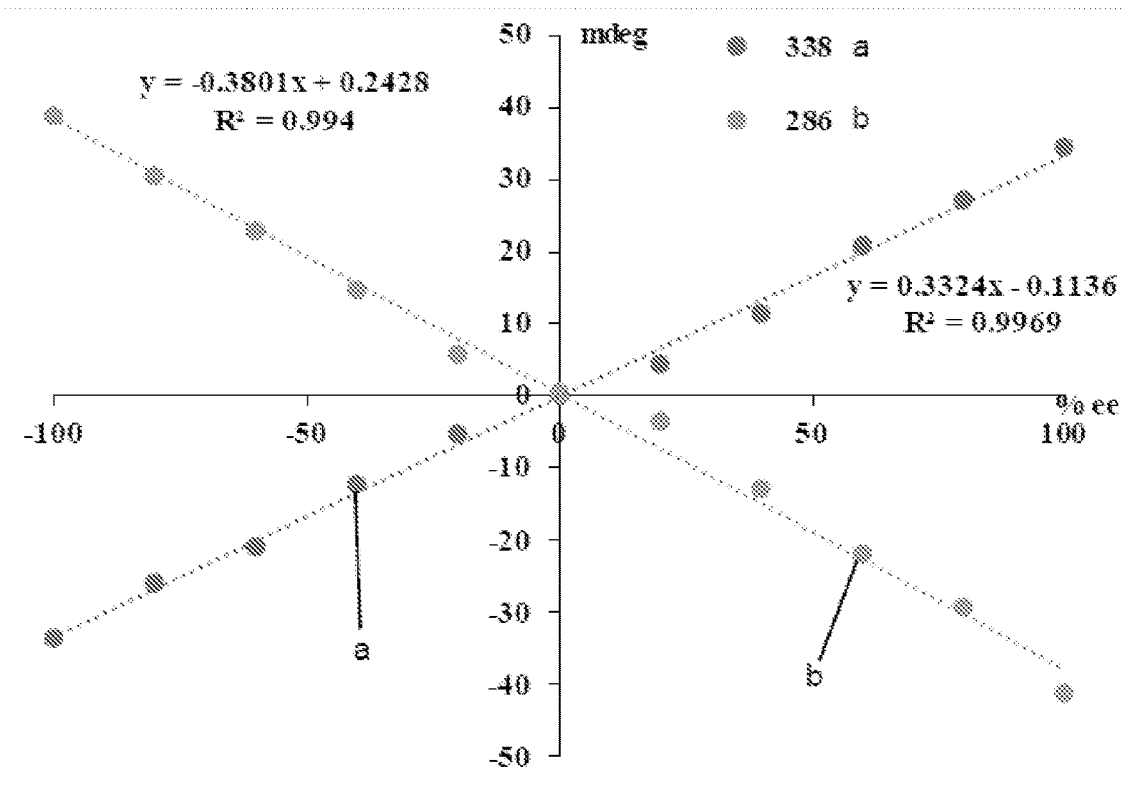

FIG. 144 shows the CD amplitudes measured at 286 and 338 nm plotted against % ee of 19 of the assembly formed between probe $FeCl_3 \cdot 6H_2O$ and analyte 19.

Figure 145:
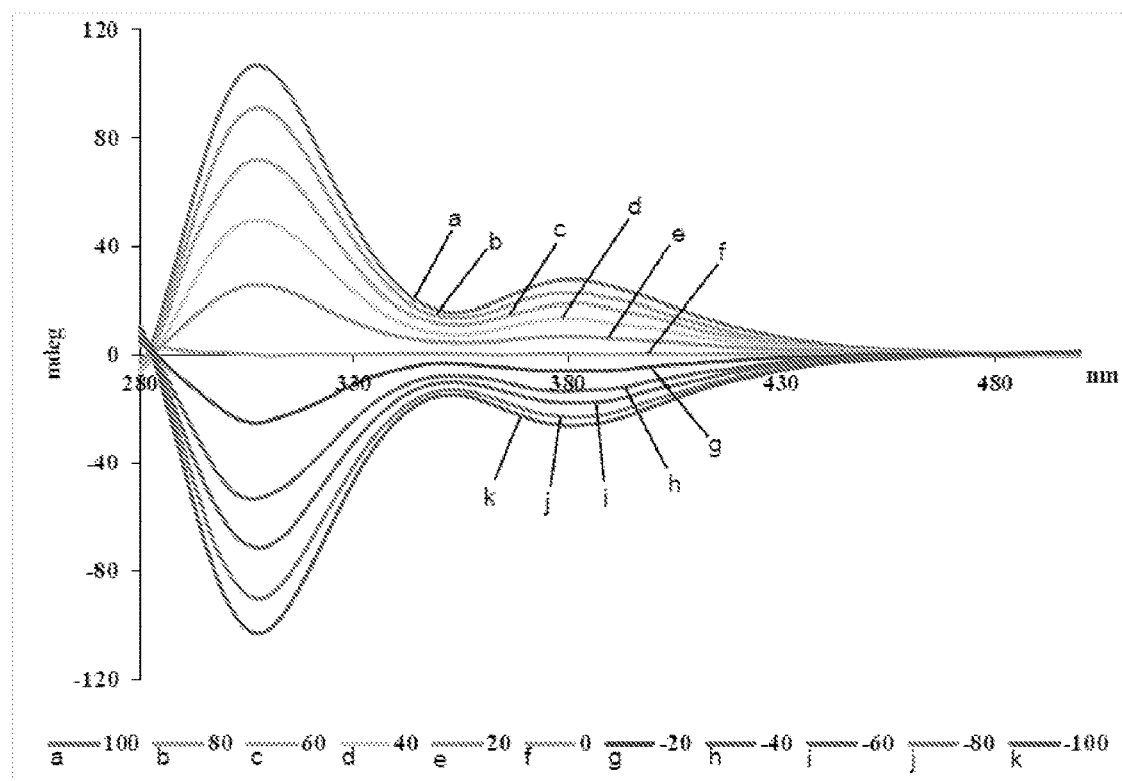

FIG. 145 shows the CD spectra of the $CuCl_2 \cdot 2H_2O$ sensing of varying enantiomeric compositions of 25.

Figure 146:
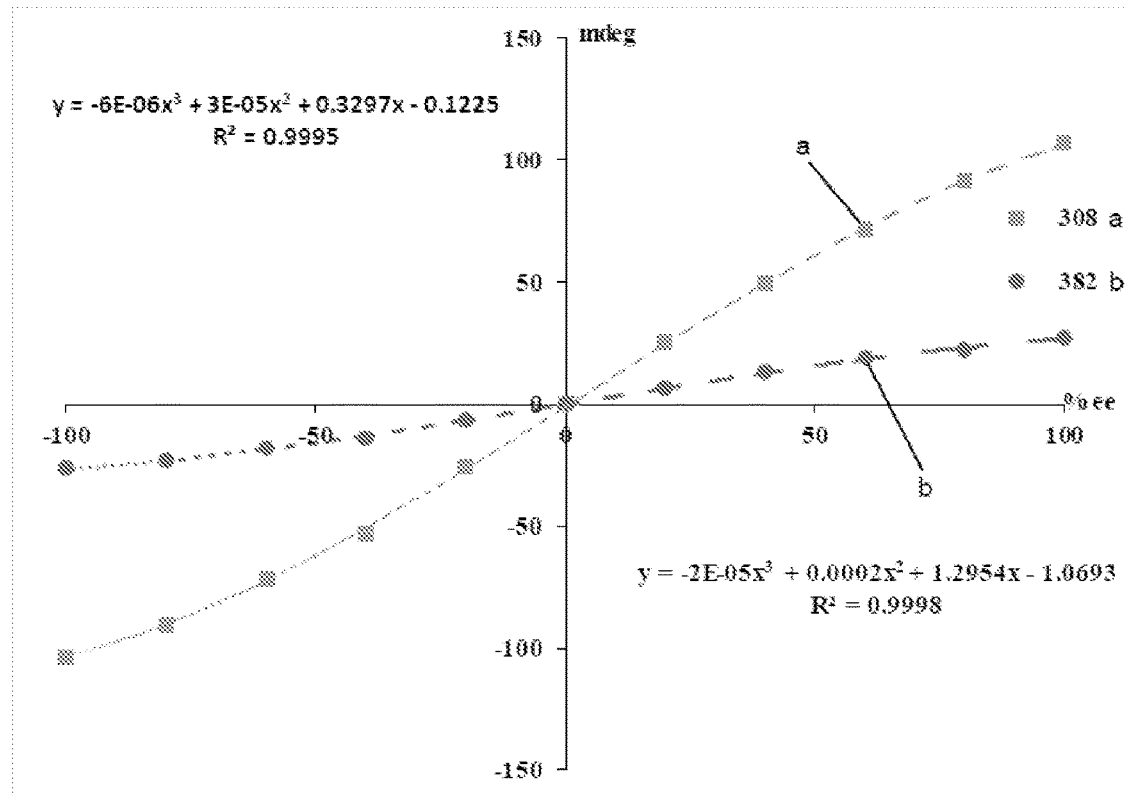

FIG. 146 shows the CD amplitudes measured at 308 and 382 nm plotted against % ee of 25 of the assembly formed between probe $CuCl_2 \cdot 2H_2O$ and analyte 25.

Figures 147A, 147B, 147C, 147D, 147E, 147F:
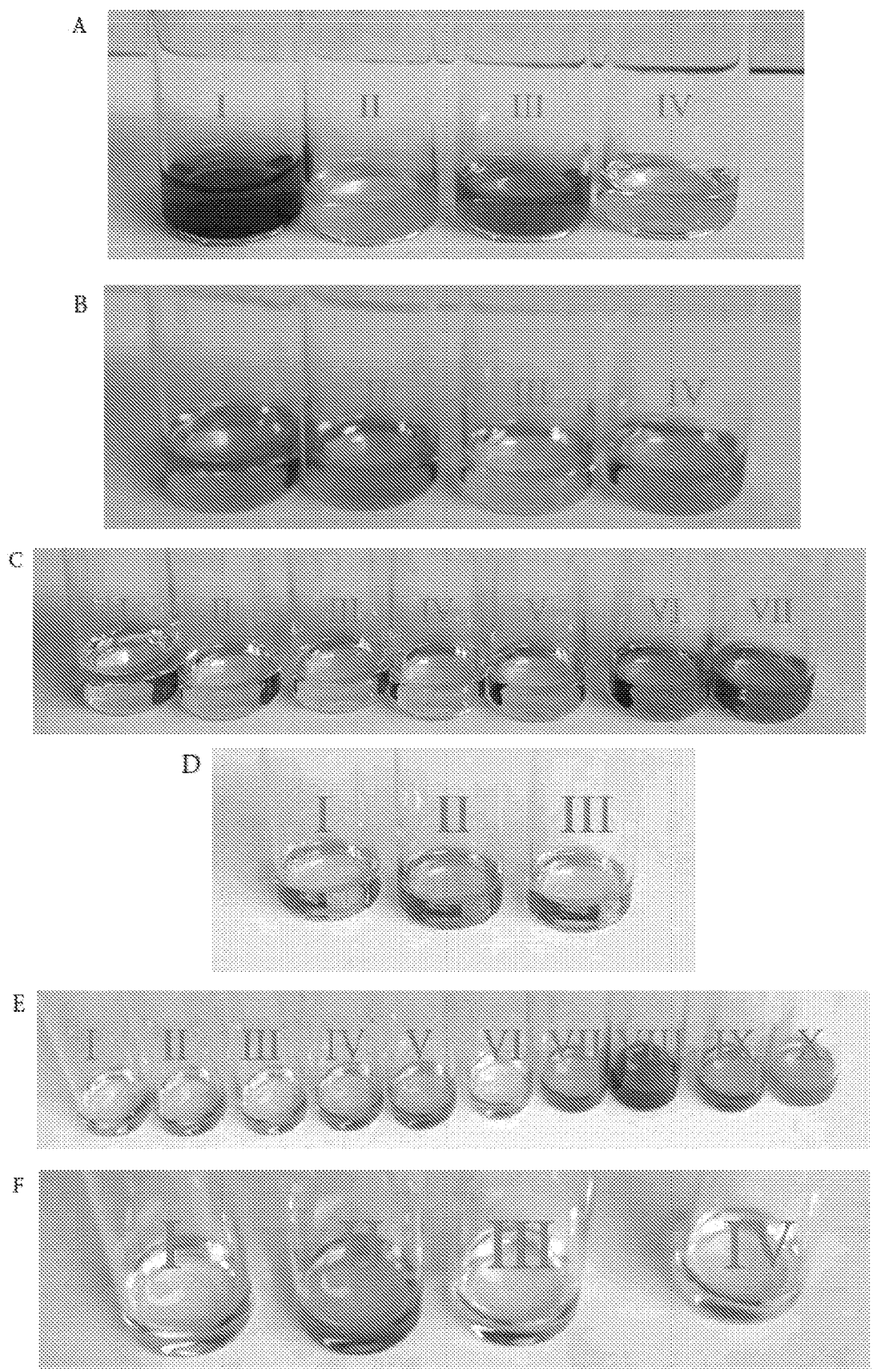
Figures 147G, 147H, 147I, 147J, 147K, 147L:
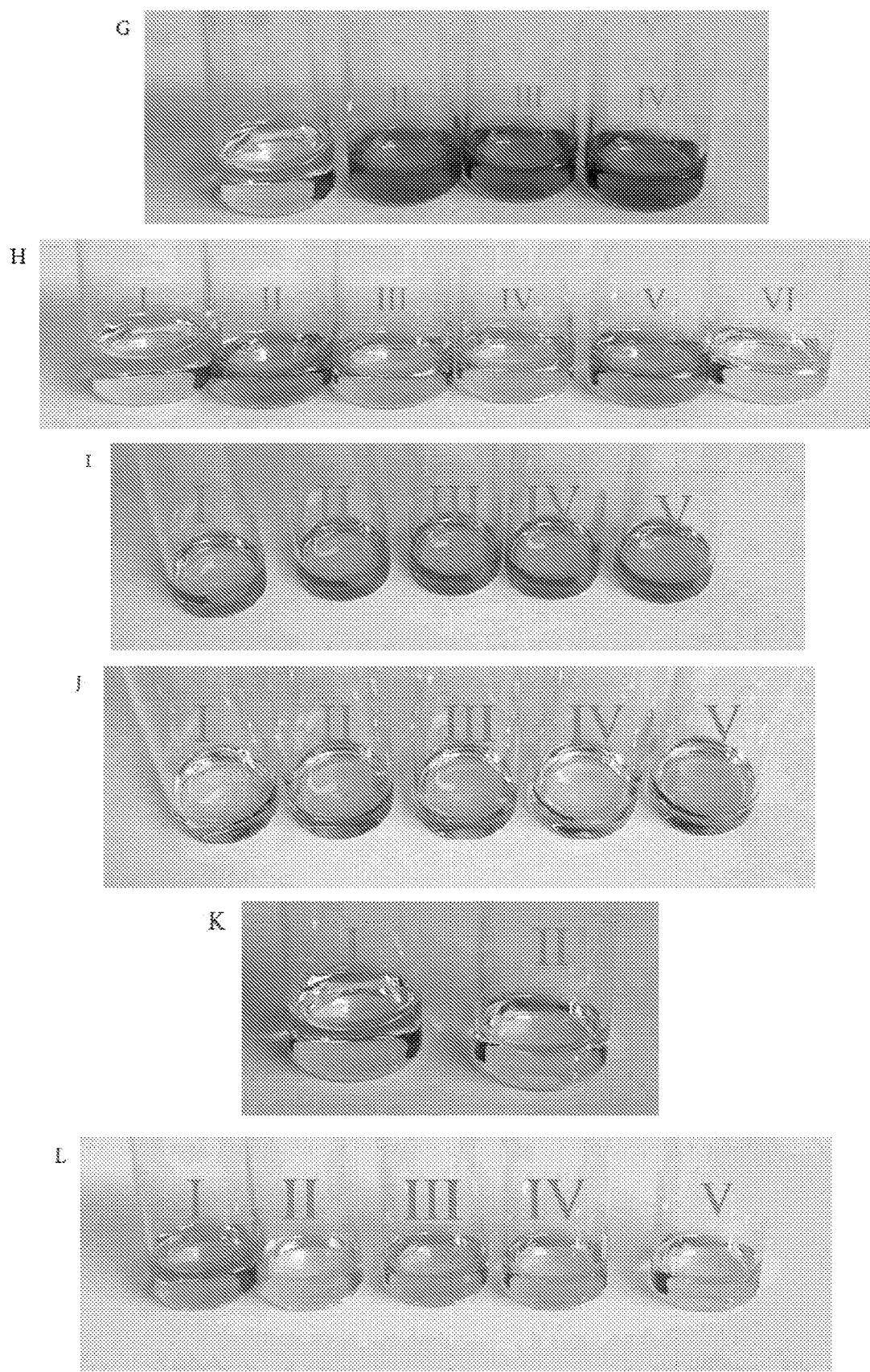

FIGS. 147A-147L show the colormetric detection of the reaction between differing probes and analytes. FIG. 147A shows $Pd(NO_3)_2$ reacted with: No substrate (I) (dark brown), (R)-1 (II) (clear), (R)-23 (III) (brown) and (S,R)-25 (IV) (clear). FIG. 147B shows $FeCl_2 \cdot 4H_2O$ reacted with: No substrate (I) (orange), (R)-1 (II) (orange), (R)-23 (III) (yellow) and (S,R)-25 (IV) (orange). FIG. 147C shows $FeCl_3 \cdot 6H_2O$ reacted with: No substrate (I) (pale yellow), (R)-1 (II) (clear), (R)-23 (III) (very pale yellow), (R,R)-19 (IV) (very pale yellow), (S,R)-25 (V) (pale yellow), (R,R)-34 (VI) (dark yellow) and (R)-38 (VII) (orange). FIG. 147D shows $FeCl_3 \cdot 6H_2O$ in DMSO reacted with: (R)-25 (I) (pale orange), (S,R)-26 (II) (orange), (R,R)-31 (III) (pale orange). FIG. 147E shows $FeCl_3 \cdot 6H_2O$ reacted with: (R)-1 (I) (pale orange), (R)-2 (II) (pale orange), (R)-4 (III) (pale orange), (R)-5 (IV) (pale orange), (R)-6 (V) (pale green), (R)-8 (VI) (pale yellow), (R)-9 (VII) (orange), (R)-10 (VIII) (purple), (R)-15 (IX) (orange), and (R)-17 (X) (orange). FIG. 147F shows $FeCl_3 \cdot 6H_2O$ reacted with: (R,R)-19 (I) (pale yellow), (R)-21 (II) (orange), (R)-23 (III) (pale yellow) and (R)-24 (IV) (pale yellow). FIG. 147G shows $MnCl_2 \cdot 4H_2O$ reacted with: No substrate (I) (clear), (R)-1 (II) (brown), (R)-23 (III) (brown) and (S,R)-25 (IV) (brown). FIG. 147H shows $CuCl_2 \cdot 2H_2O$ reacted with: No substrate (I) (pale yellow), (R)-1 (II) (blue), (R)-23 (III) (pale green), (R,R)-19 (IV) (pale blue), (S,R)-25 (V) (green) and (R)-37 (VI) (pale yellow). FIG. 147I shows $CuCl_2 \cdot 2H_2O$ reacted with: (S,R)-25 (I) (green), (S,R)-26 (II) (blue), (R,R)-27 (III) (green), (S,R)-28 (IV) (green) and (R,R)-31 (V) (green). FIG. 147J shows $CuCl_2 \cdot 2H_2O$ reacted with: (R,R)-19 (I) (pale blue), (R)-21 (II) (blue), (R)-22 (III) (pale green), (R)-23 (IV) (very pale green) and (R)-24 (V) (pale green). FIG. 147K shows $Ce(NO_3)_3 \cdot 6H_2O$ reacted with: No substrate (I) (clear), (R)-1 (II) (clear). FIG. 147L shows $RhCl_3 \cdot 3H_2O$ reacted with: No substrate (I) (orange), (R)-1 (II) (yellow), (R)-23 (III) (orange), (S,R)-25 (IV) (orange) and (R)-37 (V) (yellow).

Figure 148:
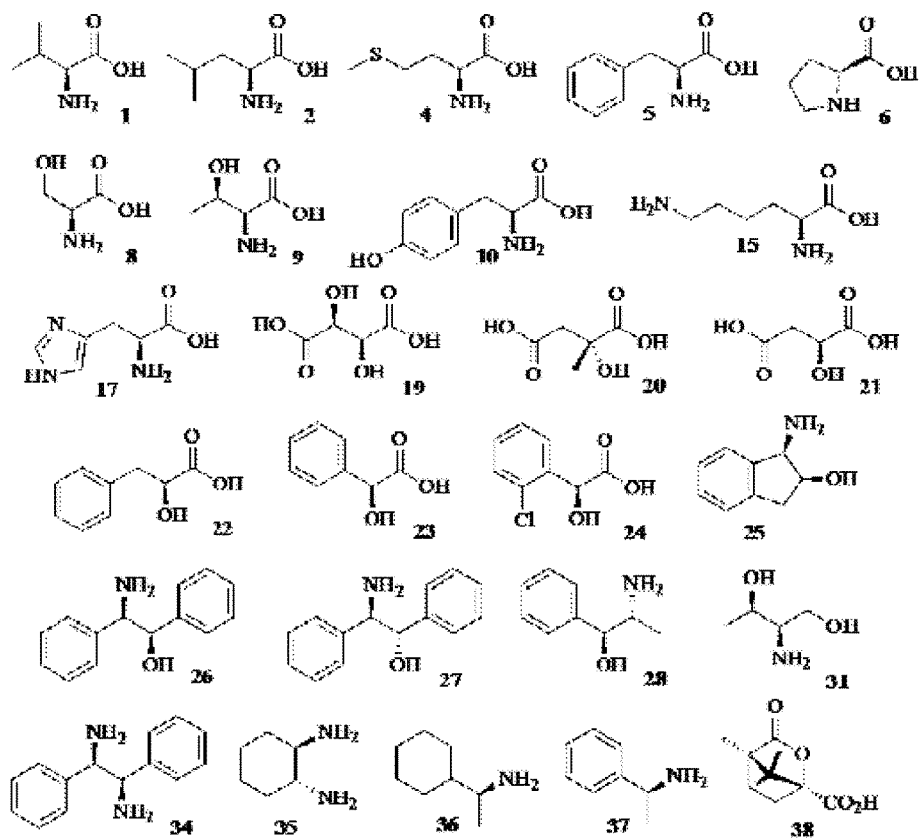
Figures 149A, 149B, 149C, 149D:
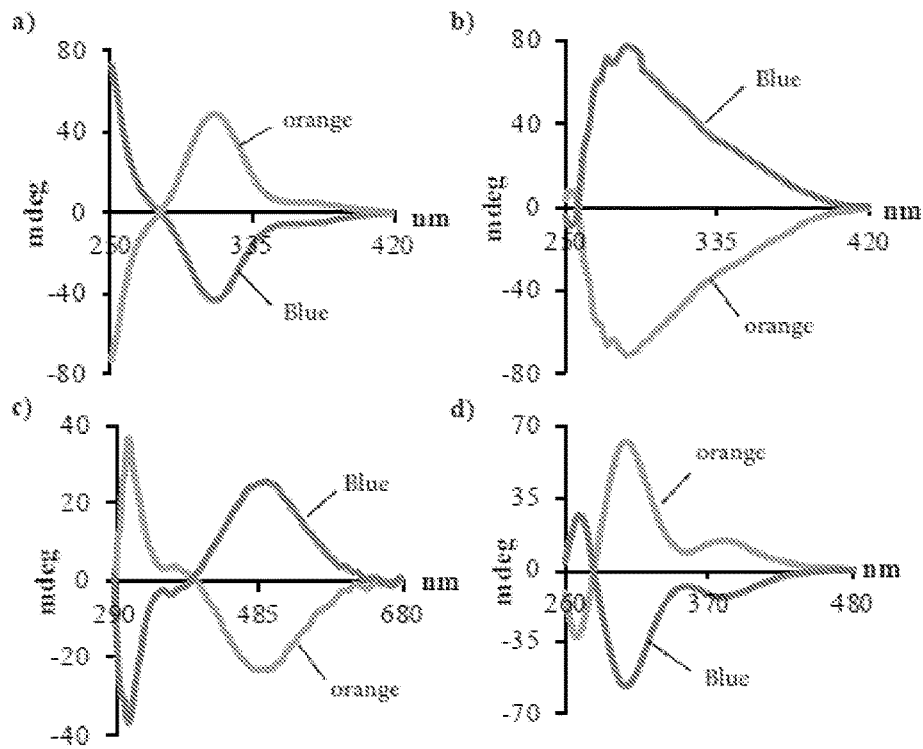

FIG. 148 shows the structures of chiral ligands tested. Only one enantiomer is shown.

FIGS. 149A-D show examples of ICD effects obtained for 1 (FIG. 149A), 23 (FIG. 149B), 10 (FIG. 149C) and 25 (FIG. 149D) using $Pd(NO_3)_2$, $FeCl_2$, $FeCl_3$ and $CuCl_2$, respectively. The sensing with Pd(II) was conducted at 1.8 mM in MeOH. All other spectra were collected at 0.5 mM in DMSO.

Figure 150A:
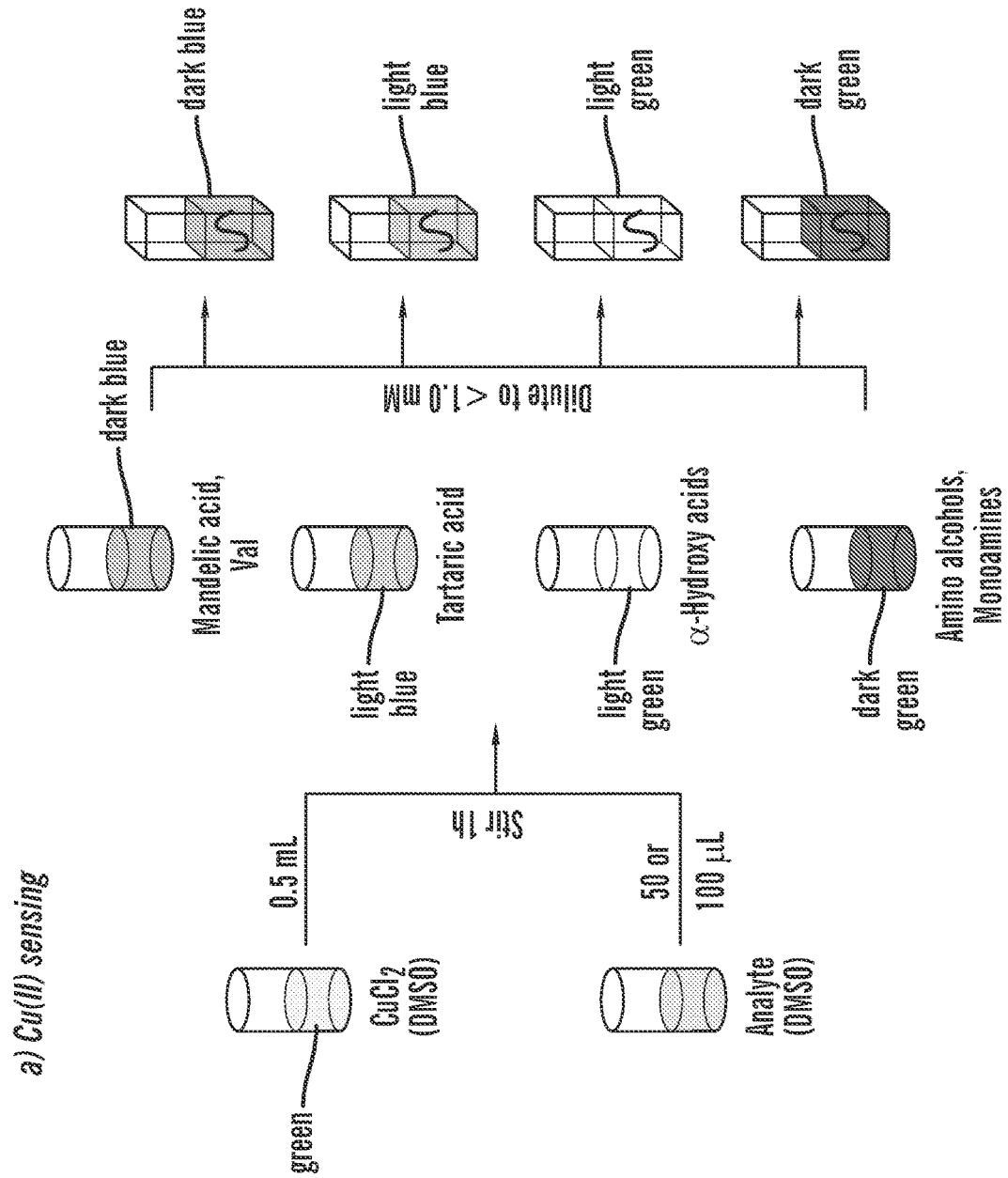
Figure 150B:
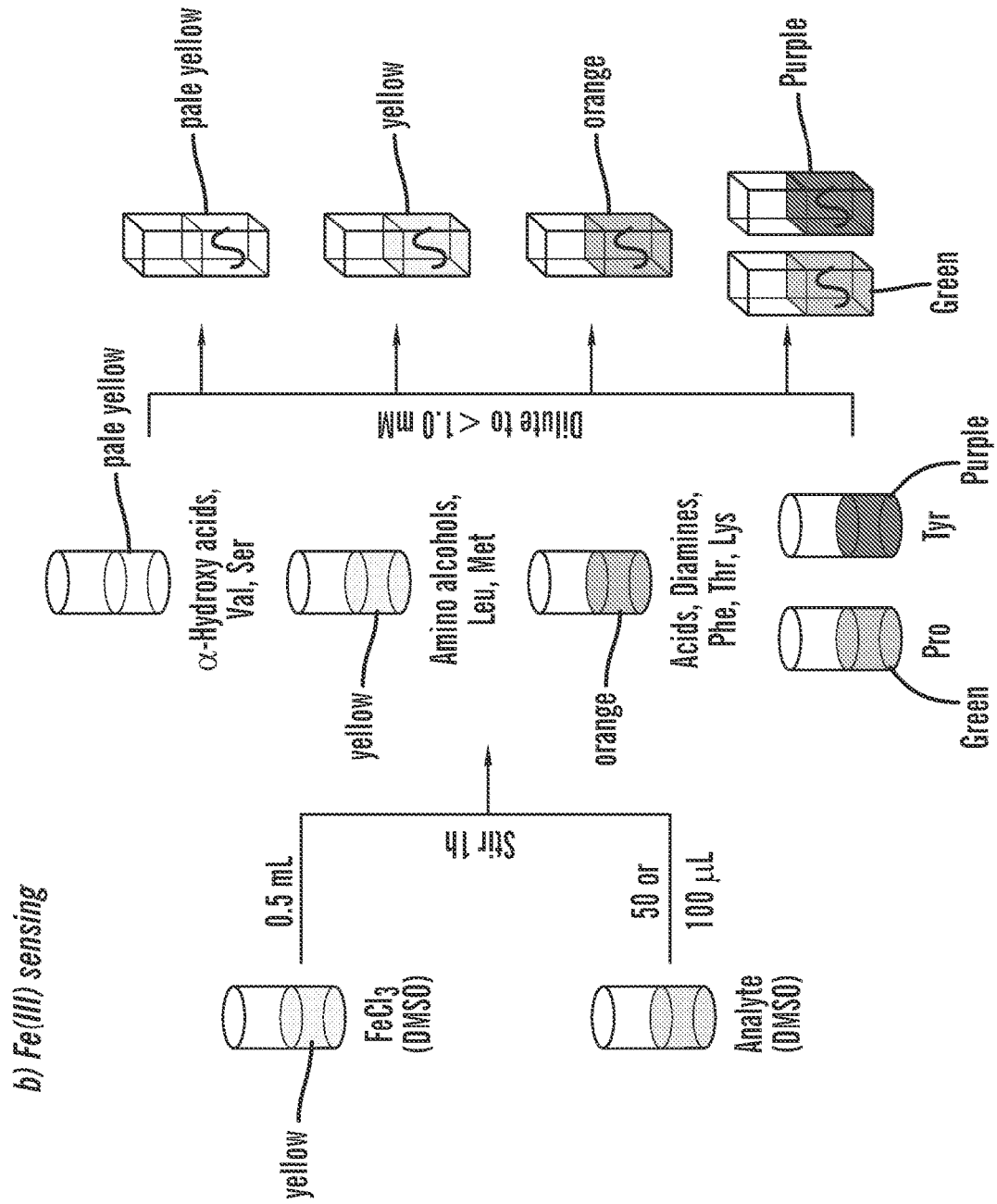

FIGS. 150A-150B relate to the general workflow of the CD sensing assay and examples of the colormetric effects obtained for $CuCl_2$ (FIG. 150A) and $FeCl_3$ (FIG. 150B).

Figures 151A, 151B:
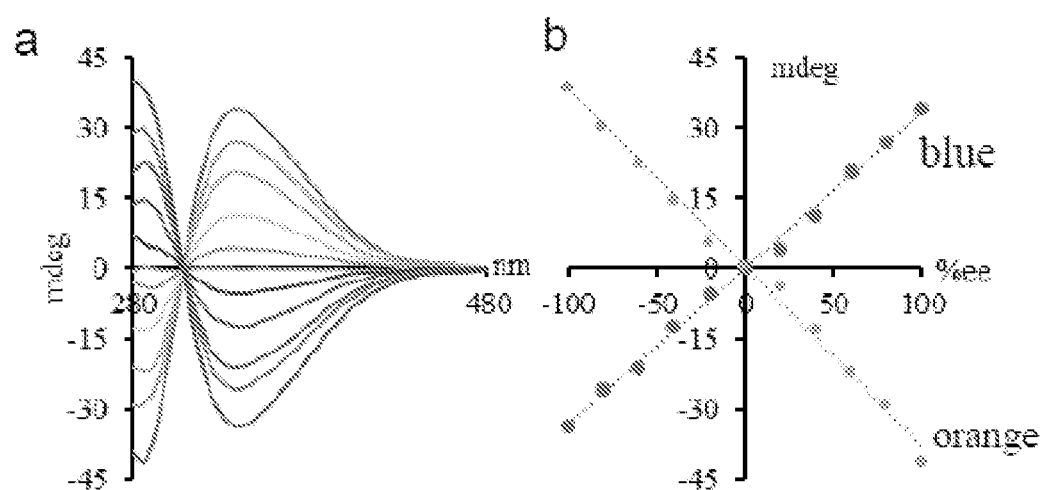

FIGS. 151A-151B show ICD sensing of tartaric acid samples of varying enantiomeric composition with $FeCl_3$. FIG. 151A shows the CD spectra of tartaric acid samples of varying enantiomeric composition with probe $FeCl_3$. FIG. 151B shows the CD amplitudes measured at 288 nm (orange) and 338 nm (blue) plotted against % ee of tartaric acid of the assembly formed between probe $FeCl_3 \cdot 6H_2O$ and tartaric acid (0.5 mM, DMSO).

Figures 152A, 152B:
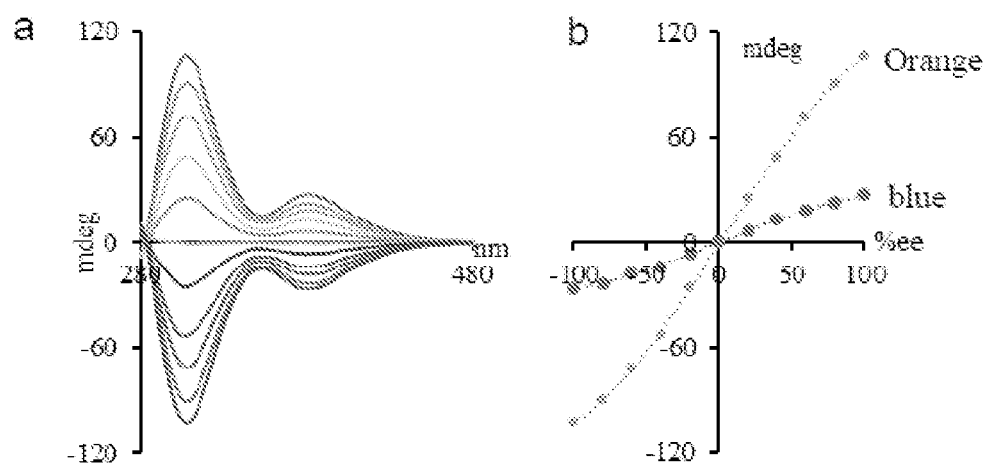

FIGS. 152A-152B relate to ICD sensing of cis-aminoindanol samples of varying enantiomeric composition with $CuCl_2$. FIG. 152A shows the CD spectra of cis-aminoindanol samples of varying enantiomeric composition with probe $CuCl_2$. FIG. 152B shows the CD amplitudes measured at 308 nm (orange) and 382 nm (blue) plotted against % ee of cis-aminoindanol of the assembly formed between probe $CuCl_2$ and cis-aminoindanol (0.9 mM, DMSO).

DETAILED DESCRIPTION OF THE INVENTION

The present invention relates to an analytical method that includes providing a sample potentially containing a chiral analyte that can exist in stereoisomeric forms, and providing a probe selected from the group consisting of metal salts.

The sample is contacted with the probe under conditions that permit coordination of the probe to the analyte, if present in the sample; and, based on any coordination that occurs, the absolute configuration of the analyte in the sample, and/or the concentration of the analyte in the sample, and/or the enantiomeric composition of the analyte in the sample is/are determined The analytical methods described herein may be used to evaluate a wide range of chiral analytes. The analyte is one that can exist in stereoisomeric forms. This includes enantiomers, diastereomers, and a combination thereof. As will be understood, the analyte can be any chiral analyte that can coordinate with a metal. Suitable analytes include, for example, amines, diamines, amino alcohols, carboxylic acids, hydroxy acids, amino acids, amino phosphonic acids, alcohols, thiols, amides, and combinations thereof.

The amino acid analyte can be any natural or non-natural chiral amino acid, including alpha amino acids, beta amino acids, gamma amino acids, L-amino acids, and D-amino acids. In some embodiments, the amino acid comprises a functionalized side chain. In some embodiments, the analyte is an unprotected amino acid.

Any metal salt may be used for the probes of the present invention. As will be apparent to the skilled artisan, some metals have more than one oxidation state, which may have different spectral profiles. Thus, when using such metals, it is preferable to use metal ions of the same oxidation state. Alternatively, a known mixture could be used, provided one is able to properly interpret any spectral changes that may occur after the sample is added. Exemplary metals salts according to all aspects of the present invention include, without limitation, transition metal (e.g., type II transition metal) salts and lanthanide metal salts. Suitable metal salts include, for example, cobalt salts, palladium salts, copper salts, iron salts, manganese salts, cerium salts, and rhodium salts. Exemplary cobalt salts include, but are not limited to, $Co(NO_3)_2$, $Co(ClO_4)_2$, $Co(OH)_2$, $CoC_2O_4 \cdot 2H_2O$, $Co(SCN)_2$, $CoF_2$, $CoBr_2$, $CoCl_2$, $CoI_2$, $Co_3(PO_4)_2$, $CoSO_4$, $Co(CO_3)_2$, $Co(C_2O_4)_2$, and their hydrates. Exemplary palladium salts include, but are not limited to, $Pd(NO_3)_2$, $Pd(CN)_2$, $PdF_2$, $PdBr_2$, $PdCl_2$, $PdI_2$, $PdSO_4$, $Pd(ACN)_2(Br)_2$, $Pd(ACN)_4(BF_4)_2$, $Pd(ACN)_2Cl_2$, and their hydrates. Exemplary copper salts include, but are not limited to, CuBr, $CuBr(Me_2S)$ complex, CuCl, CuF, CuI, CuSCN, $Cu(OAc)_2$, $Cu(ACN)_4PF_6$, $Cu(ACN)_4BF_4$, $Cu(ACN)_4OTf$, $Cu(NO_3)_2$, $Cu(ClO_4)_2$, $CuSO_4$, $CuF_2$, $CuBr_2$, $CuCl_2$, $CuCl_2 \cdot 2H_2O$, $Cu_2(P_2O_7)$, $Cu(tartrate)_2$, $Cu(BF_4)_2$, $Cu(SCN)_2$, $Cu(OAc)_2$, $Cu(acac)_2$, $Cu(CO_3)_2$, $Cu(t\text{-butylacac})_2$, $Cu(OTf)_2$, and their hydrates. Exemplary iron salts include, but are not limited to, $Fe(NO_3)_2$, $Fe(C_2O_4)_2$, $Fe(ClO_4)_2$, $Fe_3(PO_4)_2$, $Fe(BF_4)_2$, $FeC_2O_4 \cdot 2H_2O$, $FeSO_4$, $FeF_2$, $FeBr_2$, $FeCl_2$, $FeI_2$, $FeCl_3 \cdot 6H_2O$, $FeCl_2 \cdot 4H_2O$, $FeF_3$, $FeBr_3$, $FeCl_3$, $Fe(NO_3)_3$, $Fe_2(C_2O_4)_3$, $FePO_4$, $Fe(acac)_3$, and their hydrates. Exemplary manganese salts include, but are not limited to, $Mn(CO_3)_2$, $Mn(NO_3)_2$, $MnSO_4 \cdot 2H_2O$, $MnF_2$, $MnBr_2$, $MnCl_2$, $MnCl_2 \cdot 4H_2O$, $MnI_2$, $Mn(formate)_2$, $Mn(ClO_4)_2$, and their hydrates. Exemplary cerium salts include, but are not limited to, $CeBr_3$, $CeCl_3$, $CeF_3$, $Ce(CO_3)_3$, $Ce(OAC)_3$, $Ce(NO_3)_3$, $Ce(aCaC)_3$, $Ce(C_2O_4)_3$, $Ce(SO_4)_3$, $Ce(NO_3)_3 \cdot 6H_2O$, $CeCl_3 \cdot 7H_2O$, and their hydrates. Exemplary rhodium salts include, but are not limited to, $Rh(OAc)_3$, $Rh(NO_3)_3$, $RhCl_3 \cdot 3H2O$, $Rh(SO4)3$, and their hydrates. In certain embodiments, the metal is a non-fluorescent metal ion.

The term "hydrate" includes but is not limited to hemihydrate, monohydrate, dihydrate, trihydrate and the like.

In certain embodiments, the determining step is carried out using circular dichroism spectroscopy and the metal produces circular dichroism signals at a high wavelength (e.g., at least above about 300 nm; e.g., at least about 300 to at least about 400 nm) and/or at a high intensity (e.g., at least above about 10 mDeg/mMol; e.g., at least about 10 mDeg/mMol to at least about 500 mDeg/mMol; e.g., at least in a range with a lower limit of about 10 mDeg/mMol, about 40 mDeg/mMol, about 70 mDeg/mMol, about 100 mDeg/mMol, about 130 mDeg/mMol, about 160 mDeg/mMol, about 190 mDeg/mMol, about 220 mDeg/mMol, about 250 mDeg/mMol, about 280 mDeg/mMol, about 310 mDeg/mMol, about 340 mDeg/mMol, about 370 mDeg/mMol, about 400 mDeg/mMol, about 430 mDeg/mMol, about 460 mDeg/mMol, or about 490 mDeg/mMol, and an upper limit of about 40 mDeg/mMol, about 70 mDeg/mMol, about 100 mDeg/mMol, about 130 mDeg/mMol, about 160 mDeg/mMol, about 190 mDeg/mMol, about 220 mDeg/mMol, about 250 mDeg/mMol, about 280 mDeg/mMol, about 310 mDeg/mMol, about 340 mDeg/mMol, about 370 mDeg/mMol, about 400 mDeg/mMol, about 430 mDeg/mMol, about 460 mDeg/mMol, about 490 mDeg/mMol, or about 500 mDeg/mMol, or any combination thereof).

As will be apparent to a skilled artisan, any suitable counter anion may be used in the metal salt. Exemplary anions include, but are not limited to, organic anions, inorganic anions, halides, and hydroxides.

In at least one embodiment, the analyte:metal molar ratio is about 1:1, about 2:1, about 3:1, about 4:1, about 5:1, or about 6:1.

The term "enantiomeric composition" refers to the enantiomeric ratio and/or enantiomeric excess of an analyte. The enantiomeric ratio (er) is the ratio of the percentage of one analyte enantiomer in a mixture to that of the other enantiomer. The enantiomeric excess (ee) is the difference between the percentage of one analyte enantiomer and the percentage of the other analyte enantiomer. For example, a sample which contains 75% L-analyte and 25% D-analyte will have an enantiomeric excess of 50% of L-analyte and an enantiomeric ratio (D:L) of 25:75.

In the analytical methods described herein, the enantiomeric composition of the analyte can be determined by correlating the chiroptical signal of the probe-analyte complexes that form to that of standard samples. The chiroptical signal of the complexes can be measured using standard techniques, which will be apparent to the skilled artisan. Such techniques include circular dichroism spectroscopy (e.g., STEREOCHEMISTRY OF ORGANIC COMPOUNDS 1003-07 (E. L. Eliel & S. H. Wilen eds., 1994); DYNAMIC STEREOCHEMISTRY OF CHIRAL COMPOUNDS 140-43 (Christian Wolf ed., 2008), each of which is hereby incorporated by reference in its entirety), optical rotatory dispersion (e.g., STEREOCHEMISTRY OF ORGANIC COMPOUNDS 999-1003 (E. L. Eliel & S. H. Wilen eds., 1994), which is hereby incorporated by reference in its entirety), and polarimetry STEREOCHEMISTRY OF ORGANIC COMPOUNDS 217-21, 1071-80 (E. L. Eliel & S. H. Wilen eds., 1994); DYNAMIC STEREOCHEMISTRY OF CHIRAL COMPOUNDS 140-43 (Christian Wolf ed., 2008), each of which is hereby incorporated by reference in its entirety). By way of example, stereomerically pure and/or stereochemically enriched samples of each isomer of an analyte of interest can be mixed in varying ratio with the particular probe to generate standard samples of known enantiomeric composition and/or diastereomeric composition, and their optical spectra obtained. The chiroptical signal of the probe-analyte complexes in the test sample can be measured by generating an optical spectrum of the test sample. The enantiomeric composition of the analyte originally present in the test sample can then be determined by comparing the optical spectrum of the test sample to that of the standard sample(s).

In the analytical methods described herein, the concentration of the analyte can be determined by correlating an optical spectroscopic signal of the probe-analyte complexes that form to that of standard samples. The optical spectroscopic signal can be measured using standard techniques, which will be apparent to the skilled artisan. Such techniques include, but are not limited to, UV spectroscopy (PRINCIPLES OF INSTRUMENTAL ANALYSIS 342-47 (Douglas A. Skoog et al. eds., 5$^{th}$ ed. 1998), which is hereby incorporated by reference in its entirety), fluorescence spectroscopy, and other spectroscopic techniques. By way of example, serial titrations of the analyte of interest can be mixed with the particular probe to generate standard samples and their spectra (e.g., UV, fluorescence) obtained. The spectroscopic signal (e.g., UV, fluorescence) of the probe-analyte complexes can be measured by generating a spectrum (e.g., UV, fluorescence) of the test sample. The total concentration of the analyte originally present in the test sample can then be determined by comparing the spectrum of the test sample to the calibration curve obtained with the standard samples. As will be apparent to the skilled artisan, if the stereoisomeric excess of the analyte is also determined, the concentration of individual isomers originally present in the test sample can be determined by comparing the stereoisomeric excess to the total analyte concentration.

In the analytical methods described herein, the absolute configuration of the analyte can be assigned from the chiroptical signal of the probe-analyte complexes that form. This assignment can be based on the sense of chirality induction with a reference or by analogy. The chiroptical signal of the complexes can be measured using standard techniques, which will be apparent to the skilled artisan. Such techniques include circular dichroism spectroscopy (e.g., STEREOCHEMISTRY OF ORGANIC COMPOUNDS 1003-07 (E. L. Eliel & S. H. Wilen eds., 1994); DYNAMIC STEREOCHEMISTRY OF CHIRAL COMPOUNDS 140-43 (Christian Wolf ed., 2008), each of which is hereby incorporated by reference in its entirety), optical rotatory dispersion (e.g., STEREOCHEMISTRY OF ORGANIC COMPOUNDS 999-1003 (E. L. Eliel & S. H. Wilen eds., 1994), which is hereby incorporated by reference in its entirety), and polarimetry (e.g., STEREOCHEMISTRY OF ORGANIC COMPOUNDS 217-21, 1071-80 (E. L. Eliel & S. H. Wilen eds., 1994); DYNAMIC STEREOCHEMISTRY OF CHIRAL COMPOUNDS 140-43 (Christian Wolf ed., 2008), each of which is hereby incorporated by reference in its entirety). By way of example, stereoisomerically pure samples of each isomer of an analyte of interest can be mixed with the particular probe to generate standard samples, and their optical spectra obtained. The chiroptical signal of the probe-analyte complexes in the test sample can be measured by generating an optical spectrum of the test sample. The absolute configuration of the analyte originally present in the sample can then be determined by comparing the optical spectrum of the test sample to that of the standard sample(s).

The analytical methods provide, among other things, rapid and convenient tools for determining the enantiomeric composition, concentration, and absolute configuration of chiral analytes. These analytical methods may be particularly useful, for example, for evaluating reactions whose desired product is chiral. For example, the present methods can be used to determine the enantiomeric composition of the desired product, thus indicating the stereoselectivity of the reaction. Similarly, the present methods can be used to determine the concentration of the total product, the desired isomer, or both, thus indicating the overall or individual yield of the reaction. In certain embodiments, the analyte is a reaction product and the stereoselectivity and yield of the reaction are determined by determining the enantiomeric composition and concentration of the analyte.

Previous methods using metal-based probes to analyze chiral analytes by detecting changes in their absorption and/or transmission spectra have relied on probes that include an auxiliary ligand or group, as it was thought that the ligand or group was needed in order for the analyte to cause detectable and/or quantifiable changes in the spectra at high wavelength, e.g., above 300 nm. As demonstrated herein, however, absorption and transmission techniques can be used to detect the coordination of a chiral analyte with a metal salt without the need for an auxiliary ligand or group. Thus, in certain embodiments, the analytical methods are carried out using absorption spectroscopy, transmission spectroscopy, or both. As will be apparent to the skilled artisan, these techniques could further be combined with emission spectroscopy to determine the analyte concentration. For example, absorption spectroscopy and/or transmission spectroscopy could be used to determine the enantiomeric composition and/or absolute configuration of the analyte and emission spectroscopy could be used to determine the analyte concentration.

In certain embodiments, the analytical methods are carried out under aerobic conditions (e.g., under air or in an aqueous environment). Most metals that can have more than one oxidation state oxidize slowly enough in aerobic conditions that they are unlikely to oxidize to any statistically significant degree in the time it would take for any analyte in the sample to coordinate with the metal. However, cobalt (II) salts quickly oxidize in aerobic conditions. Thus, the use of another oxidizing agent (e.g., $H_2O_2$, $O_2$) may be helpful when using cobalt (II) salts in an aerobic environment to insure that all of the metal ions are in a single oxidation state ($Co^{3+}$) when any spectra are taken following sample addition. Alternatively, more rigorous conditions, such as the use of an anaerobic environment, could be used to avoid having spectra taken after only partial oxidation of cobalt (II) to cobalt (III).

In certain embodiments, the analytical methods are carried out under oxidizing conditions (e.g., in $H_2O_2$, $O_2$, air).

The analytical methods could also optionally be carried out in the presence of a base. The use of a base may be helpful when the analyte is an acid (e.g., a carboxylic acid) or when an acid may be generated in situ. Adding an equivalent of base could also be helpful to avoid side reactions. In certain embodiments of the analytical method disclosed herein, a stoichiometric amount in regard to the analyte of base is added to the reaction (e.g., when the analyte is a carboxylic acid). Suitable bases include both organic and inorganic bases (or mixtures thereof). Exemplary bases include, but are not limited to: alkoxides such as sodium tert-butoxide; alkali metal amides such as sodium amide, lithium diisopropylamide, and alkali metal bis(trialkylsilyl)amide, e.g., such as lithium bis(trimethylsilyl)amide (LiHMDS) or sodium bis(trimethylsilyl)amide (NaHMDS); tertiary amines (e.g., triethylamine, trimethylamine, 4-(dimethylamino)pyridine (DMAP), 1,5-diazabicycl[4.3.0]non-5-ene (DBN), 1,5-diazabicyclo[5.4.0]undec-5-ene (DBU); alkali or alkaline earth carbonate, bicarbonate or hydroxide (e.g., sodium, magnesium, calcium, barium, potassium carbonate, phosphate, hydroxide and bicarbonate); and ammonium hydroxides (e.g., tetrabutylammonium hydroxide (TBAOH)).

In certain embodiments, the contacting step is carried out in a solvent selected from aqueous solvents, protic solvents, aprotic solvents, and any combination thereof. Exemplary solvents include, but are not limited to, chloroform, dichloromethane, acetonitrile, toluene, tetrahydrofuran, methanol, ethanol, isopropanol, water, dimethyl sulfoxide (DMSO), dimethylformamide (DMF), hexane, hexane isomers, pentane, pentane isomers, toluene, aromatic solvents, ether, dichloroethane, acetone, ethyl acetate, butanone, diethyl ether, dioxane, tert-butyl methyl ether, tetrachloroethane, and mixtures of any combination thereof. Additionally, the contacting can be carried out in air, and/or in an aqueous environment.

In at least one embodiment, contacting is carried out for about 1 to about 300 minutes (e.g., carried out for a duration range having an upper limit of about 5, about 10, about 20, about 30, about 40, about 50, about 60, about 70, about 80, about 90, about 100, about 110, about 120, about 130, about 140, about 150, about 160, about 170, about 180, about 190, about 200, about 210, about 220, about 230, about 240, about 250, about 260, about 270, about 280, about 290, or about 300 minutes, and a lower limit of about 1, about 5, about 10, about 20, about 30, about 40, about 50, about 60, about 70, about 80, about 90, about 100, about 110, about 120, about 130, about 140, about 150, about 160, about 170, about 180, about 190, about 200, about 210, about 220, about 230, about 240, about 250, about 260, about 270, about 280, or about 290 minutes, or any combination thereof). In all embodiments, contacting is carried out for a time that is sufficient for any analyte present in the sample to coordinate with the metal. As will be apparent to the skilled artisan, the speed at which coordination takes place will depend on various factors, including the particular probe selected and the analyte, whether a catalyst is present, and the temperature.

As will be apparent to the skilled chemist, the analytical methods may be carried out at room or moderate temperatures (e.g., about 25° C. to about 50° C.), at high temperatures (e.g., about 50° C. to about 100° C.), or at low temperatures (e.g., below about 25° C., e.g., below about 25° C., below about 20° C., below about 15° C., below about 10° C., below about 5° C., below about 0° C., below about −5° C., below about −10° C., below about −15° C., below about −20° C., below about −25° C., below about −30° C., below about −35° C., below about −40° C., below about −45° C., below about −50° C., below about −55° C., below about −60° C., below about −65° C., below about −70° C., or below about −75° C., preferably no lower than about −78° C.). For example, the methods may be carried out in a temperature range with an upper limit of about 100° C., about 95° C., about 90° C., about 85° C., about 80° C., about 75° C., about 70° C., about 65° C., about 60° C., about 55° C., about 50° C., about 45° C., about 40° C., about 35° C., about 30° C., about 25° C., about 20° C., about 15° C., about 10° C., about 5° C., about 0° C., about −5° C., about −10°␣C., about −15° C., about −20° C., about −25° C., about −30° C., about 35° C., about −40° C., about −45° C., about −50° C., about −55° C., about −60° C., about −65° C., about −70° C., or about −75° C., and a lower limit of about 90° C., about 85° C., about 80° C., about 75° C., about 70° C., about 65° C., about 60° C., about 55° C., about 50° C., about 45° C., about 40° C., about 35° C., about 30° C., about 25° C. about 20° C., about 15° C., about 10° C., about 5° C., about 0° C., about −5° C., about −10° C., about −15° C., about −20° C., about −25° C., about −30° C., about −35° C., about −40° C., about −45° C., about −50° C., about −55° C., about −60° C., about −65° C., about −70° C., about −75° C., or about −78° C., or any combination thereof. By way of example, the temperature could be increased to speed up the coordination reaction or decreased to prevent side reactions that may occur at certain temperatures.

Preferences and options for a given aspect, feature, embodiment, or parameter of the technology described herein should, unless the context indicates otherwise, be regarded as having been disclosed in combination with any and all preferences and options for all other aspects, features, embodiments, and parameters of the technology.

The present technology may be further illustrated by reference to the following examples.

EXAMPLES

The examples below are intended to exemplify the practice of embodiments of the disclosure but are by no means intended to limit the scope thereof.

Example 1—CD Analysis

The scope of enantioselective chemosensing with ligand-free metal was tested with amino acids 1-18, α-hydroxy acid 19-24, amino alcohols 25-33, and amines 34-37 (only one enantiomer shown).

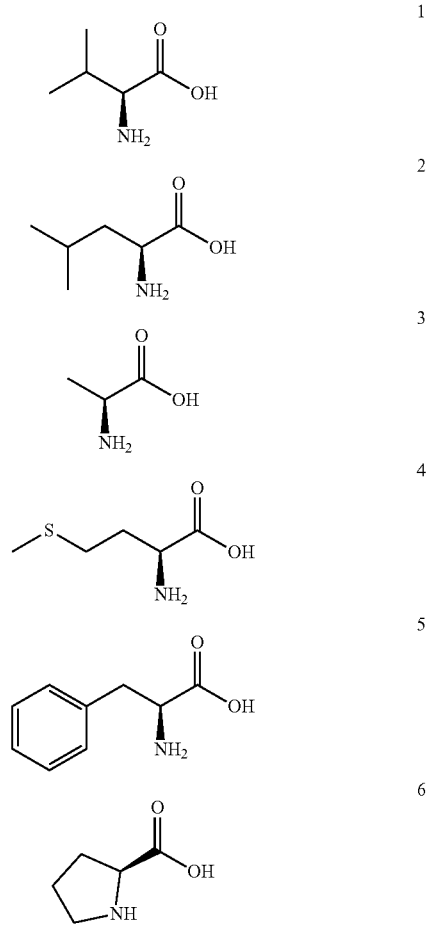

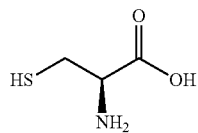
7
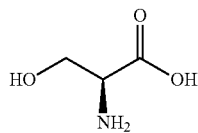
8
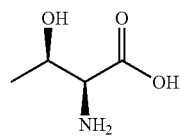
9
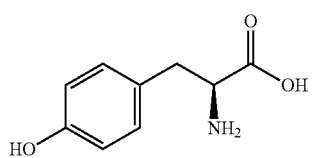
10
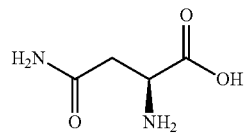
11
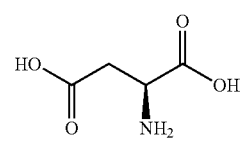
12
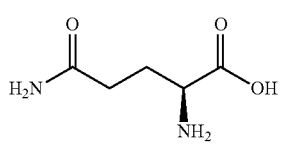
13
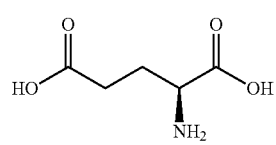
14
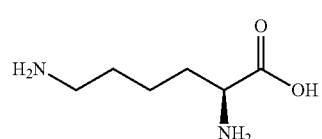
15
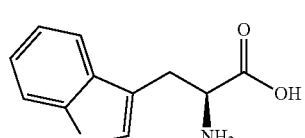
16
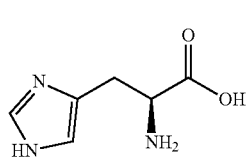
17
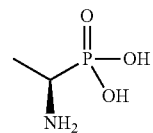
18
2. α-Hydroxy acids
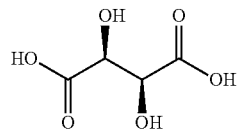
19
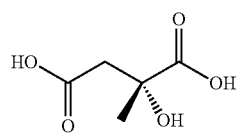
20
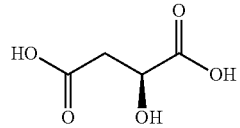
21
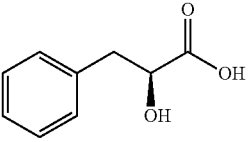
22
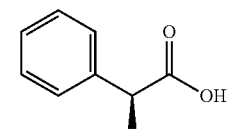
23
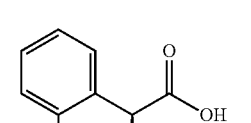
24
3. Amino alcohols
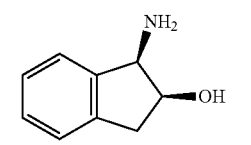
25
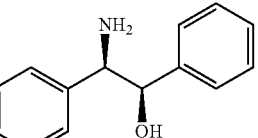
26
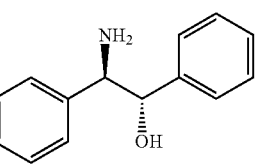
27

-continued

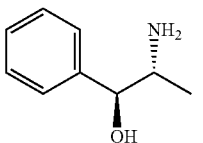

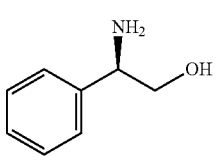

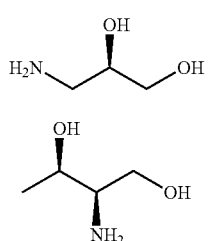

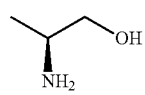

4. Amines

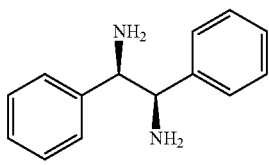

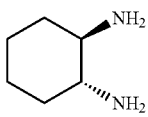

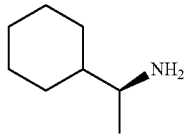

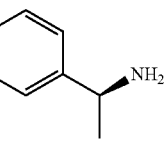

5. Carboxylic acid

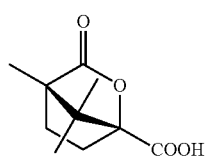

A stock solution of Co(NO$_3$)$_2$·6H$_2$O (0.02 M) in MeOH was prepared and portions of 0.5 mL were transferred to 4 mL vials. Solutions of the substrates were prepared in MeOH (0.50 M). For substrates 1 to 24, an equimolar amount of TBAOH (1.0 M in MeOH) was added. To each vial containing 0.5 mL of the Co(II) stock solution were added three equivalents of the substrate followed by one equivalent (1.14 µL) of H$_2$O$_2$ (30% w/w aqueous solution). In all cases, a distinct color change was observed upon addition of the chiral substrates and upon addition of the oxidant. Control NMR experiments showed that the substrates do not react with H$_2$O$_2$ under these conditions. The mixture was stirred for 1 hour at 25° C. and CD analysis was conducted either at 1.8 mM (amino acids, α-hydroxy acids and amino alcohols) or 0.5 mM (diamines) in MeOH. CD spectra were collected with a standard sensitivity of 100 mdeg, a data pitch of 2.0 nm, a band width of 1 nm, a scanning speed of 500 nm min-1, and a response of 0.5 s using a quartz cuvette (1 cm path length) (FIGS. 1-35). The data were baseline corrected and smoothed using a binomial equation. Control experiments with 1-35 showed that the free substrates are CD silent in the region of interest.

Example 2—Mechanistic Analysis

UV Analysis of the Complex Formation

Figure 1:
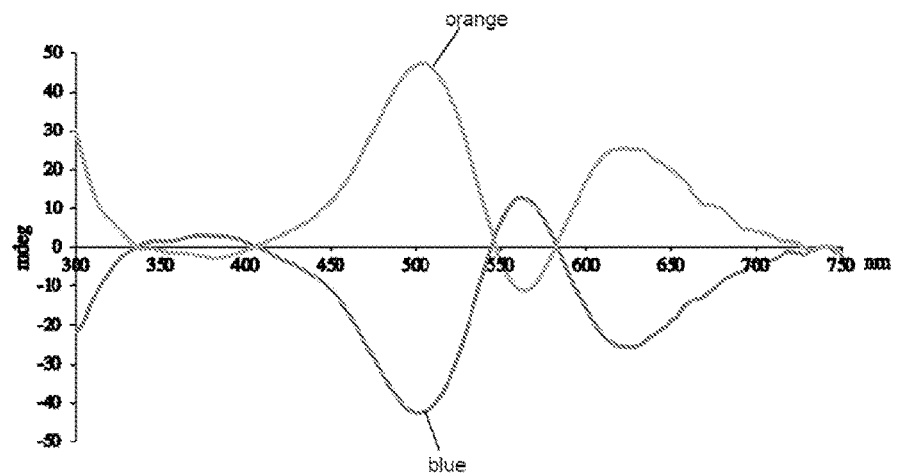
FIG. 1 shows the CD spectra of the assembly obtained from $Co(NO_3)_2 \cdot 6H_2O$, TBAOH, $H_2O_2$, and (S)-1 (blue) or (R)-1 (orange).
Figure 2:
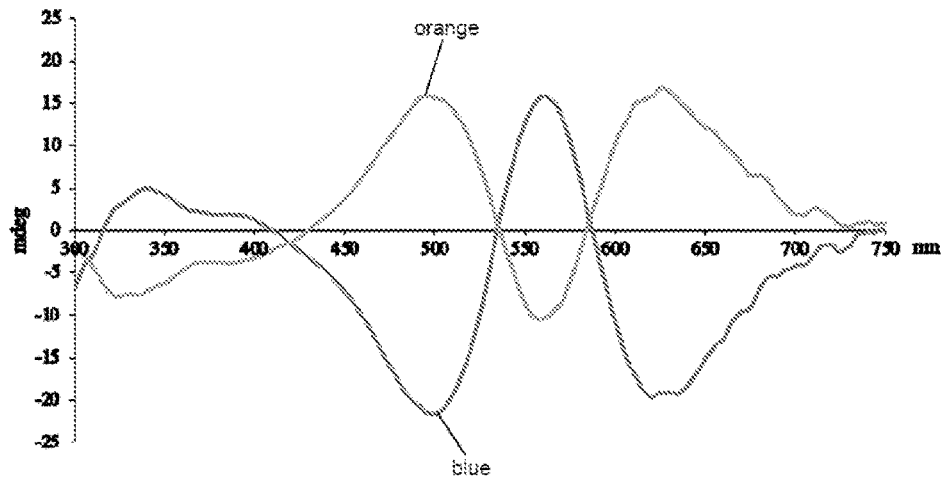
FIG. 2 shows the CD spectra of the assembly obtained from $Co(NO_3)_2 \cdot 6H_2O$, TBAOH, $H_2O_2$, and (S)-2 (blue) or (R)-2 (orange).
Figure 3:
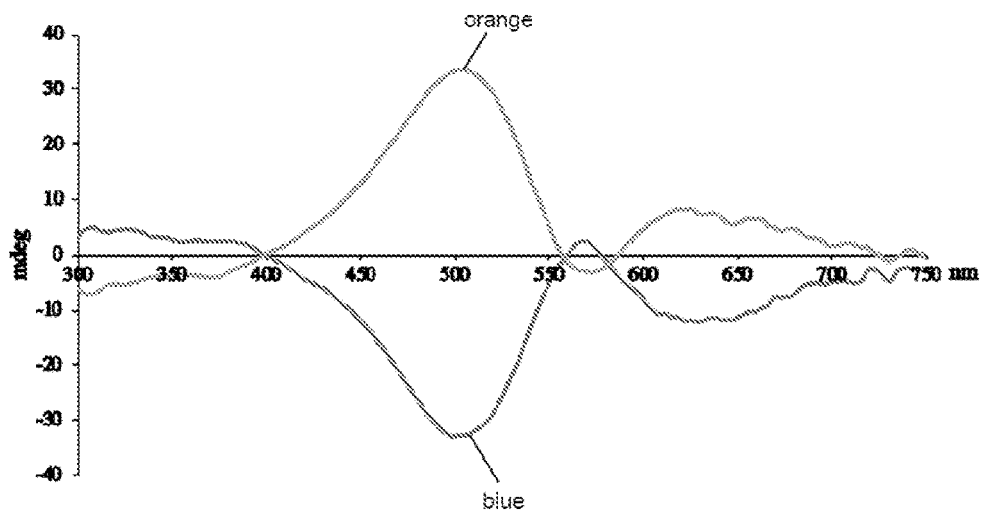
FIG. 3 shows the CD spectra of the assembly obtained from $Co(NO_3)_2 \cdot 6H_2O$, TBAOH, $H_2O_2$, and (S)-3 (blue) or (R)-3 (orange).
Figure 4:
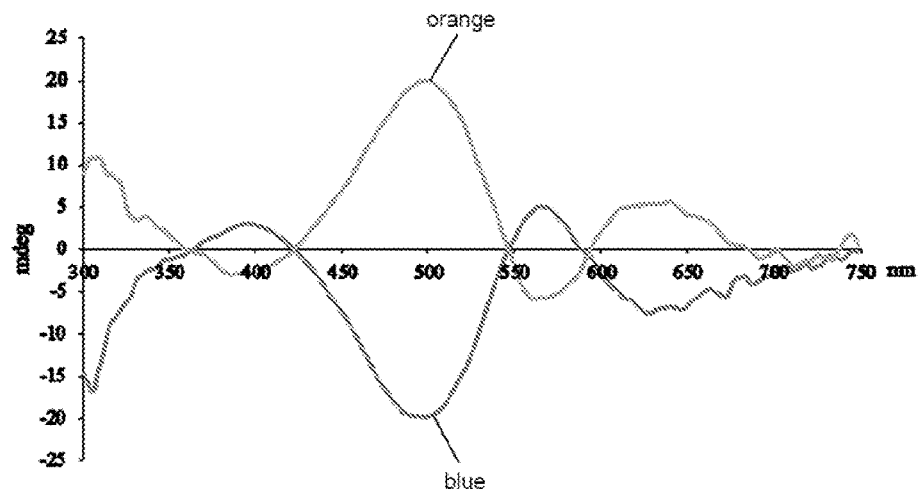
FIG. 4 shows the CD spectra of the assembly obtained from $Co(NO_3)_2 \cdot 6H_2O$, TBAOH, $H_2O_2$, and (S)-4 (blue) or (R)-4 (orange).
Figure 5:
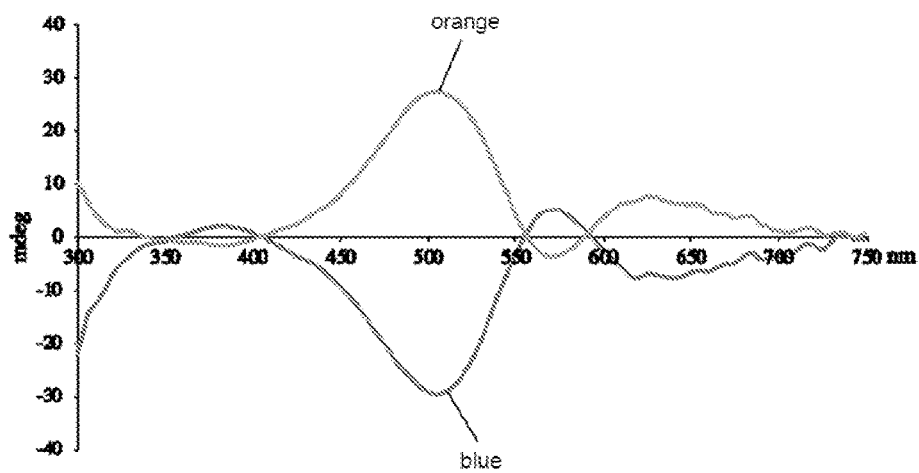
FIG. 5 shows the CD spectra of the assembly obtained from $Co(NO_3)_2 \cdot 6H_2O$, TBAOH, $H_2O_2$, and (S)-5 (blue) or (R)-5 (orange).
Figure 6:
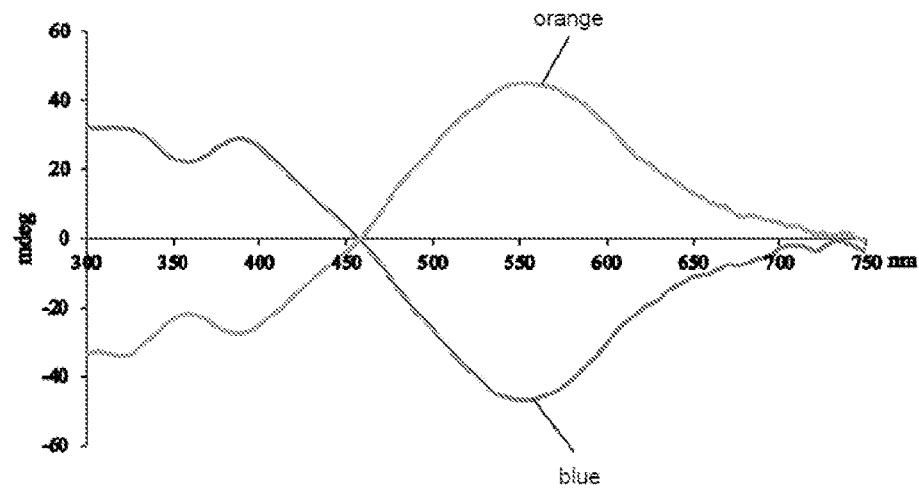
FIG. 6 shows the CD spectra of the assembly obtained from $Co(NO_3)_2 \cdot 6H_2O$, TBAOH, $H_2O_2$, and (S)-6 (blue) or (R)-6 (orange).
Figure 7:
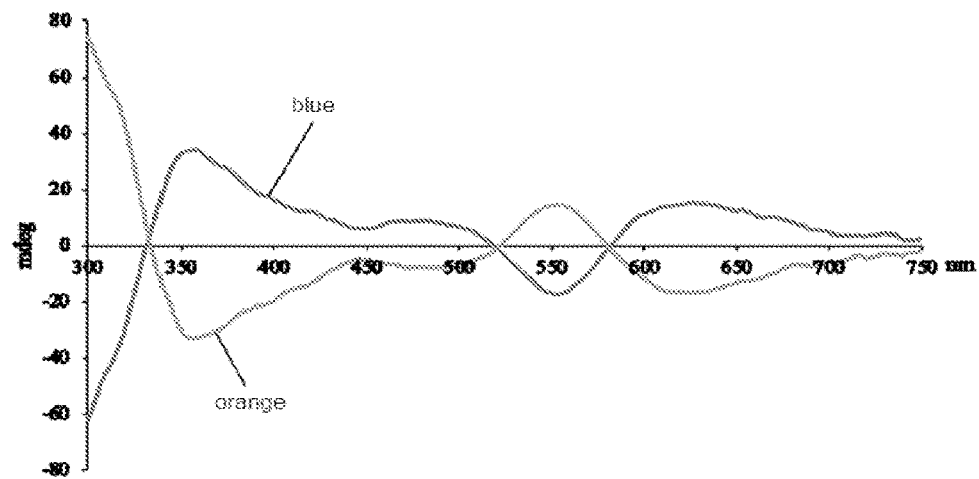
FIG. 7 shows the CD spectra of the assembly obtained from $Co(NO_3)_2 \cdot 6H_2O$, TBAOH, $H_2O_2$, and (S)-7 (blue) or (R)-7 (orange).
Figure 8:
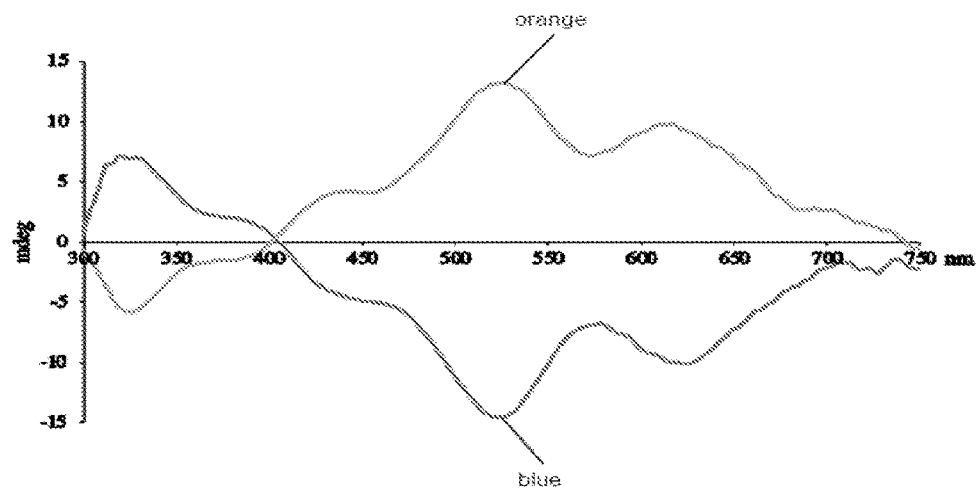
FIG. 8 shows the CD spectra of the assembly obtained from $Co(NO_3)_2 \cdot 6H_2O$, TBAOH, $H_2O_2$, and (S)-8 (blue) or (R)-8 (orange).
Figure 9:
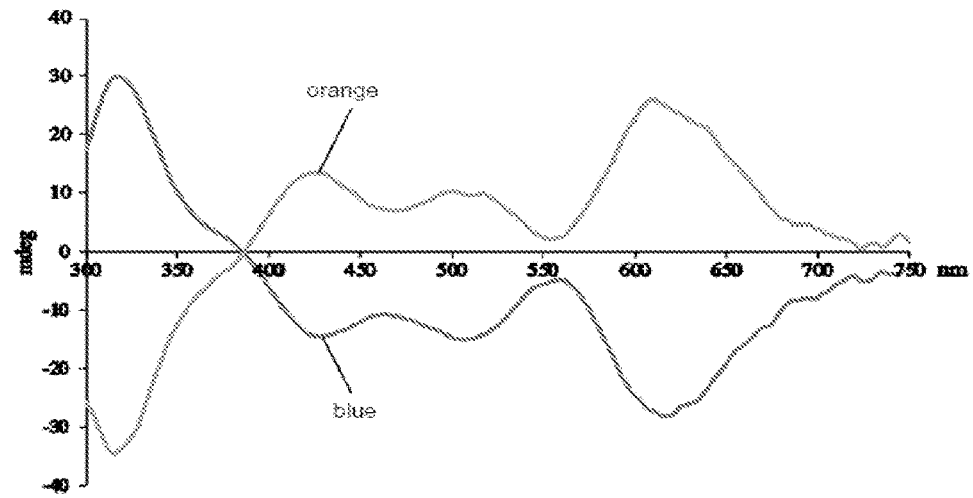
FIG. 9 shows the CD spectra of the assembly obtained from $Co(NO_3)_2 \cdot 6H_2O$, TBAOH, $H_2O_2$, and (S)-9 (blue) or (R)-9 (orange).
Figure 10:
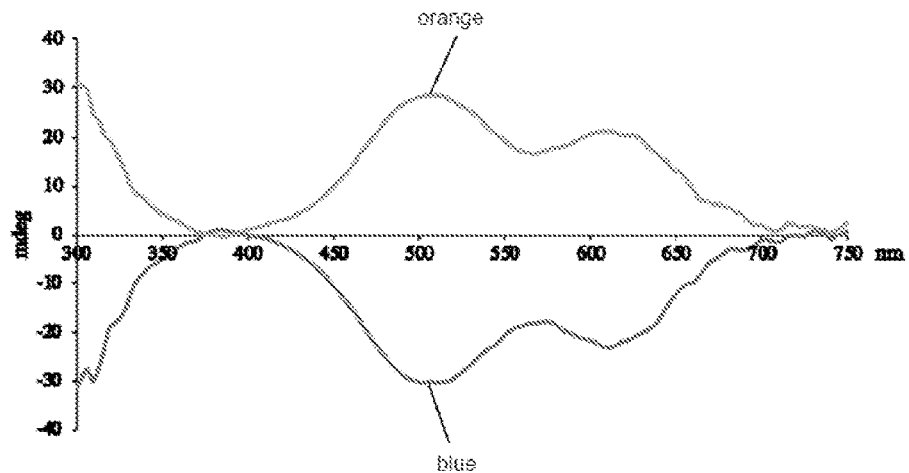
FIG. 10 shows the CD spectra of the assembly obtained from $Co(NO_3)_2 \cdot 6H_2O$, TBAOH, $H_2O_2$, and (S)-10 (blue) or (R)-10 (orange).
Figure 11:
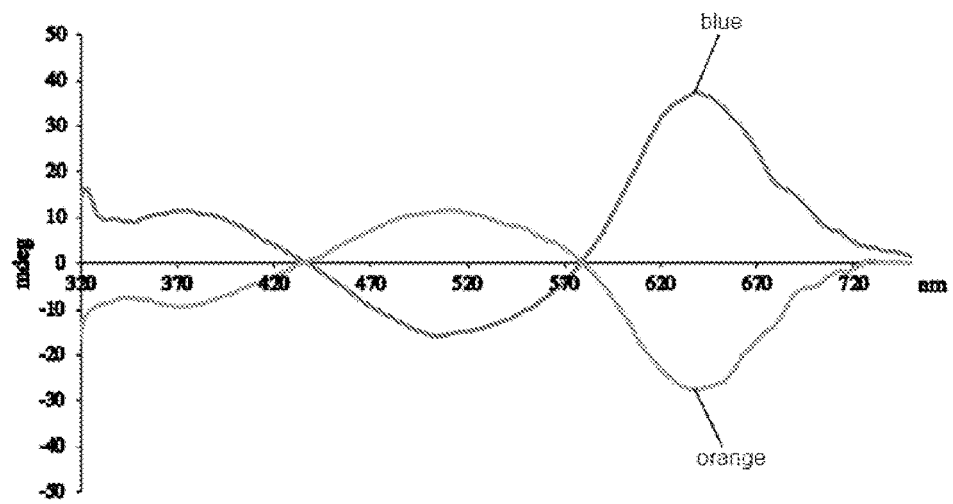
FIG. 11 shows the CD spectra of the assembly obtained from $Co(NO_3)_2 \cdot 6H_2O$, TBAOH, $H_2O_2$, and (S)-11 (blue) or (R)-11 (orange).
Figure 12:
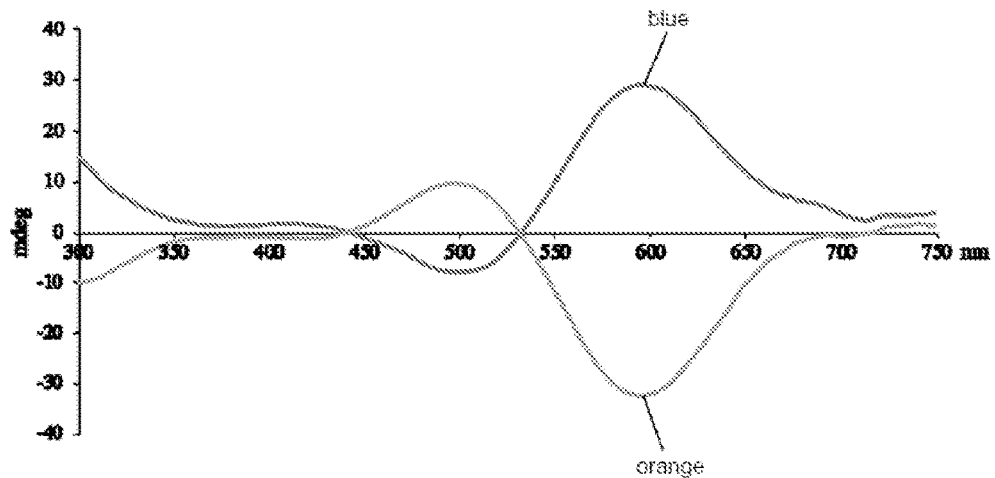
FIG. 12 shows the CD spectra of the assembly obtained from $Co(NO_3)_2 \cdot 6H_2O$, TBAOH, $H_2O_2$, and (S)-12 (blue) or (R)-12 (orange).
Figure 13:
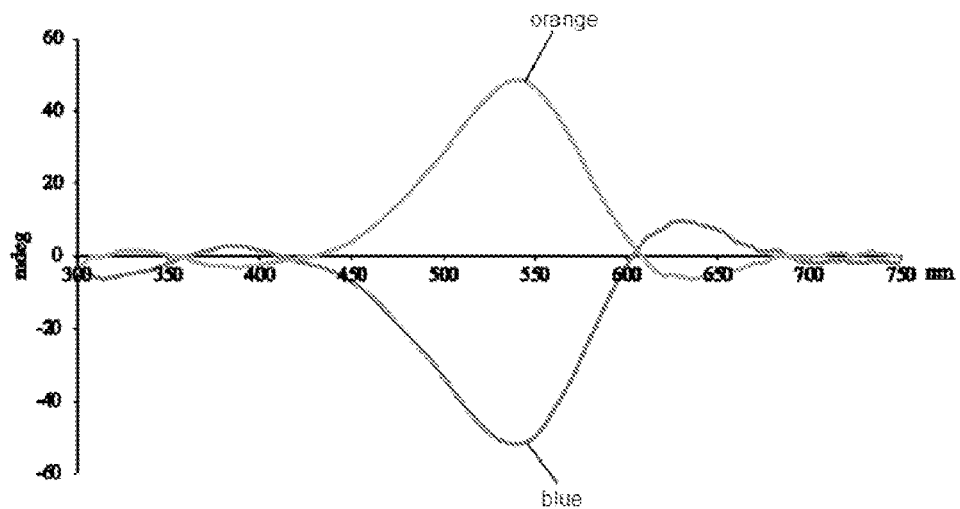
FIG. 13 shows the CD spectra of the assembly obtained from $Co(NO_3)_2 \cdot 6H_2O$, TBAOH, $H_2O_2$, and (S)-13 (blue) or (R)-13 (orange).
Figure 14:
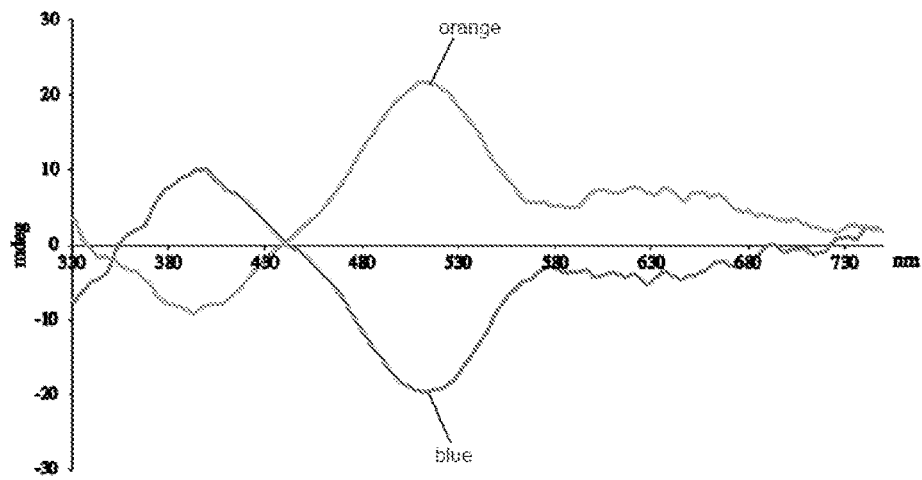
FIG. 14 shows the CD spectra of the assembly obtained from $Co(NO_3)_2 \cdot 6H_2O$, TBAOH, $H_2O_2$, and (S)-14 (blue) or (R)-14 (orange).
Figure 15:
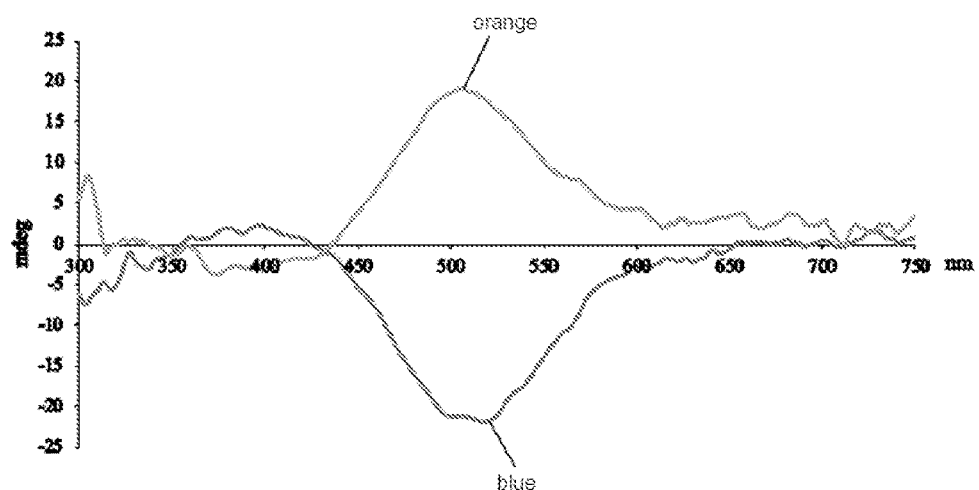
FIG. 15 shows the CD spectra of the assembly obtained from $Co(NO_3)_2 \cdot 6H_2O$, TBAOH, $H_2O_2$, and (S)-15 (blue) or (R)-15 (orange).
Figure 16:
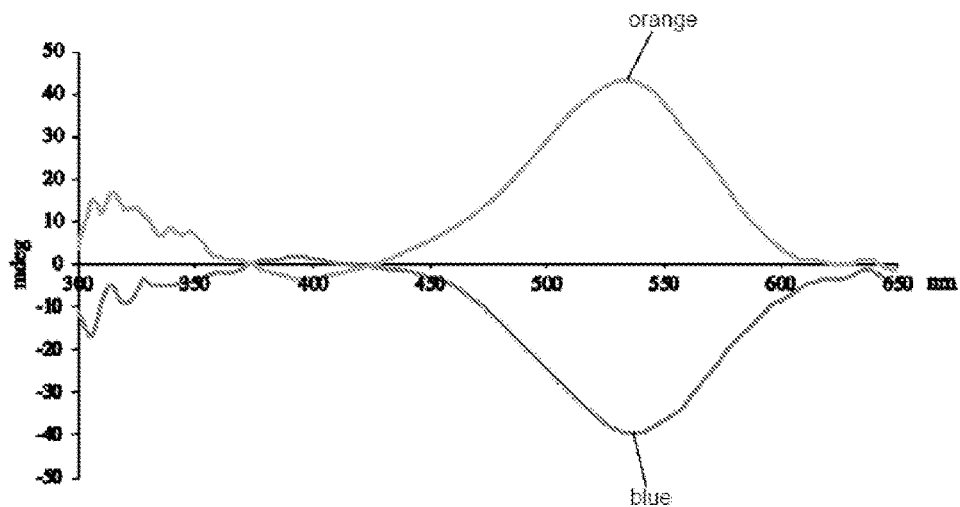
FIG. 16 shows the CD spectra of the assembly obtained from $Co(NO_3)_2 \cdot 6H_2O$, TBAOH, $H_2O_2$, and (S)-16 (blue) or (R)-16 (orange).
Figure 17:
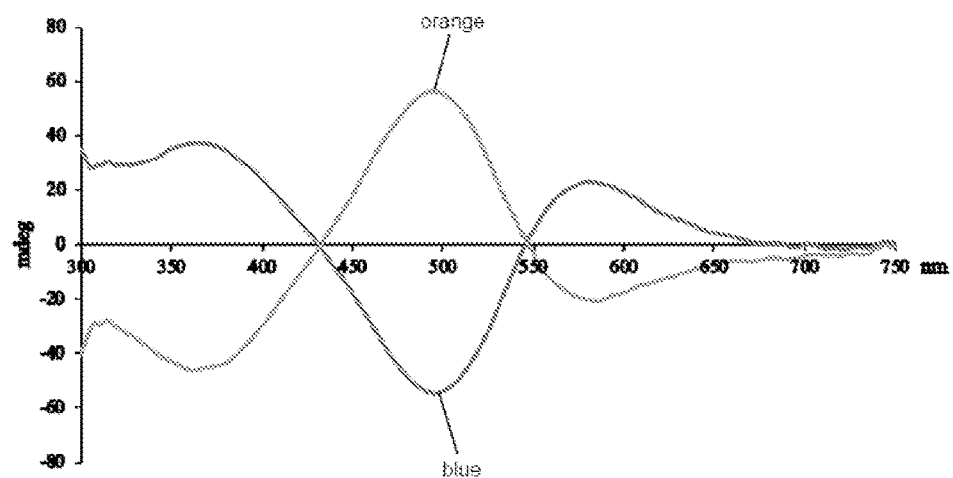
FIG. 17 shows the CD spectra of the assembly obtained from $Co(NO_3)_2 \cdot 6H_2O$, TBAOH, and (S)-17 (blue) or (R)-17 (orange).
Figure 18:
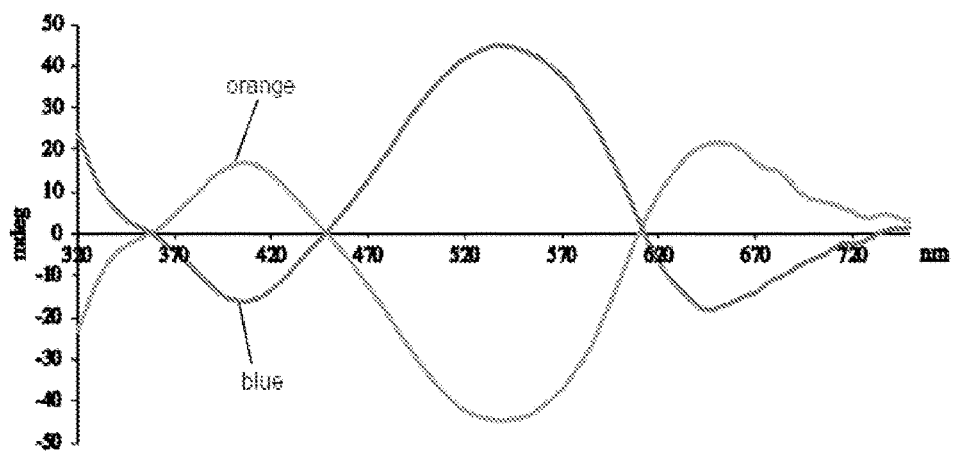
FIG. 18 shows the CD spectra of the assembly obtained from $Co(NO_3)_2 \cdot 6H_2O$, TBAOH, $H_2O_2$, and (S)-18 (blue) or (R)-18 (orange).
Figure 19:
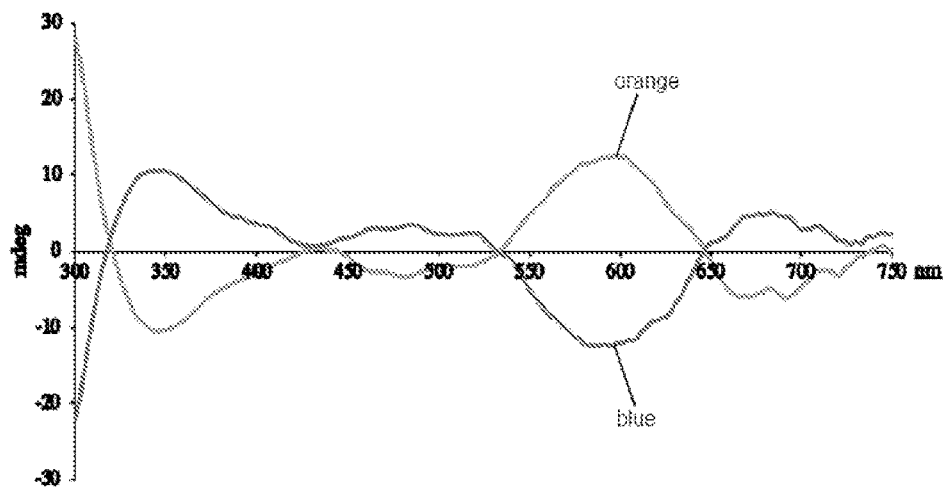
FIG. 19 shows the CD spectra of the assembly obtained from $Co(NO_3)_2 \cdot 6H_2O$, TBAOH, $H_2O_2$, and (S,S)-19 (blue) or (R,R)-19 (orange).
Figure 20:
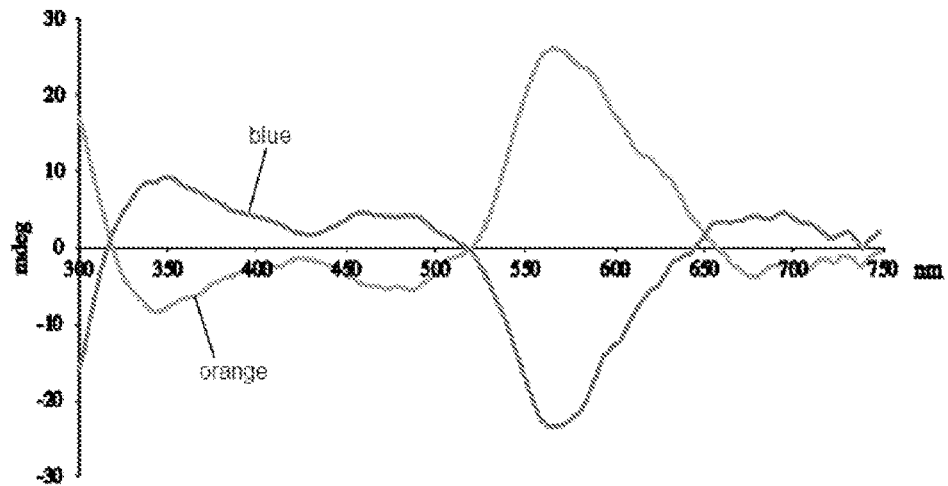
FIG. 20 shows the CD spectra of the assembly obtained from $Co(NO_3)_2 \cdot 6H_2O$, TBAOH, $H_2O_2$, and (S)-20 (blue) or (R)-20 (orange).
Figure 21:
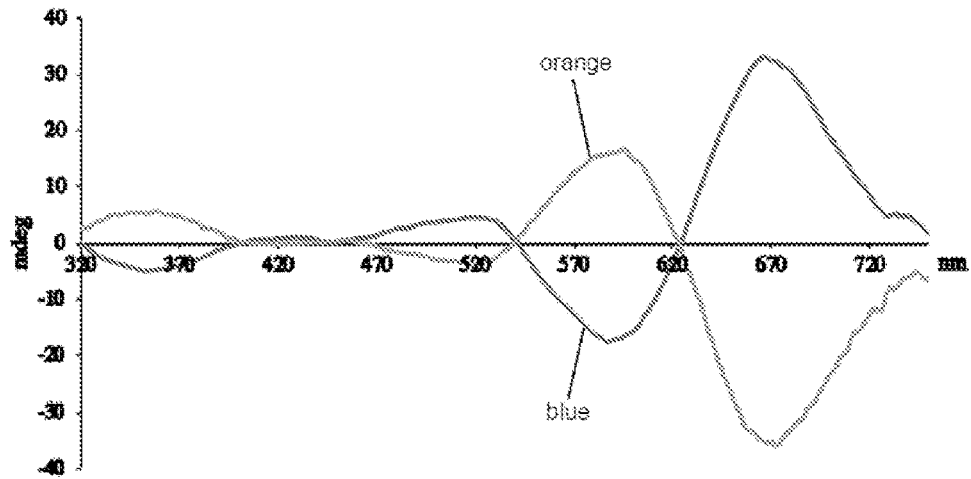
FIG. 21 shows the CD spectra of the assembly obtained from $Co(NO_3)_2 \cdot 6H_2O$, TBAOH, $H_2O_2$, and (S)-21 (blue) or (R)-21 (orange).
Figure 22:
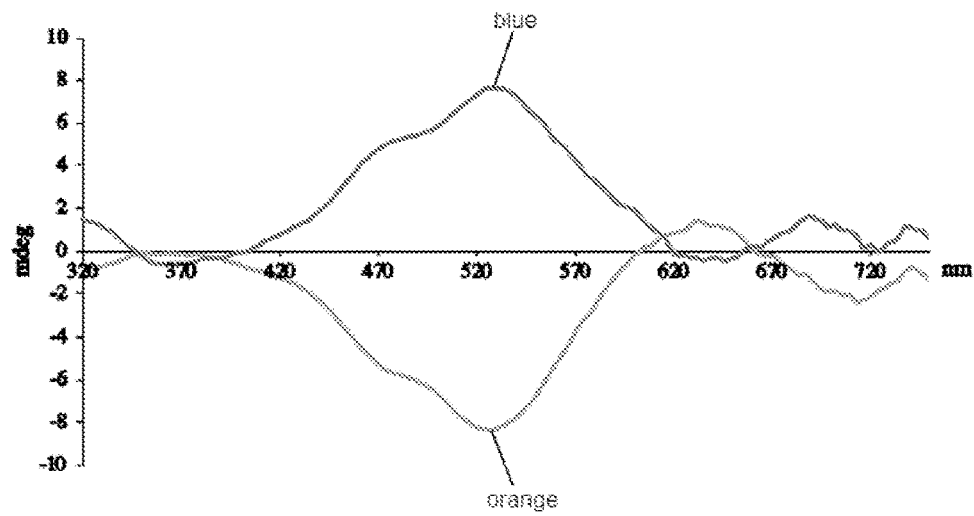
FIG. 22 shows the CD spectra of the assembly obtained from $Co(NO_3)_2 \cdot 6H_2O$, TBAOH, $H_2O_2$, and (S)-22 (blue) or (R)-22 (orange).
Figure 23:
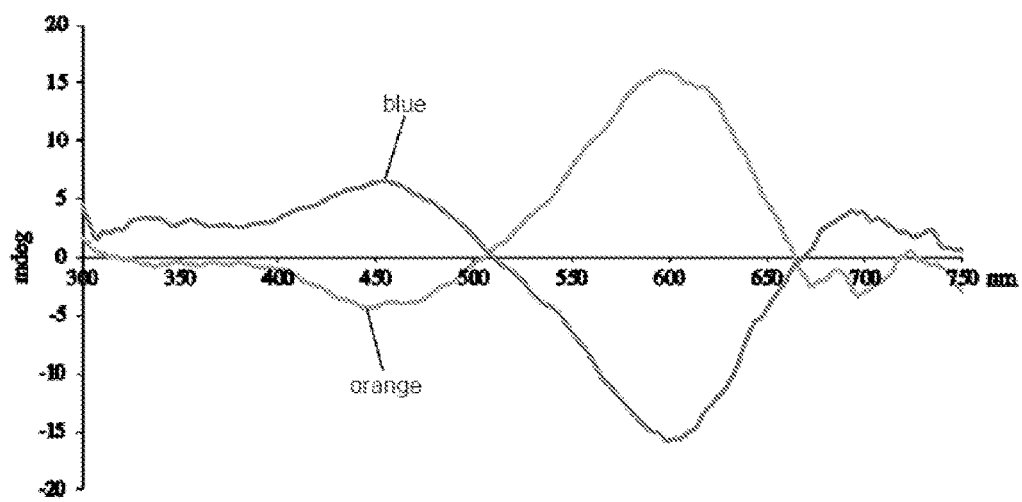
FIG. 23 shows the CD spectra of the assembly obtained from $Co(NO_3)_2 \cdot 6H_2O$, TBAOH, $H_2O_2$, and (S)-23 (blue) or (R)-23 (orange).
Figure 24:
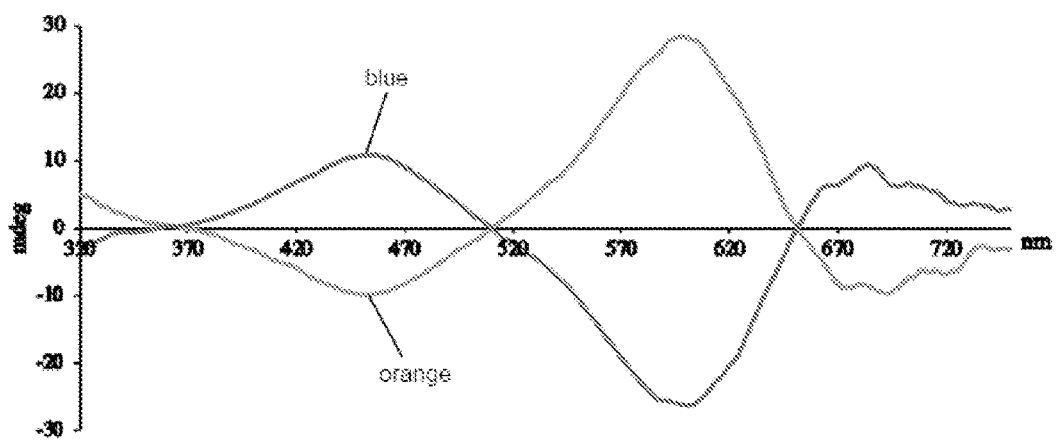
FIG. 24 shows the CD spectra of the assembly obtained from $Co(NO_3)_2 \cdot 6H_2O$, TBAOH, $H_2O_2$, and (S)-24 (blue) or (R)-24 (orange).
Figure 25:
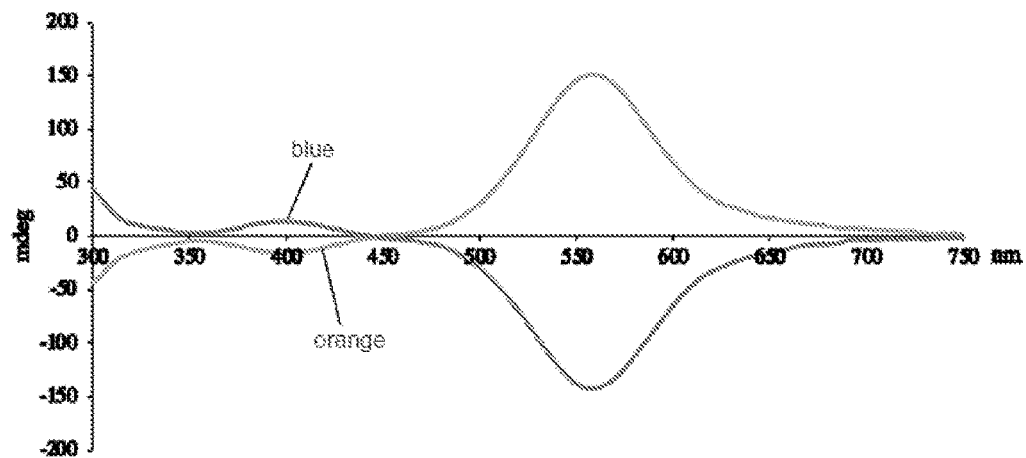
FIG. 25 shows the CD spectra of the assembly obtained from $Co(NO_3)_2 \cdot 6H_2O$, $H_2O_2$, and (S,R)-25 (blue) or (R,S)-25 (orange).
Figure 26:
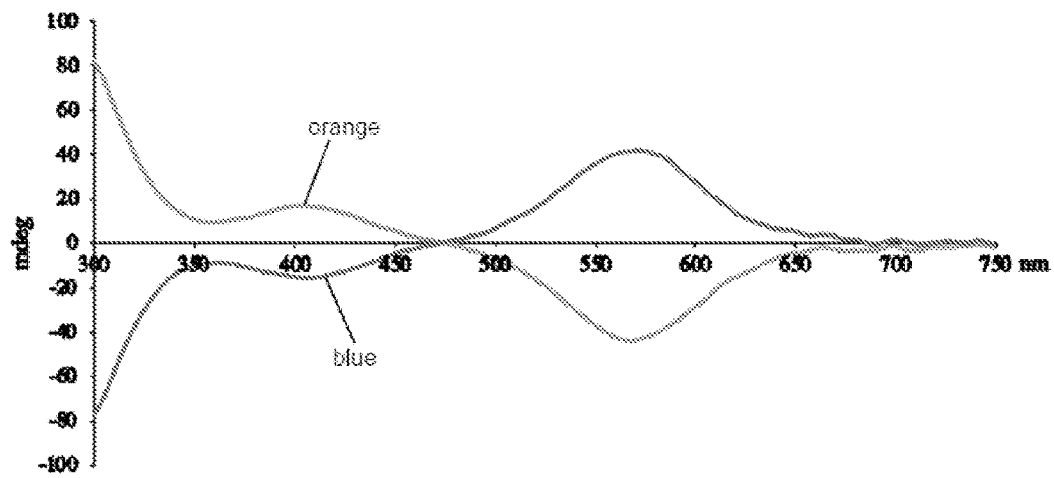
FIG. 26 shows the CD spectra of the assembly obtained from $Co(NO_3)_2 \cdot 6H_2O$, $H_2O_2$, and (S,R)-26 (blue) or (R,S)-26 (orange).
Figure 27:
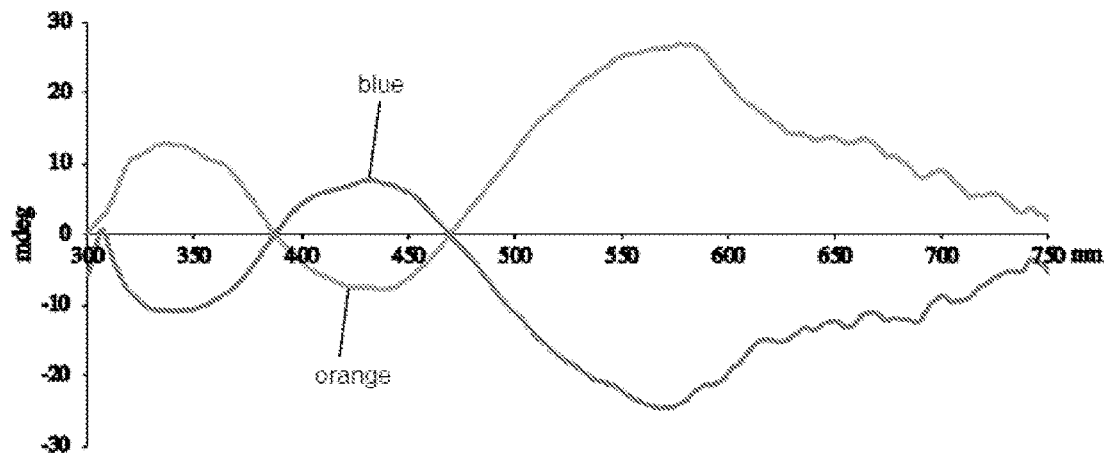
FIG. 27 shows the CD spectra of the assembly obtained from $Co(NO_3)_2 \cdot 6H_2O$, $H_2O_2$, and (S,S)-27 (blue) or (R,R)-27 (orange).
Figure 28:
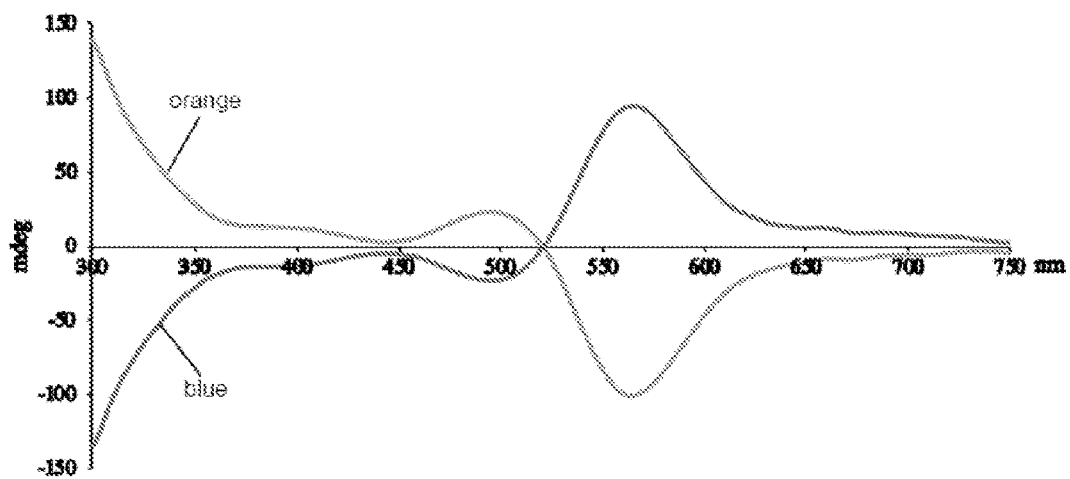
FIG. 28 shows the CD spectra of the assembly obtained from $Co(NO_3)_2 \cdot 6H_2O$, $H_2O_2$, and (S,R)-28 (blue) or (R,S)-28 (orange).
Figure 29:
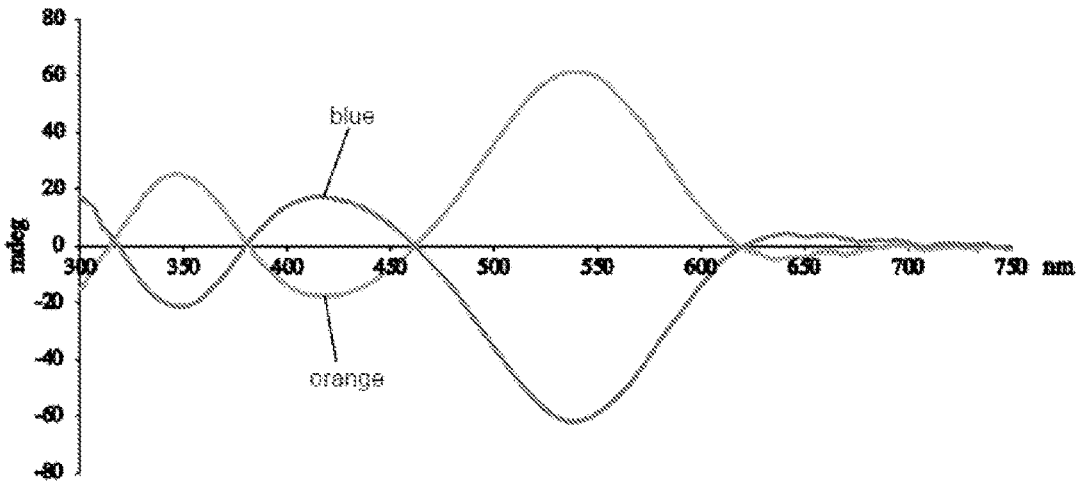
FIG. 29 shows the CD spectra of the assembly obtained from $Co(NO_3)_2 \cdot 6H_2O$, $H_2O_2$, and (S)-29 (blue) or (R)-29 (orange).
Figure 30:
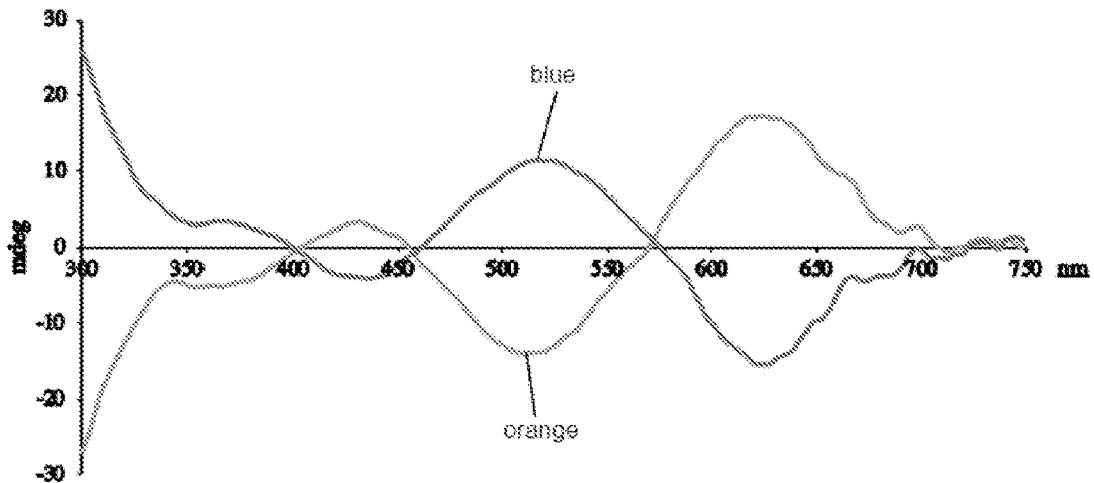
FIG. 30 shows the CD spectra of the assembly obtained from $Co(NO_3)_2 \cdot 6H_2O$, $H_2O_2$, and (S)-30 (blue) or (R)-30 (orange).
Figure 31:
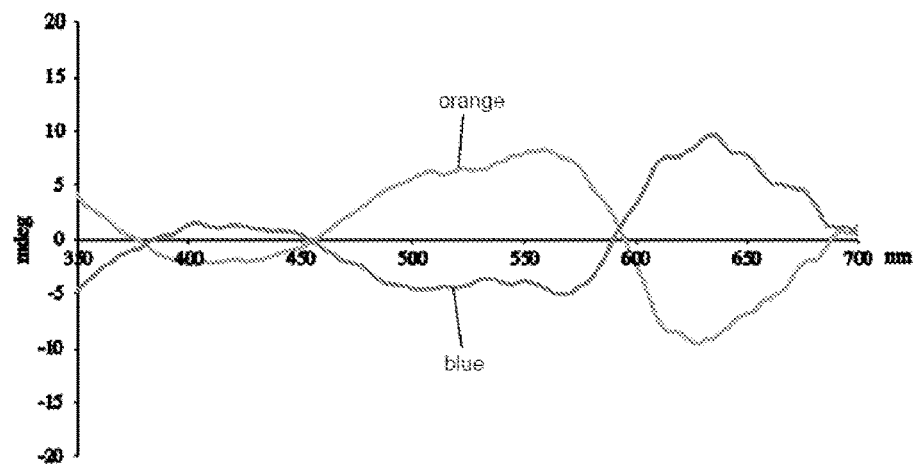
FIG. 31 shows the CD spectra of the assembly obtained from $Co(NO_3)_2 \cdot 6H_2O$, $H_2O_2$, and (S,S)-31 (blue) or (R,R)-31 (orange).
Figure 32:
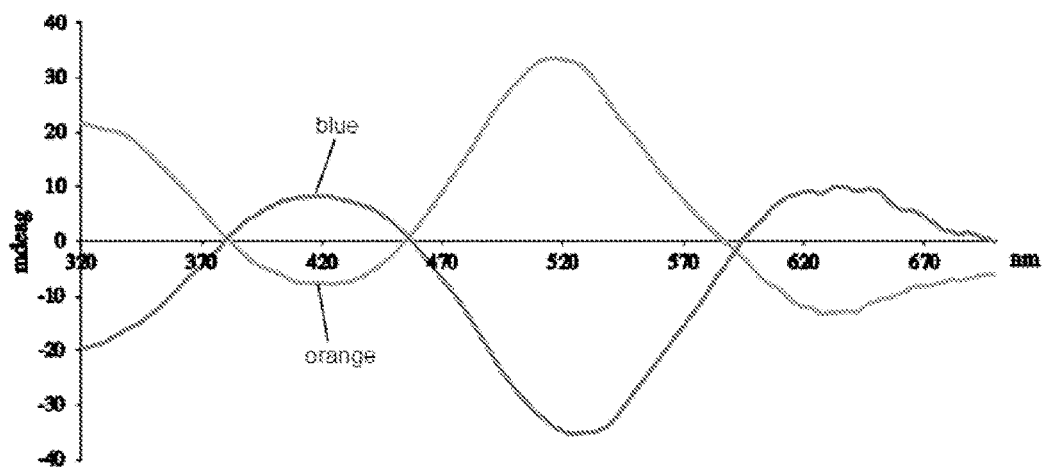
FIG. 32 shows the CD spectra of the assembly obtained from $Co(NO_3)_2 \cdot 6H_2O$, $H_2O_2$, and (S)-32 (blue) or (R)-32 (orange.
Figure 33:
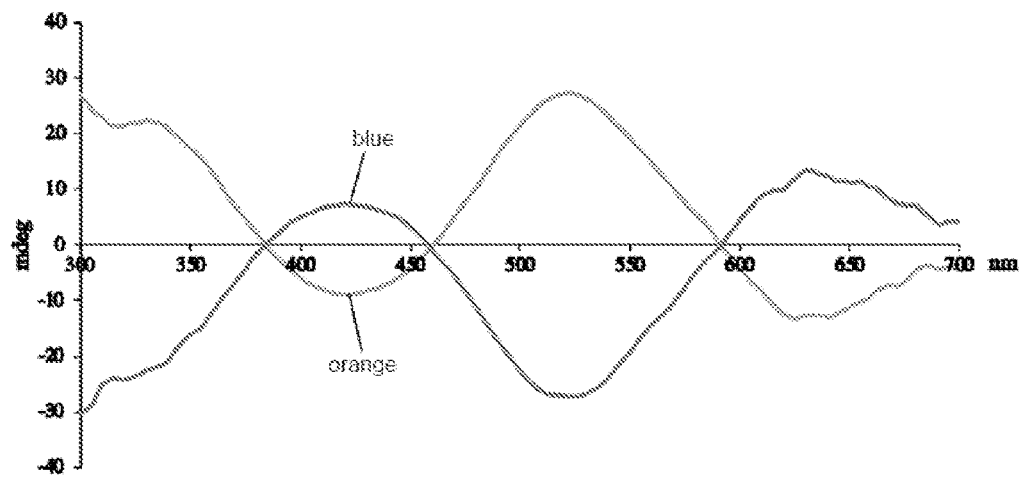
FIG. 33 shows the CD spectra of the assembly obtained from $Co(NO_3)_2 \cdot 6H_2O$, $H_2O_2$, and (S)-33 (blue) or (R)-33 (orange).
Figure 34:
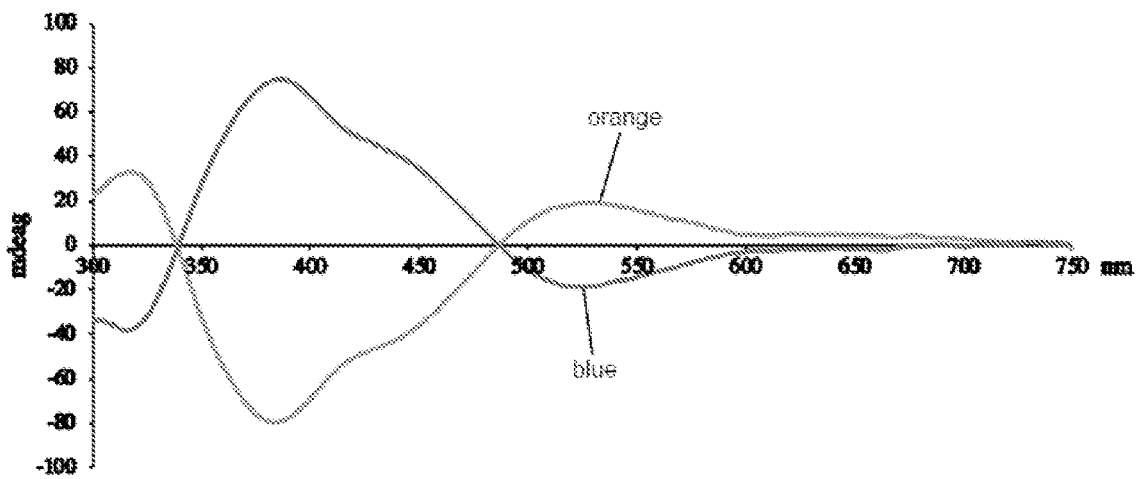
FIG. 34 shows the CD spectra of the assembly obtained from $Co(NO_3)_2 \cdot 6H_2O$, $H_2O_2$, and (S,S)-34 (blue) or (R,R)-34 (orange).
Figure 35:
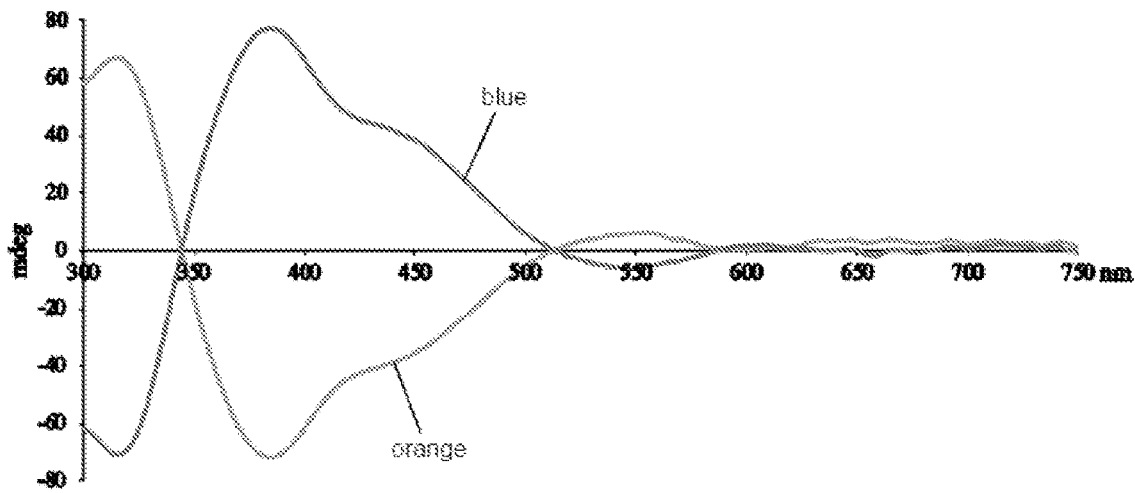
FIG. 35 shows the CD spectra of the assembly obtained from $Co(NO_3)_2 \cdot 6H_2O$, $H_2O_2$, and (S,S)-35 (blue) or (R,R)-35 (orange).
Figure 36:
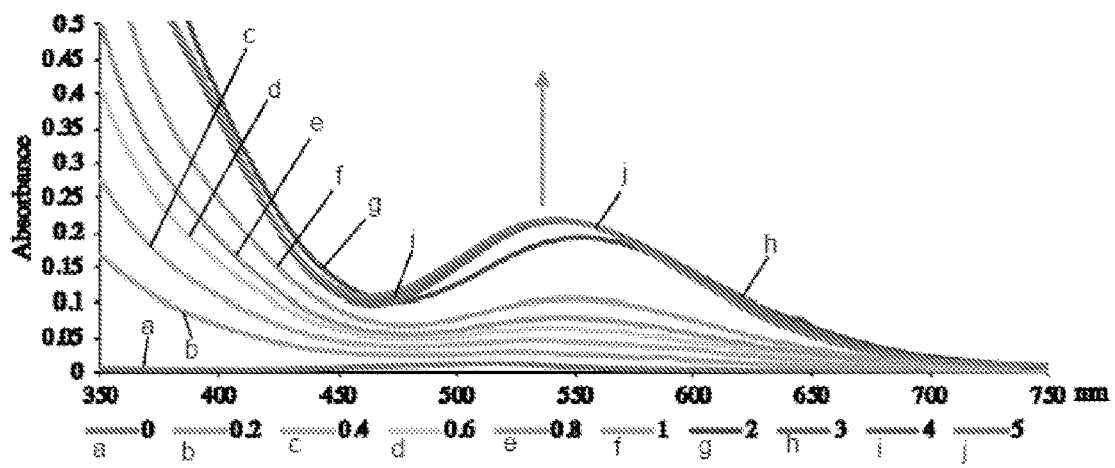
FIG. 36 shows the UV analysis of the reaction of probe $Co(NO_3)_2 \cdot 6H_2O$ with differing amount of analyte (R)-1.
Figure 37:
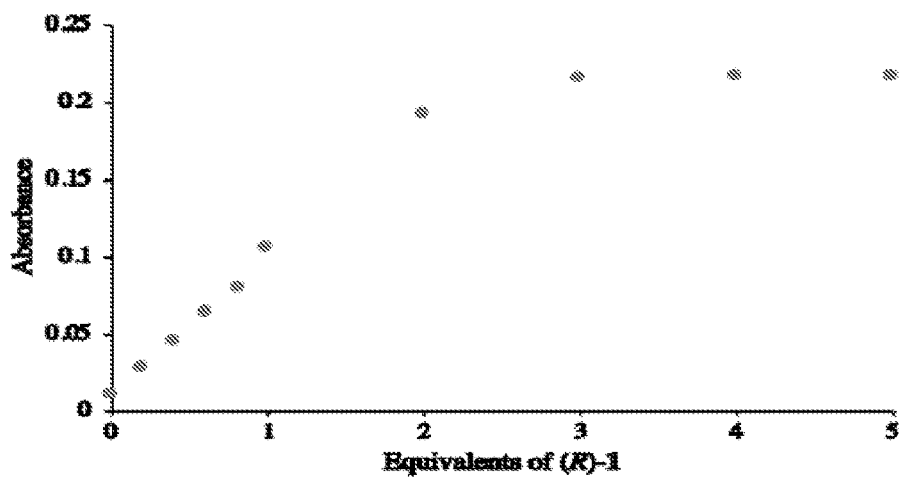
FIG. 37 shows the UV amplitude at 545 nm plotted against the equivalents of (R)-1 of the reaction of probe $Co(NO_3)_2 \cdot 6H_2O$ with differing amount of analyte (R)-1.

A stock solution of Co(NO$_3$)$_2$·6H$_2$O (0.02 M) in MeOH was prepared and 0.5 mL portions were transferred into 4 mL vials. A solution of (R)-1 was prepared in MeOH (0.50 M) and was treated with an equimolar amount of TBAOH (1.0 M in MeOH). To each vial containing 0.5 mL of the Co(II) stock solution were added increasing amounts of the substrate (0.0, 0.2, 0.4, 0.6, 0.8, 1.0, 2.0, 3.0, 4.0, 5.0 equivalents relative to Co(II)) followed by one equivalent (1.14 µL) of H$_2$O$_2$ (30% w/w aqueous solution). UV analysis was performed at 1.8 mM in MeOH with an average scanning time of 0.1 s, a data interval of 1 nm, and a scan rate of 600 nm/min (FIG. 36). The signal at 545 nm continuously increased upon addition of the substrate showing saturation upon addition of 3 equivalents of (R)-1 (see FIG. 37).

Completion of the Complex Formation by CD Spectroscopy

Figure 38:
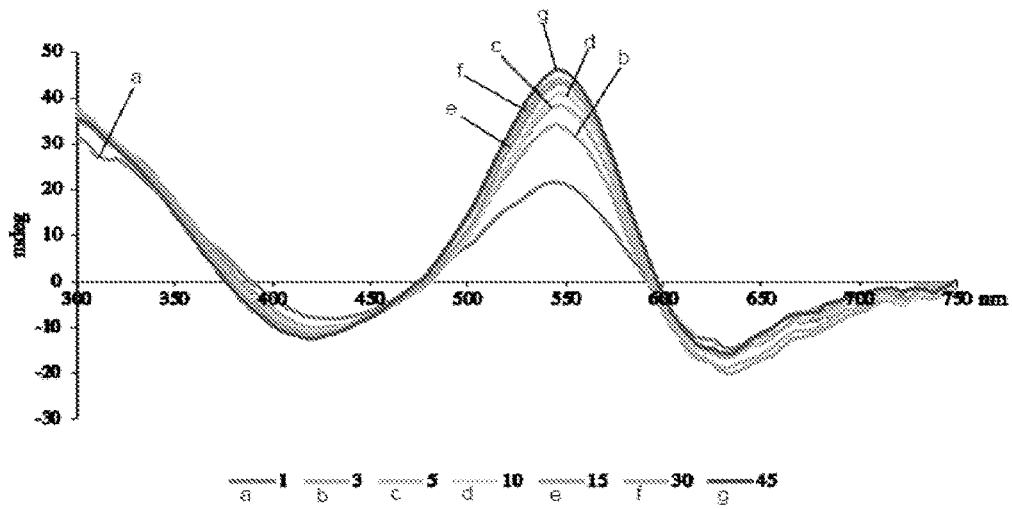
FIG. 38 shows the CD spectra of the reaction of probe $Co(NO_3)_2 \cdot 6H_2O$ with analyte (R)-32, take at time points of 1, 3, 5, 10, 15, 30, and 45 minutes.
Figure 39:
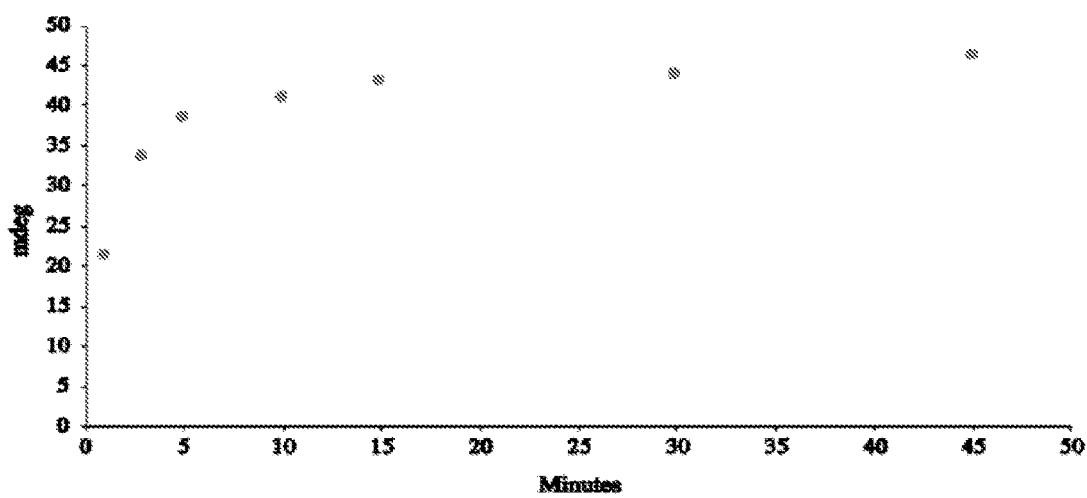
FIG. 39 shows the plot of CD signal at 550 nm plotted against time in minutes for the reaction of probe $Co(NO_3)_2 \cdot 6H_2O$ with differing amount of analyte (R)-32.

The CD spectra of a mixture of Co(NO$_3$)$_2$·6H$_2$O, (R)-32, and H$_2$O$_2$ prepared as described herein were collected after 1, 3, 5, 10, 15, 30, 45, 60, and 90 minutes using sample concentrations of 1.8 mM in MeOH (FIG. 38). The maxima at 550 nm were plotted versus time (FIG. 39). After 15 to 20 minutes, the signal begins to plateau indicating completion of the assembly formation.

Correlation Between Concentration and CD Signal of (R,S)-25

Figure 40:
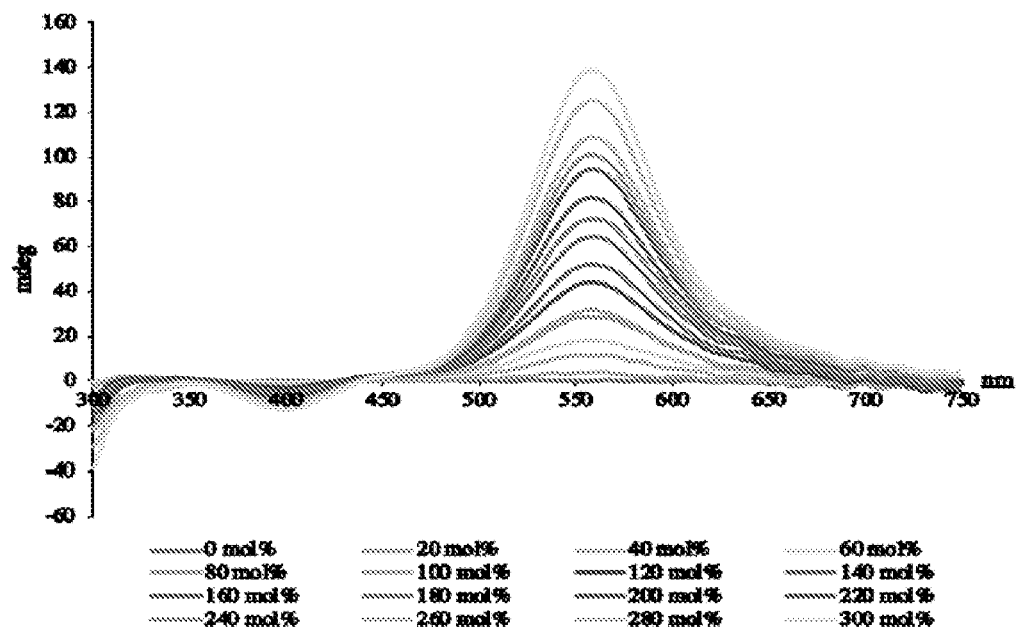
FIG. 40 shows the CD spectra of the reaction of probe $Co(NO_3)_2 \cdot 6H_2O$ with varying amounts of analyte (R,S)-25.
Figure 41:
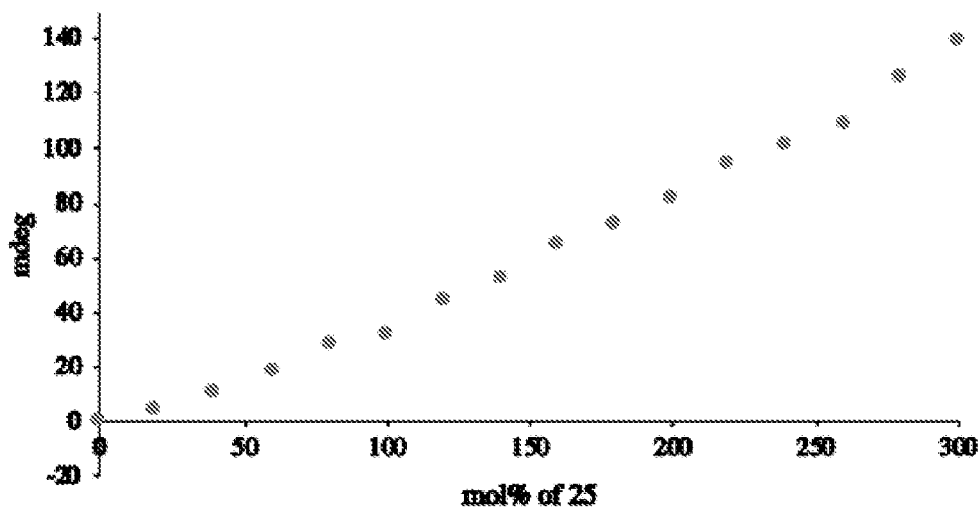
FIG. 41 shows the plot of the CD signal at 560 nm plotted against the amount of analyte in the reaction of probe $Co(NO_3)_2 \cdot 6H_2O$ with differing amount of analyte (R,S)-25.

A stock solution of Co(NO$_3$)$_2$·6H$_2$O (0.02 M) in MeOH was prepared and 0.5 mL portions were transferred into 4 mL vials. To the solutions of Co(NO$_3$)$_2$·6H$_2$O were added varying amounts of (R,S)-25 (0, 20, 40, 60, 80, 100, 120, 140, 160, 180, 200, 220, 240, 260, 280, and 300 mol %), and one equivalent (1.14 µL) of H$_2$O$_2$. The mixture was stirred for 1 hour at 25° C. prior to CD analysis. CD analysis was performed as described herein at 1.8 mM in MeOH (FIG. 40). A linear correlation was found between the CD maxima obtained at 560 nm and increasing amounts of (R,S)-25 (see FIG. 41).

Complex Stoichiometry by MS Analysis

Figure 42:
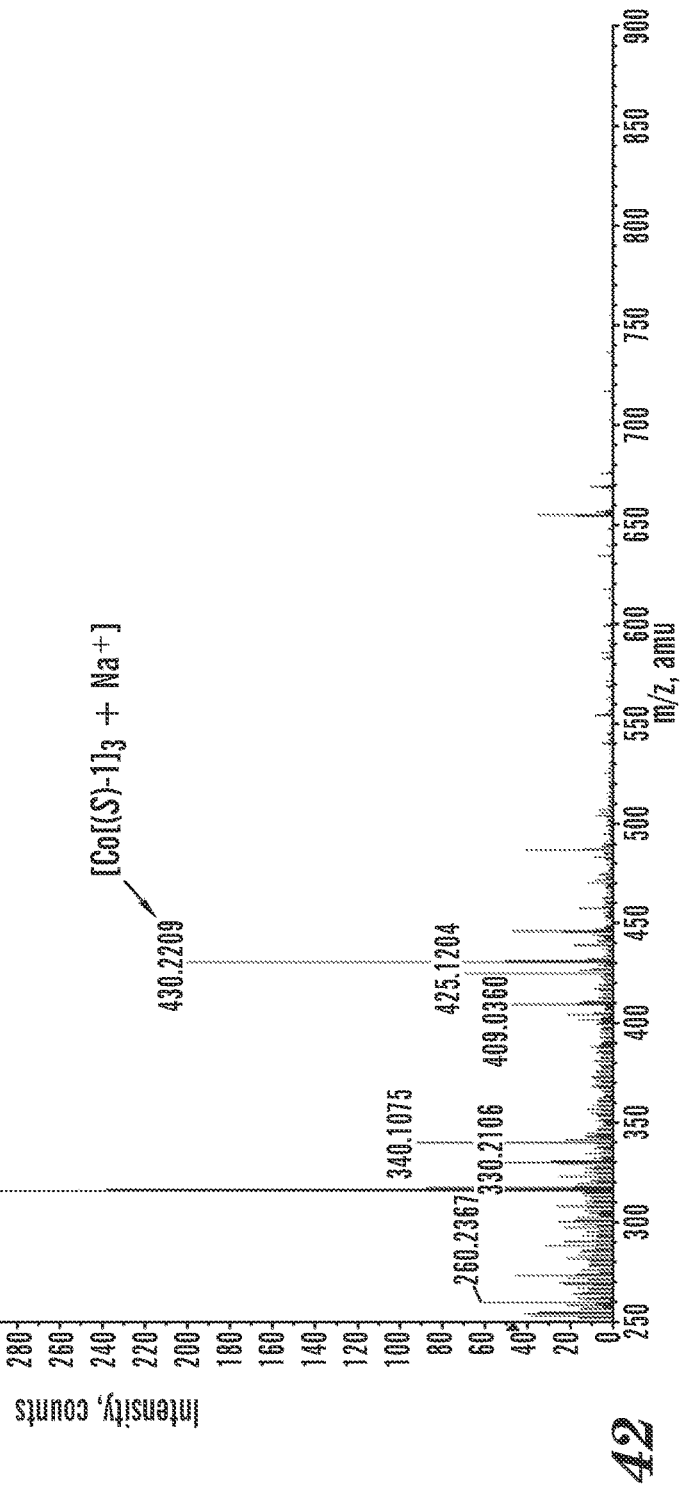
FIG. 42 shows the ESI-MS spectrum of the complex of $Co(NO_3)_2 \cdot 6H_2O$ with (S)-1.

Co(NO$_3$)$_2$·6H$_2$O (0.01 mmol in 0.5 mL MeOH), (S)-1 (0.06 mL, 0.5 M MeOH/KOH 1:1) and H$_2$O$_2$ (1.14 µL, 30% w/w in H$_2$O) were combined and the mixture was stirred for 1 hour prior to electrospray mass spectrometry (positive ion mode) analysis (metal complex $[CoC_{15}H_{30}N_3O_6]$=407 m/z) (FIG. 42).

Figure 43:
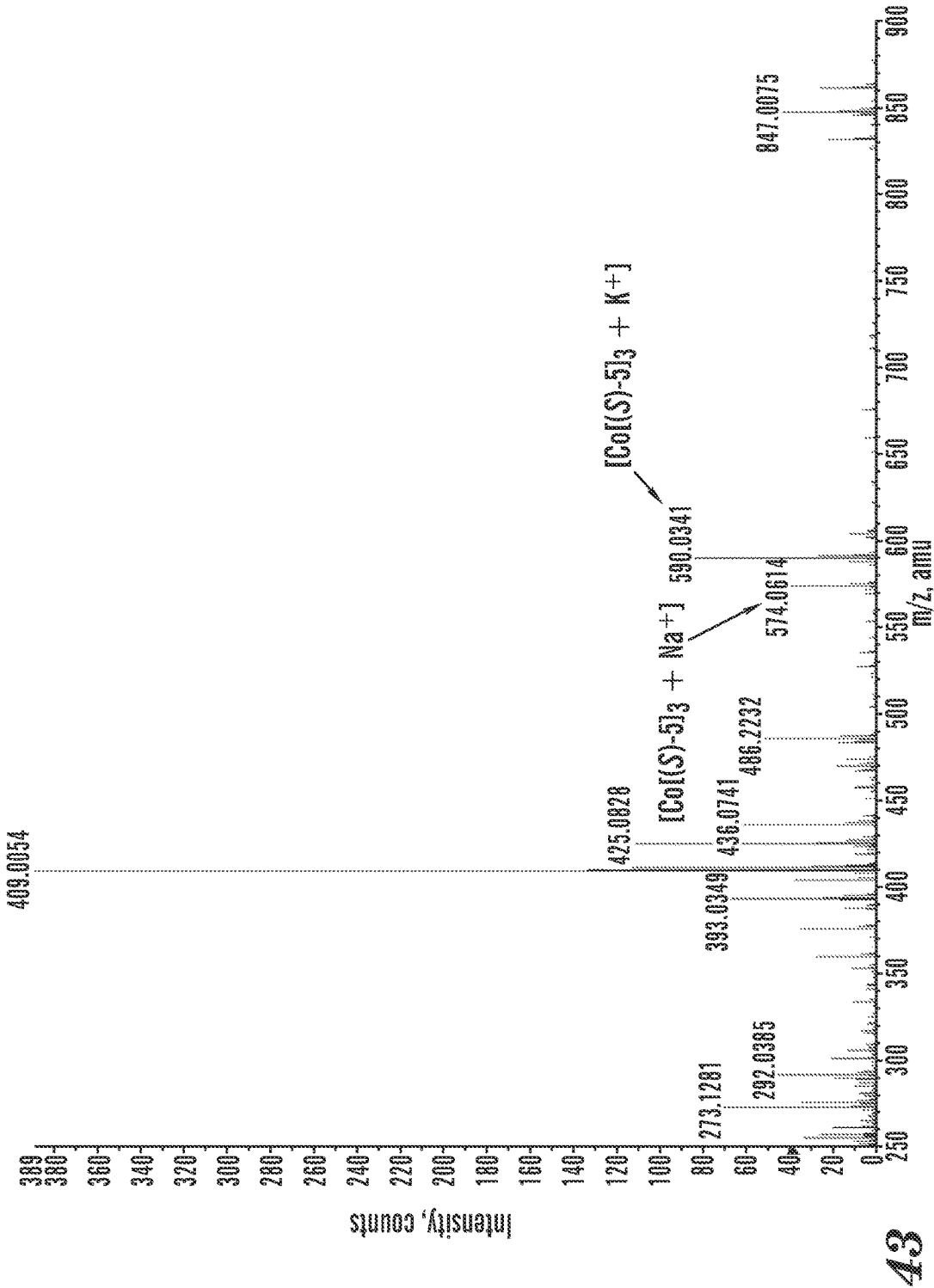
FIG. 43 shows the ESI-MS spectrum of the complex of $Co(NO_3)_2 \cdot 6H_2O$ with (S)-5.

$Co(NO_3)_2 \cdot 6H_2O$ (0.01 mmol in 0.5 mL MeOH), (S)-5 (0.06 mL, 0.5 M MeOH/KOH 1:1) and $H_2O_2$ (1.14 µL, 30% w/w in $H_2O$) were combined and the mixture was stirred for 1 hour prior to electrospray mass spectrometry (positive ion mode) analysis (metal complex $[CoC_{27}H_{30}N_3O_6]$=551 m/z) (FIG. 43).

Figure 44:
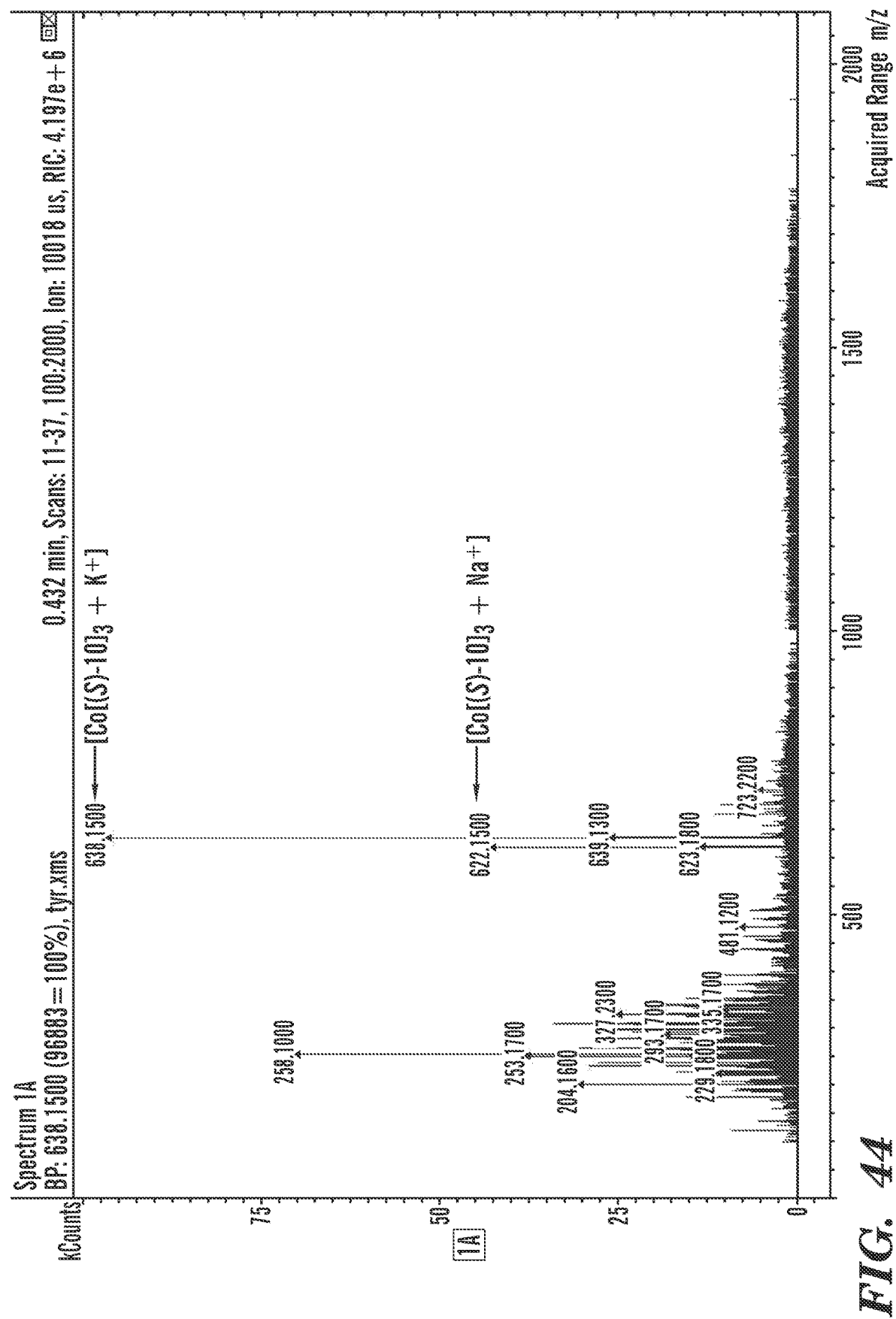
FIG. 44 shows the ESI-MS spectrum of the complex of $Co(NO_3)_2 \cdot 6H_2O$ with (S)-10.

$Co(NO_3)_2 \cdot 6H_2O$ (0.01 mmol in 0.5 mL MeOH), (S)-10 (0.06 mL, 0.5 M MeOH/KOH 1:1) and $H_2O_2$ (1.14 µL, 30% w/w in $H_2O$) were combined and the mixture was stirred for 1 hour prior to electrospray mass spectrometry (positive ion mode) analysis (metal complex $[CoC_{27}H_{30}N_3O_9]$=599 m/z) (FIG. 44).

Figure 45:
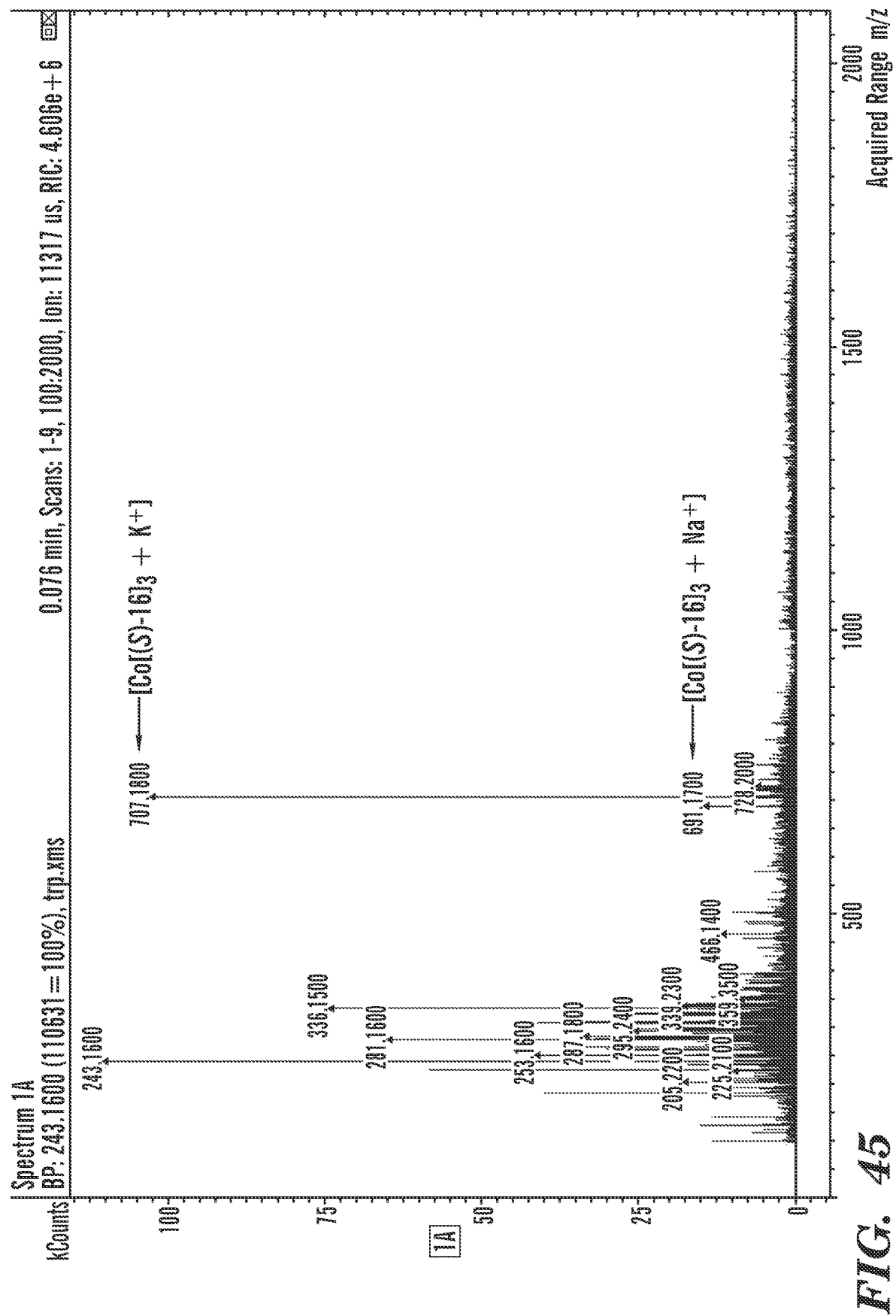
FIG. 45 shows the ESI-MS spectrum of the complex of $Co(NO_3)_2 \cdot 6H_2O$ with (S)-16.

$Co(NO_3)_2 \cdot 6H_2O$ (0.01 mmol in 0.5 mL MeOH), (S)-16 (0.06 mL, 0.5 M MeOH/KOH 1:1) and $H_2O_2$ (1.14 µL, 30% w/w in $H_2O$) were combined and the mixture was stirred for 1 hour prior to electrospray mass spectrometry (positive ion mode) analysis (metal complex $[CoC_{33}H_{33}N_6O_6]$=668 m/z) (FIG. 45).

Figure 46:
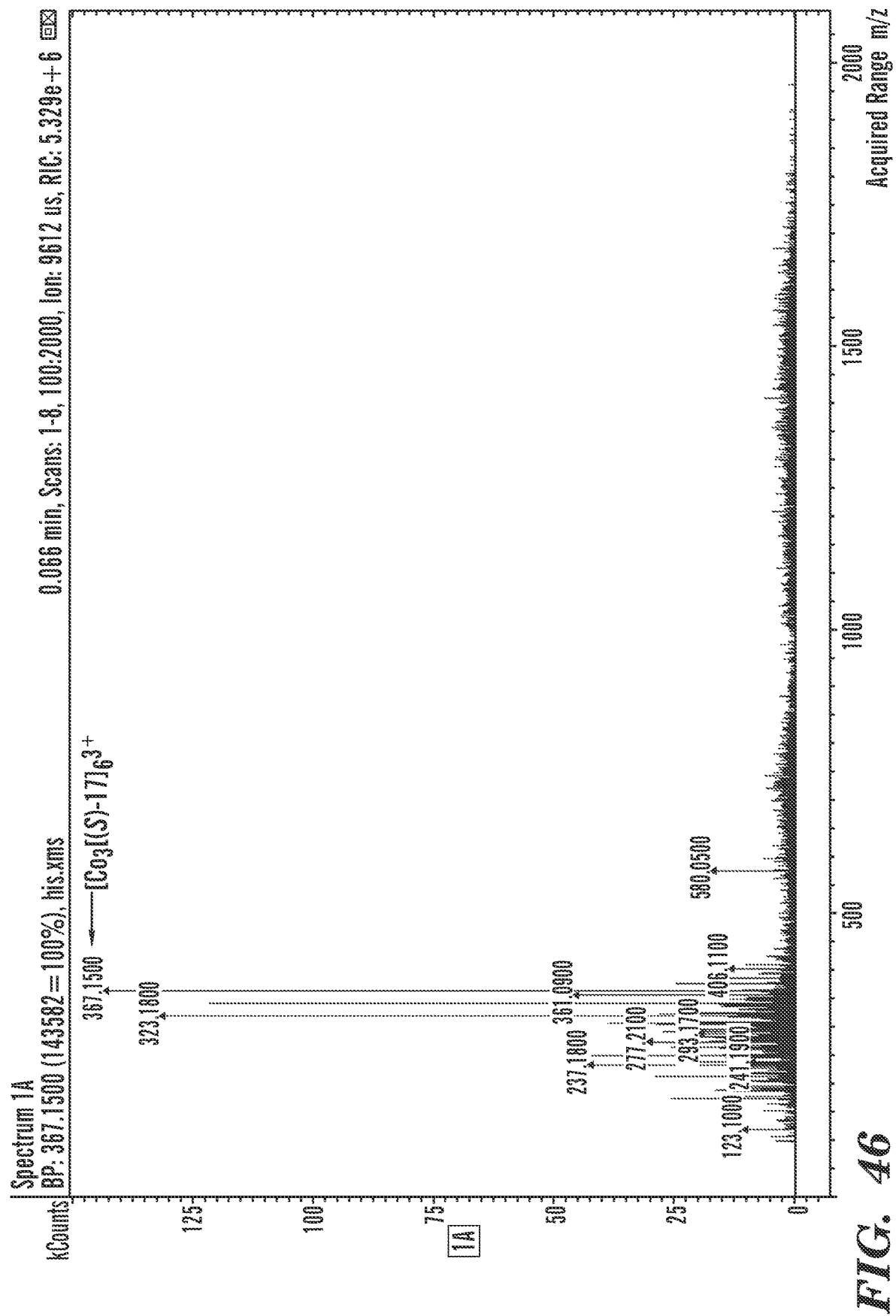
FIG. 46 shows the ESI-MS spectrum of the complex of $Co(NO_3)_2 \cdot 6H_2O$ with (S)-17.

$Co(NO_3)_2 \cdot 6H_2O$ (0.01 mmol in 0.5 mL MeOH), (S)-17 (0.06 mL, 0.5 M MeOH/KOH 1:1) and $H_2O_2$ (1.14 µL, 30% w/w in $H_2O$) were combined and the mixture was stirred for 1 hour prior to electrospray mass spectrometry (positive ion mode) analysis (metal complex $[Co_3C_{36}H_{48}N_{18}O_{12}]^{3+}$=367 m/z) (FIG. 46).

Figure 47:
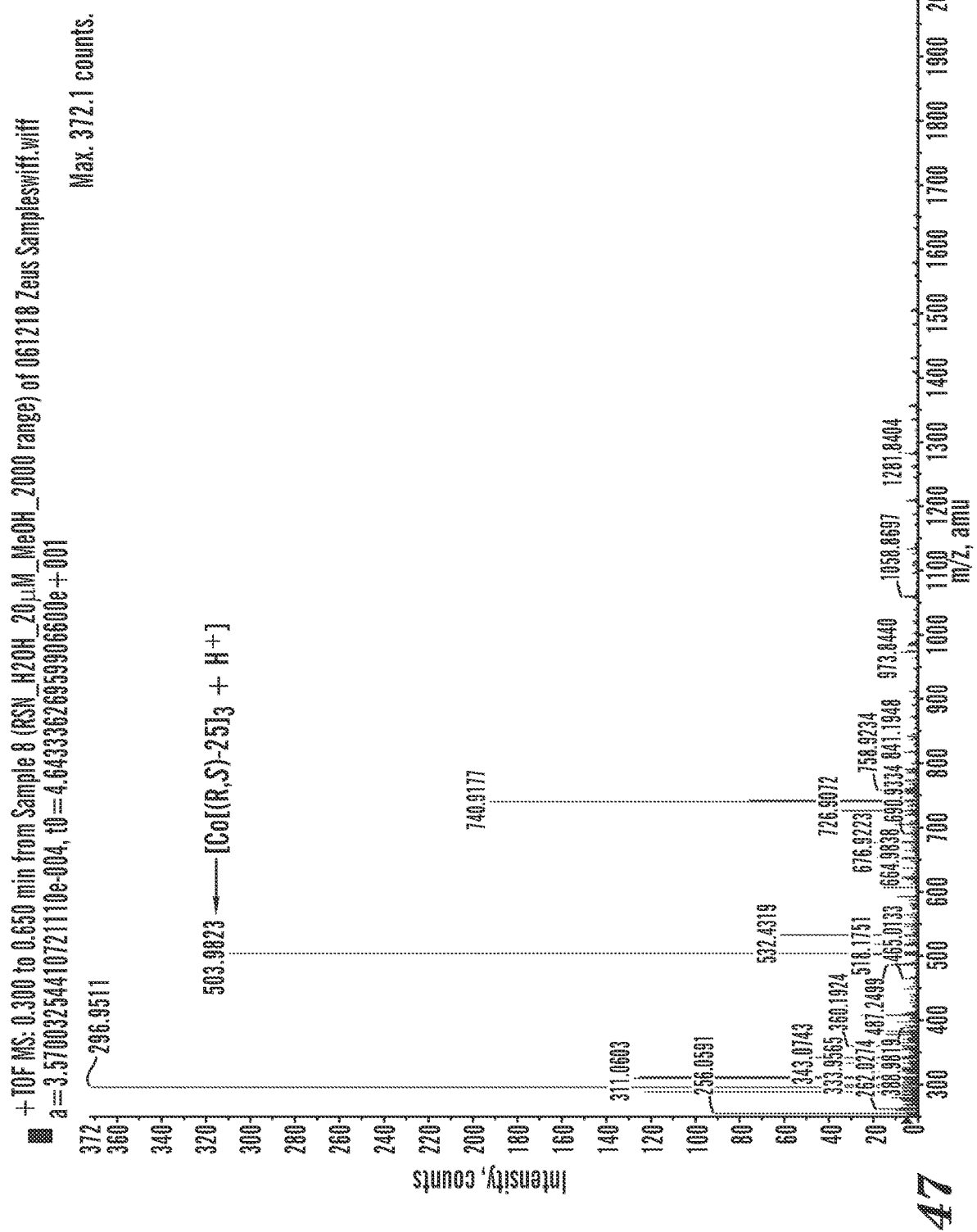
FIG. 47 shows the ESI-MS spectrum of the complex of $Co(NO_3)_2 \cdot 6H_2O$ with (R,S)-25.

$Co(NO_3)_2 \cdot 6H_2O$ (0.01 mmol in 0.5 mL MeOH), (R,S)-25 (0.06 mL, 0.5 M MeOH) and $H_2O_2$ (1.14 µL, 30% w/w in $H_2O$) were combined and the mixture was stirred for 1 hour prior to electrospray mass spectrometry (positive ion mode) analysis (metal complex $[CoC_{27}H_{30}N_3O_3]$=503 m/z) (FIG. 47).

Figure 48:
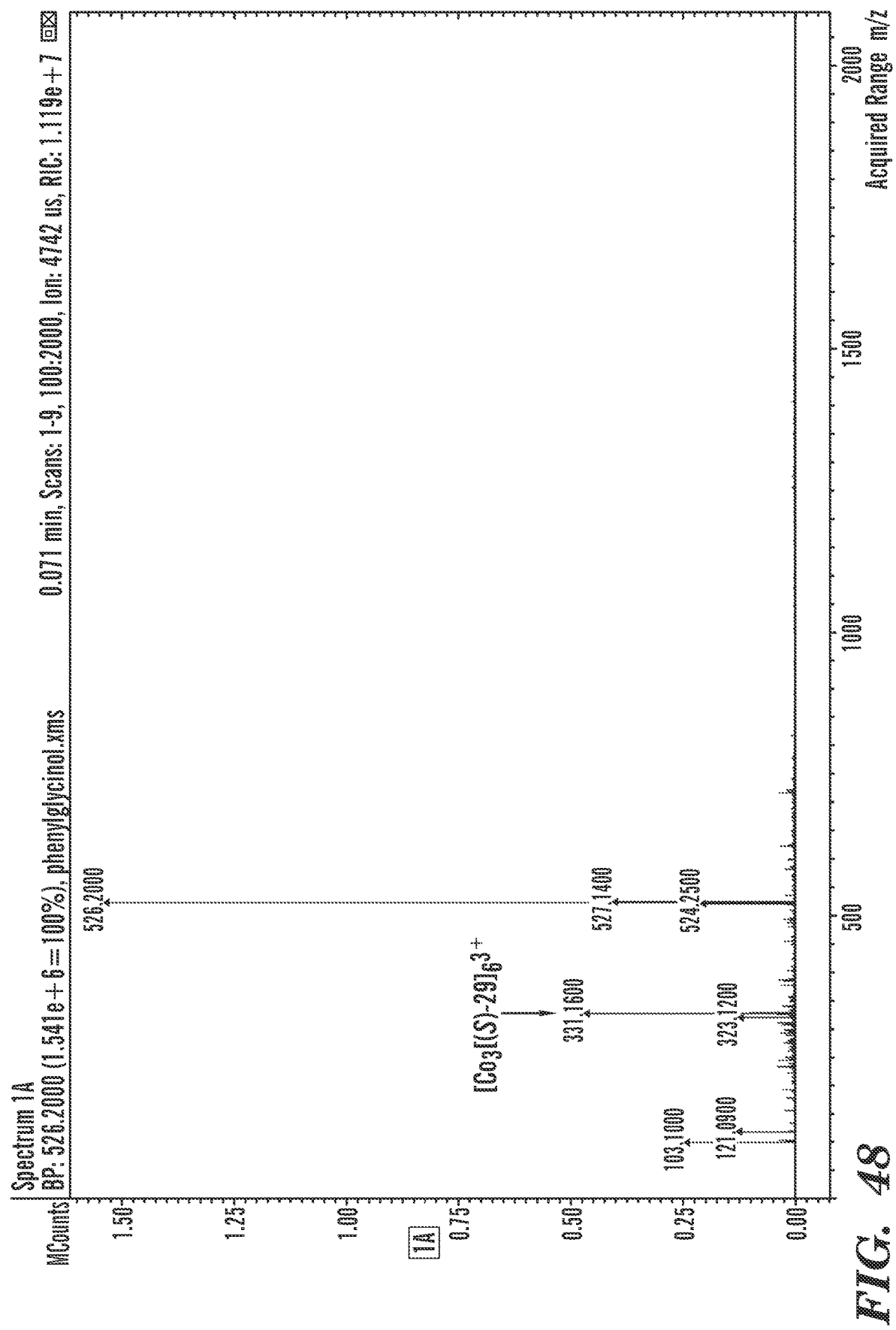
FIG. 48 shows the ESI-MS spectrum of the complex of $Co(NO_3)_2 \cdot 6H_2O$ with (S)-29.
Figure 49:
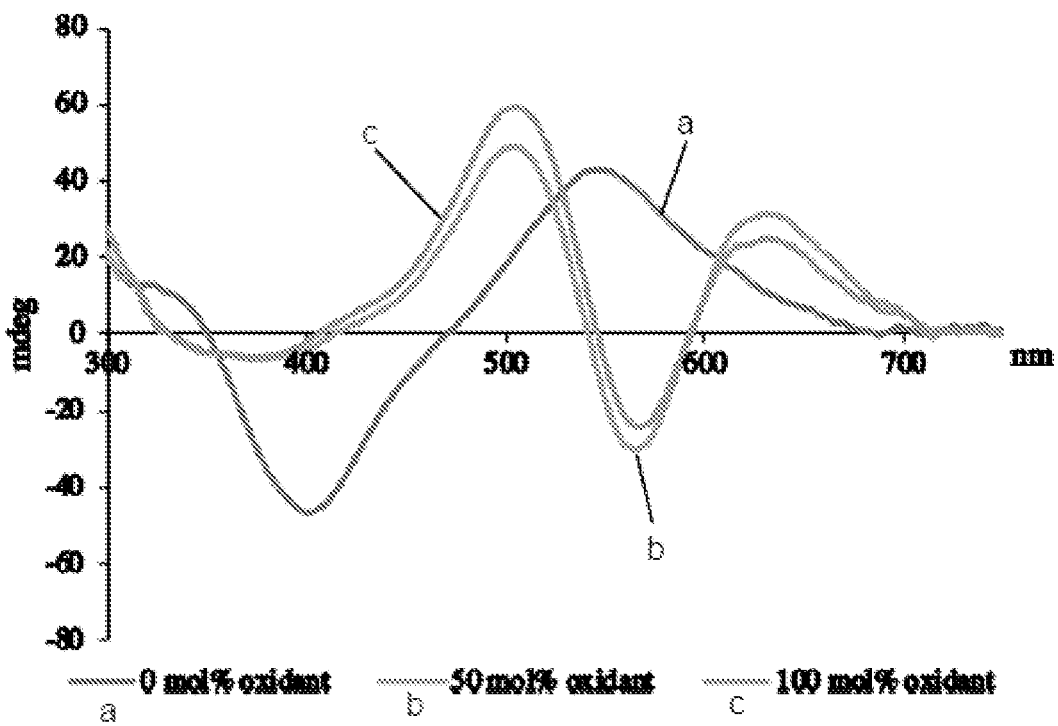
FIG. 49 shows the CD spectra of the coordination between probe $Co(NO_3)_2 \cdot 6H_2O$ and (R)-Valine (1) with varying amounts of $H_2O_2$.
Figure 50:
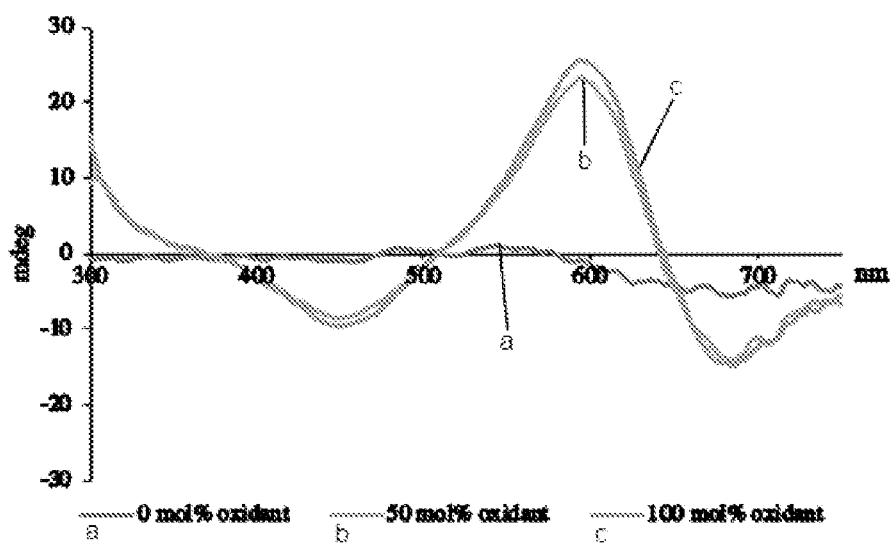
FIG. 50 shows the CD spectra of the coordination between probe $Co(NO_3)_2 \cdot 6H_2O$ and (R)-2-Chloromandelic acid (24) with varying amounts of $H_2O_2$.
Figure 51:
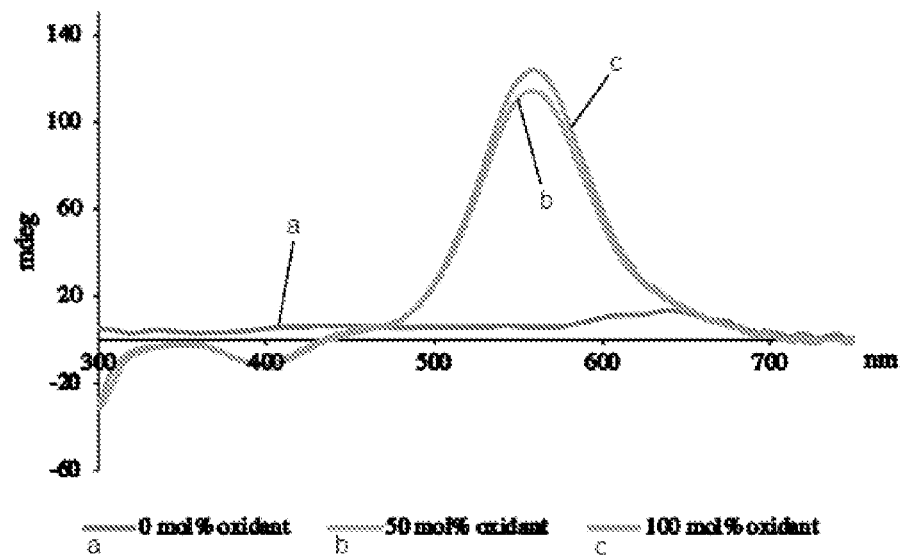
FIG. 51 shows the CD spectra of the coordination between probe $Co(NO_3)_2 \cdot 6H_2O$ and (R,S)-cis-2-Amino-1-indanol (25) with varying amounts of $H_2O_2$.
Figure 52:
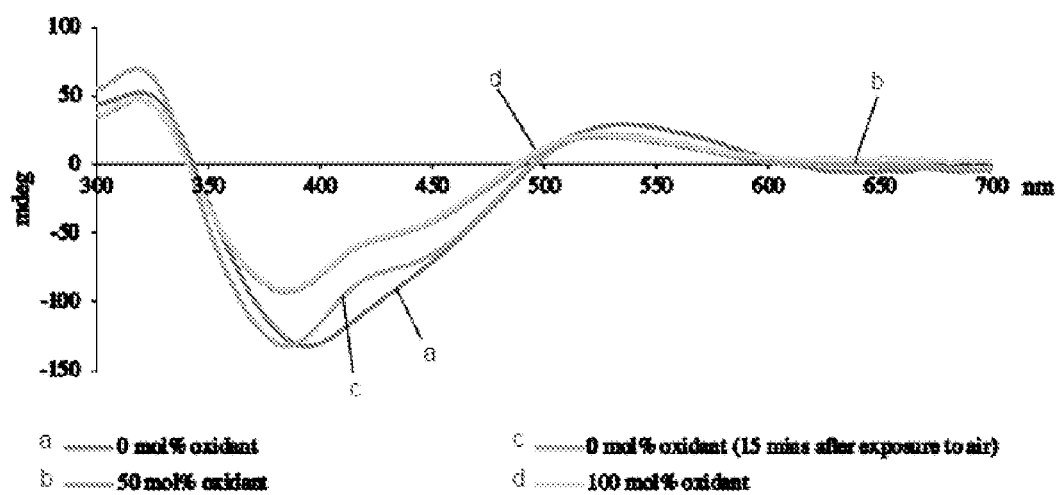
FIG. 52 shows the CD spectra of the coordination between probe $Co(NO_3)_2 \cdot 6H_2O$ and (R,R)-Diphenylethylenediamine (34) with varying amounts of $H_2O_2$.

$Co(NO_3)_2 \cdot 6H_2O$ (0.01 mmol in 0.5 mL MeOH), (S)-29 (0.06 mL, 0.5 M MeOH) and $H_2O_2$ (1.14 µL, 30% w/w in $H_2O$) were combined and the mixture was stirred for 1 hour prior to electrospray mass spectrometry (positive ion mode) analysis (metal complex $[Co_3C_{48}H_{60}N_6O_6]^{3+}$=331 m/z) (FIG. 48).

Significance of Oxidation of Co(II) to Co(III)

Figure 53A:
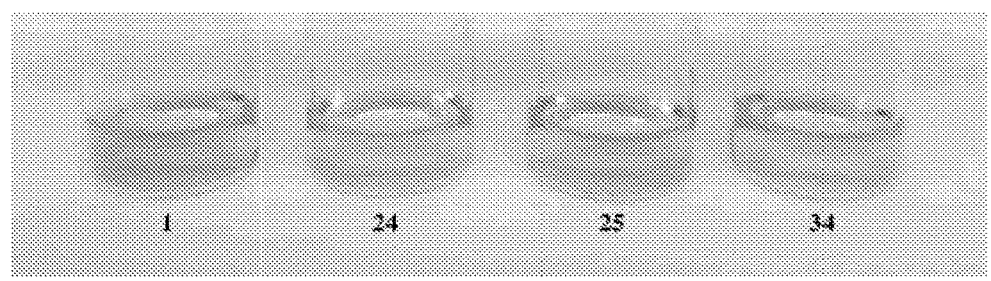
FIGS. 53A-53C show the images of the reaction mixtures of $Co(NO_3)_2 \cdot 6H_2O$ with analytes 1, 24, 25, 34, with varying amounts of $H_2O_2$.
Figure 53B:
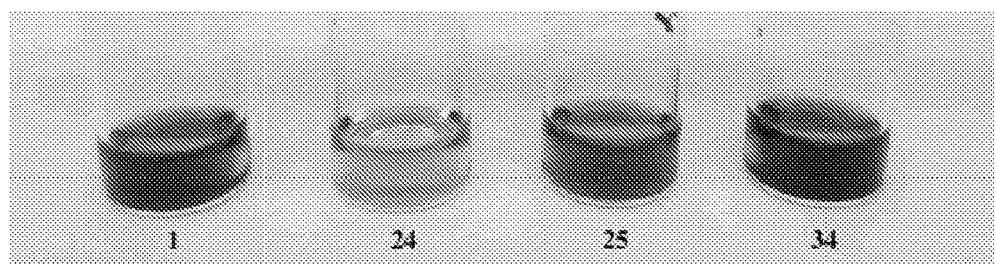
Figure 53C:
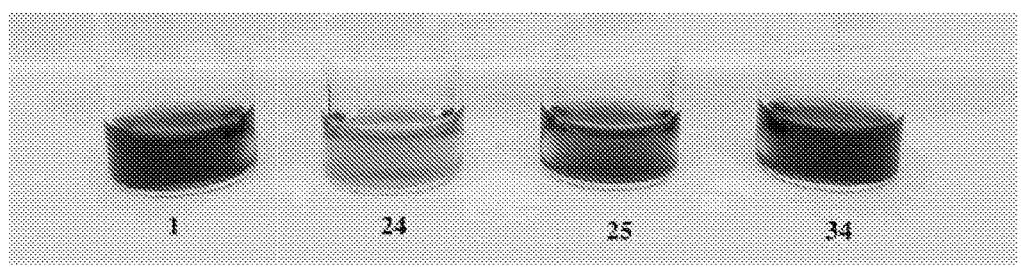
Figure 54:
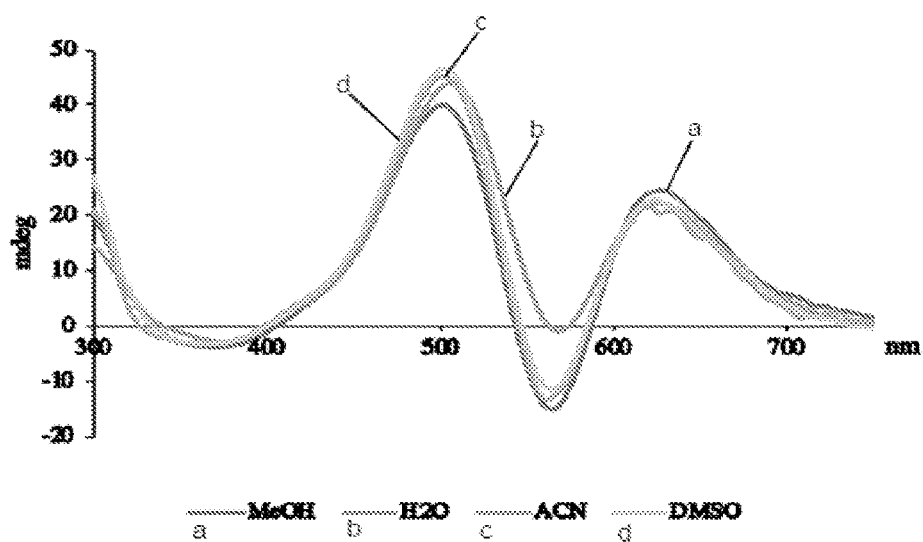
FIG. 54 shows the solvent effects on the CD spectra of the complex obtained with $Co(NO_3)_2 \cdot 6H_2O$, (S)-1, TBAOH and $H_2O_2$.
Figure 55:
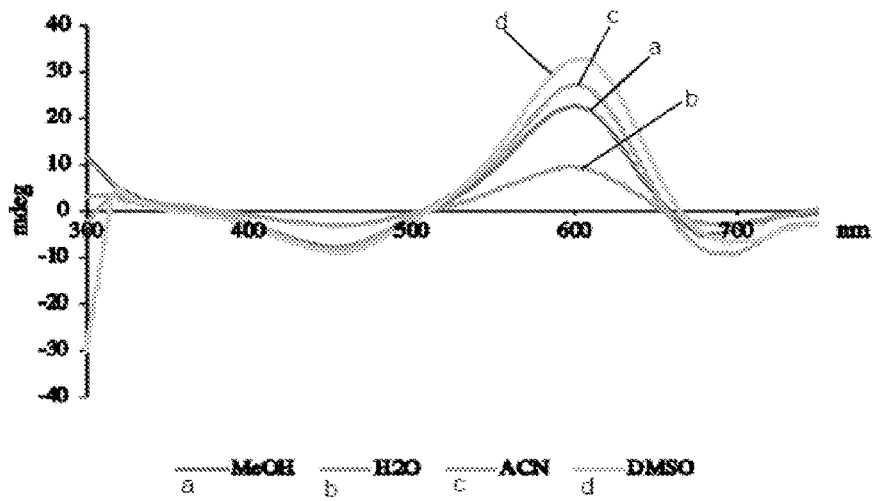
FIG. 55 shows the solvent effects on the CD spectra of the complex obtained with $Co(NO_3)_2 \cdot 6H_2O$, (R)-24, TBAOH and $H_2O_2$.
Figure 56:
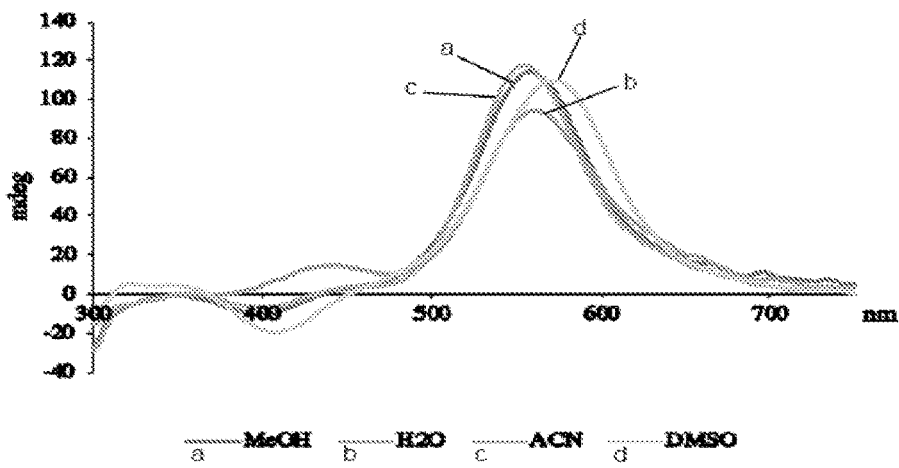
FIG. 56 shows solvent effects on the CD spectra of the complex obtained with $Co(NO_3)_2 \cdot 6H_2O$, (R,S)-25, TBAOH and $H_2O_2$.
Figure 57:
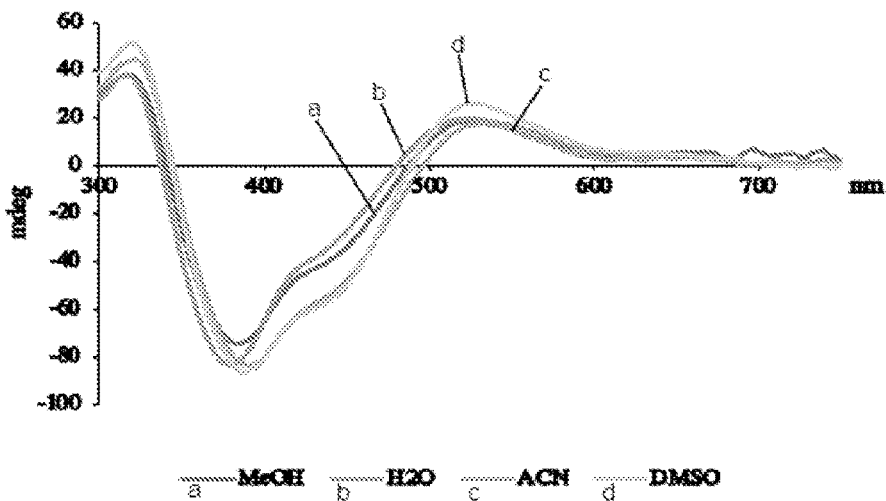
FIG. 57 shows solvent effects on the CD spectra of the complex obtained with $Co(NO_3)_2 \cdot 6H_2O$, (R,R)-34, TBAOH and $H_2O_2$.
Figure 58:
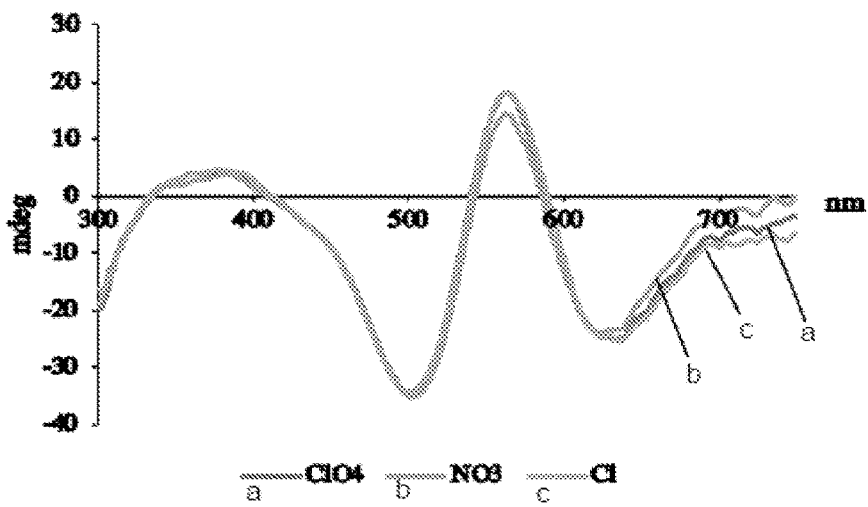
FIG. 58 shows anion effects on the CD spectra of the mixtures of Co(II), (9-1, TBAOH and $H_2O_2$.
Figure 59:
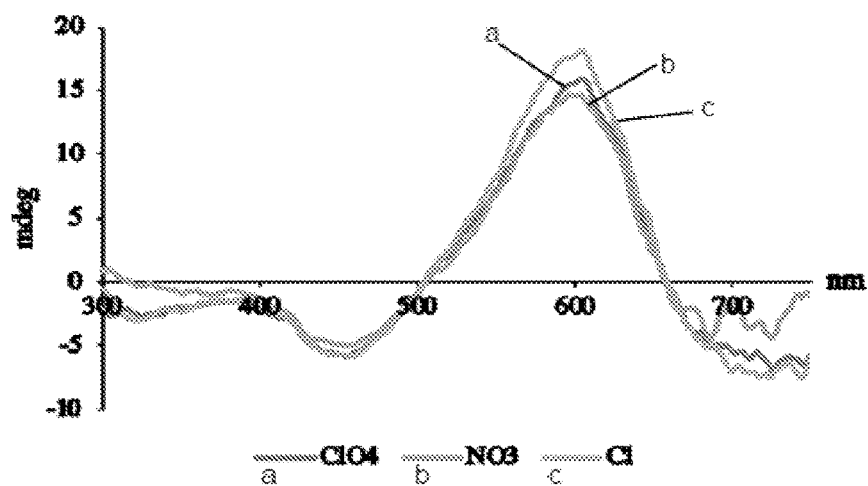
FIG. 59 shows anion effects on the CD spectra of mixtures of Co(II), (R)-23, TBAOH and $H_2O_2$.
Figure 60:
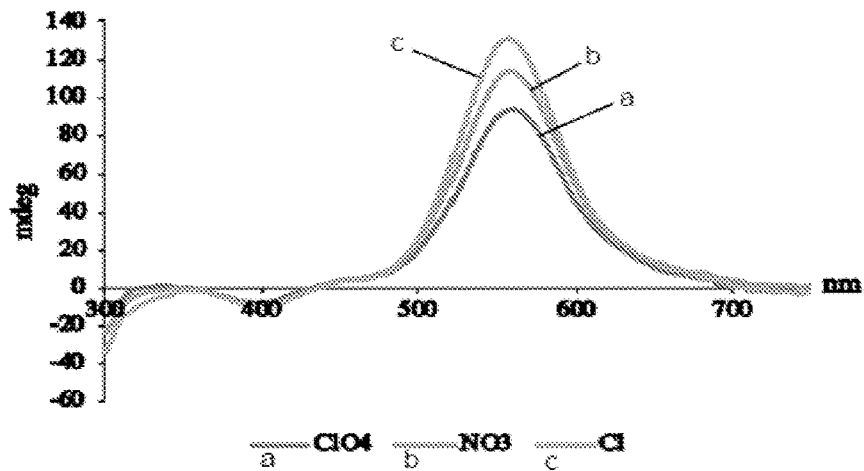
FIG. 60 shows anion effects on the CD spectra of mixtures of Co(II), (R,S)-25 and $H_2O_2$.
Figure 61:
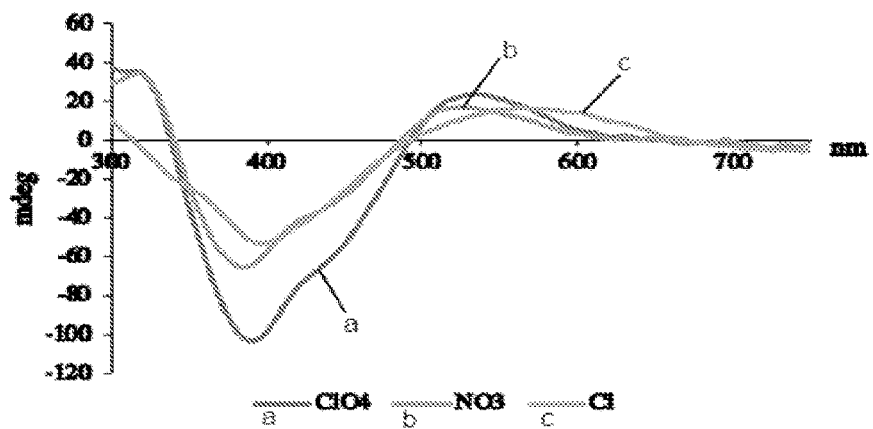
FIG. 61 shows anion effects on the CD spectra of mixtures of Co(II), (R,R)-34 and $H_2O_2$.

The complexes formed from Co(II) and four different analytes were treated with varying amounts of $H_2O_2$. A solution of $Co(NO_3)_2 \cdot 6H_2O$ (0.02 M) in MeOH was prepared and 0.5 mL portions were transferred into 4 mL vials. Solutions of 1, 24, 25, or 34 (0.50 M in MeOH) were prepared. For substrates 1 and 24, an equimolar amount of TBAOH (1.0 M in MeOH) was also added. To each vial containing 0.5 mL of the Co(II) solution were added three equivalents (0.06 mL) of the substrate and varying amounts of $H_2O_2$ (0 mol % (inert atmosphere), 50 mol %, and 100 mol % relative to Co(II)). CD analysis was performed as described herein (FIGS. 49-52). Images of the reaction mixtures upon introduction of oxidant are shown in FIGS. 53A-53C.

Solvent Effects

A solution of $Co(NO_3)_2 \cdot 6H_2O$ (0.02 M) in MeOH was prepared and 0.5 mL portions were transferred into 4 mL vials. Solutions of 1, 24, 25, or 34 (0.50 M in MeOH) were prepared. For substrates 1 and 24, an equimolar amount of TBAOH (1.0 M in MeOH) was also added. To each vial containing 0.5 mL of the Co(II) solution were added three equivalents (0.06 mL) of the substrate and one equivalent (1.14 µL) of $H_2O_2$ (30% w/w aqueous solution). CD analysis was performed by taking an aliquot (0.2 mL of 1, 24, and 25, or 0.05 mL of 34) of the reaction mixture and diluting it further with 2.0 mL of either MeOH, deionized $H_2O$, acetonitrile, or DMSO (FIGS. 54-57).

Anion Effects

Stock solutions of $Co(ClO_4)_2 \cdot 6H_2O$, $Co(NO_3)_2 \cdot 6H_2O$ and $CoCl_2 \cdot 6H_2O$ (0.02 M) in MeOH were prepared and 0.5 mL portions were transferred into 4 mL vials. Solutions of 1, 23, 25, or 34 (0.50 M in MeOH) were prepared. For substrates 1 and 23, an equimolar amount of TBAOH (1.0 M in MeOH) was also added. To each vial containing 0.5 mL of the Co(II) solution were added three equivalents (0.06 mL) of the substrate and one equivalent (1.14 µL) of $H_2O_2$ (30% w/w aqueous solution). CD analysis was performed by taking an aliquot (0.2 mL of 1, 24, and 25, or 0.05 mL of 34) of the reaction mixture and diluting it further with 2.0 mL of MeOH (FIGS. 58-61).

Figure 62:
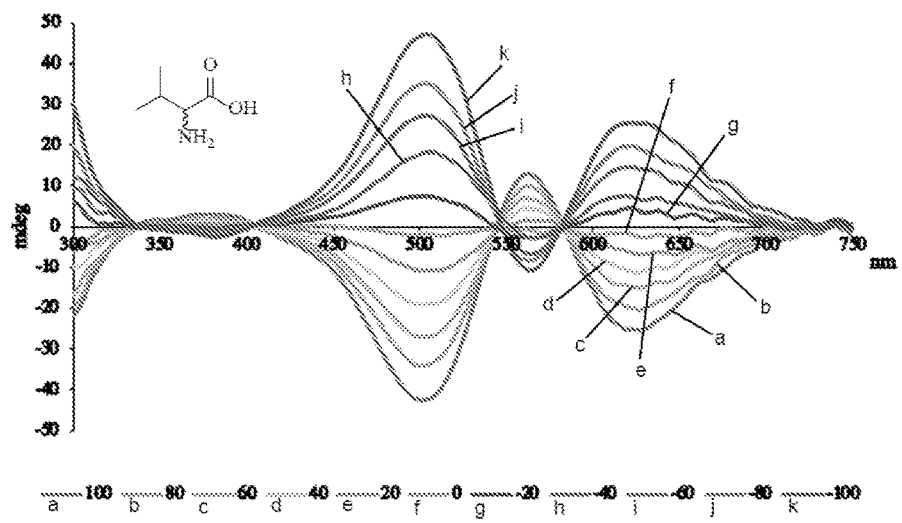
FIG. 62 shows the CD spectra of the reaction of probe $Co(NO_3)_2 \cdot 6H_2O$ with varying enantiomeric compositions of analyte 1.
Figure 63:
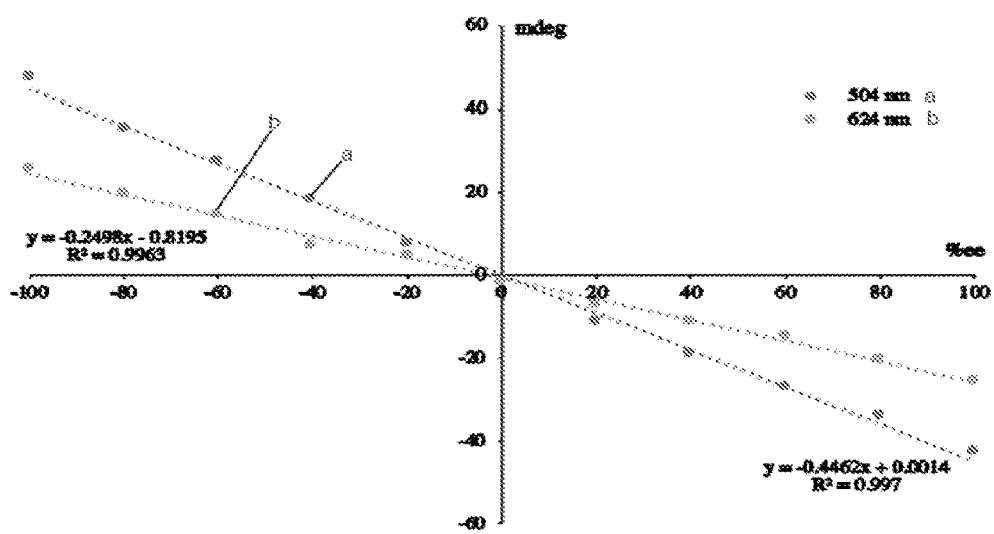
FIG. 63 shows the CD amplitudes measured at 504 and 624 nm plotted against % ee for the reaction of probe $Co(NO_3)_2 \cdot 6H_2O$ with varying enantiomeric compositions of analyte 1.

Example 3—Quantitative EE Analysis of Various Chiral Analytes ee Determination of Valine A stock solution of $Co(NO_3)_2 \cdot 6H_2O$ (0.02 M) in MeOH was prepared and portions of 0.5 mL were transferred into 4 mL vials. Solutions of 1 (0.50 M in MeOH) at varying ee compositions (+100.0, +80.0, +60.0, +40.0, +20.0, 0.0, −20.0, −40.0, −60.0, −80.0, −100.0) and an equimolar amount of TBAOH were prepared. To each vial containing 0.5 mL of the Co(II) solution were added three equivalents of 1 (0.06 mL) and one equivalent (1.14 µL) of $H_2O_2$. The CD analysis was carried out as described herein (FIG. 62). The CD amplitudes measured at 504 and 624 nm were plotted against % ee (FIG. 63). A linear relationship between the CD amplitudes at 505 and 625 nm and the enantiomeric excess of 1 was found.

Five scalemic samples of 1 were prepared and then treated with the Co(II) salt as described herein. Using the linear regression equations obtained from the calibration curves and the measured CD amplitudes at 504 and 624 nm, the enantiomeric excess and the absolute configuration of the major enantiomer were determined, as shown in Table 1.

TABLE 1

Enantiomeric excess and absolute configuration of scalemic samples of 1 measured using $Co(NO_3)_2 \cdot 6H_2O$

| Sample Composition | | Chiroptical Sensing (504 nm) | | Chiroptical Sensing (624 nm) | | |
|---|---|---|---|---|---|---|
| Abs. Config. | Actual % ee | Abs. Config.[a] | Calculated % ee[b] | Abs. Config.[a] | Calculated % ee[b] | Average % ee |
| S | 88.0 | S | 83.4 | S | 88.1 | 85.8 |
| S | 62.0 | S | 59.2 | S | 66.1 | 62.7 |
| S | 22.0 | S | 23.3 | S | 28.3 | 25.8 |
| R | 16.0 | R | 13.7 | R | 14.3 | 14.0 |
| R | 94.0 | R | 95.7 | R | 92.1 | 93.9 |

[a]Based on the sign of the CD response.
[b]Based on the amplitude of the CD response.

ee Determination of 1-Aminoethylphosphonic Acid

Figure 64:
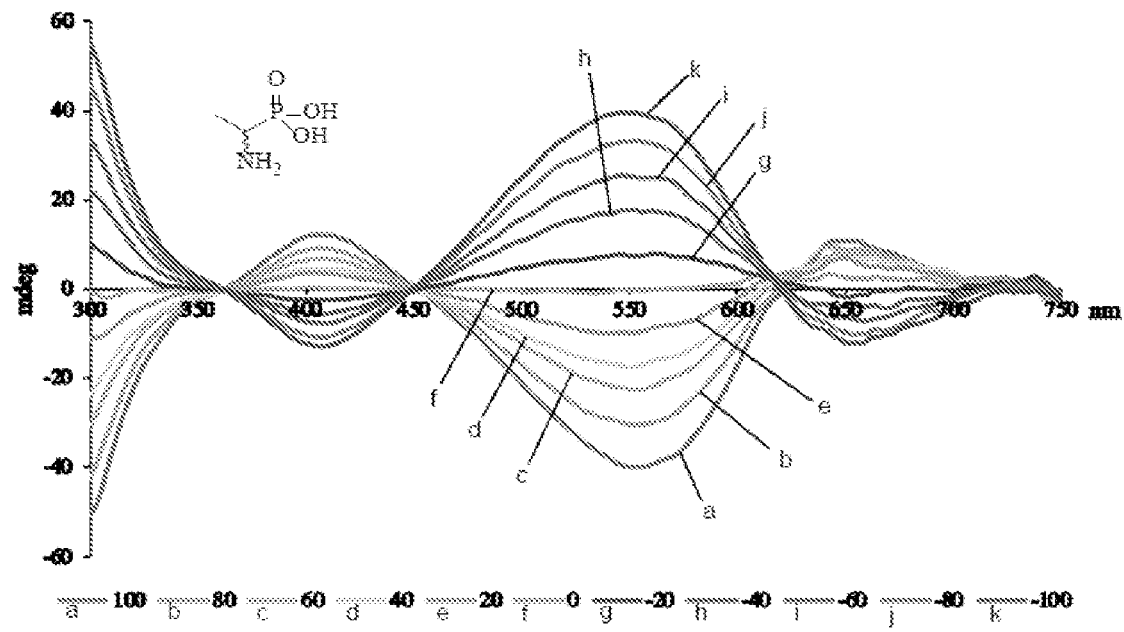
FIG. 64 shows the CD spectra of the reaction of probe $Co(NO_3)_2 \cdot 6H_2O$ with varying enantiomeric compositions of analyte 18.
Figure 65:
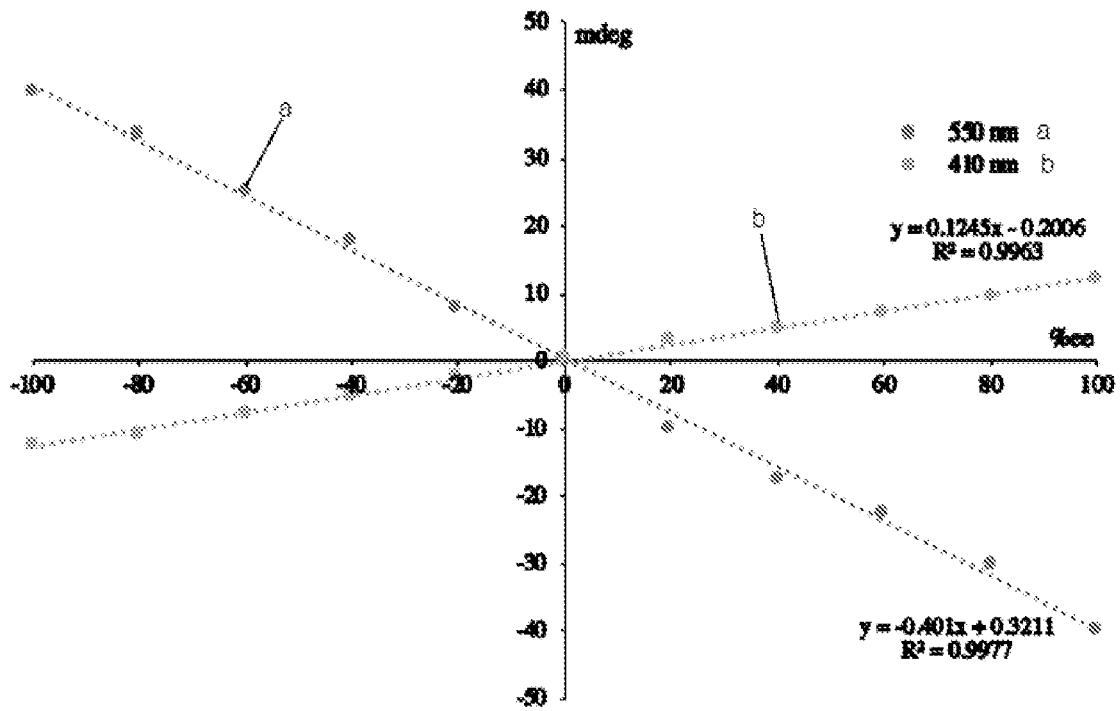
FIG. 65 shows the CD amplitudes measured at 410 and 550 nm plotted against % ee for the reaction of probe $Co(NO_3)_2 \cdot 6H_2O$ with varying enantiomeric compositions of analyte 18.

A stock solution of $Co(NO_3)_2 \cdot 6H_2O$ (0.02 M) in MeOH was prepared and portions of 0.5 mL were transferred into 4 mL vials. Solutions of 18 (0.50 M in MeOH) at varying ee compositions (+100.0, +80.0, +60.0, +40.0, +20.0, 0.0, −20.0, −40.0, −60.0, −80.0, −100.0) and an equimolar amount of TBAOH were prepared. To each vial containing 0.5 mL of the Co(II) solution were added three equivalents of 18 (0.06 mL) and one equivalent (1.14 µL) of $H_2O_2$. The CD analysis was carried out as described herein (FIG. 64). The CD amplitudes measured at 410 and 550 nm were plotted against % ee (FIG. 65). A linear relationship between the CD amplitudes at 410 and 550 nm and the enantiomeric excess of 18 was found.

Five scalemic samples of 18 were prepared and then treated with the Co(II) salt as described herein. Using the linear regression equations obtained from the calibration curves and the measured CD amplitudes at 410 and 550 nm, the enantiomeric excess and the absolute configuration of the major enantiomer were determined, as shown in Table 2.

TABLE 2

Enantiomeric excess and absolute configuration of scalemic samples of 18 measured using $Co(NO_3)_2 \cdot 6H_2O$

| Sample Composition | | Chiroptical Sensing (410 nm) | | Chiroptical Sensing (550 nm) | |
|---|---|---|---|---|---|
| Abs. Config. | Actual % ee | Abs. Config.[a] | Calculated % ee[b] | Abs. Config.[a] | Calculated % ee[b] | Average % ee |
| R | 88.0 | R | 90.1 | R | 86.9 | 88.5 |
| R | 62.0 | R | 58.1 | R | 58.7 | 58.4 |
| R | 22.0 | R | 17.8 | R | 22.1 | 20.0 |
| S | 16.0 | S | 21.5 | S | 16.0 | 18.8 |
| S | 94.0 | S | 88.6 | S | 88.3 | 88.5 |

[a] Based on the sign of the CD response.
[b] Based on the amplitude of the CD response.

ee Determination of 2-Chloromandelic Acid

Figure 66:
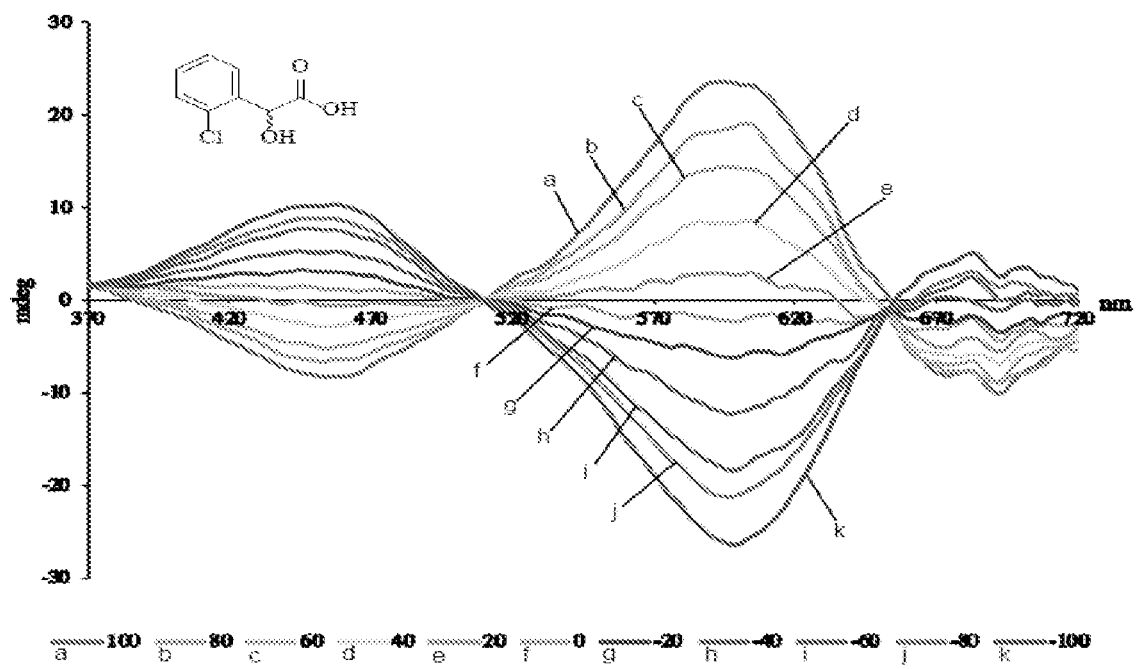
FIG. 66 shows the CD spectra of the reaction of probe $Co(NO_3)_2 \cdot 6H_2O$ with varying enantiomeric compositions of analyte 24.
Figure 67:
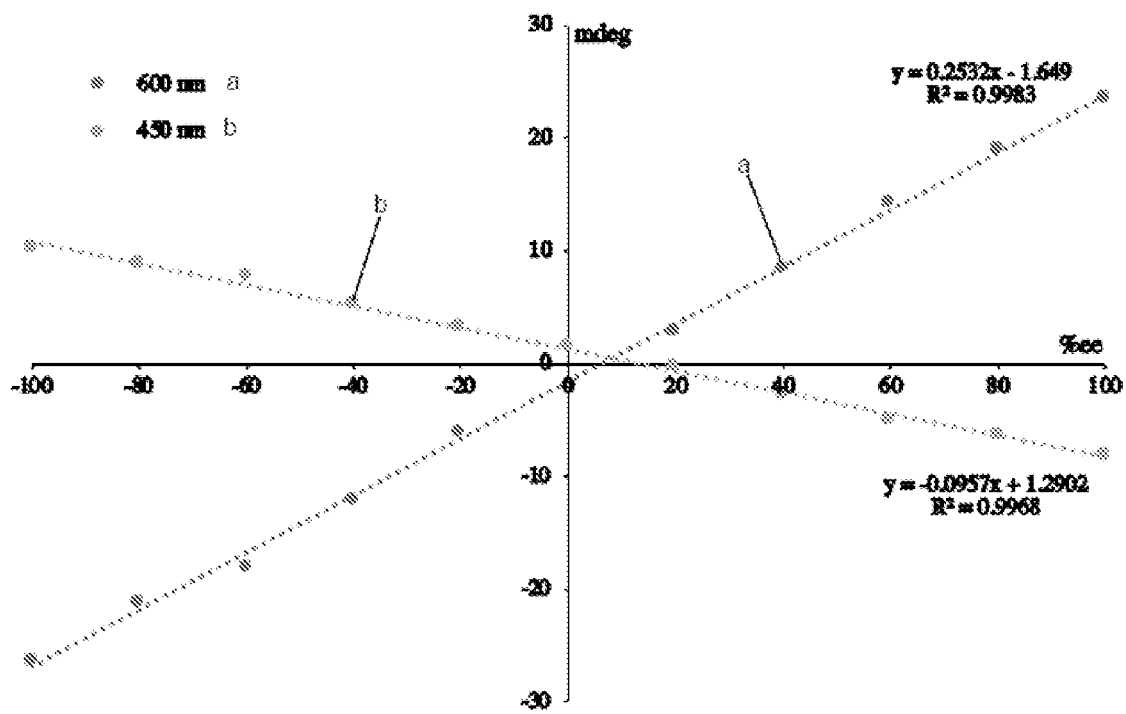
FIG. 67 shows the CD amplitudes measured at 450 and 600 nm plotted against % ee for the reaction of probe $Co(NO_3)_2 \cdot 6H_2O$ with varying enantiomeric compositions of analyte 24.

A stock solution of $Co(NO_3)_2 \cdot 6H_2O$ (0.02 M) in MeOH was prepared and portions of 0.5 mL were transferred into 4 mL vials. Solutions of 24 (0.50 M in MeOH) at varying ee compositions (+100.0, +80.0, +60.0, +40.0, +20.0, 0.0, −20.0, −40.0, −60.0, −80.0, −100.0) and an equimolar amount of TBAOH were prepared. To each vial containing 0.5 mL of the Co(II) solution were added three equivalents of 24 (0.06 mL) and one equivalent (1.14 µL) of $H_2O_2$. The CD analysis was carried out as described herein (FIG. 66). The CD amplitudes measured at 450 and 600 nm were plotted against % ee (FIG. 67). A linear relationship between the CD amplitudes at 450 and 600 nm and the enantiomeric excess of 24 was found.

Five scalemic samples of 24 were prepared and then treated with the Co(II) salt as described herein. Using the linear regression equations obtained from the calibration curves and the measured CD amplitudes at 450 and 600 nm, the enantiomeric excess and the absolute configuration of the major enantiomer were determined, as shown in Table 3.

TABLE 3

Enantiomeric excess and absolute configuration of scalemic samples of 24 measured using $Co(NO_3)_2 \cdot 6H_2O$

| Sample Composition | | Chiroptical Sensing (450 nm) | | Chiroptical Sensing (600 nm) | |
|---|---|---|---|---|---|
| Abs. Config. | Actual % ee | Abs. Config.[a] | Calculated % ee[b] | Abs. Config.[a] | Calculated % ee[b] | Average % ee |
| R | 88.0 | R | 91.1 | R | 84.1 | 87.6 |
| R | 62.0 | R | 54.7 | R | 59.9 | 57.3 |
| R | 22.0 | R | 27.0 | R | 20.3 | 23.7 |
| S | 16.0 | S | 19.5 | S | 17.8 | 18.7 |
| S | 94.0 | S | 92.1 | S | 92.6 | 92.4 |

[a] Based on the sign of the CD response.
[b] Based on the amplitude of the CD response.

ee Determination of cis-1-Amino-2-indanol

Figure 68:
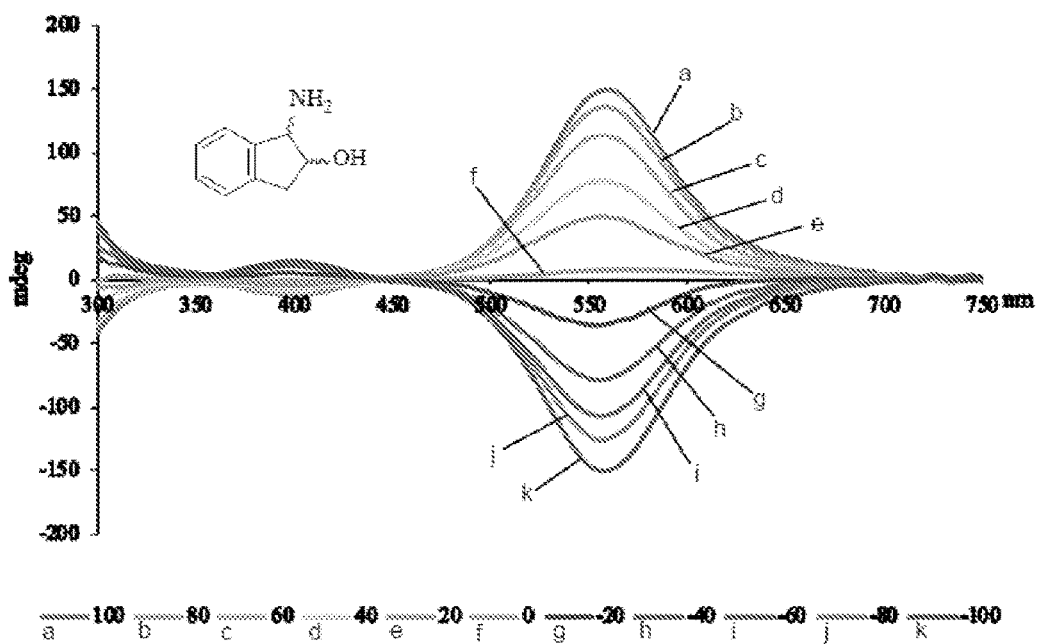
FIG. 68 shows the CD spectra of the reaction of probe $Co(NO_3)_2 \cdot 6H_2O$ with varying enantiomeric compositions of analyte 25.
Figure 69:
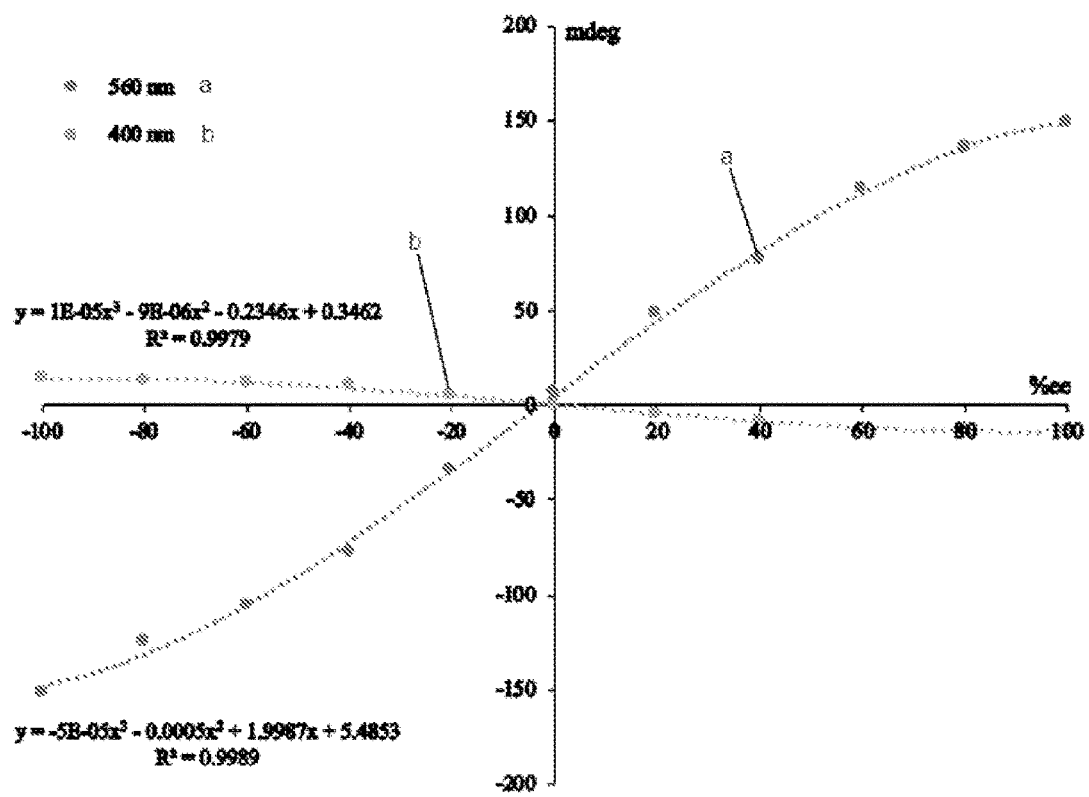
FIG. 69 shows the CD amplitudes measured at 400 and 560 nm plotted against % ee for the reaction of probe $Co(NO_3)_2 \cdot 6H_2O$ with varying enantiomeric compositions of analyte 25.

A stock solution of $Co(NO_3)_2 \cdot 6H_2O$ (0.02 M) in MeOH was prepared and portions of 0.5 mL were transferred into 4 mL vials. Solutions of 25 (0.50 M in MeOH) at varying ee compositions (+100.0, +80.0, +60.0, +40.0, +20.0, 0.0, −20.0, −40.0, −60.0, −80.0, −100.0) were prepared. To each vial containing 0.5 mL of the Co(II) solution were added three equivalents of 25 (0.06 mL) and one equivalent (1.14 µL) of $H_2O_2$. The CD analysis was carried out as described herein (FIG. 68). The CD amplitudes measured at 400 and 560 nm were plotted against % ee (FIG. 69). A sigmoidal relationship between the CD amplitudes at 400 and 560 nm and the enantiomeric excess of 25 was found.

Five scalemic samples of 25 were prepared and then treated with the Co(II) salt as described herein. Using the equations obtained from the calibration curves and the measured CD amplitudes at 400 and 560 nm, the enantiomeric excess and the absolute configuration of the major enantiomer were determined, as shown in Table 4.

TABLE 4

Enantiomeric excess and absolute configuration of scalemic samples of 25 measured using $Co(NO_3)_2 \cdot 6H_2O$

| Sample Composition | | Chiroptical Sensing (400 nm) | | Chiroptical Sensing (560 nm) | |
|---|---|---|---|---|---|
| Abs. Config. | Actual % ee | Abs. Config.[a] | Calculated % ee[b] | Abs. Config.[a] | Calculated % ee[b] | Average % ee |
| R, S | 88.0 | R, S | 85.1 | R, S | 82.3 | 83.7 |
| R, S | 62.0 | R, S | 64.0 | R, S | 61.0 | 62.5 |
| R, S | 22.0 | R, S | 25.6 | R, S | 27.2 | 26.4 |
| S, R | 16.0 | S, R | 20.1 | S, R | 14.5 | 17.3 |
| S, R | 94.0 | S, R | 90.0 | S, R | 97.6 | 93.8 |

[a] Based on the sign of the CD response.
[b] Based on the amplitude of the CD response.

ee Determination of 1,2-diphenylethylenediamine

Figure 70:
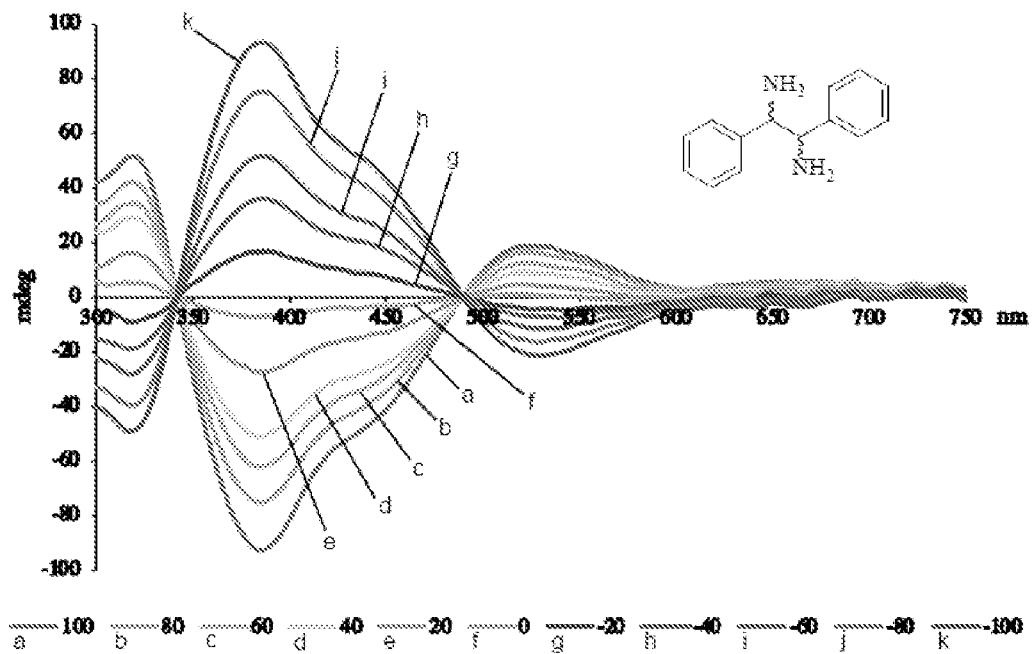
FIG. 70 shows the CD spectra of the reaction of probe $Co(NO_3)_2 \cdot 6H_2O$ with varying enantiomeric compositions of analyte 34.
Figure 71:
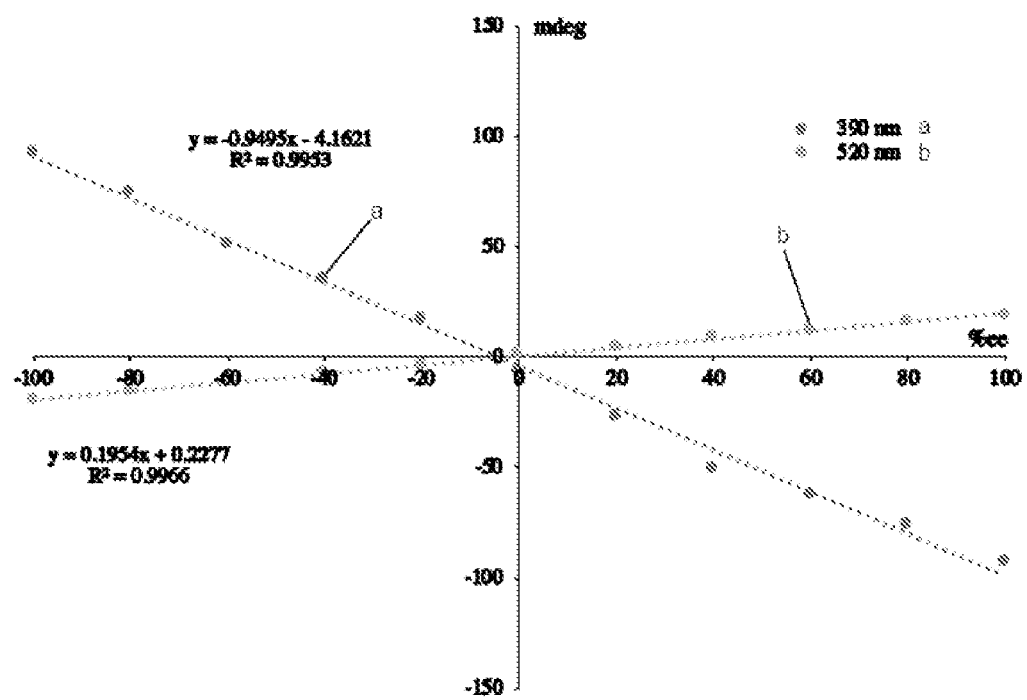
FIG. 71 shows the CD amplitudes measured at 390 and 520 nm plotted against % ee for the reaction of probe $Co(NO_3)_2 \cdot 6H_2O$ with varying enantiomeric compositions of analyte 34.

A stock solution of $Co(NO_3)_2 \cdot 6H_2O$ (0.02 M) in MeOH was prepared and portions of 0.5 mL were transferred into 4 mL vials. Solutions of 34 (0.50 M in MeOH) at varying ee compositions (+100.0, +80.0, +60.0, +40.0, +20.0, 0.0, −20.0, −40.0, −60.0, −80.0, −100.0) were prepared. To each vial containing 0.5 mL of the Co(II) solution were added three equivalents of 34 (0.06 mL) and one equivalent (1.14 µL) of $H_2O_2$. The CD analysis was carried out as described herein (FIG. 70). The CD amplitudes measured at 390 and 520 nm were plotted against % ee (FIG. 71). A linear relationship between the CD amplitudes at 390 and 520 nm and the enantiomeric excess of 34 was found.

Five scalemic samples of 34 were prepared and then treated with the Co(II) salt as described herein. Using the equations obtained from the calibration curves and the measured CD amplitudes at 390 and 520 nm, the enantiomeric excess and the absolute configuration of the major enantiomer were determined, as shown in Table 5.

TABLE 5

Enantiomeric excess and absolute configuration of scalemic samples of 34 measured using $Co(NO_3)_2 \cdot 6H_2O$

| Sample Composition | | Chiroptical Sensing (390 nm) | | Chiroptical Sensing (520 nm) | |
|---|---|---|---|---|---|
| Abs. Config. | Actual % ee | Abs. Config.[a] | Calculated % ee[b] | Abs. Config.[a] | Calculated % ee[b] | Average % ee |
| R, R | 88.0 | R, R | 89.9 | R, R | 90.0 | 90.0 |
| R, R | 62.0 | R, R | 62.6 | R, R | 60.3 | 61.5 |
| R, R | 22.0 | R, R | 24.2 | R, R | 17.7 | 21.0 |

TABLE 5-continued

Enantiomeric excess and absolute configuration of
scalemic samples of 34 measured using Co(NO₃)₂·6H₂O

| Sample Composition | | Chiroptical Sensing (390 nm) | | Chiroptical Sensing (520 nm) | | |
| --- | --- | --- | --- | --- | --- | --- |
| Abs. Config. | Actual % ee | Abs. Config.[a] | Calculated % ee[b] | Abs. Config.[a] | Calculated % ee[b] | Average % ee |
| S, S | 16.0 | S, S | 16.9 | S, S | 18.3 | 17.6 |
| S, S | 94.0 | S, S | 92.3 | S, S | 91.7 | 92.0 |

[a]Based on the sign of the CD response.
[b]Based on the amplitude of the CD response.

Figure 72:
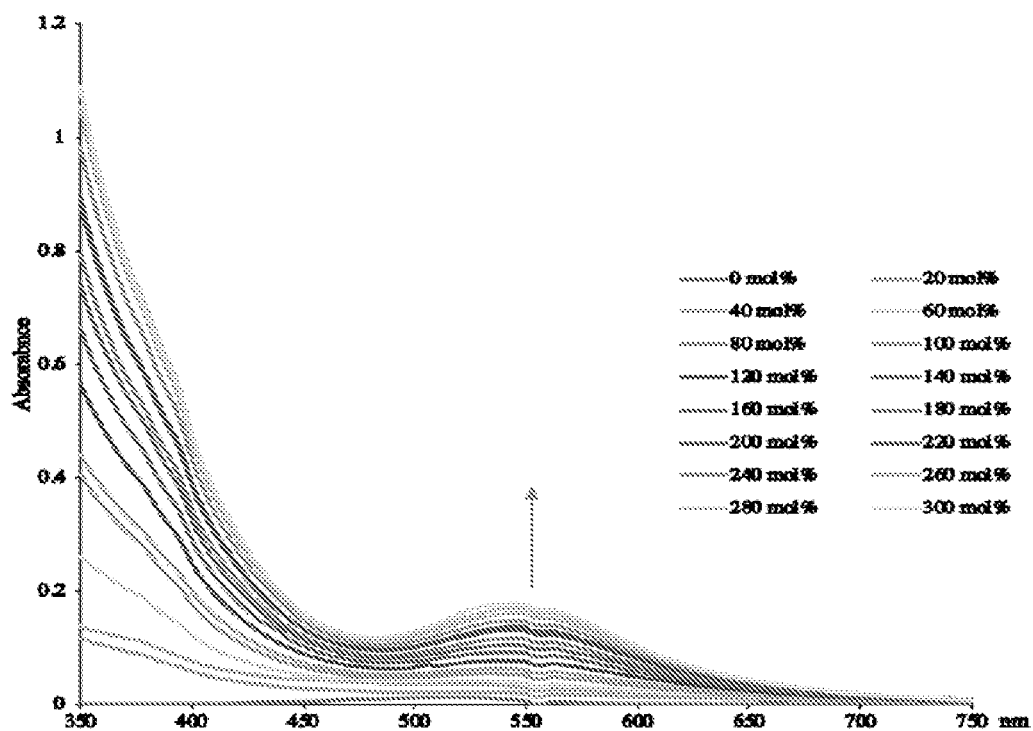
FIG. 72 shows the UV spectra of the sensor $Co(NO_3)_2 \cdot 6H_2O$ in the presence of varying amounts of 25.
Figure 73:
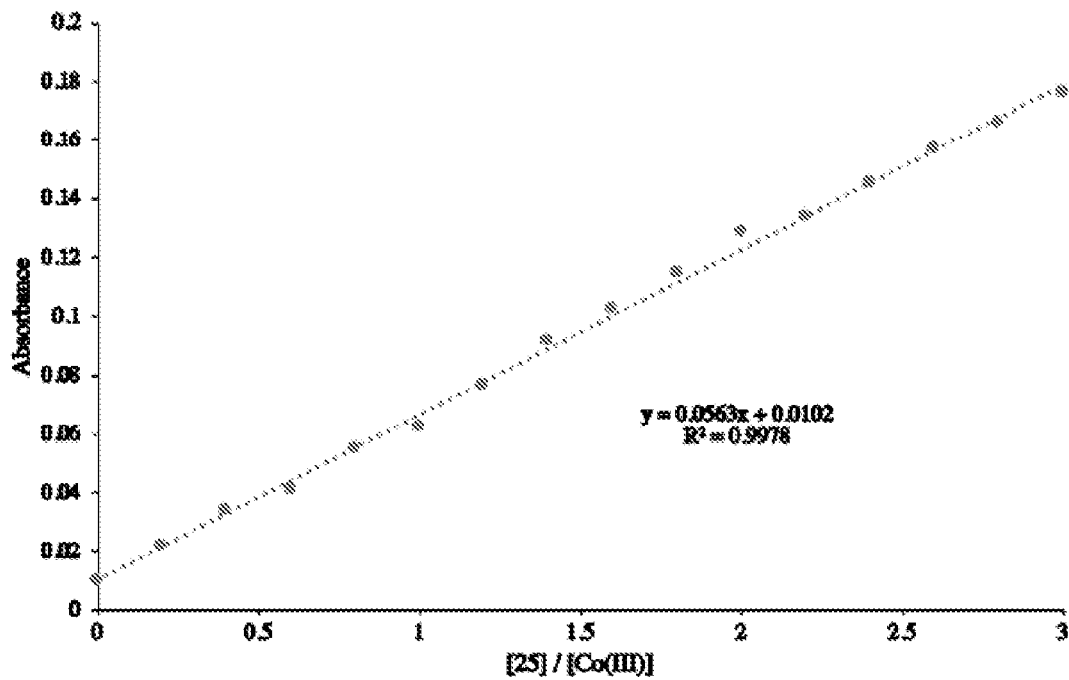
FIG. 73 shows the UV change at 535 nm upon complex formation of Co(II) with varying amounts of 25 ranging from 0 to 300 mol %.

Example 4—Simultaneous Determination of the Concentration and % EE of Cis-1-Amino-2-Indanol The change in the UV spectra upon addition of various amounts of 25 were analyzed. A stock solution of Co(NO₃)₂·6H₂O (0.02 M) in MeOH was prepared and 0.5 mL portions were transferred into 4 mL vials. To the solutions of Co(NO₃)₂·6H₂O were added varying amounts of 25 (0, 20, 40, 60, 80, 100, 120, 140, 160, 180, 200, 220, 240, 260, 280, and 300 mol %), and one equivalent (1.14 μL) of H₂O₂. UV spectra were collected at 1.8 mM in MeOH with an average scanning time of 0.1 s, a data interval of 1 nm, and a scan rate of 600 nm/min (FIG. 72). The UV absorbance at 535 nm increased steadily upon addition of 25 (see FIG. 73).

Nine solutions of 25 at varying concentrations and % ee were prepared and analyzed as described herein. Using the linear regression equation obtained from the calibration curve and the UV absorbance at 535 nm, the concentrations of these samples were determined, as shown in Table 6 below.

The samples were subjected to CD analysis. The amplitude obtained at 560 nm was used with the following formulae to calculate the corresponding % ee (equation 1 was obtained from the plot of the CD amplitudes measured at 560 nm plotted against % ee, see FIG. 69).

$$\% \ ee = -5 \times 10^{-5} x^3 + 5.0 \times 10^{-4} x^2 + 1.9987x - (5.4853 + [(-1)(Z)]) \quad (1)$$

$$Z = (\text{amplitude at 560 nm}) \left(\frac{3}{X}\right) \quad (2)$$

$$X = \frac{[25]}{\text{Co}(II)} \quad (3)$$

TABLE 6

Summary of the results obtained by using the regression
equations to determine the absolute configuration, concentration
and % ee of 9 scalemic samples of 25.

| Actual Composition | | | CD Sensing Results | | | |
| --- | --- | --- | --- | --- | --- | --- |
| Abs. Config. | Concentration (mM) | % ee | Abs. Config.[a] | Concentration (mM) | % ee[b] | % error |
| (S, R) | 16.6 | 81.0 | (S, R) | 17.1 | 74.9 | 6.1 |
| (R, S) | 24.2 | 74.0 | (R, S) | 23.8 | 65.4 | 8.6 |
| (S, R) | 31.2 | 65.0 | (S, R) | 31.8 | 63.7 | 1.3 |
| (R, S) | 34.6 | 43.0 | (R, S) | 36.0 | 37.6 | 5.4 |
| (S, R) | 42.2 | 35.0 | (S, R) | 42.0 | 37.1 | 2.1 |
| (R, S) | 47.4 | 64.0 | (R, S) | 48.3 | 62.4 | 1.6 |
| (S, R) | 51.6 | 55.0 | (S, R) | 53.5 | 56.1 | 1.1 |
| (R, S) | 56.6 | 25.0 | (R, S) | 56.7 | 21.0 | 4.0 |
| (S, R) | 58.8 | 16.0 | (S, R) | 59.3 | 18.3 | 2.3 |

[a]Based on the sign of the CD response.
[b]Based on the amplitude of the CD response.

Discussion of Examples 1-4

Figure 74:
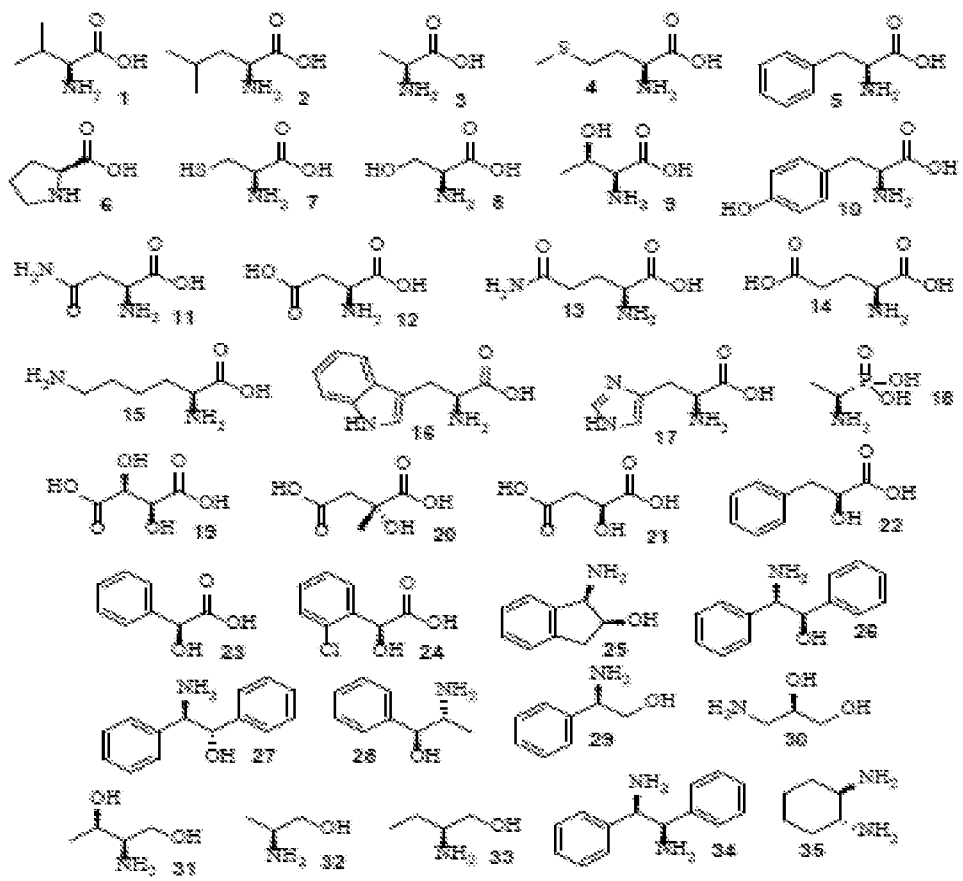
FIG. 74 shows the structures of amino acids 1-17, amino phosphonic acid 18, hydroxy acids 19-24, amino alcohols 25-33 and diamines 34 and 35 (only one enantiomer is shown for simplicity).
Figures 75A, 75B:
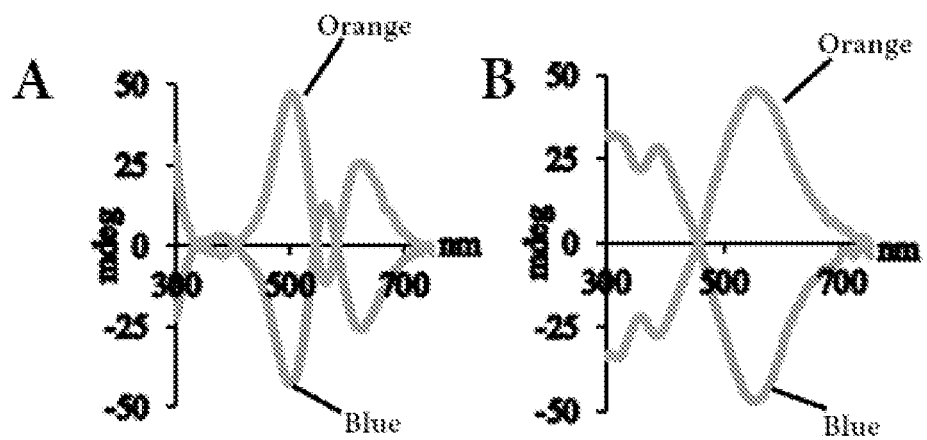
FIGS. 75A-75F show the Co(III) chirality sensing of 1 (FIG. 75A), 6 (FIG. 75B), 18 (FIG. 75C), 24 (FIG. 75D), 29 (FIG. 75E), and 34 (FIG. 75F). The cobalt CD responses to the (R)- and (S)-enantiomers are shown in orange and blue, respectively. All CD measurements were taken at either 1.8 mM (1, 6, 18 and 29) or 0.05 mM (34) in MeOH using an equimolar amount of TBAOH in the case of 1, 6, 18 and 24.
Figures 75C, 75D, 75E, 75F:
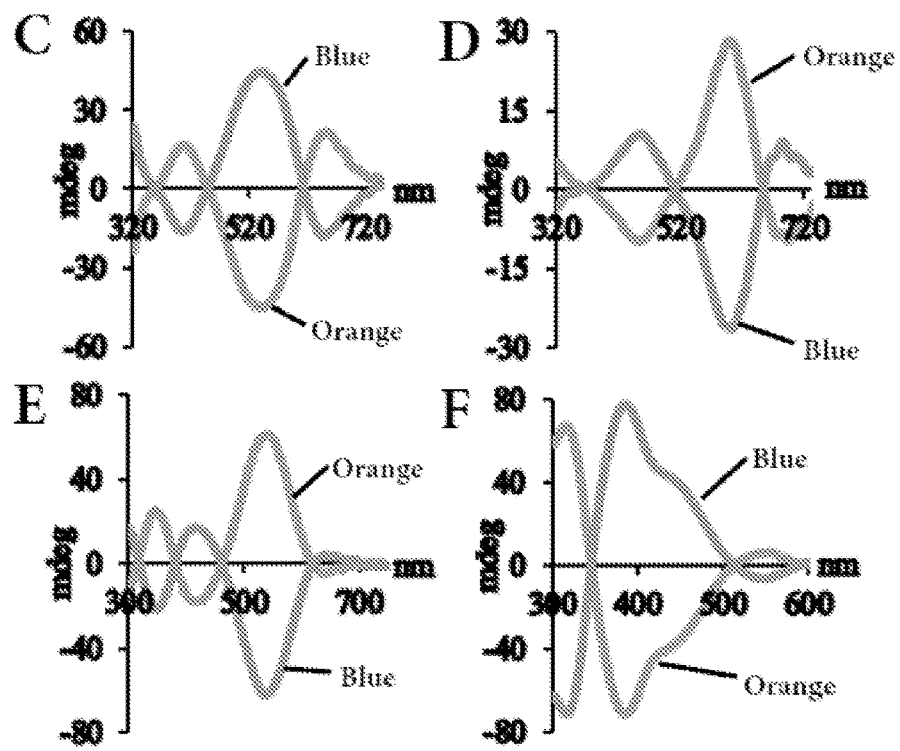

In the search for a chiroptical sensing method that has the desirable features listed herein, cobalt coordination chemistry was used, partly because of the long history of optically active [Co(en)₃]³⁺ and other Werner complexes (Werner, A., Chem. Ber. 44:2445-2455 (1911); Werner, A., Chem. Ber. 44:3279-3284 (1911); Werner, A., Chem. Ber. 44:3272-3278 (1911); Werner, A., Chem. Ber. 45:121-130 (1912), which are hereby incorporated by reference in their entirety), the wealth of spectroscopic, crystallographic and molecular recognition studies available in the literature (Fenton et al., Inorg. Chim. Acta 236:109-115 (1995); Mizuno et al., Tetrahedron 55:9455-9468 (1999); Fujii et al., Bull. Chem. Soc. Jpn. 54:2029-2038 (1981); Fujii et al., J. Chem. Soc. Chem. Commun. 415-417 (1985); Dzygiel et al., Eur. J. Org. Chem. 1253-1264 (2008); Jorge et al., J. Am. Chem. Soc. 127:975-985 (2005); Kim et al., J. Am. Chem. Soc. 127:16776-16777 (2005); Tashiro et al., Inorg. Chem. 50:4-6 (2011); Ghosh et al., Coord. Chem. Rev. 350:30-48 (2017); Gregolinski et al., Inorg. Chem. 55:633-643 (2016); Arrico et al., Org. Biomol. Chem. 15:9800-9803 (2017), which are hereby incorporated by reference in their entirety), and the general utility, for example in asymmetric catalysis (Pelissier, H. & Clavier, H. Chem. Rev. 114:2775-2823 (2014); Ehnbom et al., ACS Cent. Sci. 1:50-56 (2015); Ehnbom et al., Chem. Soc. Rev. 45:6799-6811 (2016), which are hereby incorporated by reference in their entirety). Cobalt is a physiologically important, earth-abundant transition metal and several inexpensive cobalt salts including Co(NO₃)₂, Co(ClO₄)₂ and CoCl₂ are commercially available. Because ligand exchange at a cobalt(II) center is generally fast compared to Co(III) complexes it was decided to investigate the possibility of auxiliary-free chirality sensing by mixing Co(NO₃)₂ with a chiral substrate in the presence of stoichiometric amounts of hydrogen peroxide to accelerate the assembly of stable, easy to handle adducts for rapid chiroptical analysis. In the hope to demonstrate a wide application scope this simple mix-and-measure protocol was applied to the enantiomers of amino acids 1-17, amino phosphonic acid 18, hydroxy acids 19-24, amino alcohols 25-33 and diamines 34 and 35 using methanol as solvent (FIG. 74).

Strong induced CD (ICD) signals were observed at high wavelengths, typically between 400 and 700 nm, with all 35 chirality sensing targets. The generation of ICD effects above 300 nm is preferable because it is likely to eliminate interference from chiral impurities when quantitative ee analysis is attempted. Representative examples of the Cotton effects obtained with aliphatic and aromatic substrates representing a broad range of important classes of chiral compounds are shown in FIGS. 75A-75F. Careful complex preparation using $Co(NO_3)_2$ with amino acids or diamines and analysis under inert atmosphere also gave strong ICD responses but it was found that oxidation to the corresponding Co(III) complexes is important to afford air-stable CD signals. The in situ oxidation, however, is fast and it is crucial for the chiroptical sensing of amino alcohols and hydroxy acids. Alternatively, oxidation of the initially formed Co(II) complexes can be achieved with air and the same CD results were obtained when $H_2O_2$ or $O_2$ were used as oxidant. The chirality sensing protocol described herein is robust and very practical. The components (cobalt salt, $H_2O_2$ and chiral target compound) are simply mixed in methanol and the complex formation, which coincides with a strong color change, is complete in 15-20 minutes. The solutions can then be directly subjected to CD analysis without interference from water or air. This study was continued using cobalt nitrate, $H_2O_2$ and methanol as solvent albeit strong ICD signals were also observed using water, acetonitrile or DMSO. The replacement of $Co(NO_3)_2$ with $Co(ClO_4)_2$ or $CoCl_2$ gave literally the same ICD effects with amino acid 1 and hydroxy acid 23 but a change in the CD intensities was observed when the amino alcohol 25 and the diamine 34 were tested.

Figures 76A, 76B, 76C, 76D:
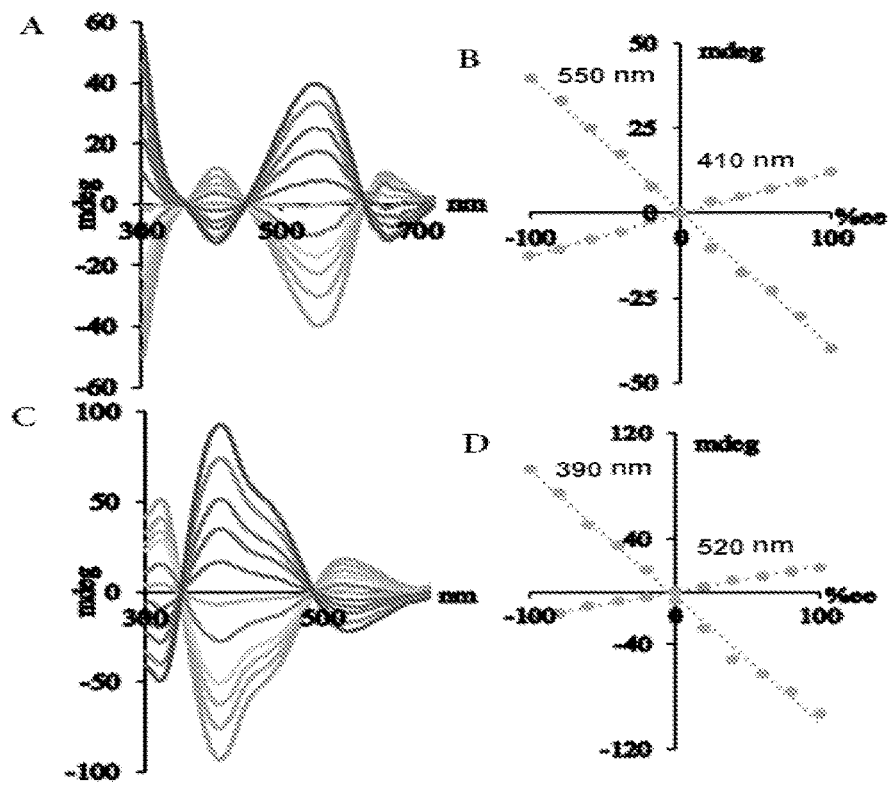
FIGS. 76A-76D relate to the Co(III) sensing of varying enantiomeric compositions of 18 and 34.
Figures 77A, 77B, 77C, 77D:
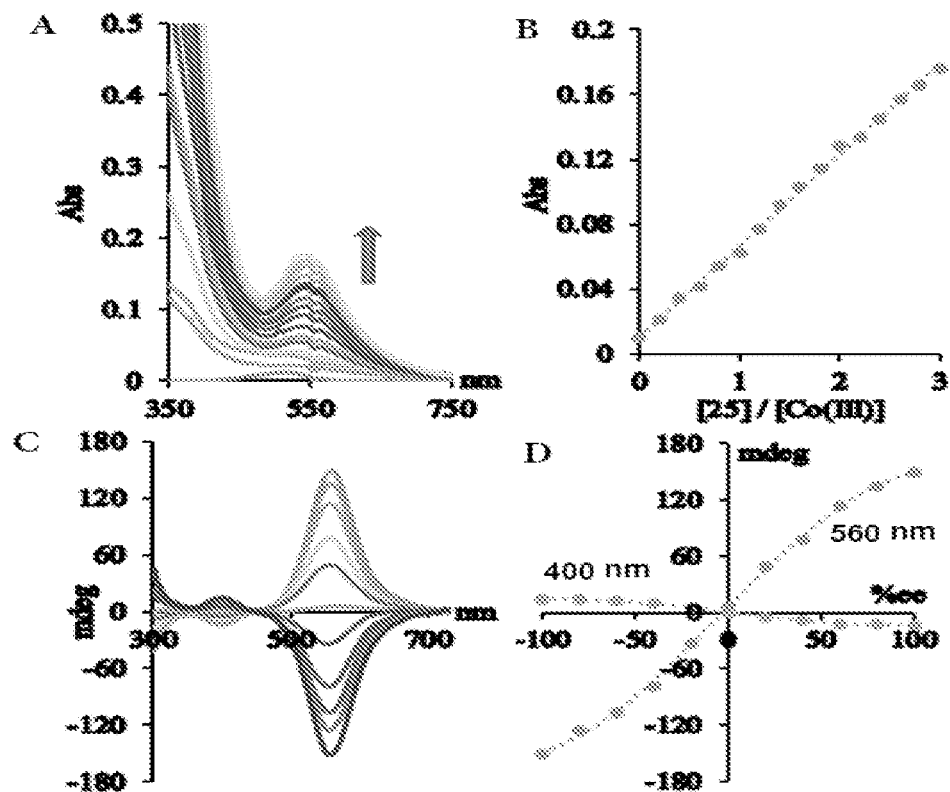
FIGS. 77A-77D relate to the Co(III) sensing of varying amounts of 25.

With a practical and widely useful chirality sensing protocol in hand, the feasibility of quantitative ee determination was explored. To equally represent amino acids, amino phosphonic acids, hydroxy acids, amino alcohols and diamines 1, 18, 24, 25 and 34 were chosen as test compounds. Perfectly linear correlations between the amplitudes of the ICD signals and the analyte % ee were obtained for 1, 18 (FIGS. 76A-76B), 24 and 34 (FIGS. 76C-76D), which may be attributed to the prevalence of homochiral complexes mentioned herein. By contrast, the amino alcohol 25 showed a nonlinear effect which could be attributed to the formation of more than one CD-active Co complex including the trinuclear structure observed with the amino alcohols 29 and 32.

25 nonracemic mixtures were prepared of 1, 18, 24, 25 and 34, respectively, covering a wide range of enantiomeric excess to demonstrate the usefulness of the chirality sensing assay described herein for quantitative stereochemical analysis (Table 7). Using the simple mix-and-measure protocol and the average of two ICD signals, the absolute configuration of the major enantiomer and the ee values were able to be correctly determined with a maximum error margin of 5.5% which is generally considered acceptable for high-throughput screening applications (Table 7, entry 10). For example, sensing of samples containing the R-enantiomer of valine in 16.0 and 94.0% ee, respectively, gave 14.0 and 93.9% ee (entries 4 and 5). The averaged error of the % ee analysis of the five valine samples is 1.7% ee (entries 1-5). The averaged error of the % ee determination of 18, 24, 25 and 34 were calculated as 2.9, 2.1, 2.1, and 1.4, respectively (entries 6-25).

TABLE 7

Chirality sensing of nonracemic mixtures of 1, 18, 24, 25 and 34.

| | Sample Composition | | Chiroptical Sensing | | |
|---|---|---|---|---|---|
| Entry | AC | % ee | $AC^a$ | % ee $(nm)^b$ | Average % ee |
| 1 | (S)-1 | 88.0 | S | 83.4 (505) 88.1 (625) | 85.8 |
| 2 | (S)-1 | 62.0 | S | 59.2 (505) 66.1 (625) | 62.7 |
| 3 | (S)-1 | 22.0 | S | 23.3 (505) 28.3 (625) | 25.8 |
| 4 | (R)-1 | 16.0 | R | 13.7 (505) 14.3 (625) | 14.0 |
| 5 | (R)-1 | 94.0 | R | 95.7 (505) 92.1 (625) | 93.9 |
| 6 | (R)-18 | 88.0 | R | 90.1 (410) 86.9 (550) | 88.5 |
| 7 | (R)-18 | 62.0 | R | 58.1 (410) 58.7 (550) | 58.4 |
| 8 | (R)-18 | 22.0 | R | 17.8 (410) 22.1 (550) | 20.0 |
| 9 | (S)-18 | 16.0 | S | 21.5 (410) 16.0 (550) | 18.8 |
| 10 | (S)-18 | 94.0 | S | 88.6 (410) 88.3 (550) | 88.5 |
| 11 | (R)-24 | 88.0 | R | 91.1 (450) 84.1 (600) | 87.6 |
| 12 | (R)-24 | 62.0 | R | 54.7 (450) 59.9 (600) | 57.3 |
| 13 | (R)-24 | 22.0 | R | 27.0 (450) 20.3 (600) | 23.7 |
| 14 | (S)-24 | 16.0 | S | 19.5 (450) 17.8 (600) | 18.7 |
| 15 | (S)-24 | 94.0 | S | 92.1 (450) 92.6 (600) | 92.4 |
| 16 | (R, S)-25 | 88.0 | R, S | 85.1 (400) 82.3 (560) | 83.7 |
| 17 | (R, S)-25 | 62.0 | R, S | 64.0 (400) 61.0 (560) | 62.5 |
| 18 | (R, S)-25 | 22.0 | R, S | 25.6 (400) 27.2 (560) | 26.4 |
| 19 | (S, R)-25 | 16.0 | S, R | 20.1 (400) 14.5 (560) | 17.3 |
| 20 | (S, R)-25 | 94.0 | S, R | 90.0 (400) 97.6 (560) | 93.8 |
| 21 | (R, R)-34 | 88.0 | R, R | 89.9 (390) 90.0 (520) | 90.0 |
| 22 | (R, R)-34 | 62.0 | R, R | 62.6 (390) 60.3 (520) | 61.5 |
| 23 | (R, R)-34 | 22.0 | R, R | 24.2 (390) 17.7 (520) | 21.0 |
| 24 | (S, S)-34 | 16.0 | S, S | 16.9 (390) 18.3 (520) | 17.6 |
| 25 | (S, S)-34 | 94.0 | S, S | 92.3 (390) 91.7 (520) | 92.0 |

$^a$Based on the sign of the CD response.
$^b$Based on the amplitude of the CD response.

The chiroptical sensing also coincides with a visible color change that can be quantified by UV spectroscopy. For example, addition of increasing amounts of 25 to the cobalt sensor yields a new absorption band at approximately 550 nm (FIGS. 77A-77D). While the characteristic ICD effects allow accurate ee quantification the UV change is independent of the enantiomeric sample composition and can therefore be exploited to determine the overall substrate concentration. Since optical sensing is emerging as a powerful alternative to chromatographic methods for accelerated asymmetric reaction analysis (Shabbir et al., *Proc. Natl. Acad. Sci. USA* 106:10487 (2009); Nieto et al., *Chem. Eur. J.* 16:227 (2010); Bentley et al., *Science Adv.* 2:e1501162 (2016); Bentley et al., *Nat. Commun.* 7:12539 (2016); De los Santos, Z. A. & Wolf, C. J., *Am. Chem. Soc.* 138:13517 (2016); Biedermann, F. & Nau, W. M., *Angew. Chem. Int. Ed.* 53:5694 (2014); Feagin et al., *J. Am. Chem. Soc.* 137:4198 (2015); Giuliano et al., *Adv. Synth. Catal.* 357:2301 (2015); Shcherbakova et al., *Chem. Eur. J.* 23:10222-10229 (2017), which are hereby incorporated by reference in their entirety) and stereoselective quantification of biomarkers (Thanzeel, F. Y. & Wolf, C., *Angew. Chem. Int. Ed.* 56:7276-7281 (2017), which is hereby incorporated by reference in its entirety), the possibility of using the auxiliary-free cobalt sensing method disclosed herein for the combined determination of the absolute configuration, enantiomeric composition and concentration of chiral compounds was investigated. The UV/CD sensing of nine samples of 25 with varying concentration and enantiomeric composition allowed reliable identification of the major enantiomer based on the sign of the ICD signal (Table 8). The intensities of the induced CD and UV effects were then used to determine the ee values and concentration of 25 in each case with good accuracy. The averaged errors of the concentration and % ee analysis were calculated as 0.7% and 3.5%, respectively.

TABLE 8

Combined sensing of the absolute configuration, ee and concentration of samples of cis-1-amino-2-indanol, 25.

| | Sample Composition | | | CD Sensing Results | | |
|---|---|---|---|---|---|---|
| Entry | AC | Conc. (mM) | % ee | AC[a] | Conc. (mM) | % ee[b] |
| 1 | (S, R) | 16.6 | 81.0 | (S, R) | 17.1 | 74.9 |
| 2 | (R, S) | 24.2 | 74.0 | (R, S) | 23.8 | 65.4 |
| 3 | (S, R) | 31.2 | 65.0 | (S, R) | 31.8 | 63.7 |
| 4 | (R, S) | 34.6 | 43.0 | (R, S) | 36.0 | 37.6 |
| 5 | (S, R) | 42.2 | 35.0 | (S, R) | 42.0 | 37.1 |
| 6 | (R, S) | 47.4 | 64.0 | (R, S) | 48.3 | 62.4 |
| 7 | (S, R) | 51.6 | 55.0 | (S, R) | 53.5 | 56.1 |
| 8 | (R, S) | 56.6 | 25.0 | (R, S) | 56.7 | 21.0 |
| 9 | (S, R) | 58.8 | 16.0 | (S, R) | 59.3 | 18.3 |

[a]Based on the sign of the CD response.
[b]Based on the amplitude of the CD response.

Auxiliary-free chirality sensing of the chiral analytes depicted above or others including monoamines and carboxylic acids is also possible, and one can use other metals, for example Fe(II), Fe (III), Cu(I), Cu(II), Ce(III), Pd(II), Mn(II), Rh(III) as shown herein.

Example 5—General Sensing Procedure

A stock solution of the metal salt (0.02 M) in either MeOH [Pd(NO$_3$)$_2$], ACN [Cu(ACN)$_4$PF$_6$], DMSO [FeCl$_2$·4H$_2$O, FeCl$_3$·6H$_2$O, MnCl$_2$·4H$_2$O, CuCl$_2$·2H$_2$O, Ce(NO$_3$)$_3$·6H$_2$O] or H$_2$O [RhCl$_3$·3H$_2$O] was prepared and portions of 0.5 mL were transferred into 4 mL vials. Solutions of the analytes were prepared in either MeOH or DMSO (0.50 M). For substrates carrying an acidic functional group, an equimolar amount of TBAOH (1.0 M in MeOH) was added. The mixtures were stirred for 1 hour at 25° C. and CD analysis was conducted after diluting the mixture with either MeOH, ACN, or DMSO to the final concentration given in the figure descriptions. CD spectra were collected with a standard sensitivity of 100 mdeg, a data pitch of 2.0 nm, a band width of 2 nm, a scanning speed of 500 nm min$^{-1}$, and a response of 0.5 s using a quartz cuvette (1 cm path length). The data were baseline corrected and smoothed using a binomial equation. Control experiments with the chiral analytes showed that the free substrates are CD silent in the region of interest.

Example 6—Substrate Scope

The scope of enantioselective chemosensing was tested with amino acids 1, 2, 4, 5, 6, 8, 9, 10, 15, 17, α-hydroxy acids 19-24, amino alcohols 25-28, 31, amines 34-37 and carboxylic acid 38 (only one enantiomer shown).

1

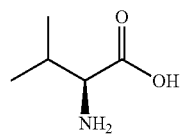

2

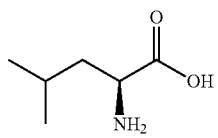

4

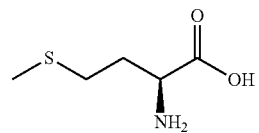

5

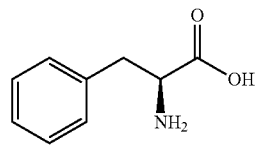

6

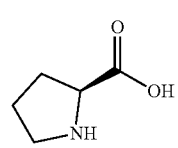

8

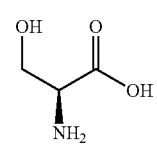

9

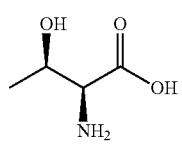

10

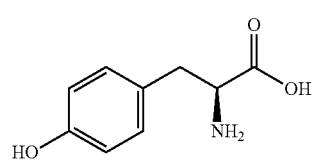

15

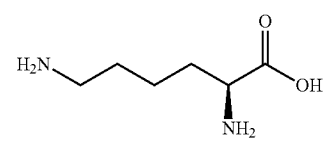

17

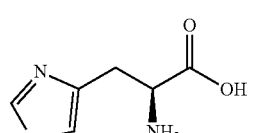

19

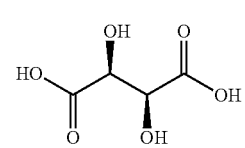

20

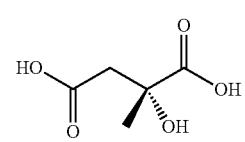

21

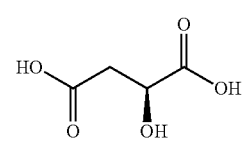

-continued

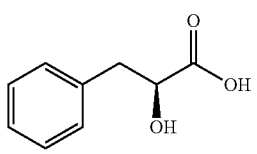
22

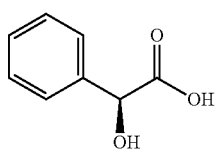
23

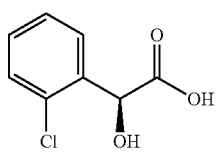
24

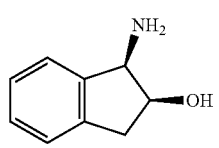
25

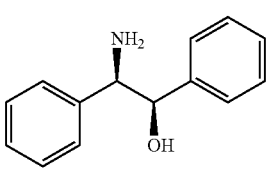
26

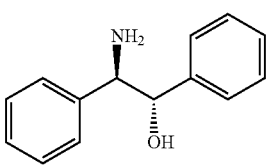
27

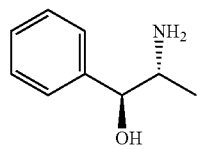
28

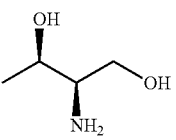
31

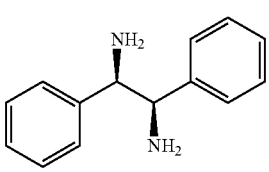
34

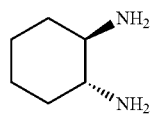
35

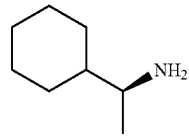
36

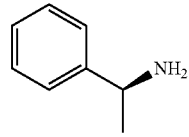
37

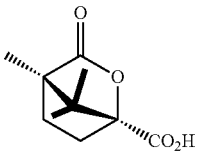
38

Figure 78:
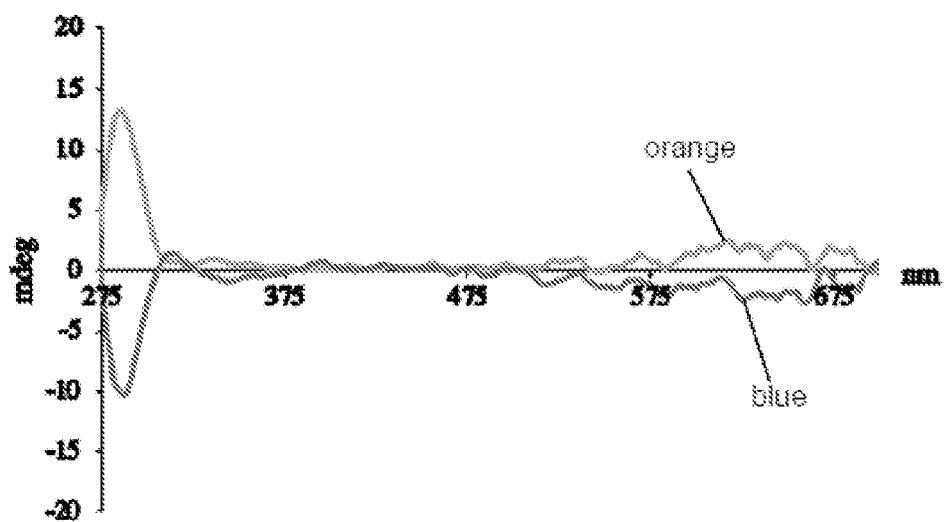
FIG. 78 shows the CD spectra of the assembly obtained from $Cu(ACN)_4PF_6$, TBAOH, and (S)-1 (blue) or (R)-1 (orange) in ACN at 0.5 mM.
Figure 79:
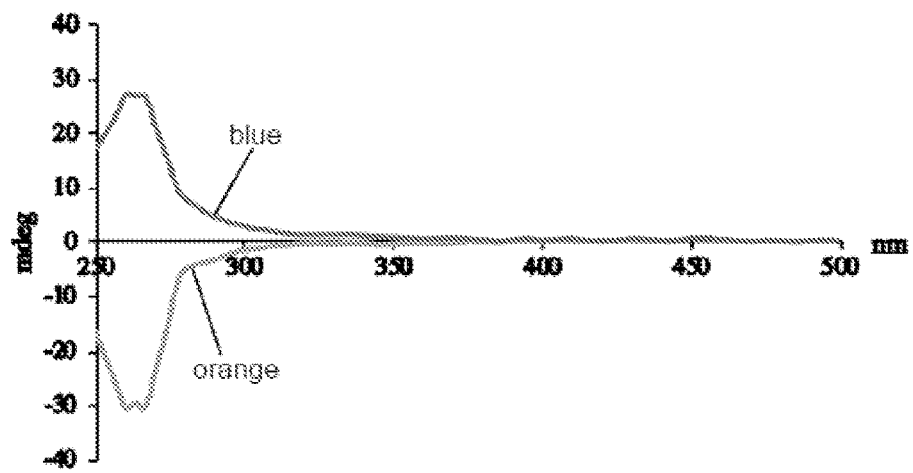
FIG. 79 shows the CD spectra of the assembly obtained from $Cu(ACN)_4PF_6$, TBAOH, and (S)-23 (blue) or (R)-23 (orange) in ACN at 1.8 mM.
Figure 80:
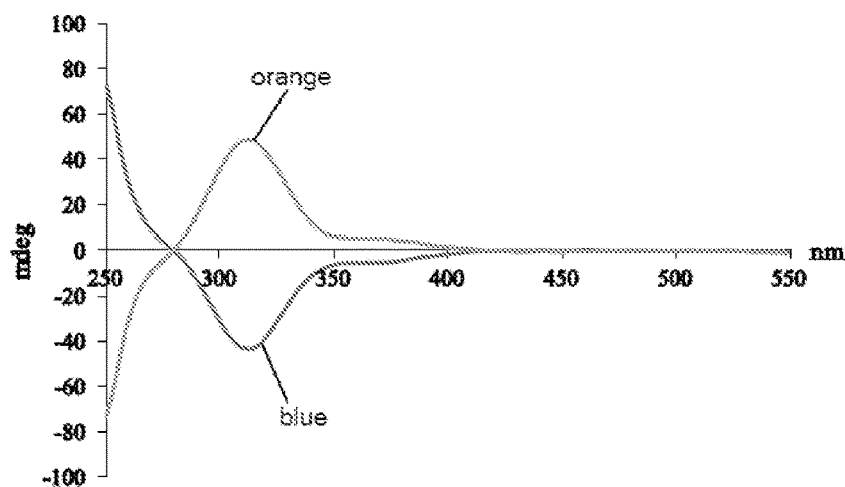
FIG. 80 shows the CD spectra of the assembly obtained from $Pd(NO_3)_2$, TBAOH, and (S)-1 (blue) or (R)-1 (orange) in MeOH (1.8 mM $Pd(NO_3)_2$, 3 equivalents of 1).
Figure 81:
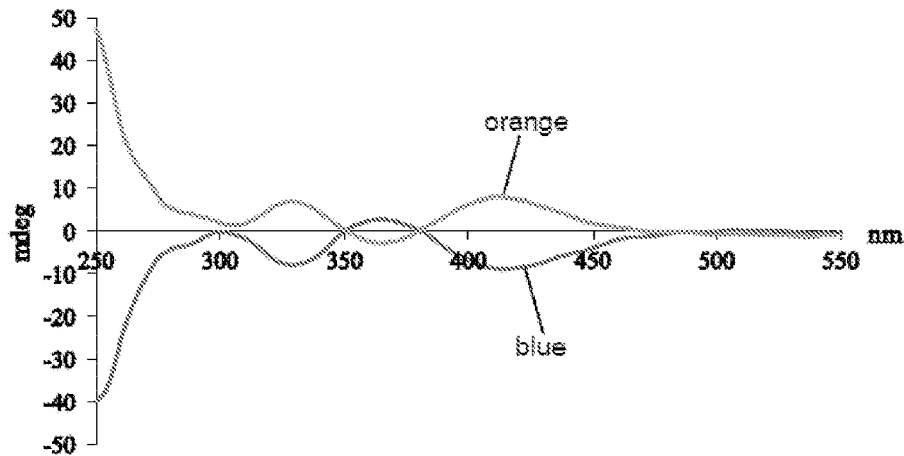
FIG. 81 shows the CD spectra of the assembly obtained from $Pd(NO_3)_2$, TBAOH, and (S)-23 (blue) or (R)-23 (orange) in MeOH (1.8 mM $Pd(NO_3)_2$, 3 equivalents of 23).
Figure 82:
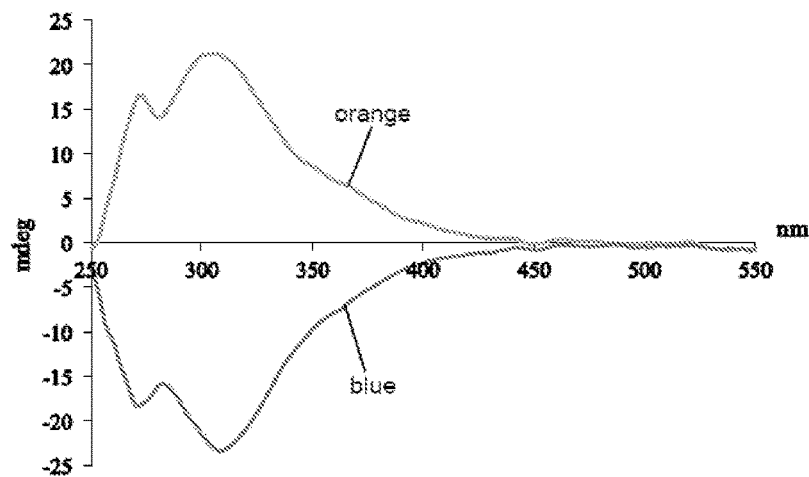
FIG. 82 shows the CD spectra of the assembly obtained from $Pd(NO_3)_2$, and (S,R)-25 (blue) or (R,S)-25 (orange) in MeOH (1.8 mM $Pd(NO_3)_2$, 3 equivalents of 25).
Figure 83:
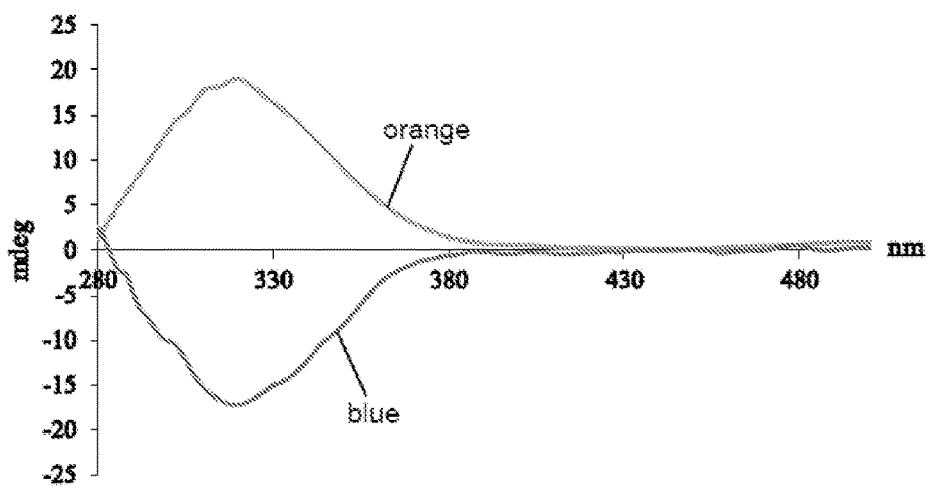
FIG. 83 shows the CD spectra of the assembly obtained from $FeCl_2 \cdot 4H_2O$, TBAOH, and (S)-1 (blue) or (R)-1 (orange) in DMSO (0.5 mM $FeCl_2 \cdot 4H_2O$, 3 equivalents of 1).
Figure 84:
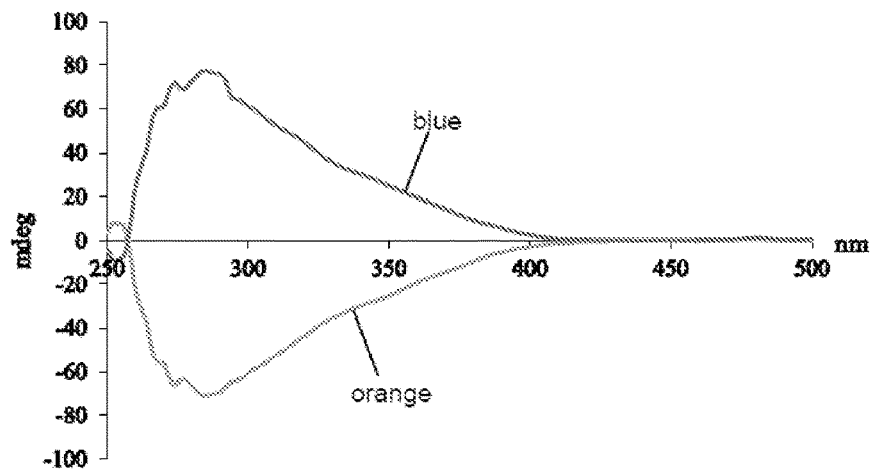
FIG. 84 shows the CD spectra of the assembly obtained from $FeCl_2 \cdot 4H_2O$, TBAOH, and (S)-23 (blue) or (R)-23 (orange) in DMSO (0.5 mM $FeCl_2 \cdot 4H_2O$, 3 equivalents of 23).
Figure 85:
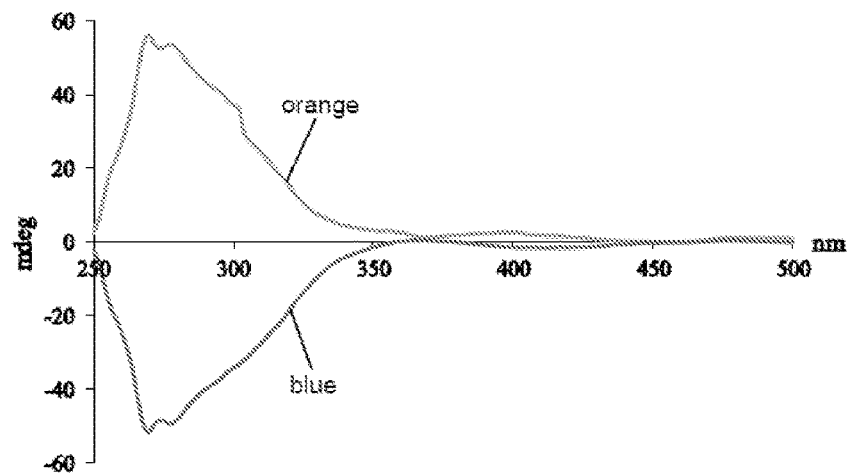
FIG. 85 shows the CD spectra of the assembly obtained from $FeCl_2 \cdot 4H_2O$, TBAOH, and (S,R)-25 (blue) or (R,S)-25 (orange) in DMSO (0.5 mM $FeCl_2 \cdot 4H_2O$, 3 equivalents of 25).
Figure 86:
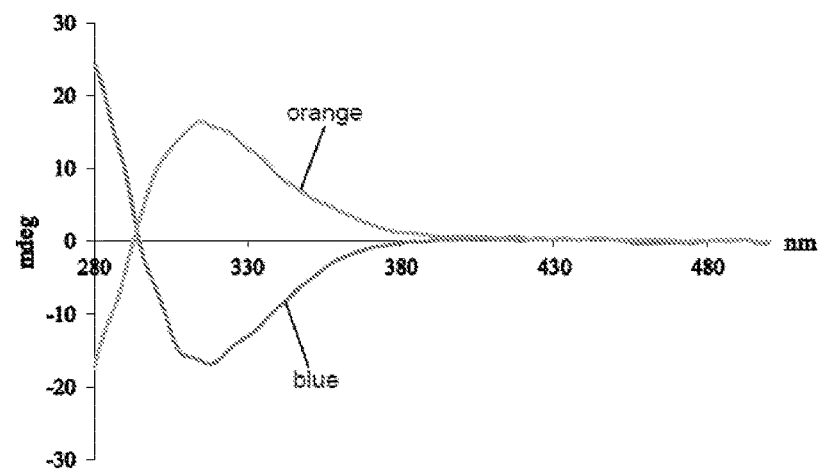
FIG. 86 shows the CD spectra of the assembly obtained from $FeCl_3 \cdot 6H_2O$, TBAOH, and (S)-1 (blue) or (R)-1 (orange) in DMSO (0.5 mM $FeCl_3 \cdot 6H_2O$, 3 equivalents of 1).
Figure 87:
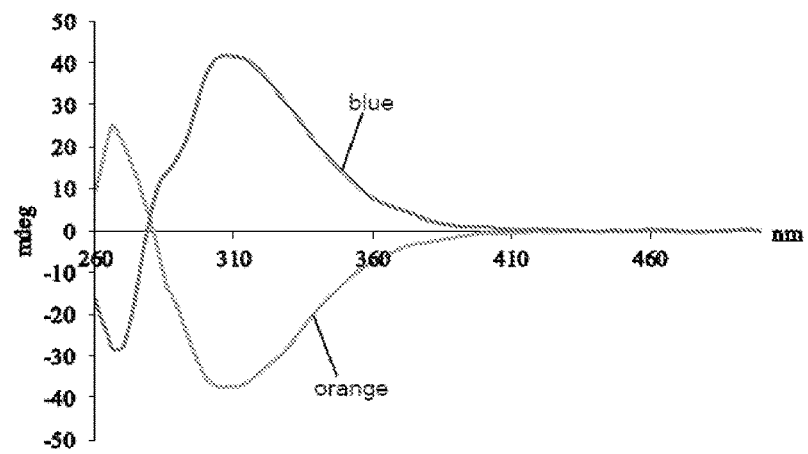
FIG. 87 shows the CD spectra of the assembly obtained from $FeCl_3 \cdot 6H_2O$, TBAOH, and (S)-2 (blue) or (R)-2 (orange) in DMSO (0.5 mM $FeCl_3 \cdot 6H_2O$, 3 equivalents of 2).
Figure 88:
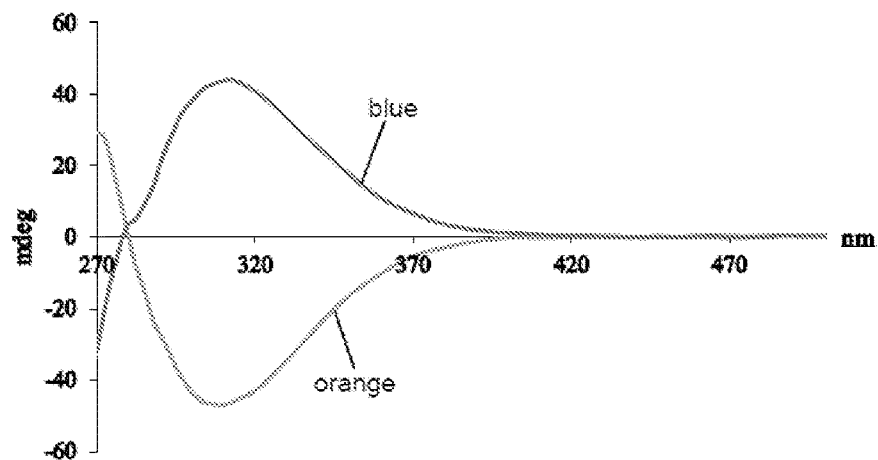
FIG. 88 shows the CD spectra of the assembly obtained from $FeCl_3 \cdot 6H_2O$, TBAOH, and (S)-4 (blue) or (R)-4 (orange) in DMSO (0.5 mM $FeCl_3 \cdot 6H_2O$, 3 equivalents of 4).
Figure 89:
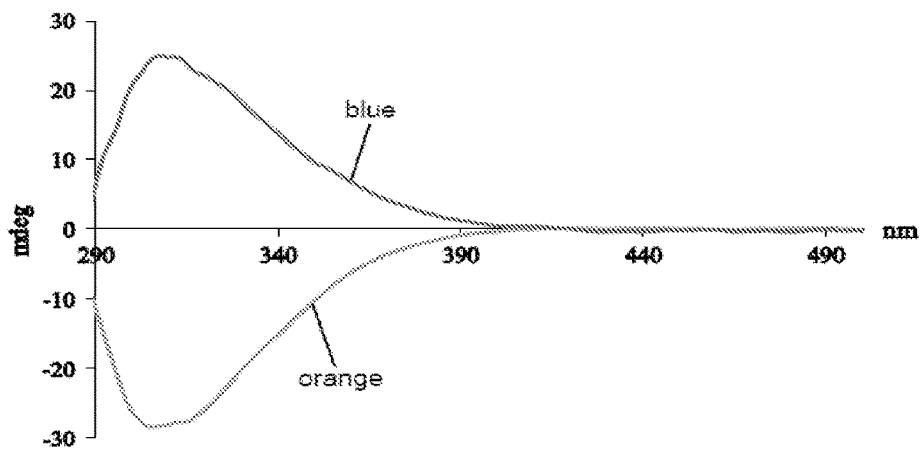
FIG. 89 shows the CD spectra of the assembly obtained from $FeCl_3 \cdot 6H_2O$, TBAOH, and (S)-5 (blue) or (R)-5 (orange) in DMSO (0.5 mM $FeCl_3 \cdot 6H_2O$, 3 equivalents of 5).
Figure 90:
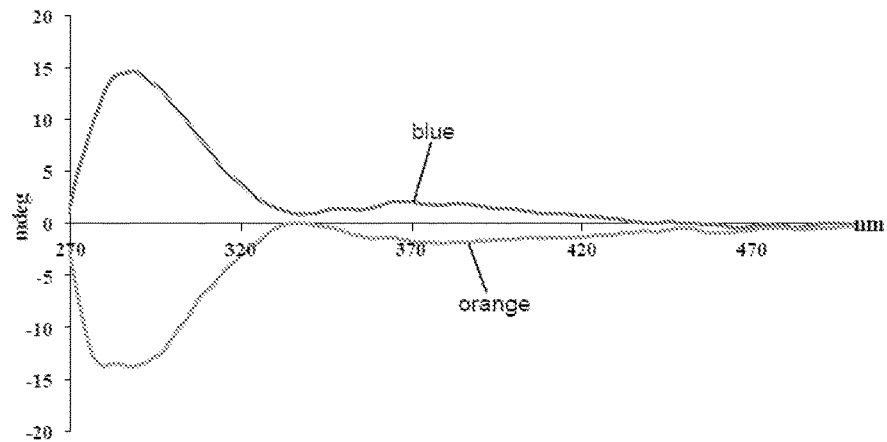
FIG. 90 shows the CD spectra of the assembly obtained from $FeCl_3 \cdot 6H_2O$, TBAOH, and (S)-6 (blue) or (R)-6 (orange) in DMSO (0.5 mM $FeCl_3 \cdot 6H_2O$, 3 equivalents of 6).
Figure 91:
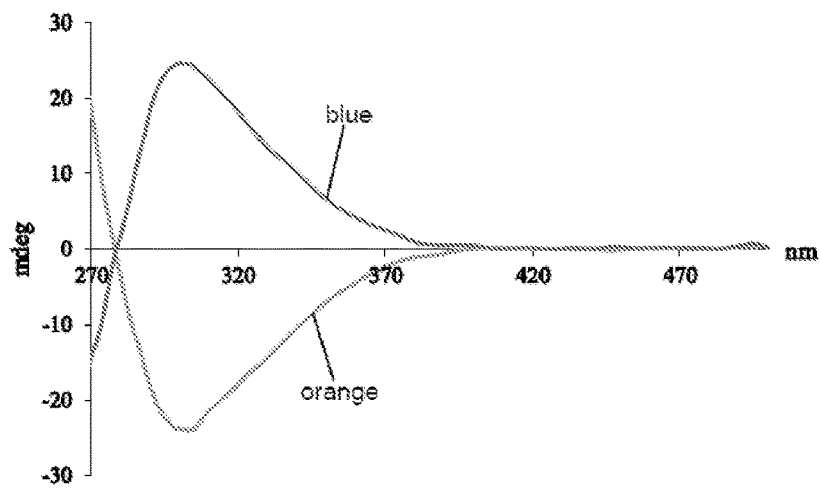
FIG. 91 shows the CD spectra of the assembly obtained from $FeCl_3 \cdot 6H_2O$, TBAOH, and (S)-8 (blue) or (R)-8 (orange) in DMSO (0.5 mM $FeCl_3 \cdot 6H_2O$, 3 equivalents of 8).
Figure 92:
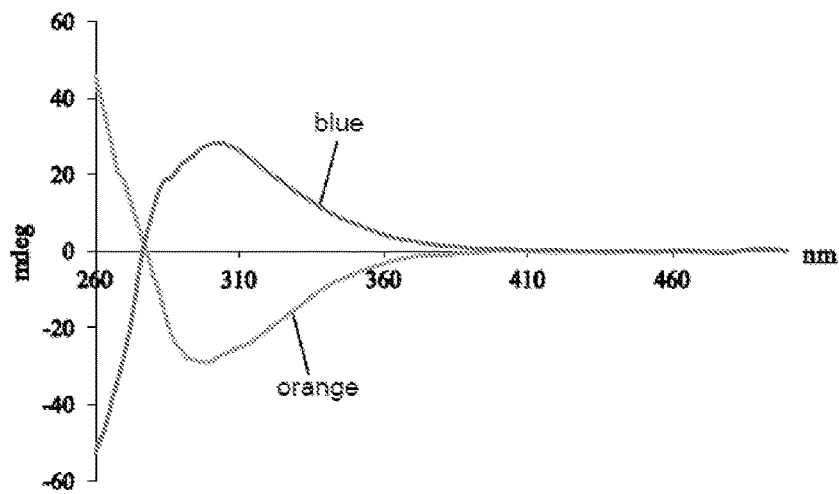
FIG. 92 shows the CD spectra of the assembly obtained from $FeCl_3 \cdot 6H_2O$, TBAOH, and (S,R)-9 (blue) or (R,S)-9 (orange) in DMSO (0.5 mM $FeCl_3 \cdot 6H_2O$, 3 equivalents of 9).
Figure 93:
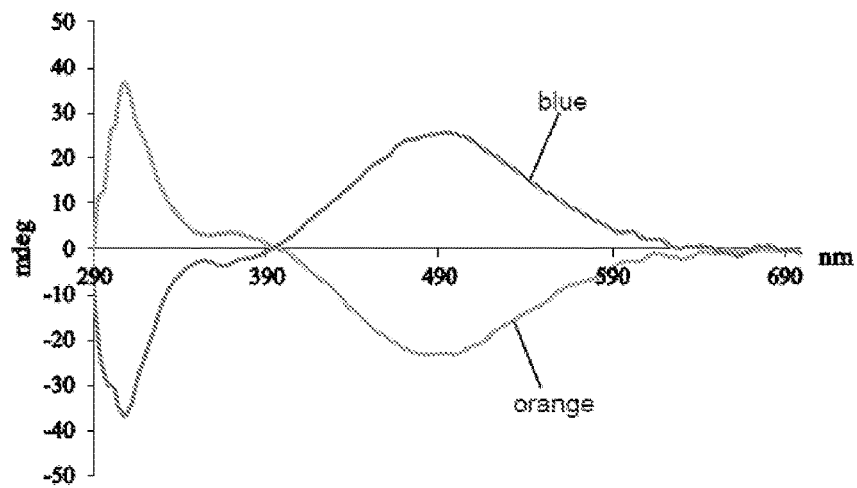
FIG. 93 shows the CD spectra of the assembly obtained from $FeCl_3 \cdot 6H_2O$, TBAOH, and (S)-10 (blue) or (R)-10 (orange) in DMSO (0.5 mM $FeCl_3 \cdot 6H_2O$, 3 equivalents of 10).
Figure 94:
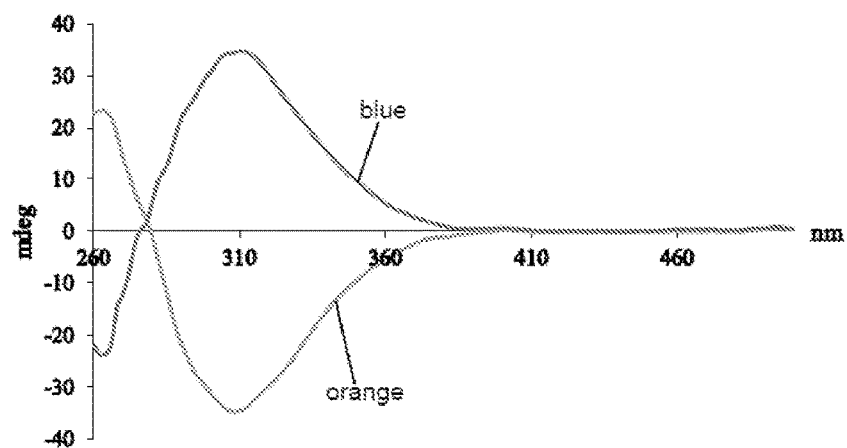
FIG. 94 shows the CD spectra of the assembly obtained from $FeCl_3 \cdot 6H_2O$, TBAOH, and (S)-15 (blue) or (R)-15 (orange) in DMSO (0.5 mM $FeCl_3 \cdot 6H_2O$, 3 equivalents of 15).
Figure 95:
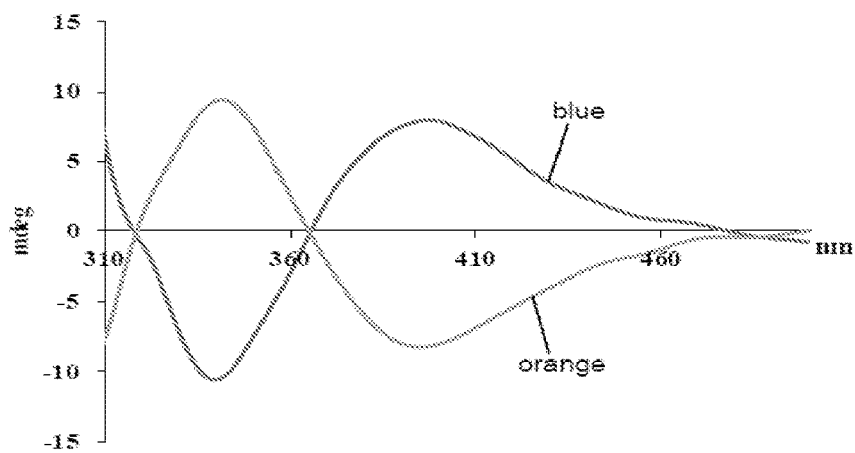
FIG. 95 shows the CD spectra of the assembly obtained from $FeCl_3 \cdot 6H_2O$, TBAOH, and (S)-17 (blue) or (R)-17 (orange) in DMSO (0.5 mM $FeCl_3 \cdot 6H_2O$, 3 equivalents of 17).
Figure 96:
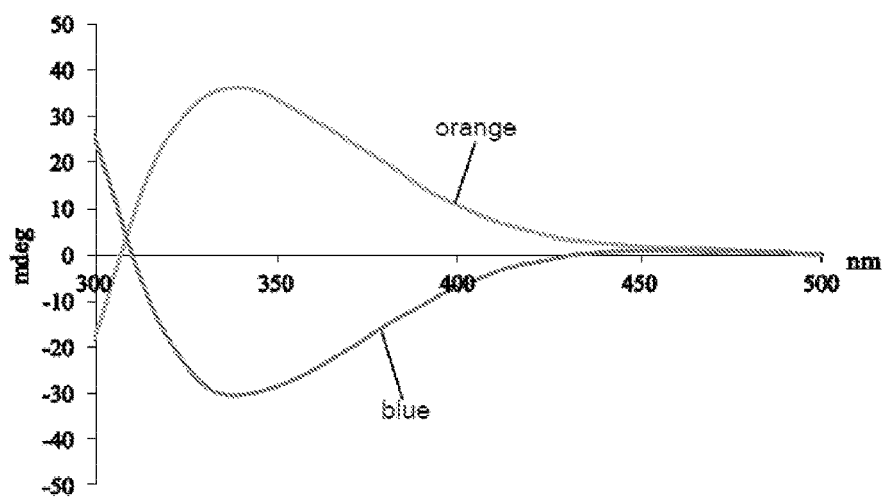
FIG. 96 shows the CD spectra of the assembly obtained from $FeCl_3 \cdot 6H_2O$, TBAOH, and (S,S)-19 (blue) or (R,R)-19 (orange) in DMSO (0.5 mM $FeCl_3 \cdot 6H_2O$, 3 equivalents of 19).
Figure 97:
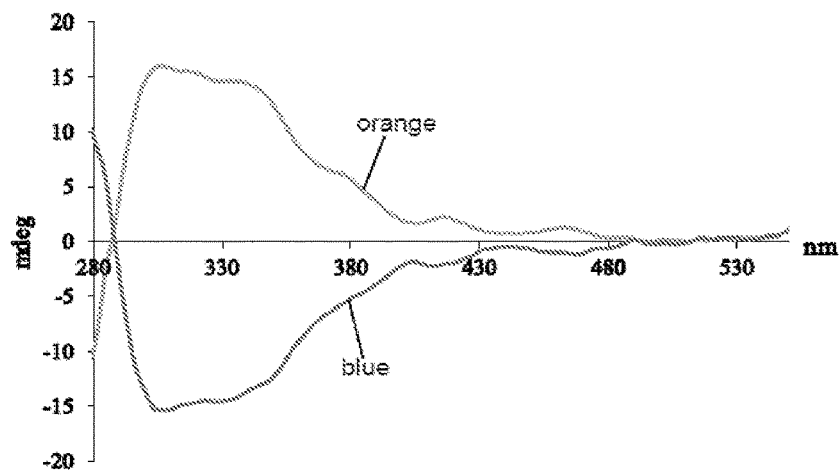
FIG. 97 shows the CD spectra of the assembly obtained from $FeCl_3 \cdot 6H_2O$, TBAOH, and (S)-20 (blue) or (R)-20 (orange) in DMSO (0.5 mM $FeCl_3 \cdot 6H_2O$, 3 equivalents of 20).
Figure 98:
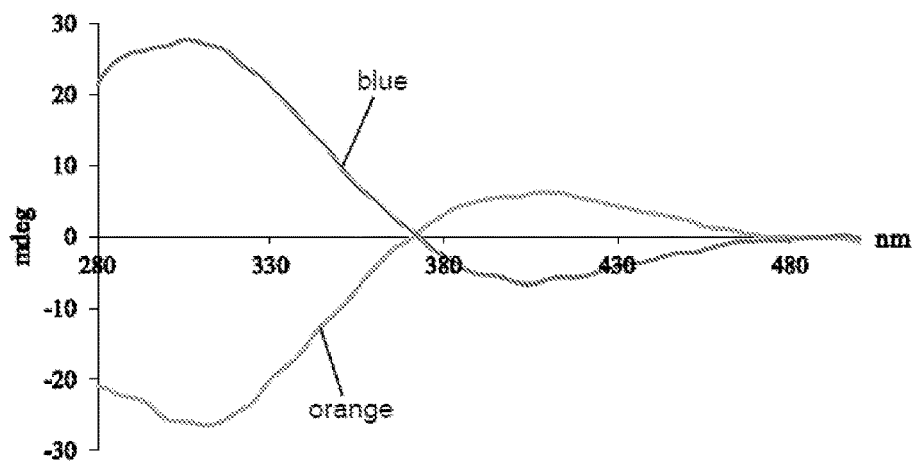
FIG. 98 shows the CD spectra of the assembly obtained from $FeCl_3 \cdot 6H_2O$, TBAOH, and (S)-23 (blue) or (R)-23 (orange) in DMSO (0.5 mM $FeCl_3 \cdot 6H_2O$, 3 equivalents of 23).
Figure 99:
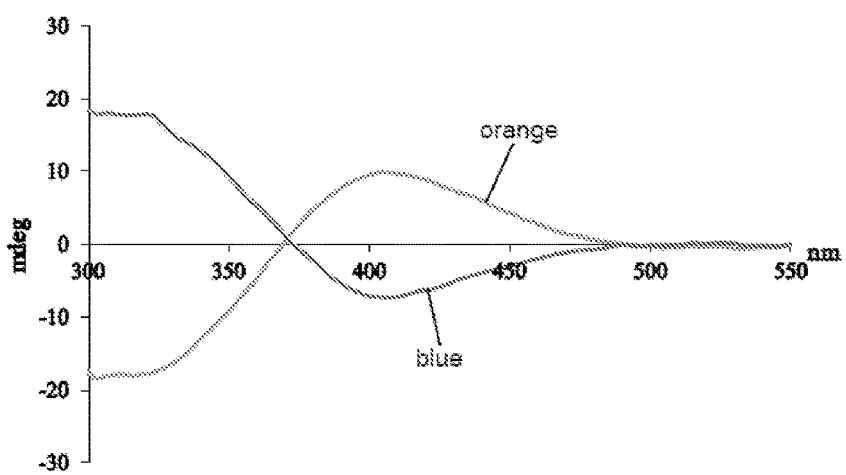
FIG. 99 shows the CD spectra of the assembly obtained from $FeCl_3 \cdot 6H_2O$, TBAOH, and (S)-24 (blue) or (R)-24 (orange) in DMSO (0.5 mM $FeCl_3 \cdot 6H_2O$, 3 equivalents of 24).
Figure 100:
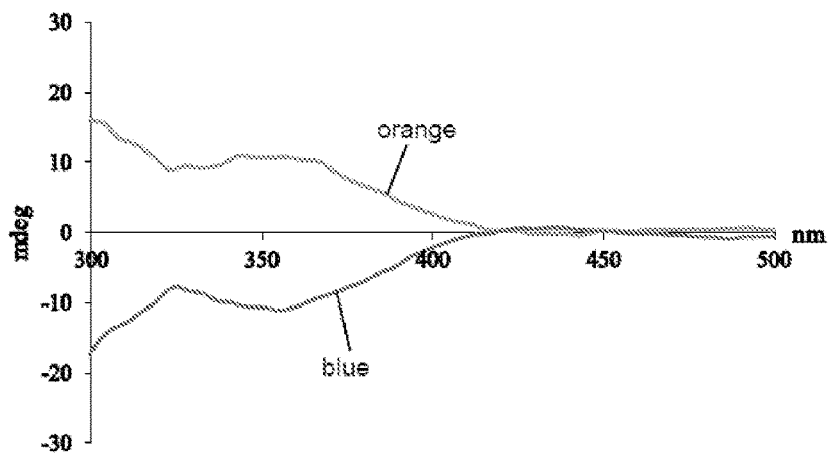
FIG. 100 shows the CD spectra of the assembly obtained from $FeCl_3 \cdot 6H_2O$, and (S,R)-25 (blue) or (R,S)-25 (orange) in DMSO (0.5 mM $FeCl_3 \cdot 6H_2O$, 3 equivalents of 25).
Figure 101:
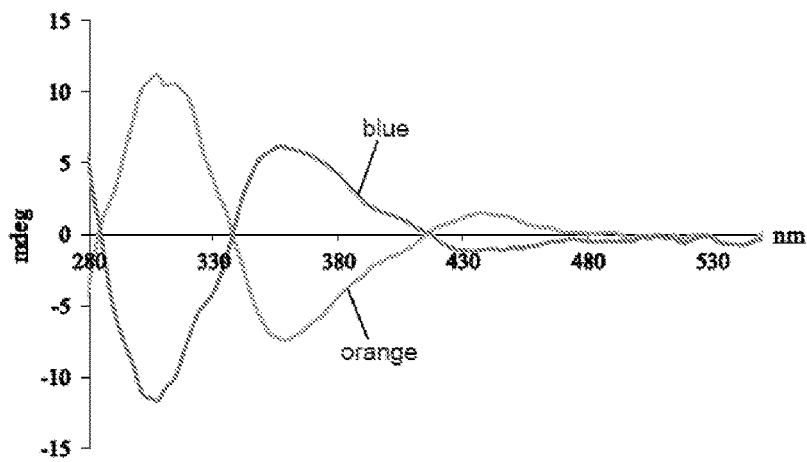
FIG. 101 shows the CD spectra of the assembly obtained from $FeCl_3 \cdot 6H_2O$, and (S,R)-26 (blue) or (R,S)-26 (orange) in DMSO (0.5 mM $FeCl_3 \cdot 6H_2O$, 3 equivalents of 26).
Figure 102:
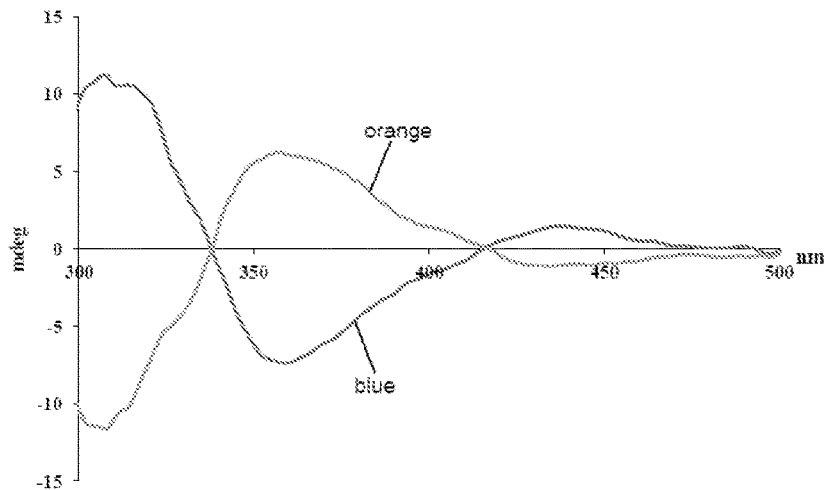
FIG. 102 shows the CD spectra of the assembly obtained from $FeCl_3 \cdot 6H_2O$, TBAOH, and (R,S)-28 (blue) or (S,R)-28 (orange) in DMSO (0.5 mM $FeCl_3 \cdot 6H_2O$, 3 equivalents of 28).
Figure 103:
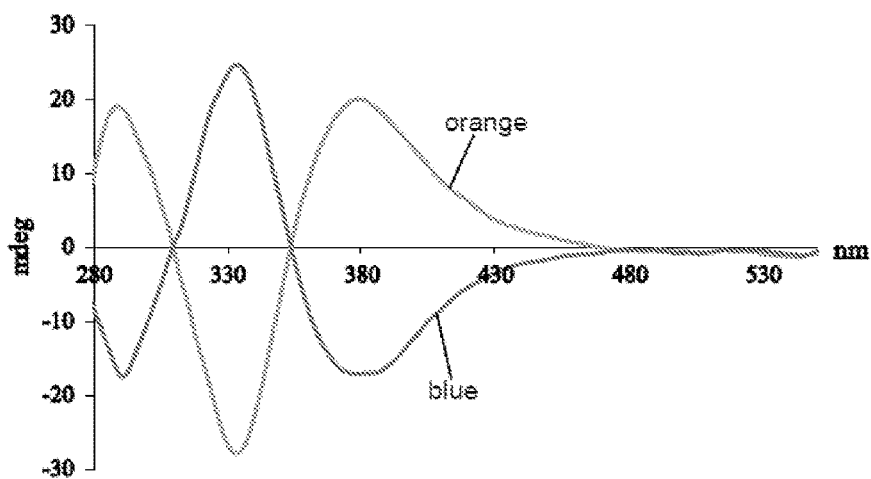
FIG. 103 shows the CD spectra of the assembly obtained from $FeCl_3 \cdot 6H_2O$, and (S,S)-31 (blue) or (R,R)-31 (orange) in DMSO (0.5 mM $FeCl_3 \cdot 6H_2O$, 3 equivalents of 31).
Figure 104:
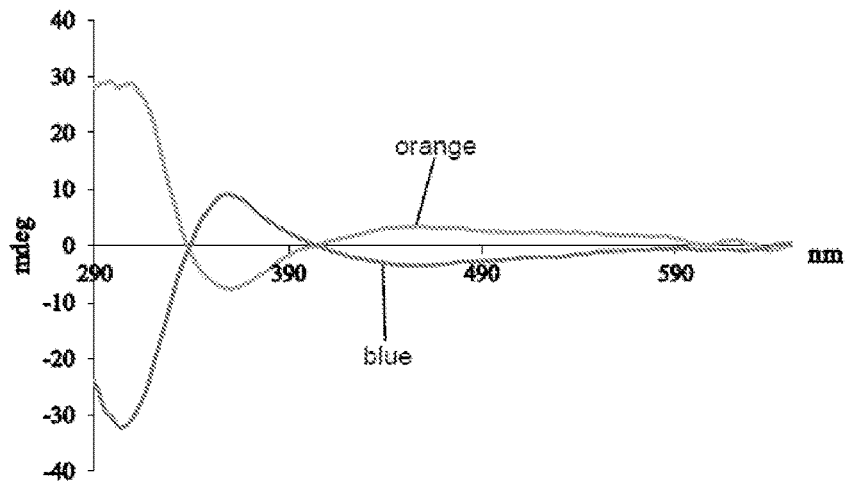
FIG. 104 shows the CD spectra of the assembly obtained from $FeCl_3 \cdot 6H_2O$, and (S,S)-34 (blue) or (R,R)-34 (orange) in DMSO (0.5 mM $FeCl_3 \cdot 6H_2O$, 3 equivalents of 34).
Figure 105:
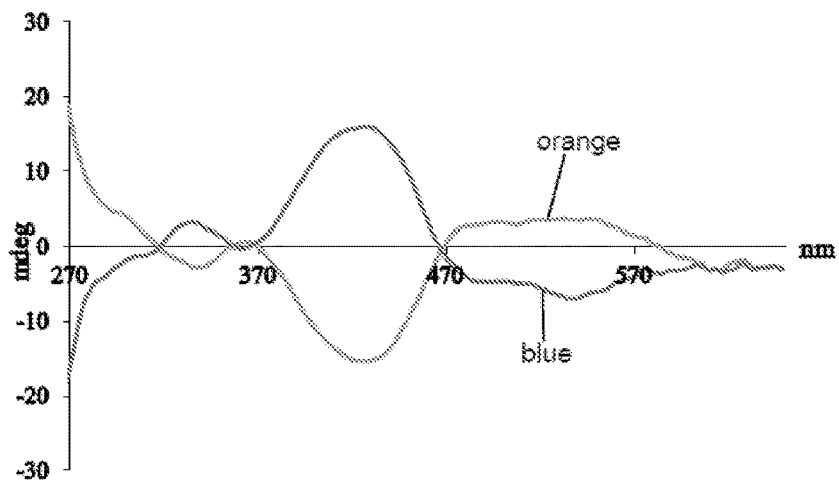
FIG. 105 shows the CD spectra of the assembly obtained from $FeCl_3 \cdot 6H_2O$, and (S,S)-35 (blue) or (R,R)-35 (orange) in DMSO (0.5 mM $FeCl_3 \cdot 6H_2O$, 3 equivalents of 35).
Figure 106:
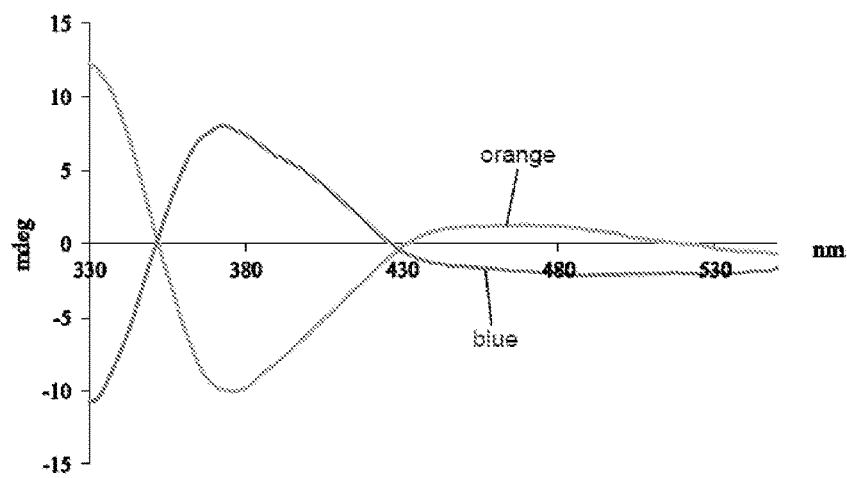
FIG. 106 shows the CD spectra of the assembly obtained from $FeCl_3 \cdot 6H_2O$, TBAOH and (S)-38 (blue) or (R)-38 (orange) in DMSO (0.9 mM $FeCl_3 \cdot 6H_2O$, 3 equivalents of 38).
Figure 107:
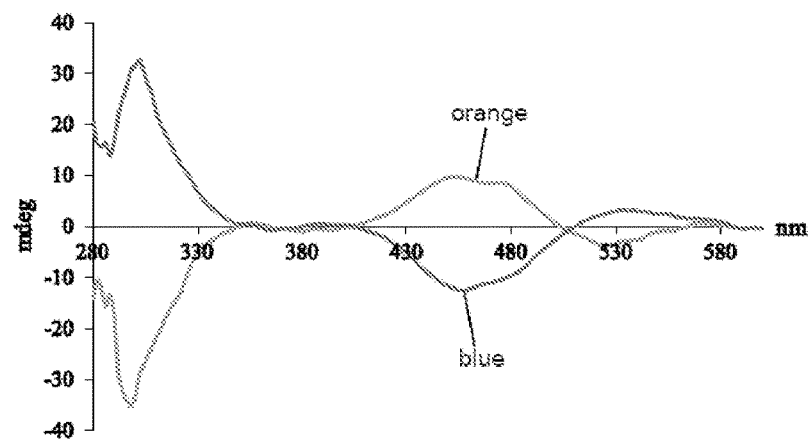
FIG. 107 shows the CD spectra of the assembly obtained from $MnCl_2 \cdot 4H_2O$, TBAOH, and (S)-1 (blue) or (R)-1 (orange) in DMSO (1.8 mM $MnCl_2 \cdot 4H_2O$, 3 equivalents of 1).
Figure 108:
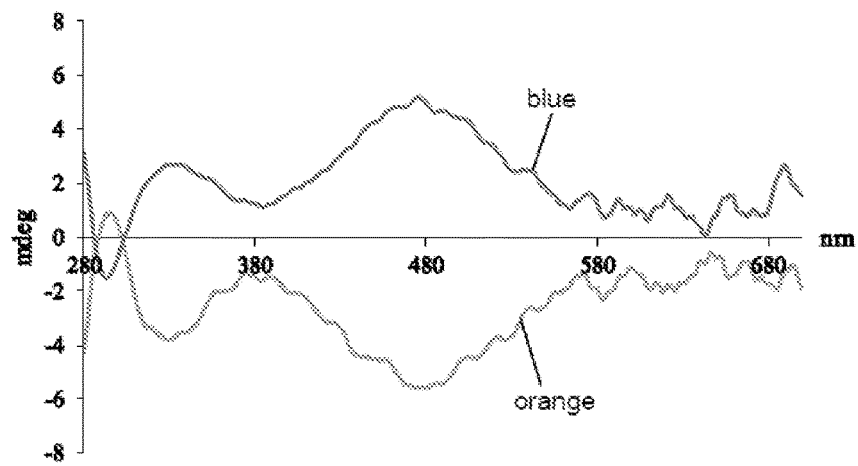
FIG. 108 shows the CD spectra of the assembly obtained from $MnCl_2 \cdot 4H_2O$, TBAOH, and (S)-23 (blue) or (R)-23 (orange) in DMSO (1.8 mM $MnCl_2 \cdot 4H_2O$, 3 equivalents of 23).
Figure 109:
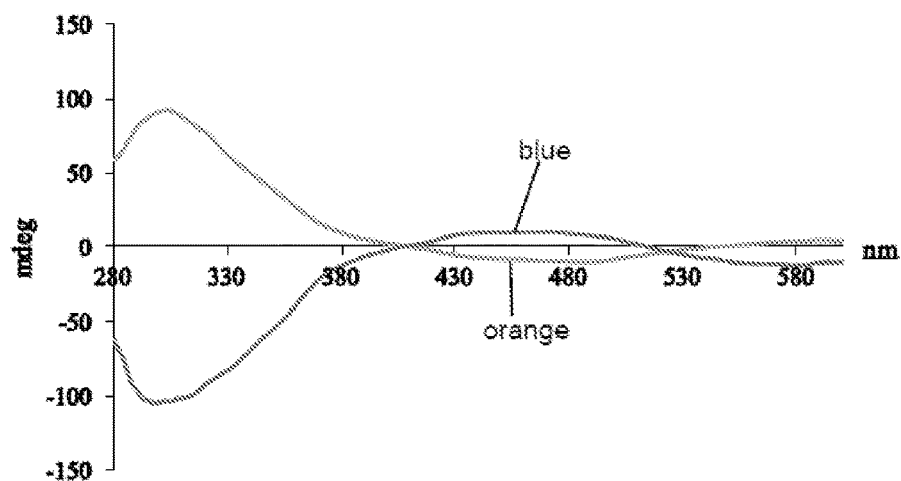
FIG. 109 shows the CD spectra of the assembly obtained from $MnCl_2 \cdot 4H_2O$, and (S,R)-25 (blue) or (R,S)-25 (orange) in DMSO (1.8 mM $MnCl_2 \cdot 4H_2O$, 3 equivalents of 25).
Figure 110:
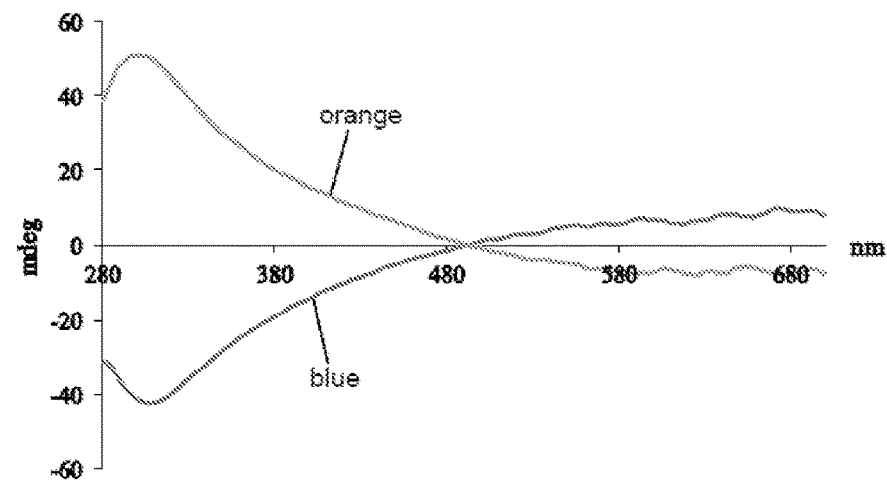
FIG. 110 shows the CD spectra of the assembly obtained from $CuCl_2 \cdot 2H_2O$, TBAOH, and (S)-1 (blue) or (R)-1 (orange) in DMSO at (1.8 mM $CuCl_2 \cdot 2H_2O$, 2.5 equivalents of 1).
Figure 111:
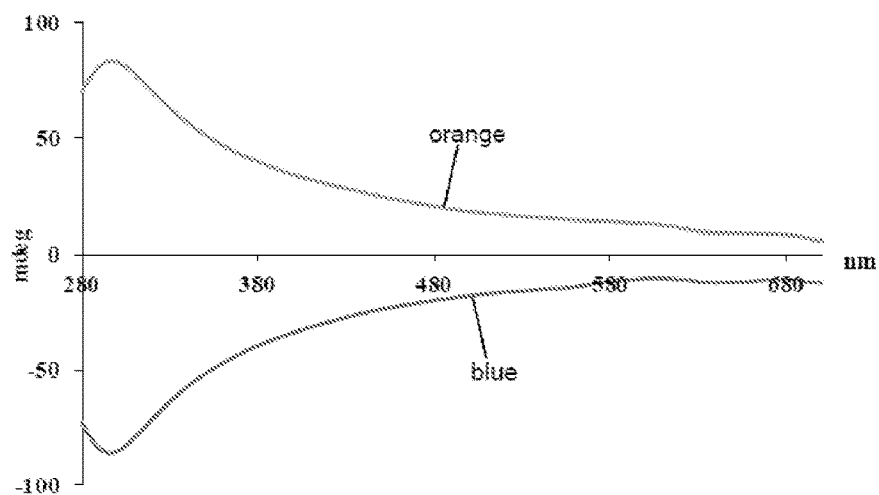
FIG. 111 shows the CD spectra of the assembly obtained from $CuCl_2 \cdot 2H_2O$, TBAOH, and (R)-2 (blue) or (S)-2 (orange) in DMSO (0.5 mM $CuCl_2 \cdot 2H_2O$, 2.5 equivalents of 2).
Figure 112:
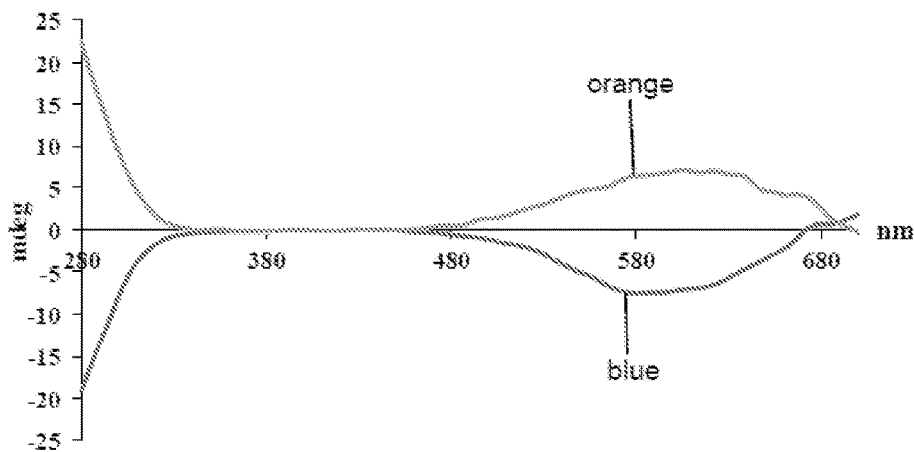
FIG. 112 shows the CD spectra of the assembly obtained from $CuCl_2 \cdot 2H_2O$, TBAOH, and (S)-9 (blue) or (R)-9 (orange) in DMSO (0.9 mM $CuCl_2 \cdot 2H_2O$, 2.5 equivalents of 9).
Figure 113:
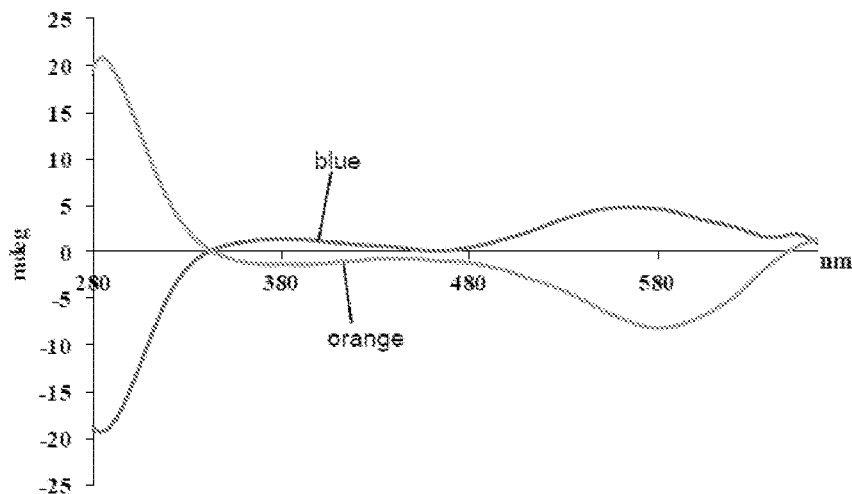
FIG. 113 shows the CD spectra of the assembly obtained from $CuCl_2 \cdot 2H_2O$, TBAOH, and (R)-17 (blue) or (S)-17 (orange) in DMSO (0.9 mM $CuCl_2 \cdot 2H_2O$, 2.5 equivalents of 17).
Figure 114:
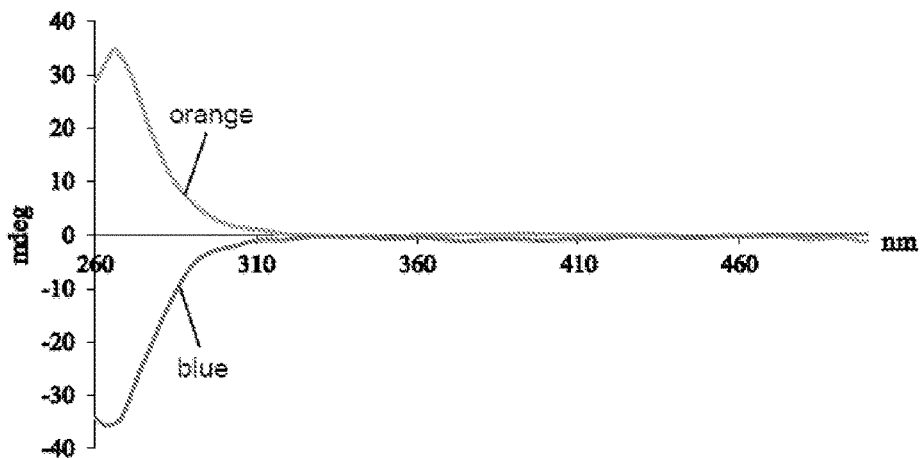
FIG. 114 shows the CD spectra of the assembly obtained from $CuCl_2 \cdot 2H_2O$, TBAOH, and (S,S)-19 (blue) or (R,R)-19 (orange) in DMSO (0.5 mM $CuCl_2 \cdot 2H_2O$, 2.5 equivalents of 19).
Figure 115:
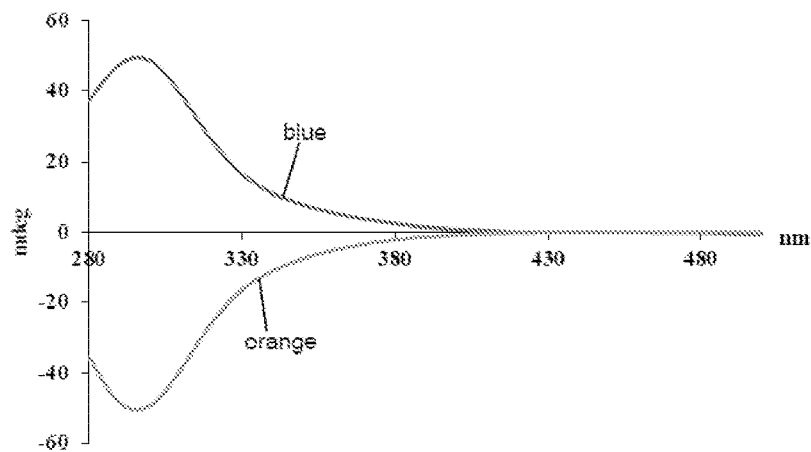
FIG. 115 shows the CD spectra of the assembly obtained from $CuCl_2 \cdot 2H_2O$, TBAOH, and (R)-20 (blue) or (S)-20 (orange) in DMSO (0.9 mM $CuCl_2 \cdot 2H_2O$, 2.5 equivalents of 20).
Figure 116:
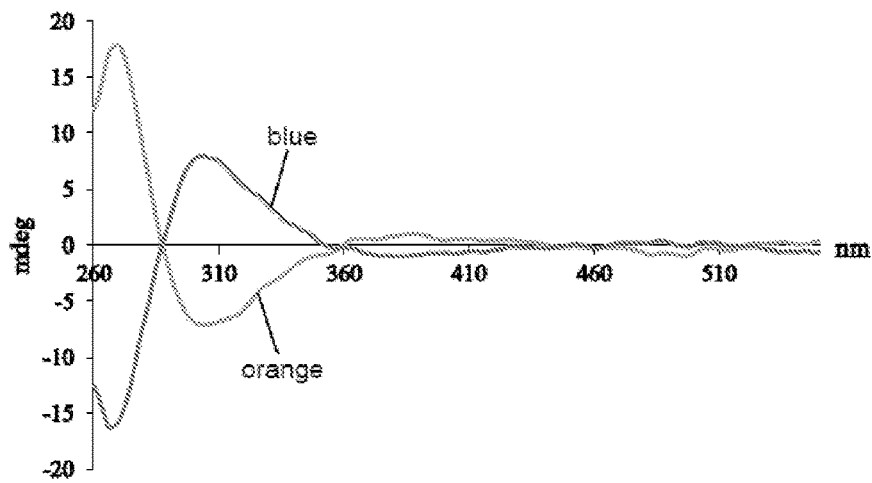
FIG. 116 shows the CD spectra of the assembly obtained from $CuCl_2 \cdot 2H_2O$, TBAOH, and (S)-21 (blue) or (R)-21 (orange) in DMSO (0.5 mM $CuCl_2 \cdot 2H_2O$, 2.5 equivalents of 21).
Figure 117:
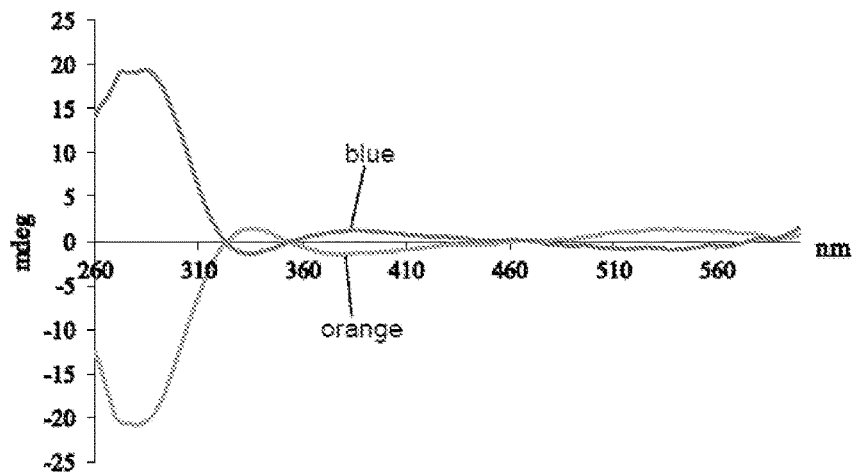
FIG. 117 shows the CD spectra of the assembly obtained from $CuCl_2 \cdot 2H_2O$, TBAOH, and (S)-22 (blue) or (R)-22 (orange) in DMSO (0.5 mM $CuCl_2 \cdot 2H_2O$, 2.5 equivalents of 22).
Figure 118:
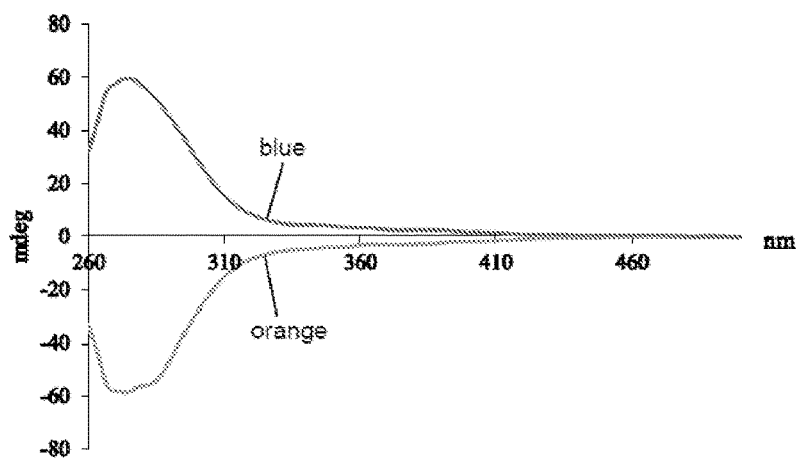
FIG. 118 shows the CD spectra of the assembly obtained from $CuCl_2 \cdot 2H_2O$, TBAOH, and (S)-23 (blue) or (R)-23 (orange) in DMSO (0.5 mM $CuCl_2 \cdot 2H_2O$, 2.5 equivalents of 23).
Figure 119:
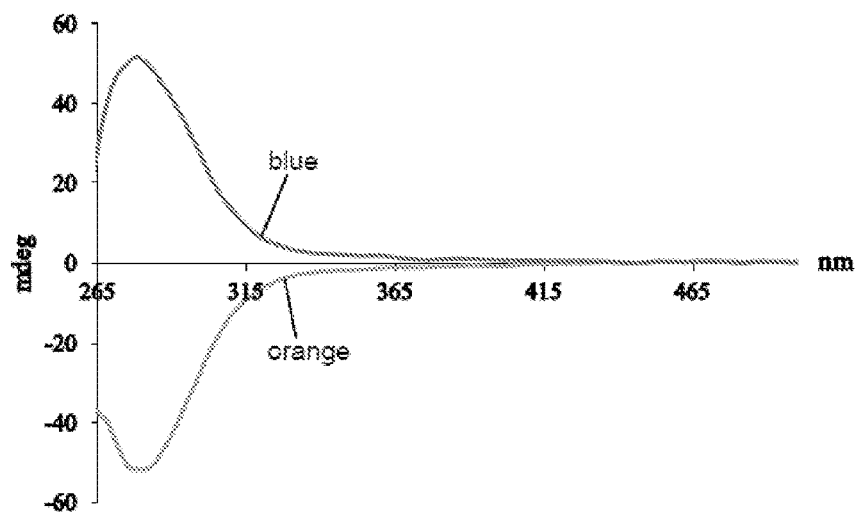
Figure 120:
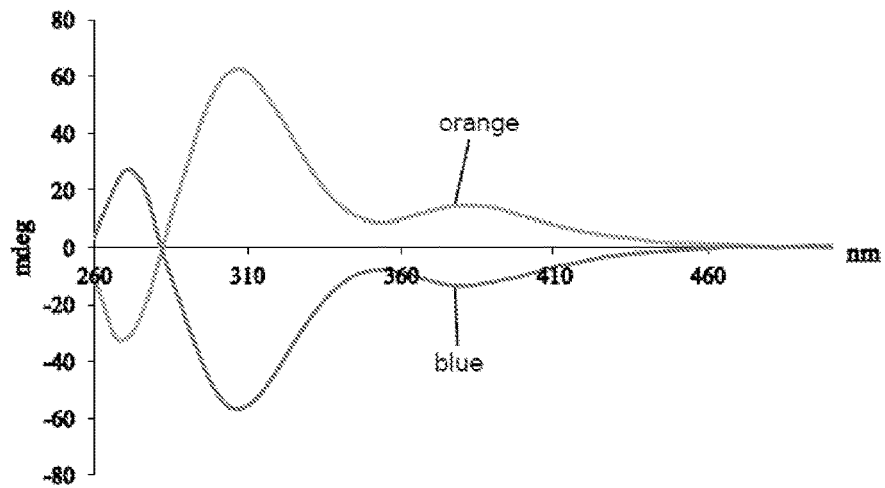
Figure 121:
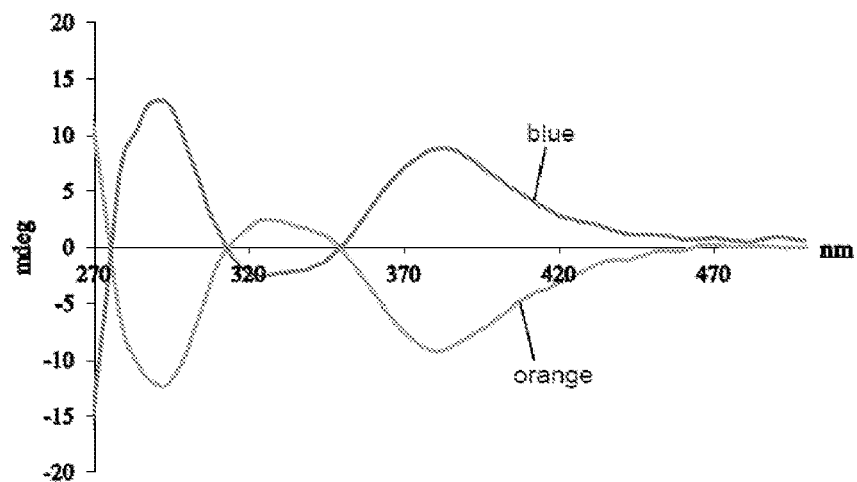
Figure 122:
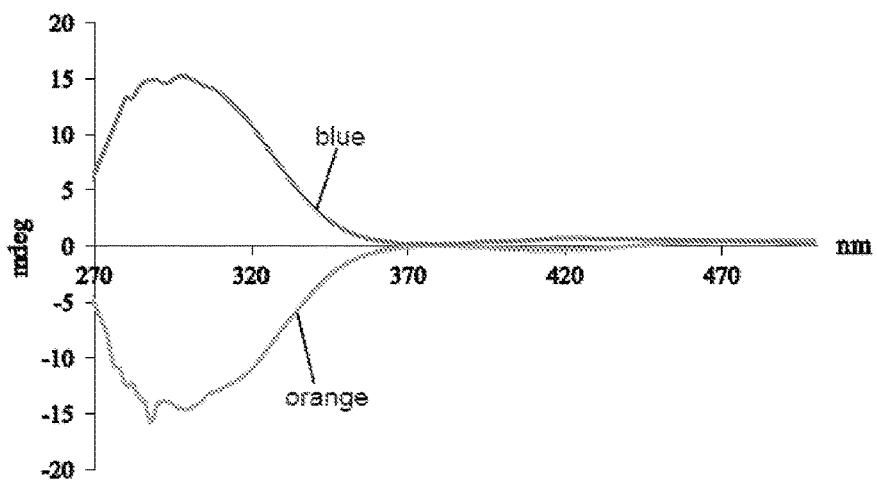
Figure 123:
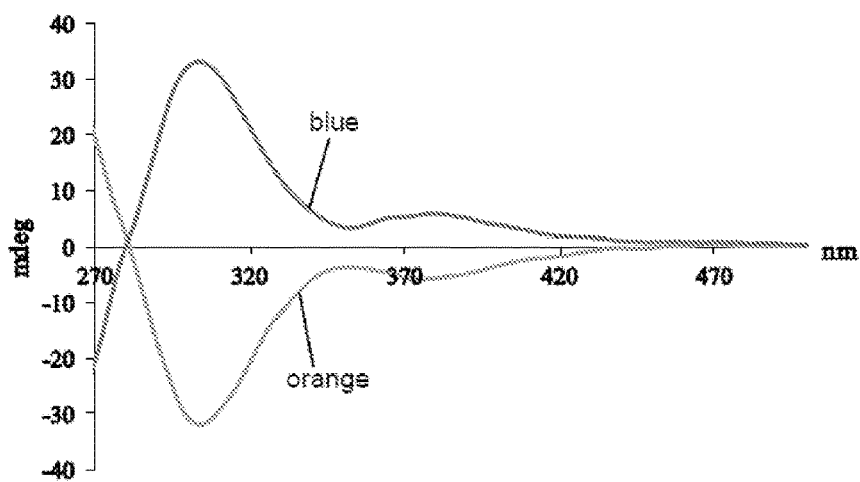
Figure 124:
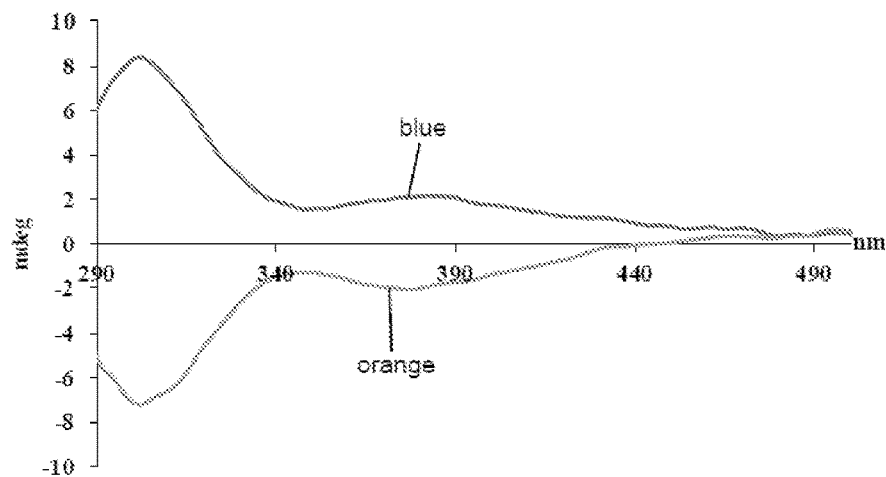
Figure 125:
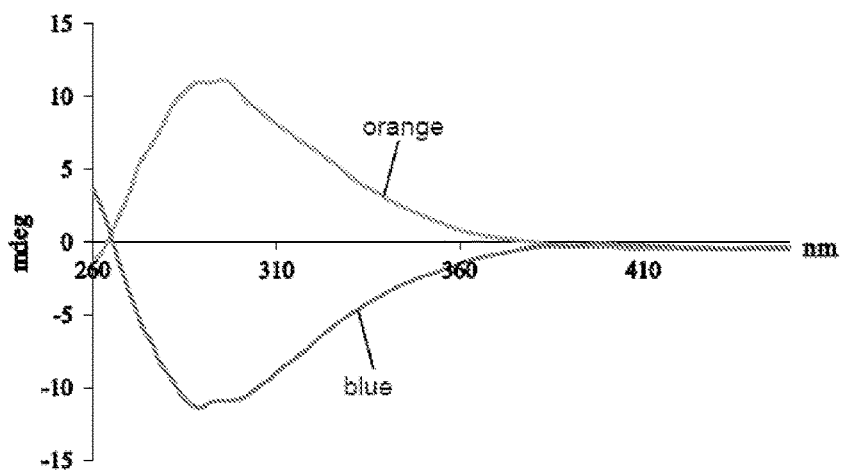
Figure 126:
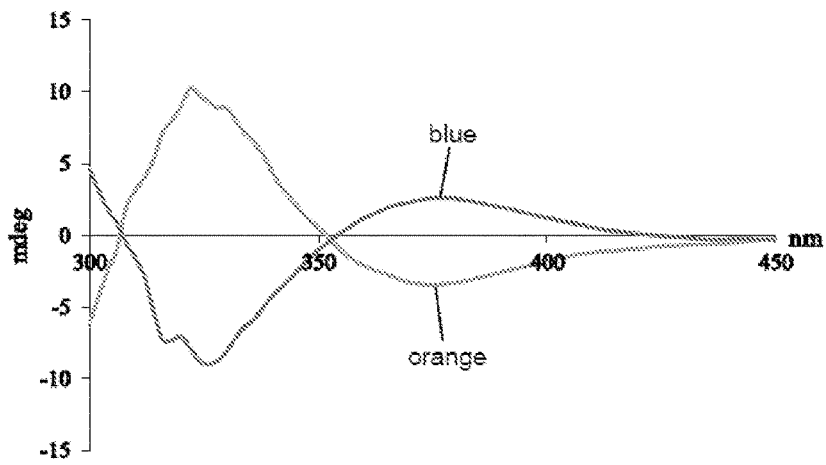
Figure 127:
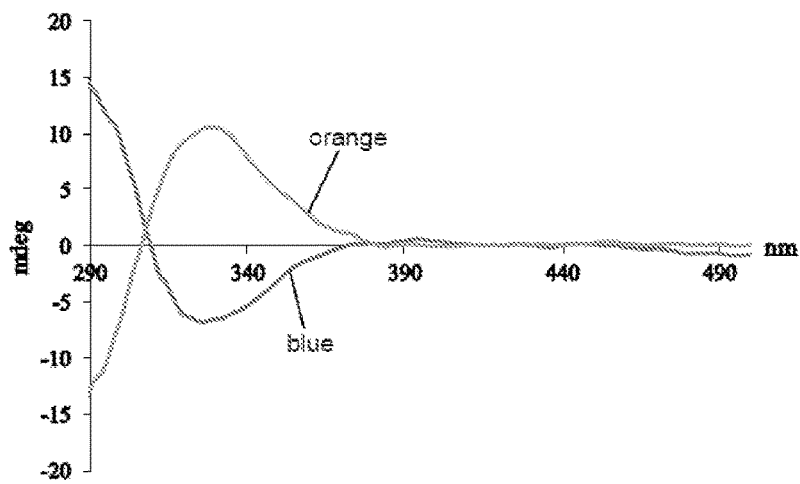
Figure 128:
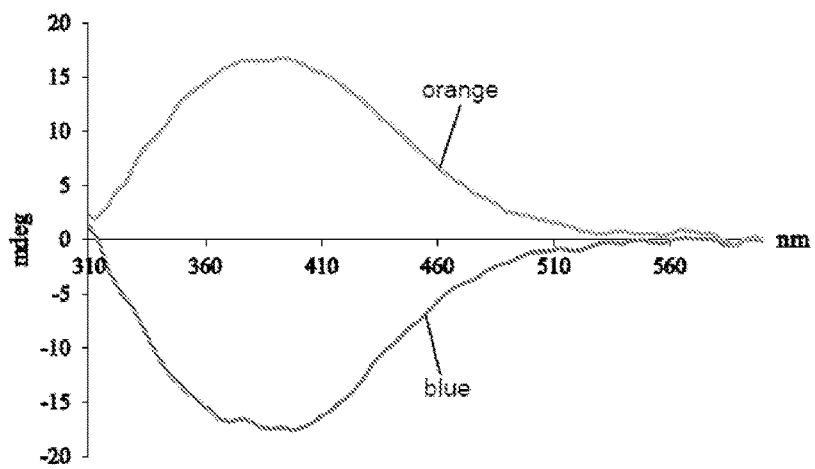
Figure 129:
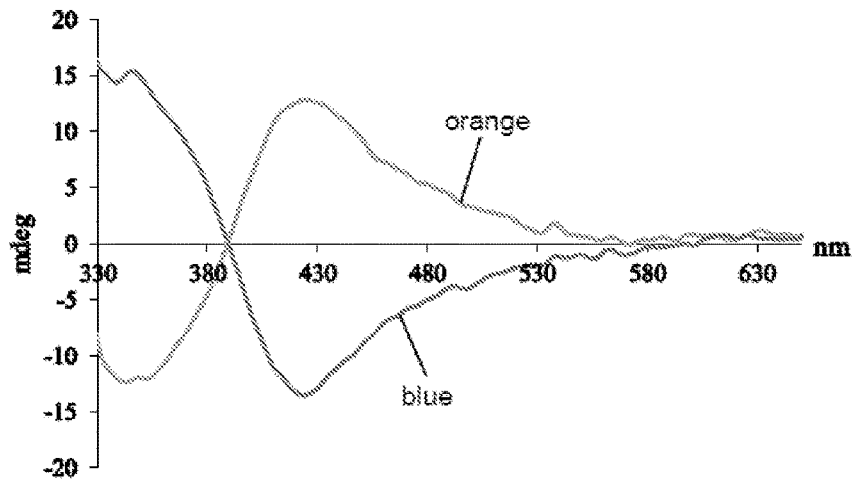
Figure 130:
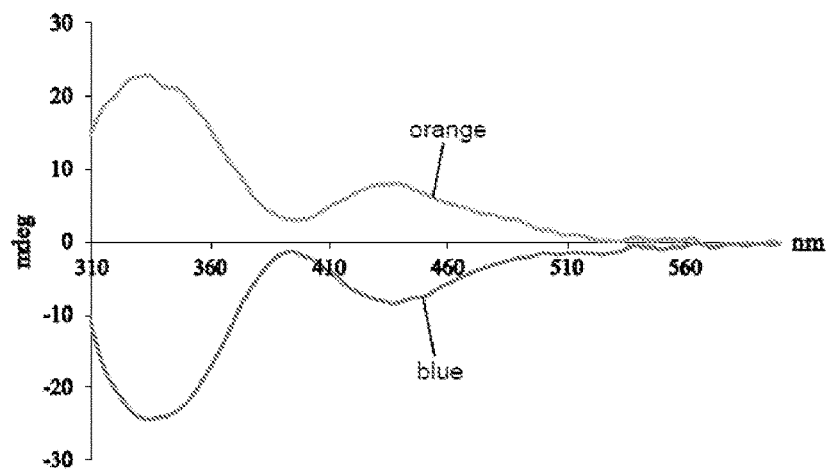

FIGS. 78-132 show the CD spectra from the enantioselective chemosensing testing of amino acids 1, 2, 4, 5, 6, 8, 9, 10, 15, 17 α-hydroxy acids 19-24, amino alcohols 25-28, 31, amines 34-37 and carboxylic acid 38, with differing probes. Table 9 discloses the chirality sensing abilities of $FeCl_3 \cdot 6H_2O$ and $CuCl_2 \cdot 2H_2O$ for each substrate.

TABLE 9

Comparison of the chirality sensing with $FeCl_3 \cdot 6H_2O$ and $CuCl_2 \cdot 2H_2O$

| Substrate | $FeCl_3$ | $CuCl_2$ |
|---|---|---|
| 1 | + | + |
| 2 | + | + |
| 4 | + | x |
| 5 | + | x |
| 6 | + | x |
| 8 | + | x |
| 9 | + | + |
| 10 | + | x |
| 15 | + | x |
| 17 | + | + |
| 19 | + | + |
| 20 | + | + |
| 21 | − | + |
| 22 | − | + |
| 23 | + | + |
| 24 | + | + |
| 25 | + | + |
| 26 | + | + |
| 27 | − | + |
| 28 | + | + |
| 31 | + | + |
| 34 | + | − |
| 35 | + | − |
| 36 | − | + |
| 37 | − | + |
| 38 | + | − |

+: Suitable for ee determination; x: insufficient ICD intensities; −: not suitable for ee quantification.

Example 7—Mechanistic Studies

UV Titration Analysis

A stock solution of $Cu(Cl)_2 \cdot 2H_2O$ or $Fe(Cl)_3 \cdot 6H_2O$ (1 M) in DMSO was prepared and 0.1 mL portions were transferred into 4 mL vials. The portions were then diluted with 0.4 mL DMSO. A solution of (S,R)-25 was prepared in DMSO (0.50 M). To each vial containing 0.5 mL of the Cu(II) or Fe(III) stock solutions were added increasing amounts of the substrate (0.0, 0.5, 1.0, 1.5, 2.0, 2.5, 3.0, 3.5, 4.0, 5.0 equivalents relative to Cu(II) or Fe(III)). UV analysis was performed at 0.5 or 0.25 mM in DMSO with an average scanning time of 0.1 s, a data interval of 1 nm, and a scan rate of 600 nm/min.

FIGS. 133 and 134 show the UV spectra and plot of the UV max values, respectively, of the reaction of $CuCl_2 \cdot 2H_2O$ and (S,R)-25 in DMSO. As shown in FIG. 134, the UV maximum at 380 nm continuously increased upon addition of the substrate showing saturation upon addition of 2.5 equivalents of (S,R)-25.

FIGS. 135 and 136 show the UV spectra and plot, respectively, of the reaction of $FeCl_3 \cdot 6H_2O$ and (R,R)-19 in DMSO. As shown in FIG. 136, the UV signal at 337 nm continuously decreased upon addition of the substrate showing saturation upon addition of 3 equivalents of (R,R)-19.

CD Titration Analysis

The CD of the reaction of probe $CuCl_2 \cdot 2H_2O$, and analyte (S,R)-25 (0-5 equivalents), as well as probe $FeCl_3 \cdot 6H_2O$, and analyte (R,R)-19 (0-5 equivalents) were obtained using the analytical method described herein. The concentrations for each reaction are disclosed in the brief description of the figures.

FIGS. 137 and 138 show the CD spectra and plot of the CD signal at 380 nm vs equivalents of (S,R)-25, respectively, of the reaction of $Cu(Cl)_2 \cdot 2H_2O$ and (S,R)-25 in DMSO.

As shown in FIG. 138, the magnitude of the CD signal at 380 nm increased steadily and reached a maximum in the presence of 2.5 equivalents of (S,R)-25.

FIGS. 139 and 140 show the CD spectra and plot of the CD signal at 338 nm vs equivalents of (R,R)-19, respectively, of the reaction of $Fe(Cl)_3 \cdot 6H_2O$ and (R,R)-19 in DMSO. As shown in FIG. 140, the CD signal at 338 nm increased steadily and reached a maximum in the presence of 3 equivalents of (R,R)-19.

Anion Effects

Stock solutions of $CuCl_2 \cdot 2H_2O$, $Cu(OAc)_2$, $Cu(CF_3CO_2)_2$, $Cu(NO_3)_2 \cdot 2.5H_2O$, $CuSO_4 \cdot 5H_2O$ and $CuClO_4 \cdot 6H_2O$ (0.02 M) in DMSO were prepared and 0.5 mL portions were transferred into 4 mL vials. A solution of 25 (0.50 M in DMSO) was prepared. To each vial containing 0.5 mL of the Cu(II) solution were added two equivalents (0.04 mL) of the substrate. CD analysis was performed by taking an aliquot (0.1 mL) of the reaction mixture and diluting it further with 2.0 mL of DMSO. FIG. 141 shows the results of the anion effect study of the different Cu(II) salts with (S,R)-25 in DMSO at 0.9 mM.

Stock solutions of $FeCl_3 \cdot 6H_2O$, $Fe(ClO_4)_3$ and $Fe(NO_3)_3 \cdot 9H_2O$ (0.0011 M) in DMSO were prepared and 0.5 mL portions were transferred into 4 mL vials. A solution of (R,R)-19 (0.17 M in water) was prepared. An equimolar amount of TBAOH (1.0 M in MeOH) was also added. To each vial containing 0.5 mL of the Fe(III) solution were added three equivalents (0.06 mL) of the substrate. CD analysis was performed by taking an aliquot (0.05 mL) of the reaction mixture and diluting it further with 2.0 mL of DMSO. FIG. 142 shows the results of the anion effect study of the different Fe(III) salts with (R,R)-19 in DMSO at 0.5 mM.

Example 8—Quantitative Chiroptical Sensing ee Determination of Tartaric Acid with $FeCl_3 \cdot 6H_2O$ A stock solution of $FeCl_3 \cdot 6H_2O$ (0.0011 M) in DMSO was prepared and portions of 0.5 mL were transferred into 4 mL vials. Solutions of 19 (0.17 M in water) at varying ee compositions (+100.0, +80.0, +60.0, +40.0, +20.0, 0.0, −20.0, −40.0, −60.0, −80.0, −100.0) and an equimolar amount of TBAOH were prepared. To each vial containing 0.5 mL of the Fe(III) solution were added three equivalents of 19 (0.06 mL). The CD analysis was carried out as described herein at a concentration of 0.5 mM (FIG. 143). The CD amplitudes measured at 286 and 338 nm were plotted against % ee (FIG. 144) and displayed a linear relationship.

Ten scalemic samples of 19 were prepared and then treated with the Fe(III) salt as described herein. Using the linear regression equations obtained from the calibration curves and the measured CD amplitudes at 286 and 338 nm, the enantiomeric excess and the absolute configuration of the major enantiomer were determined (Table 10).

TABLE 10

Summary of the results obtained by using the regression equations to determine the absolute configuration, and % ee of scalemic samples of tartaric acid using $FeCl_3 \cdot 6H_2O$

| Sample Composition | | Chiroptical Sensing (288 nm) | | Chiroptical Sensing (338 nm) | | |
|---|---|---|---|---|---|---|
| Abs. Config. | Actual % ee | Abs. Config.$^a$ | Calculated % ee$^b$ | Abs. Config.$^a$ | Calculated % ee$^b$ | Average % ee |
| R, R | 88.0 | R, R | 85.2 | R, R | 84.8 | 85.0 |
| R, R | 82.0 | R, R | 80.3 | R, R | 83.8 | 82.0 |
| R, R | 61.0 | R, R | 59.0 | R, R | 59.1 | 59.1 |
| R, R | 46.0 | R, R | 38.6 | R, R | 34.5 | 36.5 |
| R, R | 27.0 | R, R | 22.4 | R, R | 17.9 | 20.1 |
| S, S | 16.0 | S, S | 15.3 | S, S | 12.8 | 14.1 |
| S, S | 33.0 | S, S | 27.5 | S, S | 29.7 | 28.6 |
| S, S | 57.0 | S, S | 66.3 | S, S | 64.4 | 65.4 |
| S, S | 76.0 | S, S | 75.3 | S, S | 72.6 | 74.0 |
| S, S | 94.0 | S, S | 97.2 | S, S | 98.5 | 97.9 |

$^a$Based on the sign of the CD response.
$^b$Based on the amplitude of the CD response.

ee Determination of cis-Aminoindanol with $CuCl_2 \cdot 2H_2O$

A stock solution of $CuCl_2 \cdot 2H_2O$ (0.025 M) in DMSO was prepared and portions of 0.5 mL were transferred into 4 mL vials. Solutions of 25 (0.50 M in DMSO) at varying ee compositions (+100.0, +80.0, +60.0, +40.0, +20.0, 0.0, −20.0, −40.0, −60.0, −80.0, −100.0). To each vial containing 0.5 mL of the Cu(II) solution were added three equivalents of 25 (0.06 mL). The CD analysis was carried out as described herein at a concentration of 0.9 mM (FIG. 145). The CD amplitudes measured at 308 and 382 nm were plotted against % ee (FIG. 146), showing a polynomial relationship.

Five scalemic samples of 25 were prepared and then treated with the Cu(II) salt as described above. Using the linear regression equations obtained from the calibration curves and the measured CD amplitudes at 308 and 382 nm, the enantiomeric excess and the absolute configuration of the major enantiomer were determined (Table 11).

TABLE 11 ee determination of scalemic samples
of of cis-Aminoindanol with CuCl$_2$•2H$_2$O

| Sample Composition | | Chiroptical Sensing (308 nm) | | Chiroptical Sensing (382 nm) | | |
|---|---|---|---|---|---|---|
| Abs. Config. | Actual % ee | Abs. Config.[a] | Calculated % ee[b] | Abs. Config.[a] | Calculated % ee[b] | Average % ee |
| RS | 88.0 | RS | 88.1 | RS | 87.1 | 87.6 |
| RS | 46.0 | RS | 48.3 | RS | 48.2 | 48.2 |
| SR | 16.0 | SR | 14.2 | SR | 14.3 | 14.3 |
| SR | 76.0 | SR | 75.0 | SR | 73.3 | 74.2 |
| SR | 94.0 | SR | 95.2 | SR | 88.6 | 91.9 |

[a]Based on the sign of the CD response.
[b]Based on the amplitude of the CD response.

Example 9—Colorimetric Detection

Samples were prepared as described in Example 5. The mixtures (2.0 mM) were stirred for 1 hour at 25° C. and the images were obtained (FIGS. 147A-147L). The Pd(NO$_3$)$_2$ samples were prepared in MeOH, while all other metal solutions were prepared in DMSO.

Discussion of Examples 5-9

By screening Pd(NO$_3$)$_2$, FeCl$_2$, FeCl$_3$, MnCl$_2$, CuCl$_2$, Ce(NO$_3$)$_3$ and RhCl$_3$ strong Cotton effects were observed with a broad variety of chiral ligands (FIG. 148). The metal salts and analytes 1, 2, 4, 5, 6, 8, 9, 10, 15, 17, 19-28, 31, and 34-38 were simply combined in either MeOH, DMSO or water and then subjected to CD analysis after dilution to 0.5-1.8 mM solutions. In contrast to the chiroptical sensing with cobalt, the use of an oxidant is not necessary and the auxiliary-free chirality sensing is now extended to monofunctional compounds. The samples can be exposed to air and moisture and it is important to note that the inherent practicality of this sensing procedure greatly facilitates adaptation to automated high-throughput experimentation equipment.

The tested compounds include many examples of amino acids, amino alcohols, hydroxy acids, amines and carboxylic acids. The induced CD (ICD) effects typically have maxima above 300 nm which is advantageous for quantitative ee analysis because interference at lower wavelength arising from small amounts of CD-active impurities can typically be avoided. Importantly, the aliphatic and aromatic test compounds are CD-silent in the absence of the metal salts under the same conditions. Representative CD spectra for the sensing of 1, 10, 23 and 25 using palladium, iron and copper salts are shown in FIGS. 149A-149D. It is noteworthy that the sensing with Cu(II) and Fe(III) salts is particularly broad in scope, covering almost all analytes tested. The general simplicity of the sensing workflow originates from a true mix-and-measure procedure as shown herein. The sensing also coincides with characteristic colorimetric changes that can be used for naked-eye detection and analyte classification FIGS. 150A-150B.

Based on the distinct CD effects obtained with FeCl$_3$ and CuCl$_2$ it was decided to use the simple mix-and-measure protocol described herein for quantitative analysis of the enantiomeric composition of tartaric acid, 19, and cis-aminoindanol, 25. The stoichiometry and structures of ferric and cupric complexes carrying amino acid, hydroxy acid, or amine ligands have been reported based on spectrophotometric, potentiometric and mass spectrometric measurements to vary significantly with solvent, pH and other conditions, and several species can co-exist in solution (Djurdjevic, P. & Jelic, R., Transition Met. Chem. 22:284 (1997); Randhawa, B. S. & Sweety, K., J. Them. Anal. Calorim. 62:295 (2000); Dallavalle et al., Polyhedron 20:103 (2001); Dogan et al., Anal. Biochem. 295:237 (2001); Wu et al., J. Mass Spectrom. 38:386 (2003); Lahsasni et al., Int. J. Electrochem Sci. 7:7699 (2012), which are hereby incorporated by reference in their entirety). It is expected that this is also the case for Fe(III) tartrates and Cu(II) aminoindanol complexes which may form mixtures of mono- and polynuclear species (Timberlake, C. F., J. Chem. Soc. 1229 (1964); Seppala et al., Coord. Chem. Rev. 347:98 (2017), which is hereby incorporated by reference in its entirety). Interestingly, sensing of tartrate with ferric chloride, perchlorate and nitrate salts showed minor differences in the ICD intensities whereas the comparison of the chiroptical signals obtained with cis-aminoindanol and cupric chloride, acetate, trifluoroacetate, nitrate, sulfate and perchlorate revealed more significant counteranion effects on both the ICD shapes and intensities. Altogether, these results indicate that the UV and CD responses observed originate from complex equilibria between co-existing metal complexes. CD titration experiments showed that the addition of (R,R)-19 and (S,R)-25 to FeCl$_3$ and CuCl$_2$, respectively, in DMSO yields maximum Cotton effects at a 3:1 ratio. Calibration curves were constructed with nonracemic tartaric acid samples and a linear relationship between the induced CD maxima and the sample ee values was found (FIGS. 151A-151B). Using FeCl$_3$ as sensor, TBAOH as base and DMSO as solvent, the enantiomeric composition of 10 samples of 19 were then analyzed. The absolute configuration of the major enantiomer was assigned based on the sign of the ICD signal and the ee values were calculated from the amplitude of the measured CD signals at 288 and 338 nm. As is shown in Table 12, samples were tested covering a wide ee range with either the (S,S)- or the (R,R)-enantiomer in excess. In all cases, the absolute error margin is less than 10% which is acceptable for high-throughput screening applications. For example, the enantiomeric compositions of the samples containing (R,R)-19 in 88.0% ee and (S,S)-19 in 16.0% ee, respectively, were determined as 85.0 and 14.1% ee (entries 1 and 6).

TABLE 12

Quantitative chirality sensing of tartaric acid samples with FeCl$_3$.

| | Sample Composition | | Chiroptical Sensing Results | | |
|---|---|---|---|---|---|
| Entry | Abs. Config. | % ee | Abs. Config.[a] | % ee (ICDs at 288 and 338 nm)[b] | Averaged % ee |
| 1 | R, R | 88.0 | R, R | 85.2    84.8 | 85.0 |
| 2 | R, R | 82.0 | R, R | 80.3    83.8 | 82.0 |
| 3 | R, R | 61.0 | R, R | 59.0    59.1 | 59.1 |
| 4 | R, R | 46.0 | R, R | 38.6    34.5 | 36.5 |
| 5 | R, R | 27.0 | R, R | 22.4    17.9 | 20.1 |
| 6 | S, S | 16.0 | S, S | 15.3    12.8 | 14.1 |
| 7 | S, S | 33.0 | S, S | 27.5    29.7 | 28.6 |
| 8 | S, S | 57.0 | S, S | 66.3    64.4 | 65.4 |
| 9 | S, S | 76.0 | S, S | 75.3    72.6 | 74.0 |
| 10 | S, S | 94.0 | S, S | 97.2    98.5 | 97.9 |

[a]Based on the sign of the CD response.
[b]Based on the amplitude of the CD response.

Interestingly, the sensing of the amino alcohol 25 with copper(II) chloride in DMSO revealed a nonlinear relationship between the ICD maxima at 308 and 382 nm and the sample ee's (FIGS. 152A-152B). This, however, does not affect the accuracy of the quantitative analysis. The determination of the absolute configuration and enantiomeric composition of 5 nonracemic samples is shown in Table 13. The absolute configuration of the major enantiomer was correctly assigned in all cases and the averaged % ee values remained within a 3% absolute error margin,

TABLE 13

Quantitative chirality sensing of cis-aminoindanol samples with $CuCl_2$.

| | Sample Composition | | Chiroptical Sensing Results | | |
|---|---|---|---|---|---|
| Entry | Abs. Config. | % ee | Abs. Config.[a] | % ee (ICDs at 308 and 382 nm)[b] | Averaged % ee |
| 1 | RS | 88.0 | RS | 88.1 87.1 | 87.6 |
| 2 | RS | 46.0 | RS | 48.3 48.2 | 48.2 |
| 3 | SR | 16.0 | SR | 14.2 14.3 | 14.3 |
| 4 | SR | 76.0 | SR | 75.0 73.3 | 74.2 |
| 5 | SR | 94.0 | SR | 95.2 88.6 | 91.9 |

[a]Based on the sign of the CD response.
[b]Based on the amplitude of the CD response.

In summary, it is shown herein that optical chirality sensing of unprotected amino acids, hydroxy acids, amino alcohols, amines and carboxylic acids is possible with readily available cobalt, copper, iron, palladium, manganese, cerium or rhodium salts. The broad scope of inexpensive Cu(II) and Fe(III) chlorides that have been successfully applied to chiroptical sensing of a variety of mono and multifunctional compounds is particularly attractive and the ee values of nonracemic samples of tartaric acid and aminoindanol were able to be determine with good accuracy. The mix-and-measure method disclosed herein is very practical, fast and does not require anhydrous solvents or inert reaction conditions. The metal salt and the chiral sample are simply mixed, stirred for one hour and then subjected to CD analysis. A stoichiometric amount of TBAOH is added when acidic compounds are analyzed. The use of a chromophoric ligand or other reagents is not necessary and one can use MeOH, DMSO or water as solvent. The time efficiency, operational simplicity, solvent compatibility and the reduced cost are advantageous features of this optical sensing assay. Additionally, it can be easily adapted to high-throughput experimentation equipment for parallel ee analysis of hundreds of samples.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. An analytical method comprising:
providing a sample potentially containing a chiral analyte that can exist in stereoisomeric forms;
providing a probe in the form of a ligand-free metal salt;
contacting the sample with the probe under conditions that permit coordination of the probe to the analyte, if present in the sample; and
determining, based on any coordination that occurs, the absolute configuration of the analyte in the sample, and/or the concentration of the analyte in the sample, and/or the enantiomeric composition of the analyte in the sample.

2. The analytical method of claim 1, wherein the probe is a transition metal salt or lanthanide metal salt selected from the group consisting of ligand-free cobalt salts, ligand-free palladium salts, ligand-free copper salts, ligand-free iron salts, ligand-free manganese salts, ligand-free cerium salts, and ligand-free rhodium salts.

3. The analytical method of claim 2, wherein the ligand-free cobalt salt is selected from the group consisting of $Co(NO_3)_2$, $Co(ClO_4)_2$, $Co(OH)_2$, $CoC_2O_4 \cdot 2H_2O$, $Co(SCN)_2$, $CoF_2$, $CoBr_2$, $CoC_{12}$, $CoI_2$, $Co_3(PO_4)_2$, $CoSO_4$, $Co(CO_3)_2$, $Co(C_2O_4)_2$, and their hydrates.

4. The analytical method of claim 2, wherein the ligand-free palladium salt is selected from the group consisting of $Pd(NO_3)_2$, $Pd(CN)_2$, $PdF_2$, $PdBr_2$, $PdCl_2$, $PdI_2$, $PdSO_4$, $Pd(ACN)_2(Br)_2$, $Pd(ACN)_4(BF_4)_2$, $Pd(ACN)_2Cl_2$, and their hydrates.

5. The analytical method of claim 2, wherein the ligand-free copper salt is selected from the group consisting of CuBr, $CuBr(Me_2S)$ complex, CuCl, CuF, CuI, CuSCN, Cu(OAc), $Cu(ACN)_4PF_6$, $Cu(ACN)_4BF_4$, $Cu(ACN)_4OTf$, $Cu(NO_3)_2$, $Cu(ClO_4)_2$, $CuSO_4$, $CuF_2$, $CuBr_2$, $CuC_{12}$, $CuCl_2 \cdot 2H_2O$, $Cu_2(P_2O_7)$, $Cu(tartrate)_2$, $Cu(BF_4)_2$, $Cu(SCN)_2$, $Cu(OAc)_2$, $Cu(acac)_2$, $Cu(CO_3)_2$, $Cu(t$-butylacac$)_2$, $Cu(OTf)_2$, and their hydrates.

6. The analytical method of claim 2, wherein the ligand-free iron salt is selected from the group consisting of $Fe(NO_3)_2$, $Fe(C_2O_4)_2$, $Fe(ClO_4)_2$, $Fe_3(PO_4)_2$, $Fe(BF_4)_2$, $FeC_2O_4 \cdot 2H_2O$, $FeSO_4$, $FeF_2$, $FeBr_2$, $FeCl_2$, $FeI_2$, $FeCl_3 \cdot 6H_2O$, $FeCl_2 \cdot 4H_2O$, $FeF_3$, $FeBr_3$, $FeCl_3$, $Fe(NO_3)_3$, $Fe_2(C_2O_4)_3$, $FePO_4$, $Fe(acac)_3$, and their hydrates.

7. The analytical method of claim 2, wherein the ligand-free manganese salt is selected from the group consisting of $Mn(CO_3)_2$, $Mn(NO_3)_2$, $MnSO_4 \cdot 2H_2O$, $MnF_2$, $MnBr_2$, $MnCl_2$, $MnCl_2 \cdot 4H_2O$, $MnI_2$, Mn(formate)$_2$, $Mn(ClO_4)_2$, and their hydrates.

8. The analytical method of claim 2, wherein the ligand-free cerium salt is selected from the group consisting of $CeBr_3$, $CeCl_3$, $CeF_3$, $Ce(CO_3)_3$, $Ce(OAc)_3$, $Ce(NO_3)_3$, $Ce(acac)_3$, $Ce(C_2O_4)_3$, $Ce(SO_4)_3$, $Ce(NO_3)_3 \cdot 6H_2O$, $CeCl_3 \cdot 7H_2O$, and their hydrates.

9. The analytical method of claim 2, wherein the ligand-free rhodium salt is selected from the group consisting of $Rh(OAc)_3$, $Rh(NO_3)_3$, $RhCl_3 \cdot 3H_2O$, $Rh(SO_4)_3$, and their hydrates.

10. The analytical method of claim 1, wherein the analyte is selected from the group consisting of amines, diamines, amino alcohols, carboxylic acids, hydroxy acids, amino acids, amino phosphonic acids, alcohols, thiols, amides, and combinations thereof.

11. The analytical method of claim 1, wherein said conditions to permit coordination of the probe to the analyte include oxidizing conditions.

12. The analytical method of claim 1 further comprising: addition of a base.

13. The analytical method of claim 1, wherein said contacting is carried out in a solvent selected from aqueous solvents, protic solvents, aprotic solvents, and any combination thereof.

14. The analytical method of claim 1, wherein said contacting is carried out under air or in an aqueous environment.

15. The analytical method of claim 1, wherein said contacting is carried out for about 1 to about 300 minutes.

16. The analytical method of claim 1, wherein said contacting is carried out at about 20° C. to about 100° C.

17. The analytical method of claim 1, wherein the absolute configuration of the analyte is determined using circular dichroism spectroscopy, optical rotatory dispersion, or polarimetry.

18. The analytical method of claim 1, wherein the concentration of the analyte is determined using UV/Vis spectroscopy, fluorescence spectroscopy, and/or other spectroscopic techniques.

19. The analytical method of claim 1, wherein the enantiomeric composition of the analyte is determined using circular dichroism spectroscopy, optical rotatory dispersion, or polarimetry.

20. The analytical method of claim 1, wherein the analyte is a reaction product and the stereoselectivity and yield of the reaction are determined by determining the enantiomeric composition and concentration of the analyte.

21. The analytical method of claim 1, wherein the metal is a non-fluorescent metal ion.

22. The analytical method of claim 21, wherein said determining further comprises using emission spectroscopy.

23. The analytical method of claim 1, wherein said determining comprises using absorption spectroscopy and/or transmission spectroscopy.

24. The analytical method of claim 1, wherein said determining is carried out using circular dichroism spectroscopy and the metal produces circular dichroism signals at a high wavelength and/or at a high intensity.

25. The analytical method of claim 1, wherein the analyte: metal molar ratio is about 1:1, about 2:1, about 3:1, about 4:1, about 5:1, or about 6:1.

26. The analytical method of claim 1, wherein the method is carried out in the absence of an auxiliary ligand or group, in the absence of a chromophore ligand, in the absence of an organic ligand, or in the absence of both a chromophore ligand and organic ligand.

* * * * *